United States Patent [19]

Vinal

[11] 4,096,378

[45] Jun. 20, 1978

[54] DISTORTED TWO FREQUENCY CODED DATA INTERPRETING METHOD AND APPARATUS

[75] Inventor: Albert Watson Vinal, Cary, N.C.

[73] Assignee: International Business Machines Corporation, Armonk, N.Y.

[21] Appl. No.: 655,337

[22] Filed: Feb. 5, 1976

Related U.S. Application Data

[63] Continuation of Ser. No. 522,210, Nov. 8, 1974, abandoned.

[51] Int. Cl.² .............................................. G06K 7/00
[52] U.S. Cl. ...................................... 235/466; 360/43
[58] Field of Search ................. 360/43; 235/61.11 D, 235/61.11 E; 340/347 DD

[56] References Cited

U.S. PATENT DOCUMENTS

| | | | |
|---|---|---|---|
| 3,663,800 | 5/1972 | Myer et al. | 235/61.11 E |
| 3,711,843 | 1/1973 | Galvagni et al. | 360/43 |
| 3,737,632 | 6/1973 | Barnes | 360/43 |
| 3,737,895 | 6/1973 | Cupp et al. | 340/347 DD |

Primary Examiner—Thomas J. Sloyan
Attorney, Agent, or Firm—E. H. Duffield

[57] ABSTRACT

An improved method and apparatus are disclosed for the reading (or sensing) and decoding of two frequency "bar coded" or transition coded sensible data. The data may take the form of indicia recorded on various media or it may be transmitted on a communications channel. The method and apparatus include means for simultaneously or separately accommodating both variable velocity scan (or distorted reception) conditions and non-uniform bar widths in the coded data or other variations in the spacing of transition signals in the recorded indicia. Frequency variations in transmitted data signals can also be accommodated. Hand held sensor or "wand" scanning of coded tangible indicia-bearing media is facilitated for either optically or magnetically recorded data indicia. Correct interpretation of frequency-distorted transmitted data is also made possible.

72 Claims, 81 Drawing Figures $$T_{sg} = \gamma\left(\frac{T_{n-2} + T_{n-1}}{2}\right) = \frac{T/2 - 2\Delta + T}{2} = 3/4\,T - \Delta$$

$$\left.\begin{array}{l} T_{n-1} = T + 2\Delta \\ T_{n-2} = T - 2\Delta \end{array}\right\} \text{SOLVE FOR } \Delta$$

$$\therefore \frac{T_{n-1} - T_{n-2}}{4} = \Delta$$

AND $\dfrac{T_{n-1} + T_{n-2}}{2} = T$ $$\therefore T_{sg} = 3/4\left(\frac{T_{n-1} + T_{n-2}}{2}\right) - \left(\frac{T_{n-1} - T_{n-2}}{4}\right)$$

$$T_{sg} = 1/8\left[T_{n-1} + 5\,T_{n-2}\right]$$

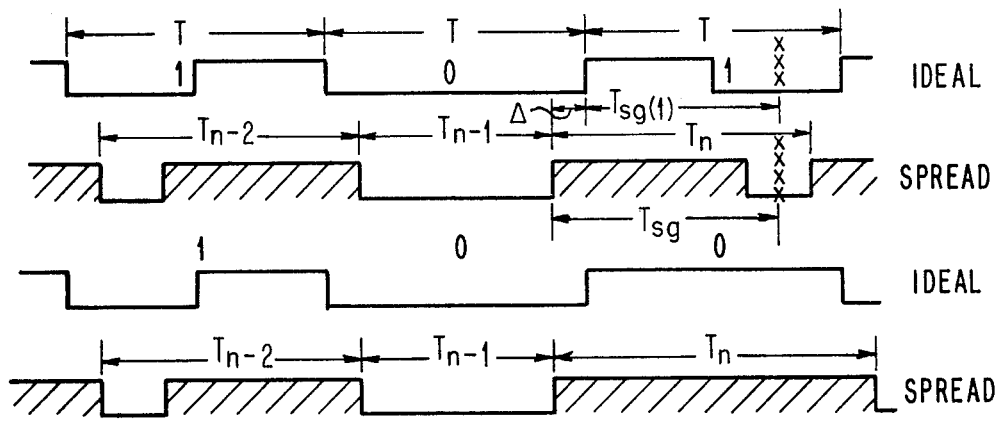
FIG. 3F  POSITIVE SPREAD  $T_{n-2} = "1"$  $T_{n-1} = "0"$
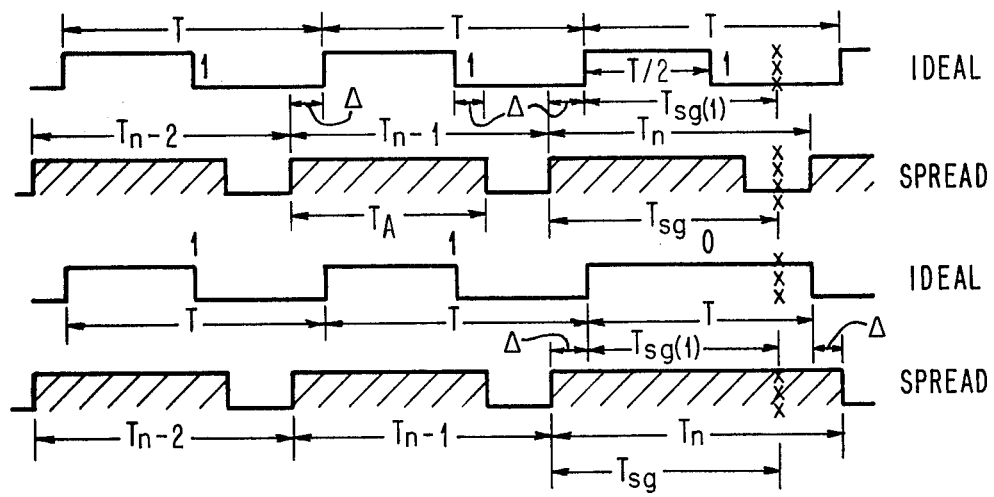
FIG. 3G  POSITIVE SPREAD  $T_{n-2} = "1"$  $T_{n-1} = "1"$ POSITIVE SPREAD
$T_{n-2} = "1"$
$T_{n-1} = "1"$ POSITIVE SPREAD
$T_{n-2} = "1"$
$T_{n-1} = "1"$

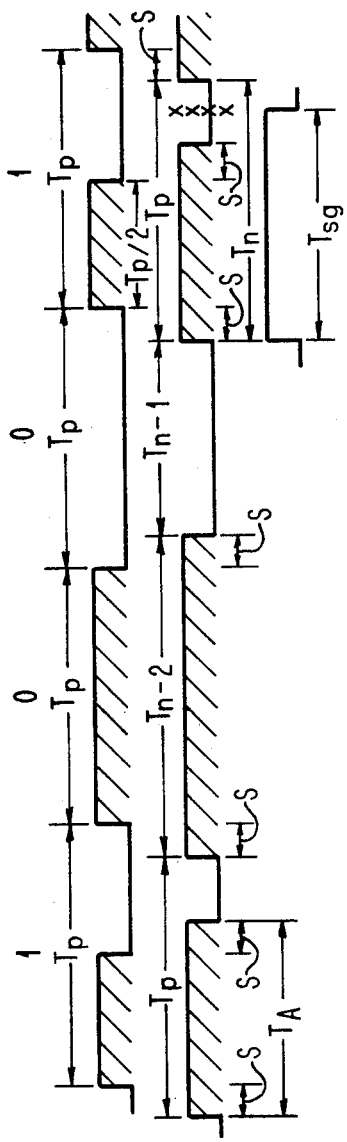
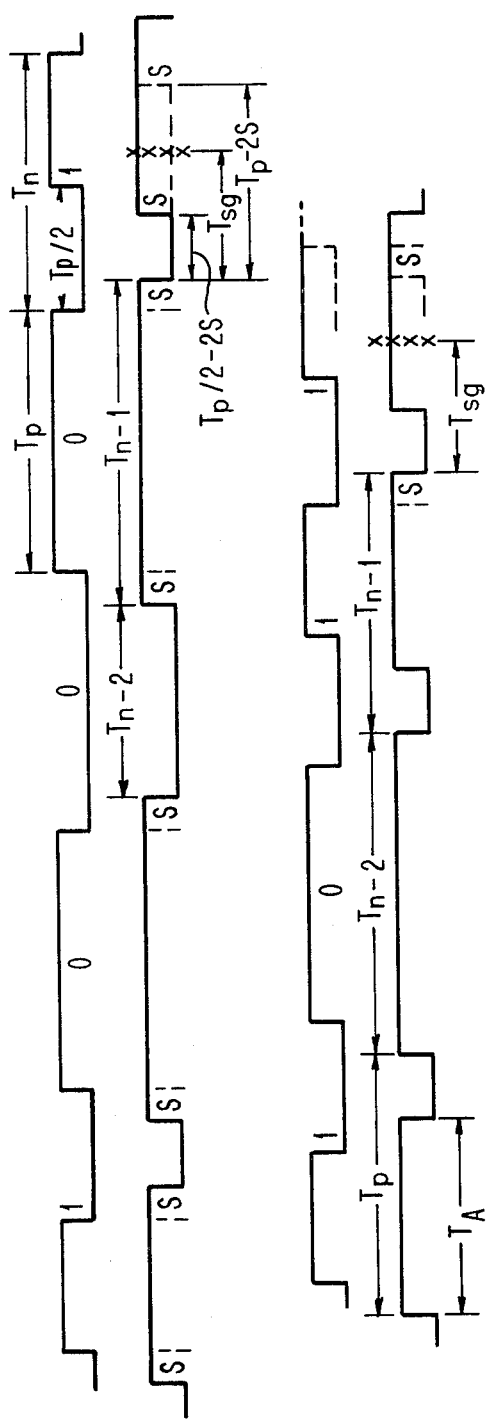
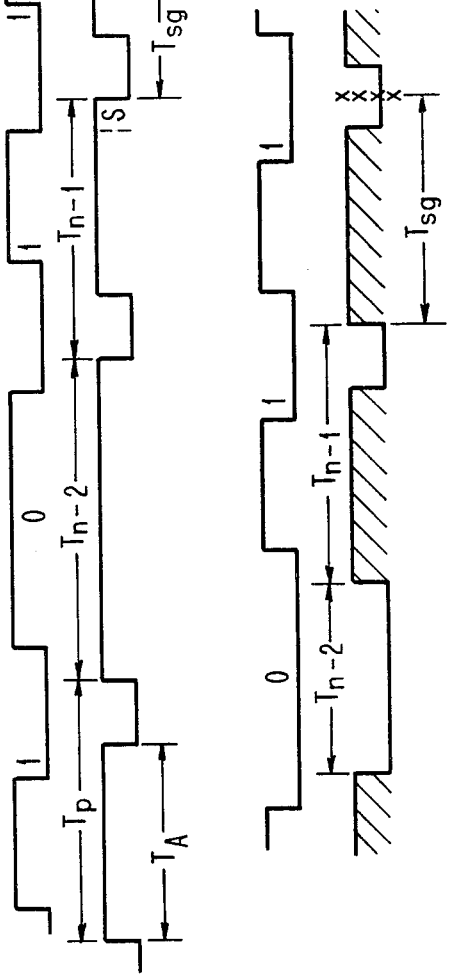
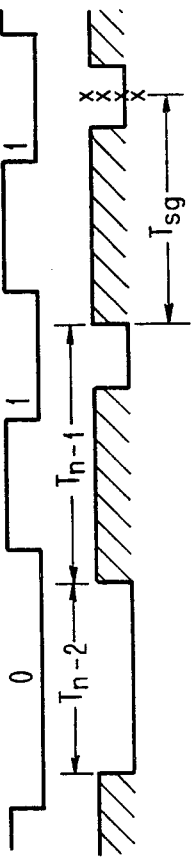
FIG. 7
$T_{n-1} = "0"$ (EVEN)
$T_{n-2} = "0"$ (ODD)
AND $T_{n-1} < T_{n-2}$
AND $K_p$ IS POSITIVE
FIG. 8
$T_{n-1} = "0"$ (ODD)
$T_{n-2} = "0"$ (EVEN)
AND $T_{n-1} > T_{n-2}$
AND $K_p$ IS POSITIVE
FIG. 9
$T_{n-1} = "1"$
$T_{n-2} = "0"$ (ODD) AND
$T_{n-1} < T_{n-2}$ AND
$K_p$ IS POSITIVE
FIG. 10
$T_{n-1} = "1"$
$T_{n-2} = "0"$ (EVEN)
$T_{n-1} > T_{n-2}$ AND
$K_p$ IS POSITIVE $T_{n-2} = \text{"1"}$
$T_{n-1} = \text{"0"}$ (ODD)
$T_{n-1} > T_{n-2}$ AND
$K_p$ IS POSITIVE $T_{n-2} = \text{"1"}$
$T_{n-1} = \text{"0"}$ (ODD)
$T_{n-1} < T_{n-2}$ AND
$K_p$ IS POSITIVE $T_{n-2} = \text{"1"}$
$T_{n-1} = \text{"1"}$
$T_{n-1} < 2T_A$ AND
$K_p$ IS POSITIVE $T_{n-1} = \text{"1"}$
$T_{n-2} = \text{"1"}$
$T_{n-1} > 2T_A$

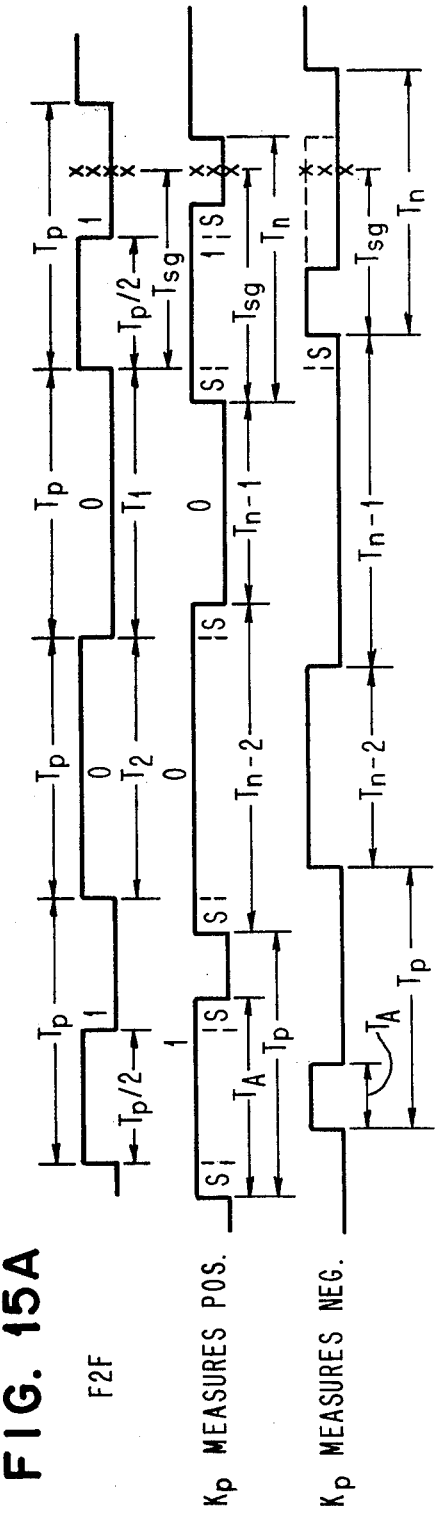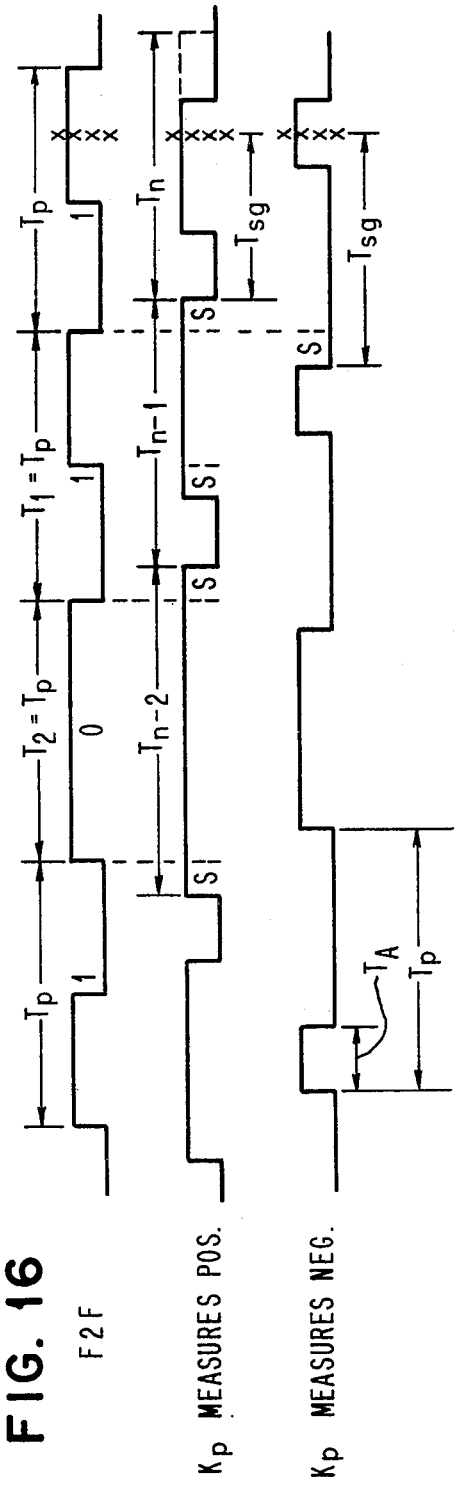

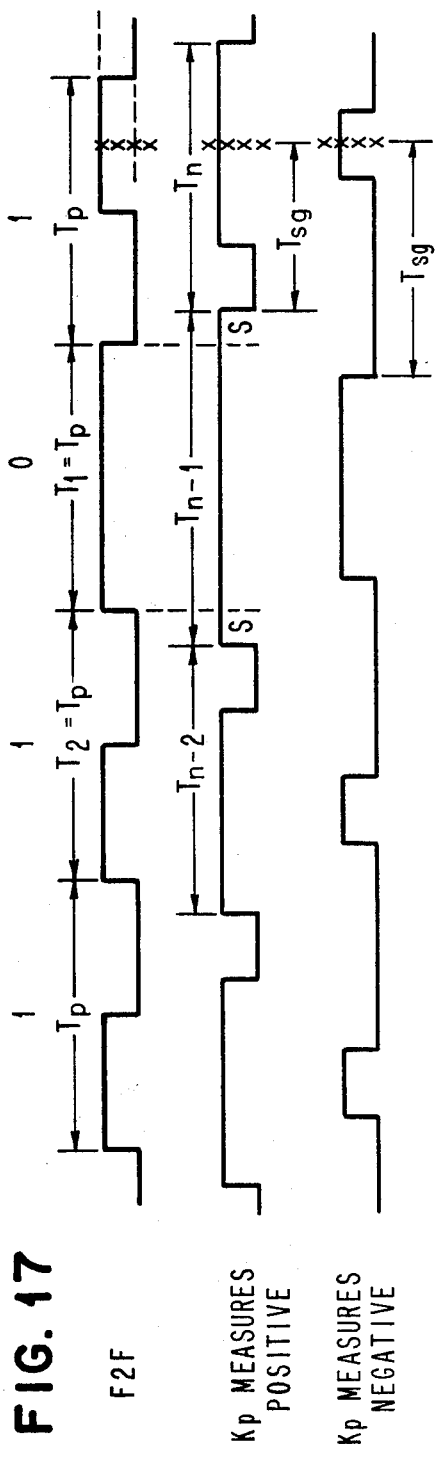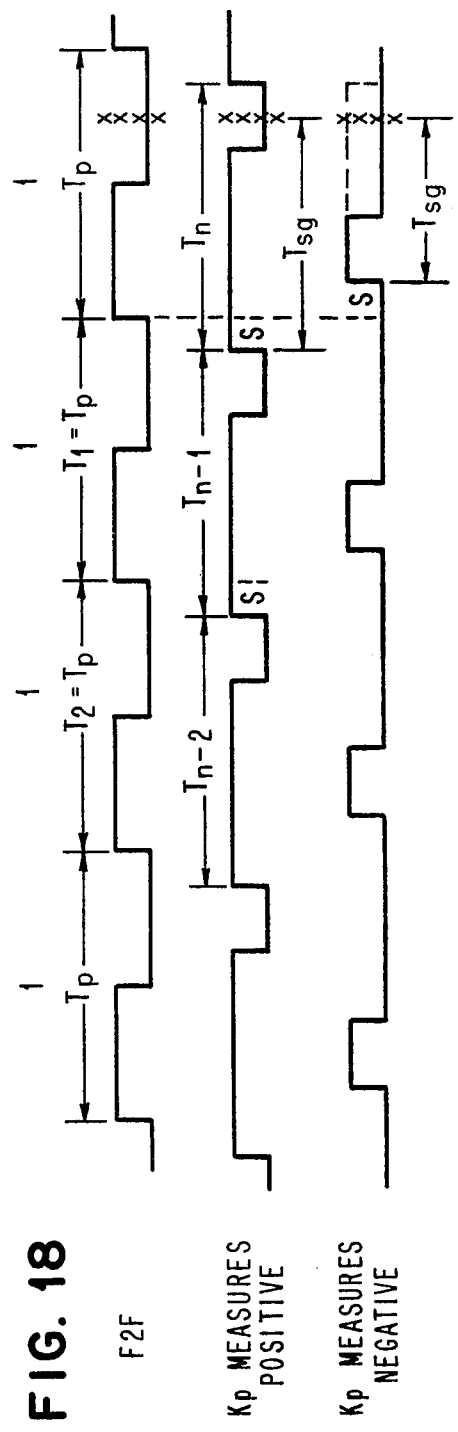

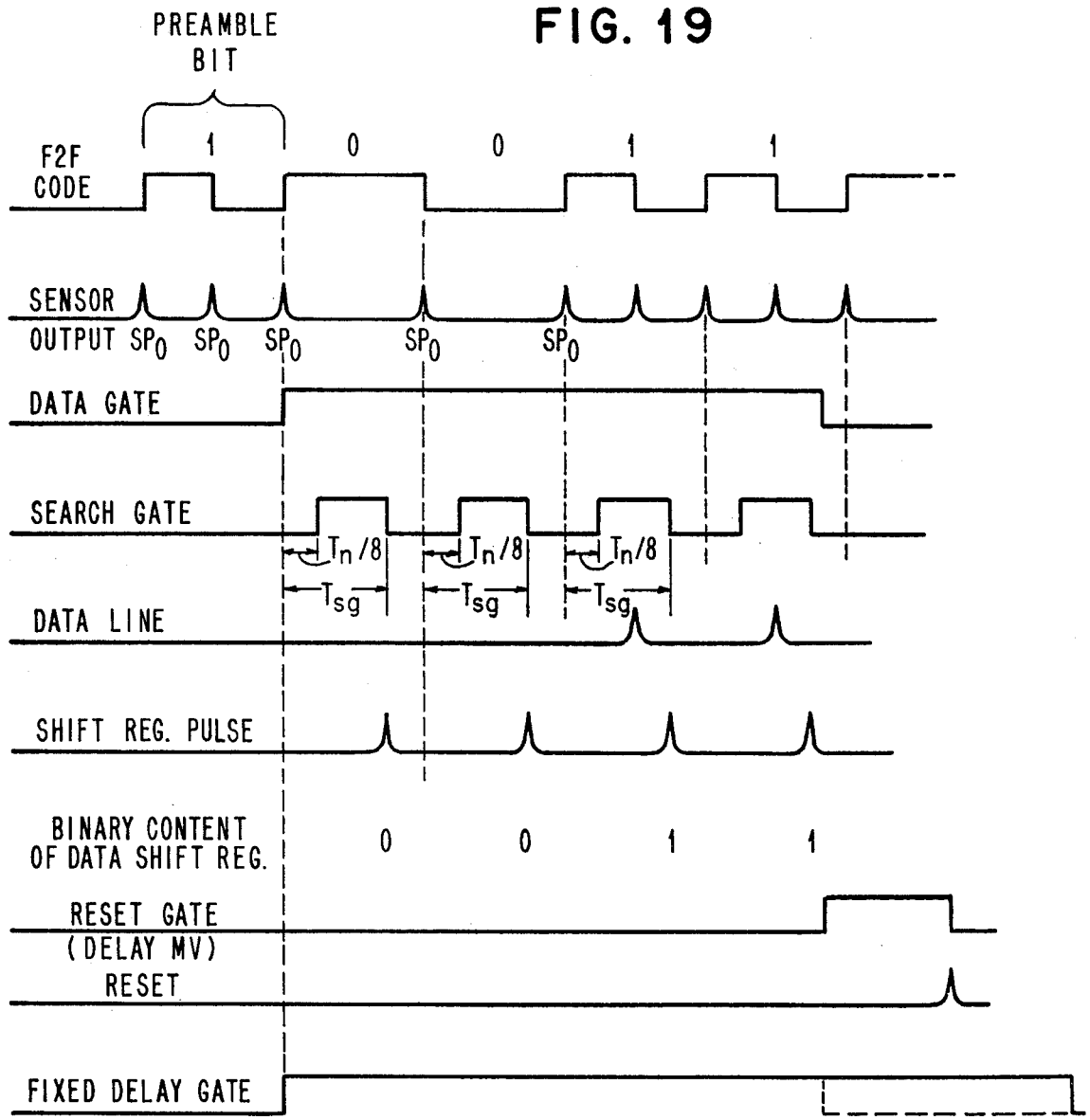

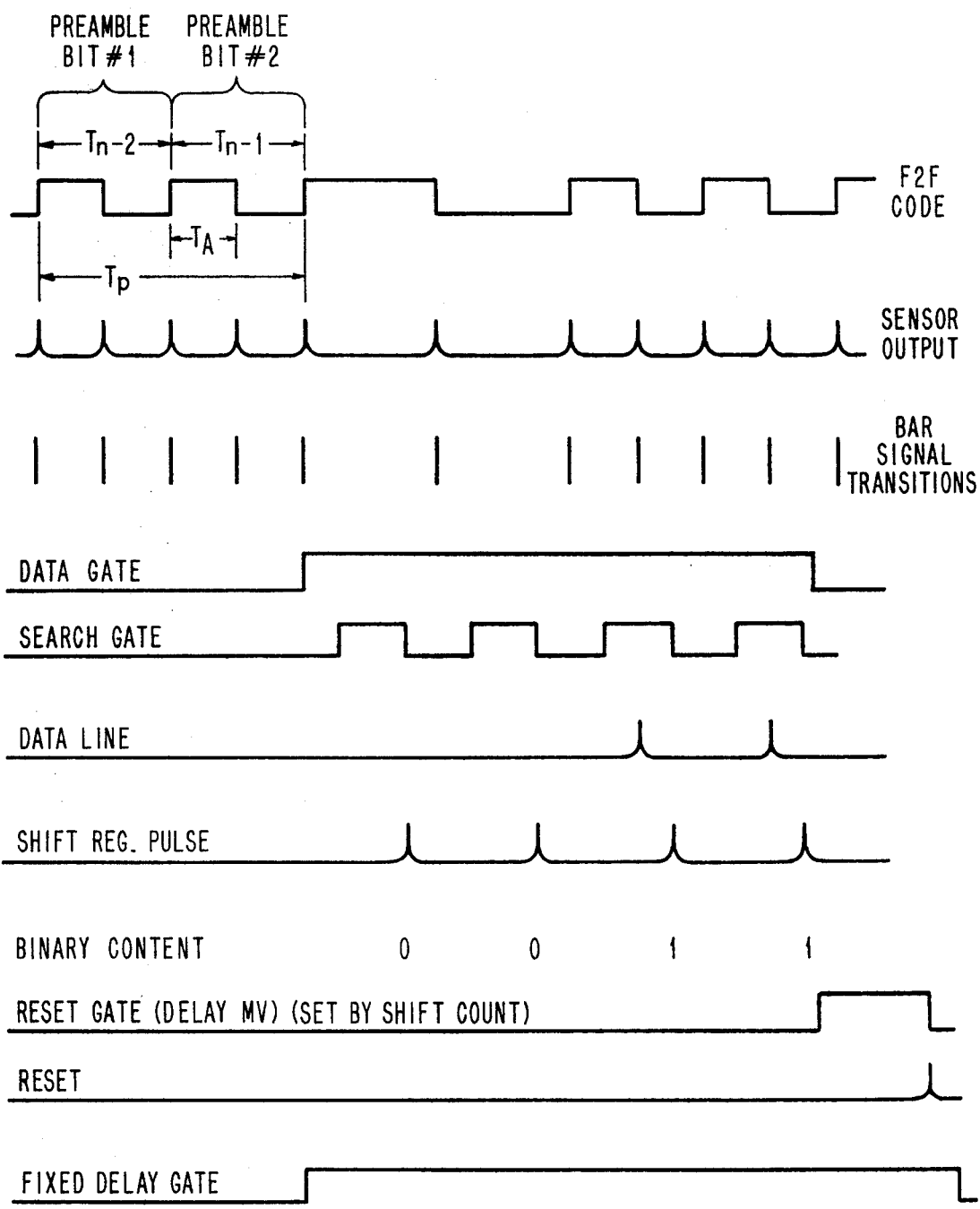

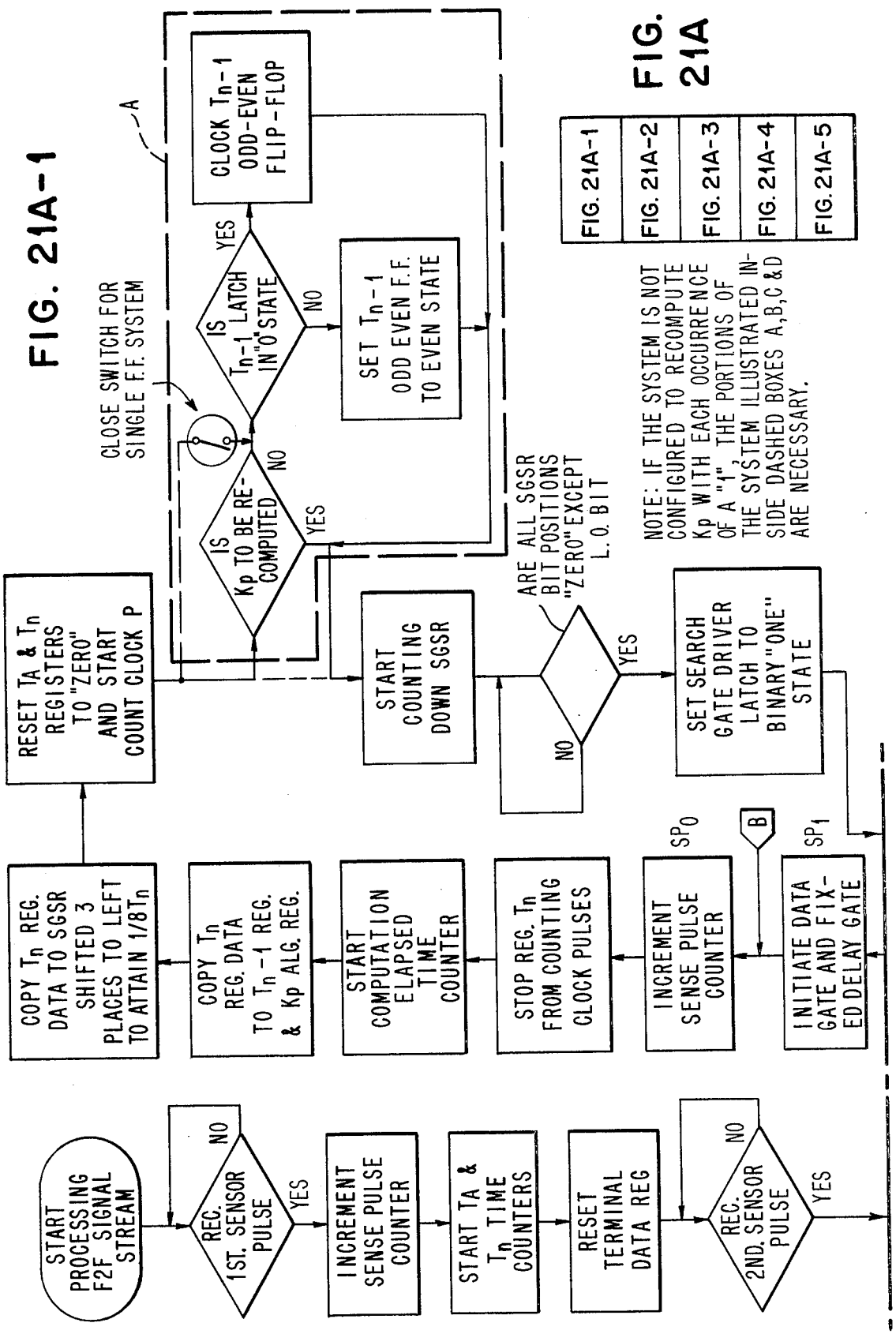

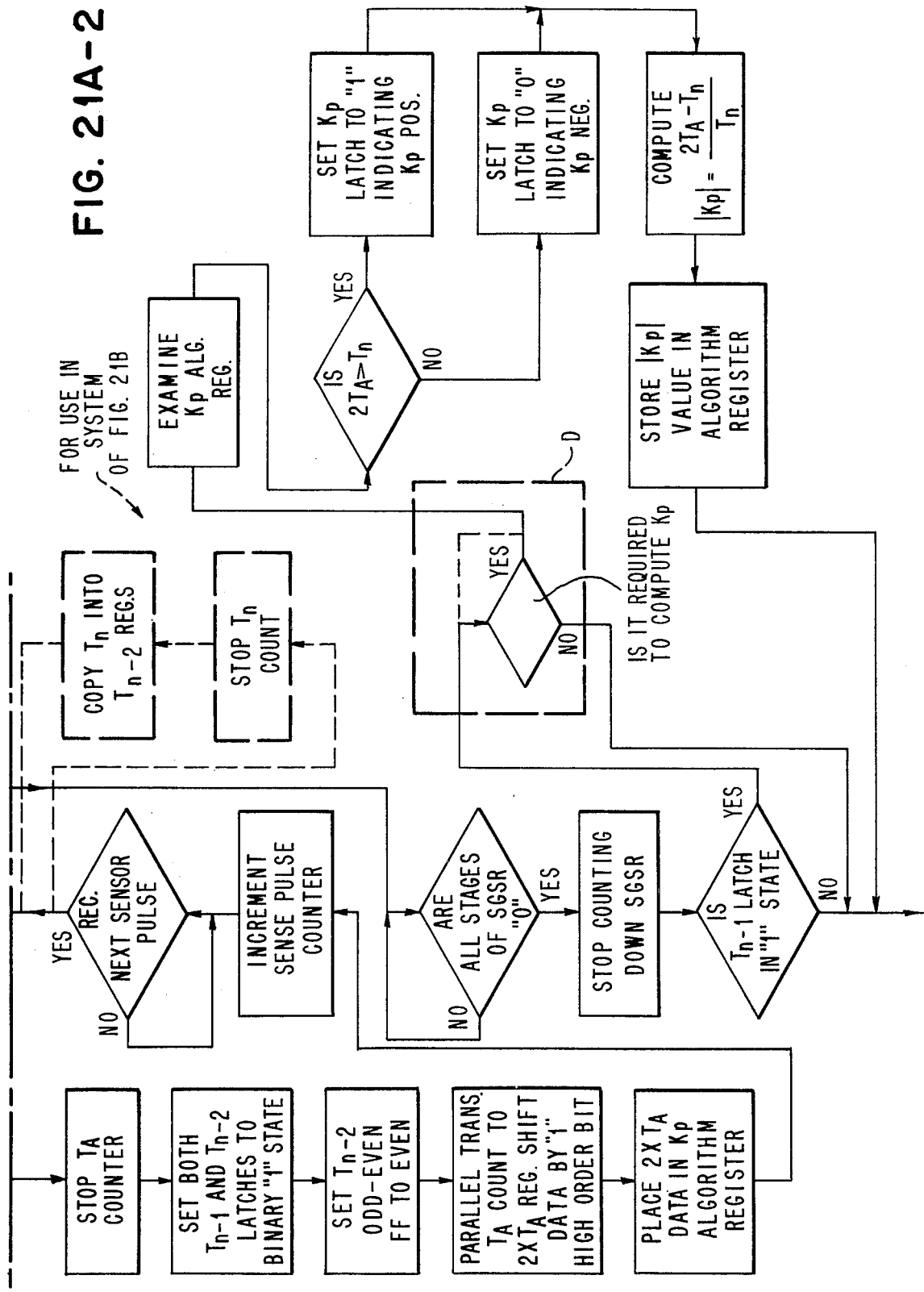

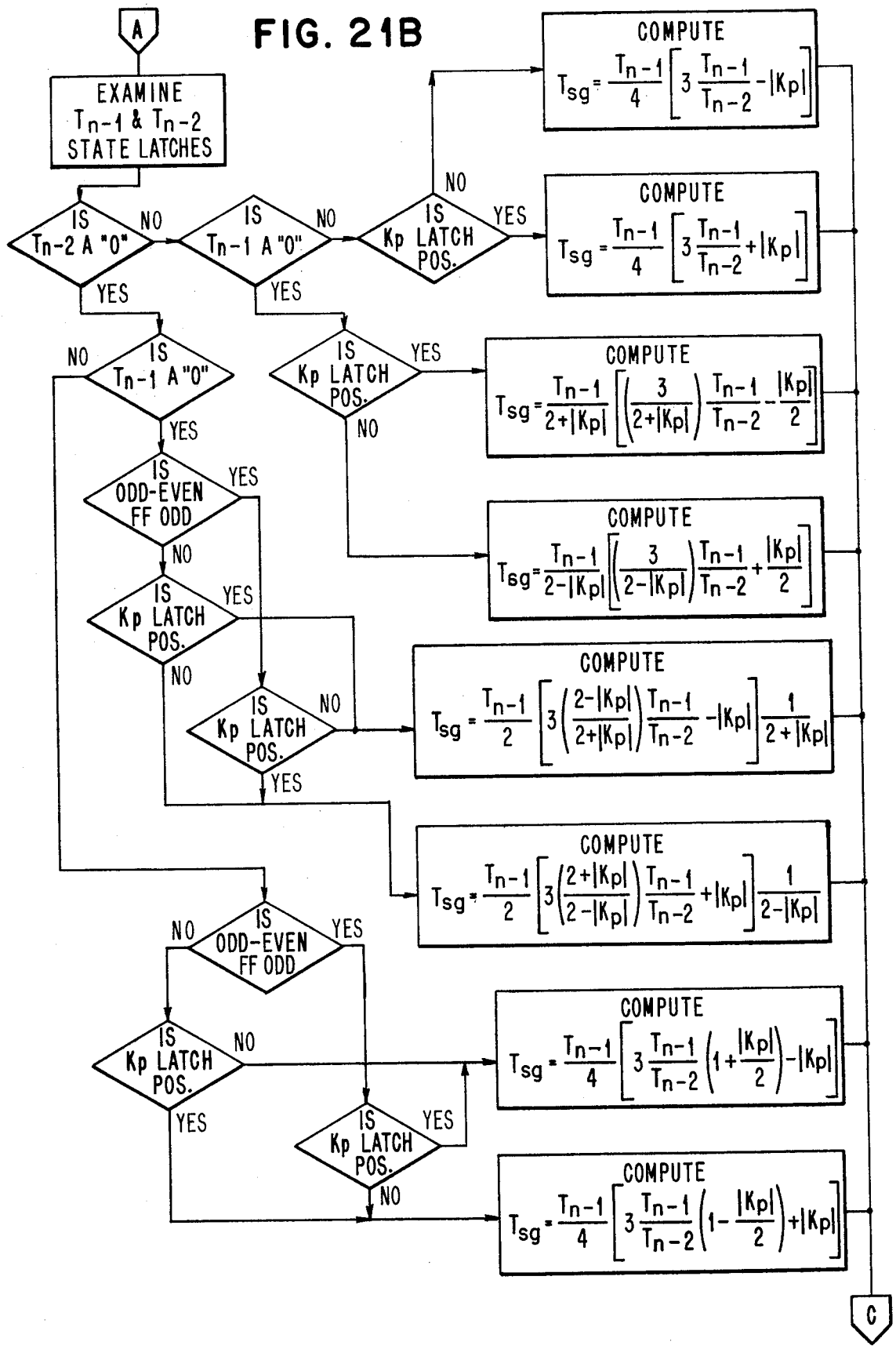

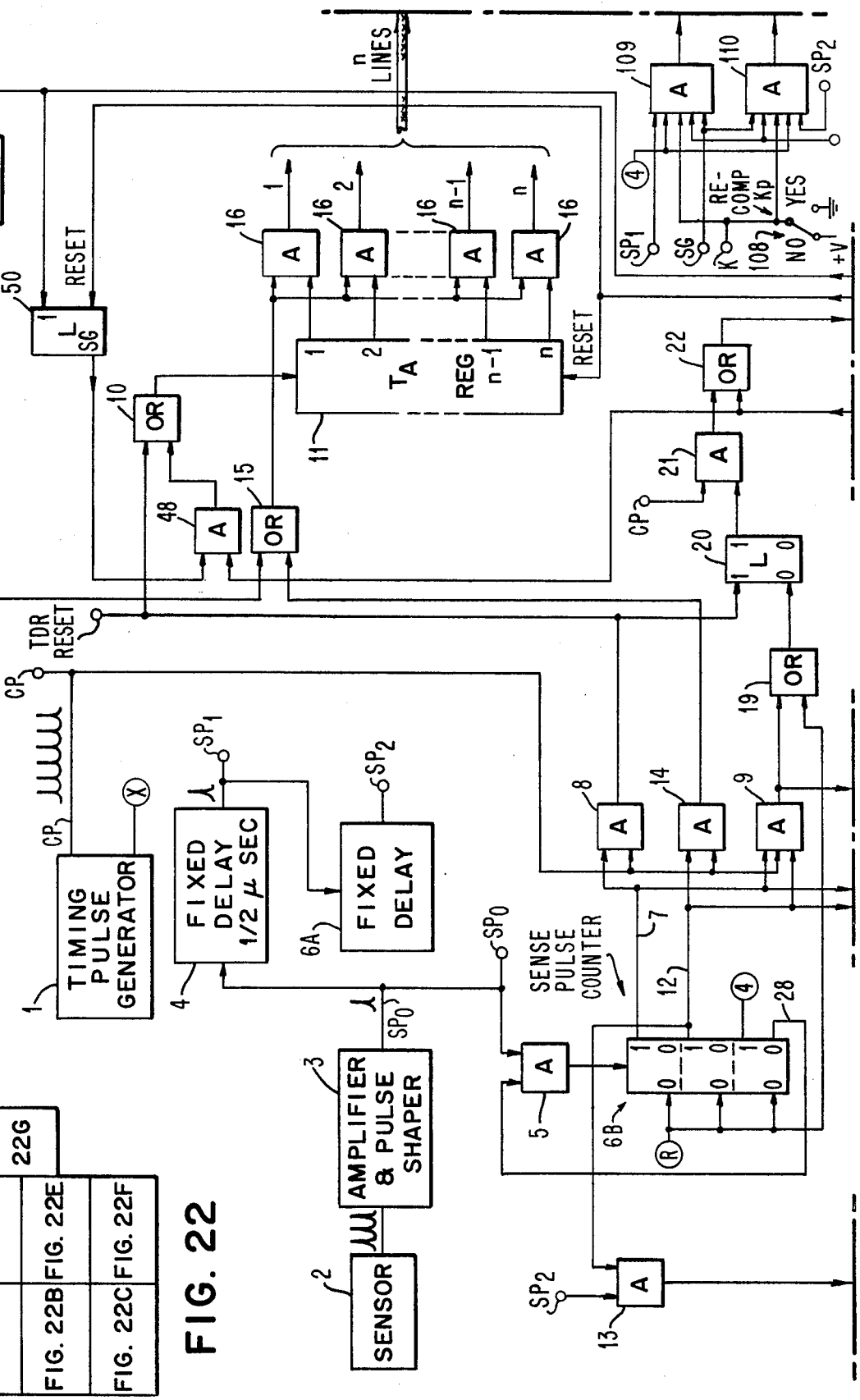

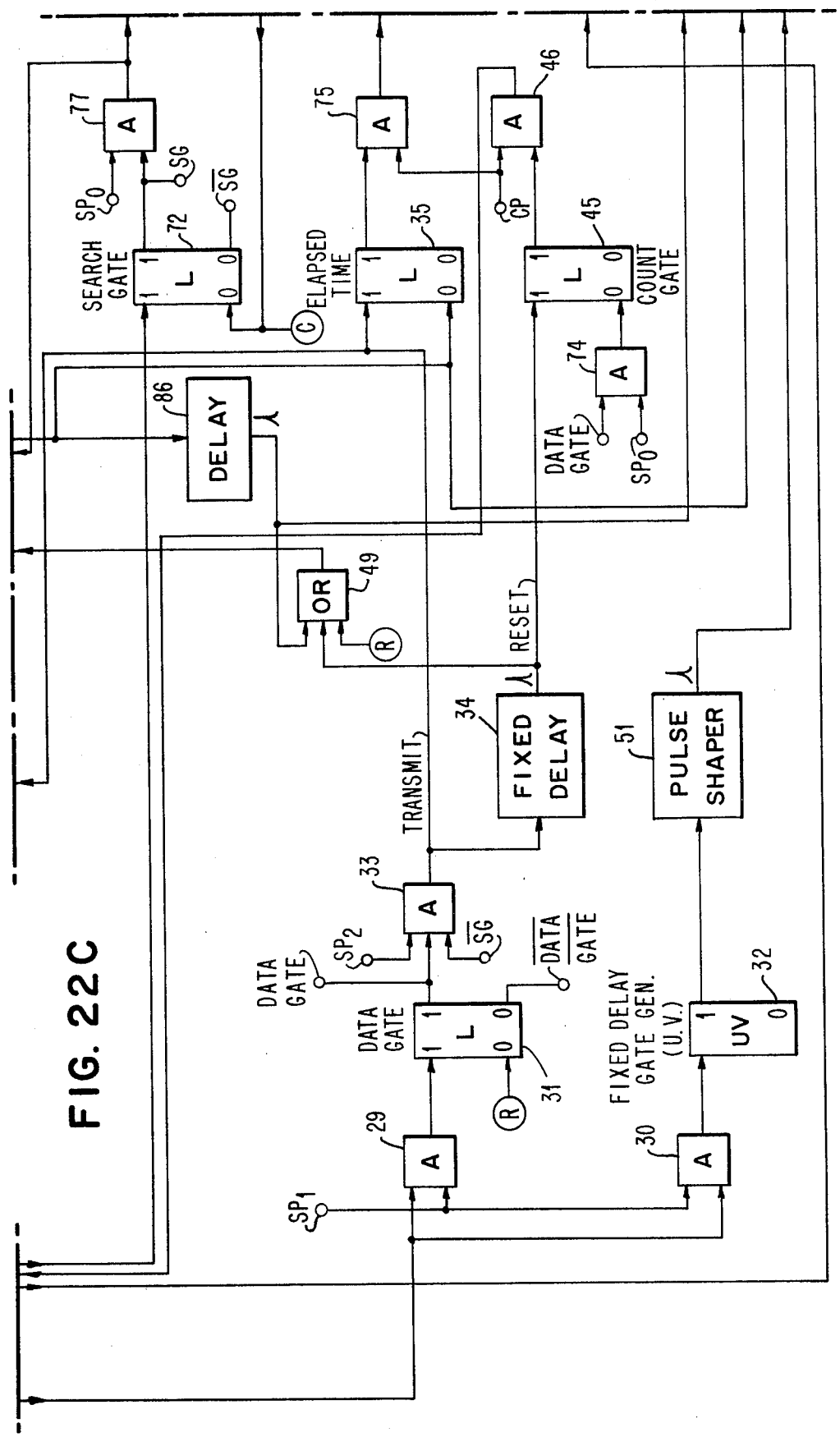

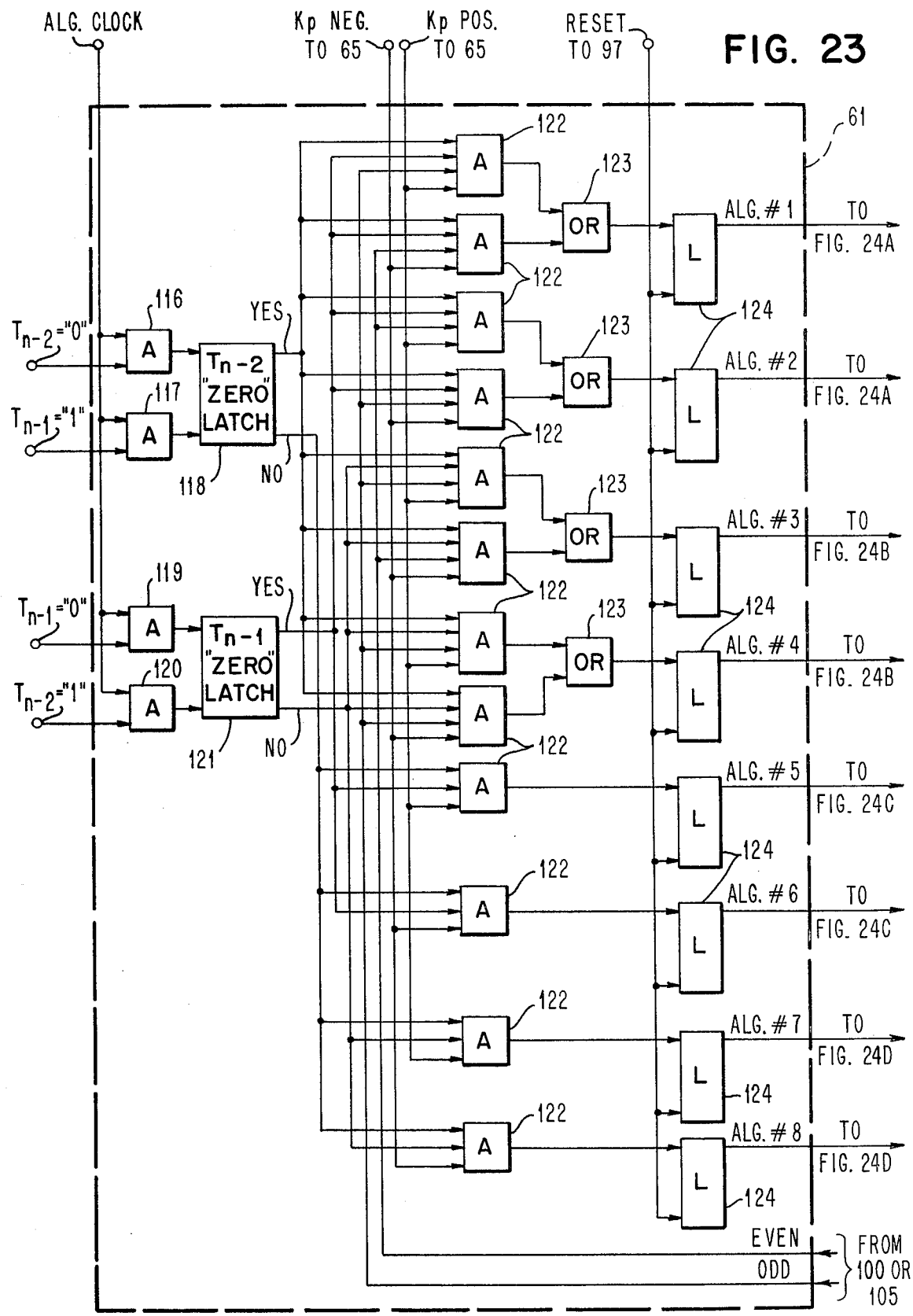

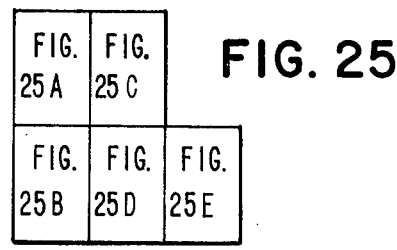
FIG. 25
FIG. 25C
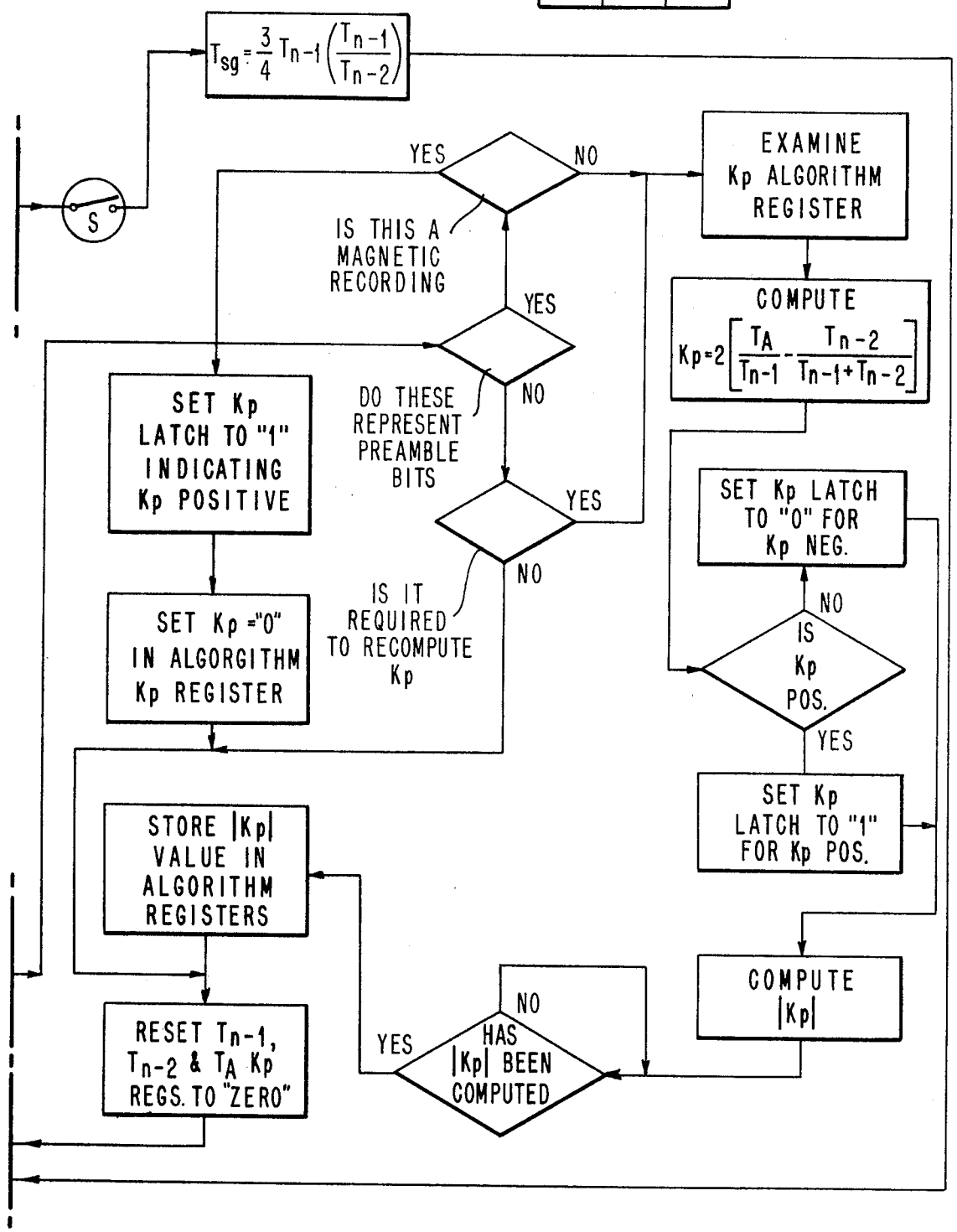

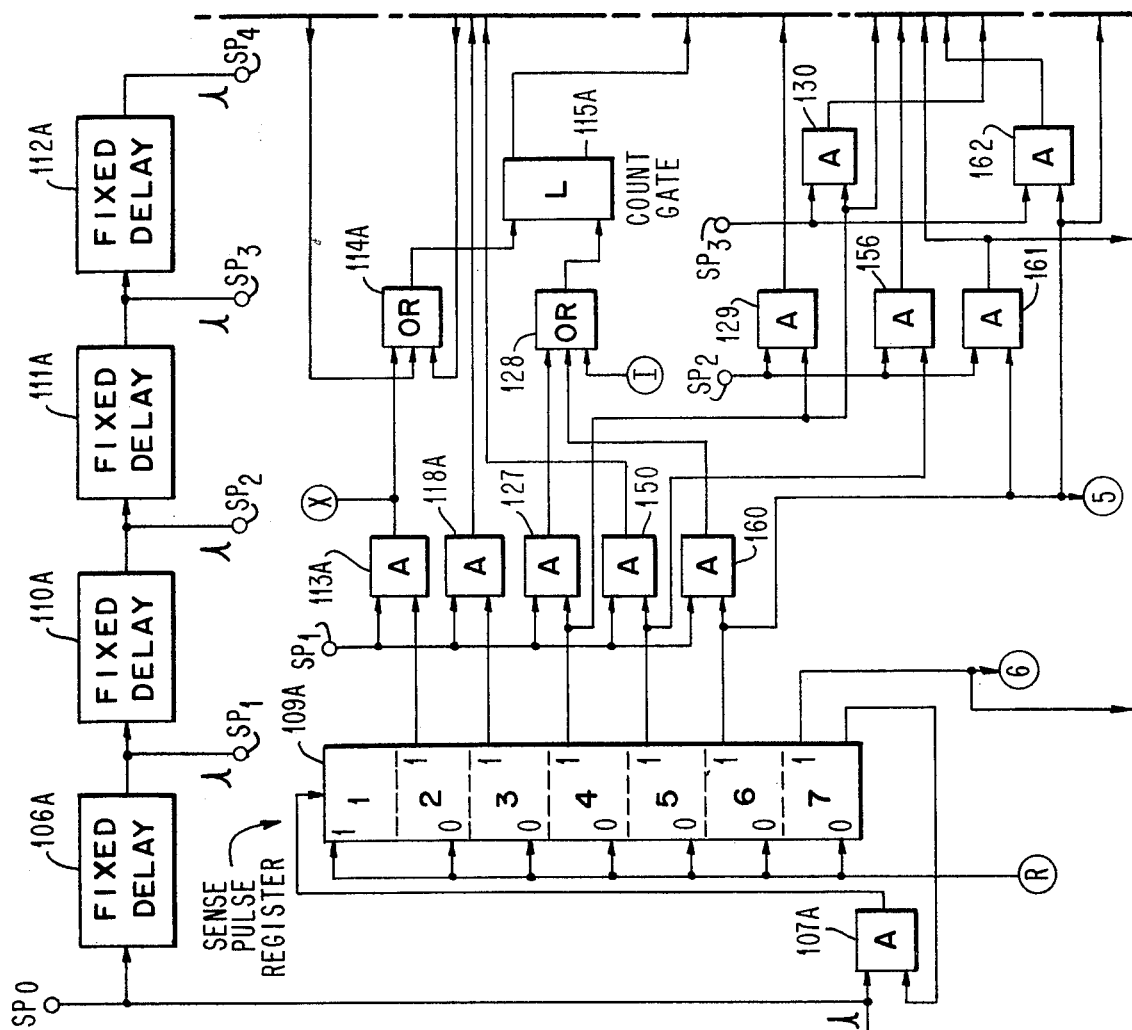
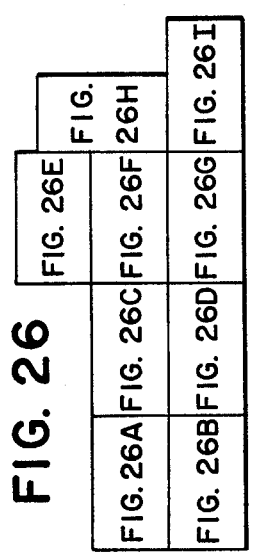
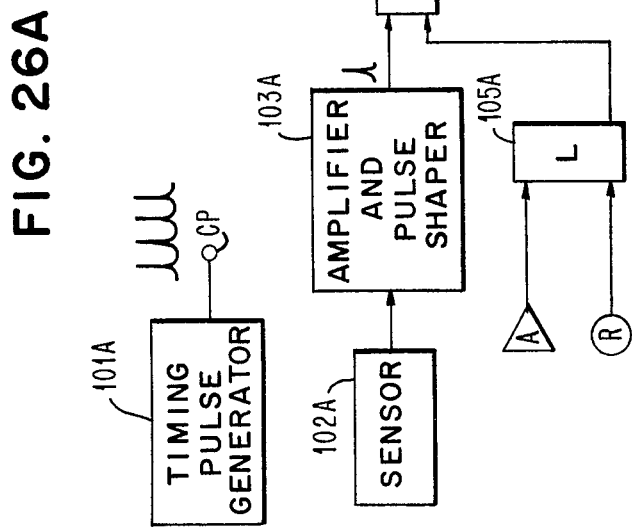
FIG. 26
FIG. 26A

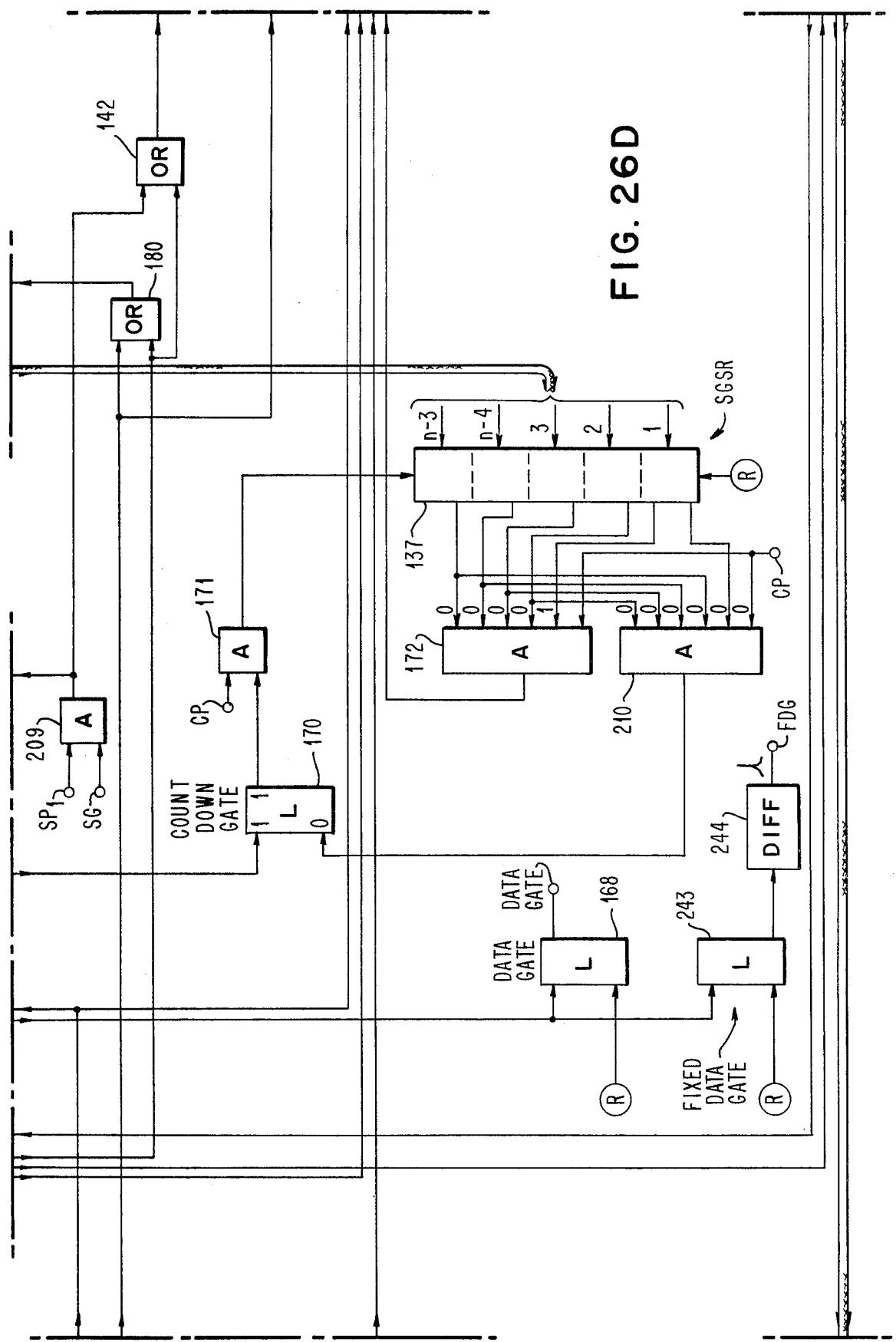

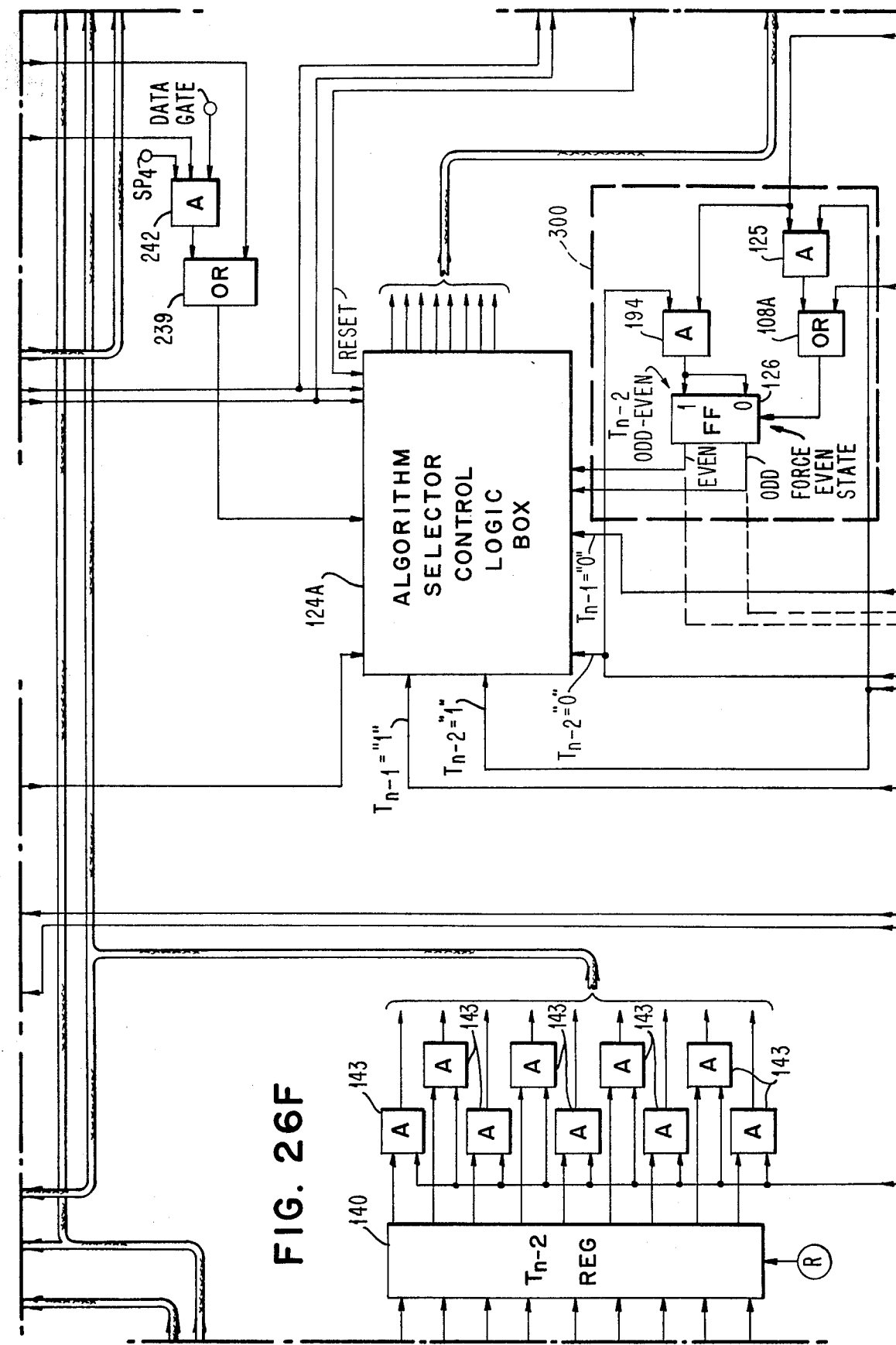

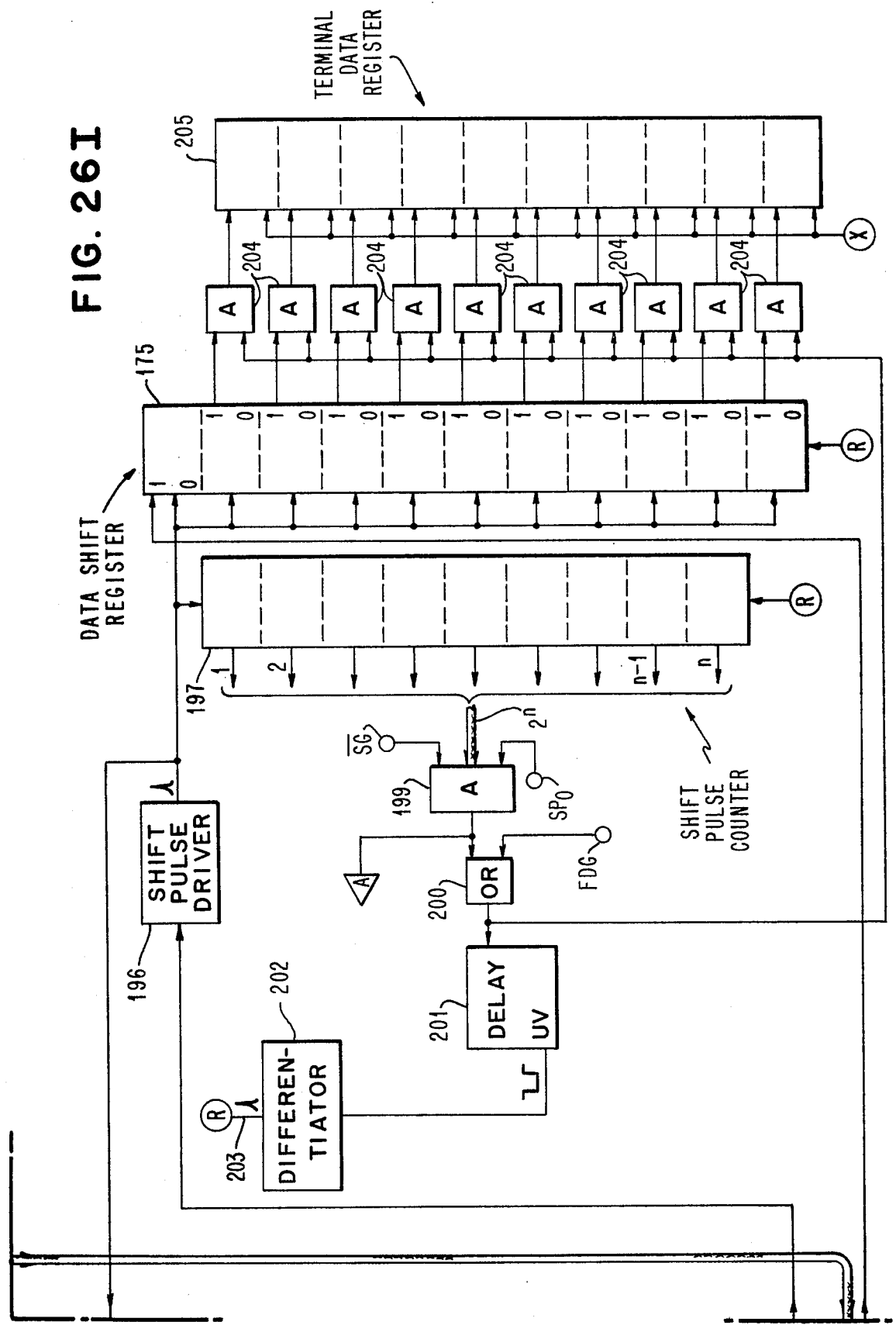

FIG. 29A
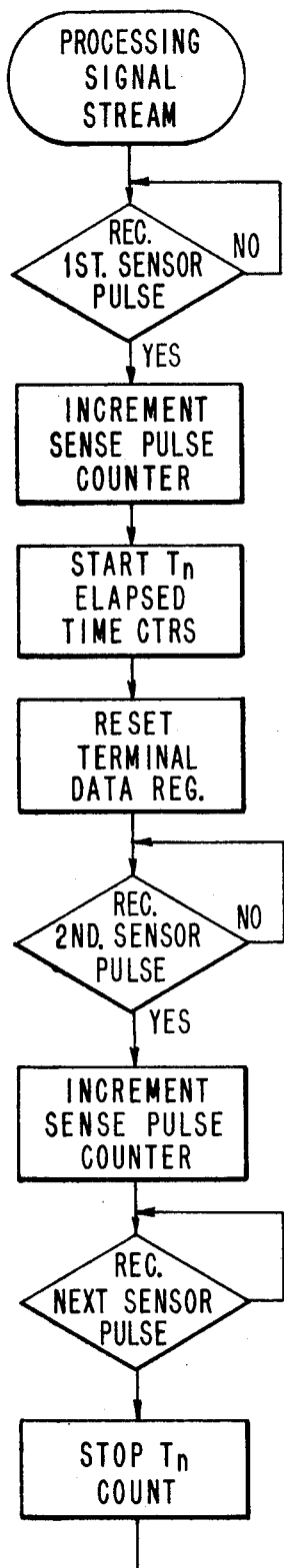
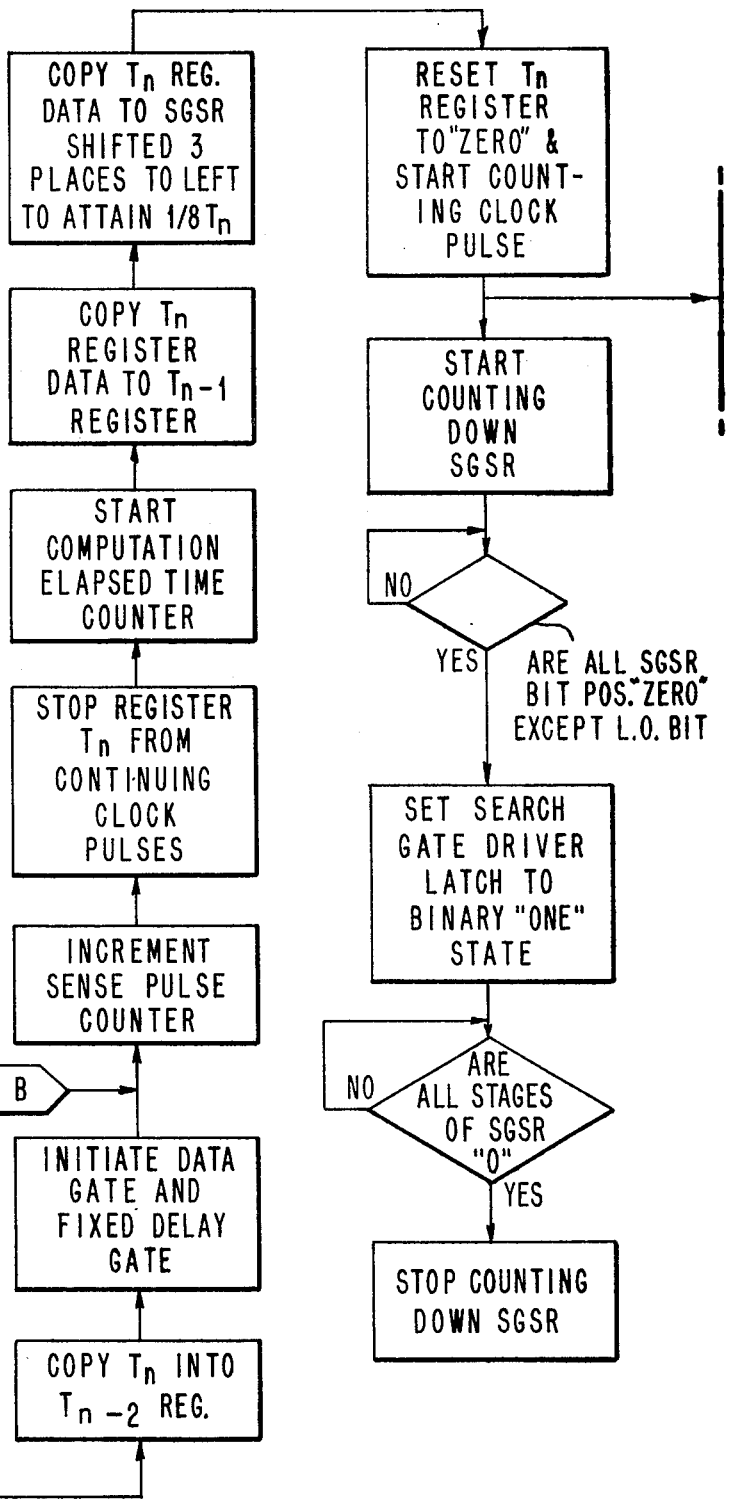
| FIG. 29A | FIG. 29B |
FIG. 29

DISTORTED TWO FREQUENCY CODED DATA INTERPRETING METHOD AND APPARATUS

This is a continuation of application Ser. No. 522,210, filed 11-08-84, now abandoned.

FIELD OF THE INVENTION

This invention relates generally to recorded indicia or transmitted code sensing and decoding methods and apparatus and to data processing systems. More specifically, it relates in particular to self-clocking coded data indicia sensing and decoding systems and apparatus.

PRIOR ART

A large body of prior art exists in which bar width coded indicia (for optical scanning) or transition time based magnetic bar widths are utilized to enclode data in any one of a variety of code formats. Examples of such bar codes or transition coding schemes may be found in U.S. Pat. No. 3,750,108 to Jensen for example, or U.S. Pat. No. 3,811,033 to Herrin et al, or in U.S. Pat. Nos. 3,708,748, 3,701,886, 2,870,429, 2,887,674, 3,111,576, 3,723,710 and 3,403,377. While a good deal of art exists in addition to the aforementioned patents, these are fairly representative of the approaches that have been taken in writing, reading and interpreting bar coded or transition coded indicia or signals. The systems are essentialy intended for use with either magnetic or optically encoded data. In such systems, the recorded indicia may be optically visible and may also be magnetically readable, such as is commonly the case with magnetic (MICR) ink characters. Also, the indicia may be optical only with contrasting light and dark or colored bars. The indicia may be magnetic only with optically invisible magnetically encoded bar patterns which, on a magnetic medium, serve the same purpose as optical bars, insofar as scanning with a magnetic sensing head versus an optical scanning head is concerned. Alternatively, a stream of signal variations may arrive over a communications channel in the form of distorted frequency coded signal transitions which vary in a manner similar to that produced by a scanning head.

As will be apparent to those skilled in the art, previous patents, such as mentioned above, have directed themselves toward problems of uneven spacing of the bars, frequency variations in the signal, or variations in indicia spacing which differ from the ideal spacing desired according to the coding format. Such variations make the problem of interpreting the encoded data difficult. Also, variations in the relative velocity between the scanning head, whether it be optical or magnetic, and the data records, introduce errors since the transition times, or crossings of the edges of optically visible bars or magnetically sensible bars, will vary if the scanning velocity varies or if, during encoding, the encoding system experienced varying transport velocities.

While the aforementioned patents are indicative of some general improvement in the art of scanning, writing, and decoding these types of coded indicia, or interpreting such distorted signals, two inherent problems remain essentially unsolved: when the coded indicia are printed with ink on paper or other similar media, the ink tends to spread or flow into the media and vary the width of the resulting printed indicia. This problem, known as "print spread", introduces an inherent source of error since the edges of the coded data bars will not occur at the ideal width or spacing at which they are desired. As will be apparent to those skilled in the art, this problem becomes increasingly significant with increasing print spread. It is also apparent that certain types of code format are more sensitive to this phenomenon, even given a constant velocity scanning operation, than are other codes.

As will appear in greater detail below, the prior art has not produced an acceptable solution to the problem of print spread. Such a solution is a prerequisite for the use of a hand held, freely movable wand or scanning head approach where the operator moves the wand freely and easily across a coded indicia for reading it. Some "hand-wandable" bar code formats have been introduced, but the operator is generally required to move the sensing wand, or scanner head at a fairly constant velocity and in a carefully prescribed manner across the indicia in order to read it effectively. The amount of training and skill required to perform this operation repeatedly and correctly are a source of great dissatisfaction. It is desirable to improve the system to permit an untrained operator to move the hand-held sensor at will, without any particular training or preparation, across bar coded indicia and consistently read it effectively and correctly extract the data therefrom.

A second inherent problem with the prior art deals with the compensation for variations in scanning velocity or transmitted signal frequency variations. Systems which depend on the measured time interval between signal transitions of previous bar coded bits of data, and which compensate internally for variations in these measurements by using a continuously varying standard, have met with some success as evidenced by the prior mentioned U.S. Pat. No. such as 3,811,033. Unfortunately, the degree of acceleration of velocity (or frequency) variation in a hand held scanner system is such, as will appear later, that the aforementioned systems in the prior art will not function effectively. As a result, the coded data will be read inaccurately under certain conditions of high acceleration and/or print spread.

The combination of acceleration (velocity) effects with print spread effects compounds the problem and creates seriously detrimental difficulties in accurately reading and interpreting coded data encoded under these width or transition time-frequency formats. In addition, the use of hand held scanners or sensors produces a phenomenon known as "skew" in which, unless the path of the scanner head is directly perpendicular to the widths of the bar or the transition coded darta, the transitions will appear to occur spaced wider in time than they physically are on the media. If the scan path produced in hand scanning is a wavy line rather than a straight line, the problem is further compounded.

OBJECTS OF THE INVENTION

In light of the foregoing problems and inherent difficulties with bar or transition coded indicia sensing and decoding systems, it is an object of this invention to provide an improved means and method for compensating for print spread in printed bar or transition coded data records so that they may be effectively sensed with a hand held sensor in an improved manner.

It is another object to provide an improved encoding or data writing method to facilitate making spread and acceleration correction.

A further object of the invention is to provide an improved means and method for compensating for acceleration effects in hand held, or other non-uniform velocity scanning, or sensing systems in general, or in non-hand held systems in an improved manner which effectively compensates for all spread, acceleration, velocity or frequency distortion effects.

Still another object of the invention is to provide an improved means and a method for compensating for the combined effects of print spread and acceleration simultaneously.

SUMMARY OF THE INVENTION

The foregoing and other objects of the invention are met by providing a means and method for first measuring signal transition time spacings and then adjusting a search time to account for the amount of print spread and/or acceleration effects detected in the initial measuring operation, so that transition codes or bar codes, encoded in an improved way, can be accurately interpreted when sensed. Additional means and method are utilized for measuring and adjusting the sense operation for acceleration alone or spread alone according to some specially derived algorithms as will appear later. Combined algorithms for correcting for both print spread and acceleration are also derived and developed and embodied in particular embodiments which will be discussed.

BRIEF DESCRIPTION OF THE DRAWINGS

FIG. 3F illustrates the complementary case of that shown in FIG. 3E in the same manner that FIG. 3B illustrates the complement of FIG. 3A.

FIG. 3G illustrates the case of a "110" or "111".

FIG. 7 illustrates the conditions used in deriving algorithms under certain listed conditions and where the data bits are preceded by a binary "1" preamble symbol.

FIG. 8 illustrates another set of conditions for algorithm derivation similar to the manner in which FIG. 7 illustrates derivation considerations.

FIG. 9 illustrates another set of conditions similar to FIGS. 7 and 8.

FIG. 10 illustrates another set of conditions similar to FIGS. 7 through 9.

FIG. 15A illustrates a set of derivation conditions where two "0's" are positioned between a binary "1" preamble symbol and a symbol $T_n$ for which a search gate prediction is desired.

FIG. 16 illustrates another set of conditions in a manner similar to FIGS. 15A and 15B.

FIG. 17 illustrates another set of conditions in a manner similar to FIGS. 15A, 15B, and 16.

FIG. 18 illustrates another set of conditions in a manner similar to FIGS. 15A and 15B through 17.

FIG. 19 illustrates a schematic timing diagram for the logic operations of a preferred embodiment of the invention.

FIG. 20 illustrates a schematic timing diagram for the logic operations of another preferred embodiment of the invention.

FIG. 21B illustrates a functional flow chart for the logic operations to be carried out to perform the second order algorithm in manipulations pursuant to the timing requirements of FIG. 19 and shows the method of a preferred embodiment.

FIG. 23 illustrates a logic diagram for an algorithm selector indicated in FIG. 22.

Specific embodiments of the present invention, together with flow charts illustrating their sequence of operation will be discussed shortly. However, since it is necessary to introduce a good many new terms and to discuss generally the problems to be encountered and overcome, this specification will be divided into three general parts. In the first part, the nature of the encoding technique, generally regarded in the art is "F2F" encoding, will be discussed woth relationship to the phenomenon known as "print spread." Print spread occurs when such coding techniques are applied to printed bar characters or codes. In a second segment of this specification, the problems of acceleration of the sensor relative to the data bearing media (or velocity variations during encoding, etc.) will be discussed as concerns the effects of acceleration on accurate reading or sensing. There exists a general lack of success in the prior art at handling this problem effectively. In a third section, the combined effects of print spread and acceleration will be discussed and specific embodiments developed which provide a universal reading technique and apparatus for bar or transition codes exhibiting print spread acceleration distortions in the signal stream resulting from reading such codes.

Figure 1:
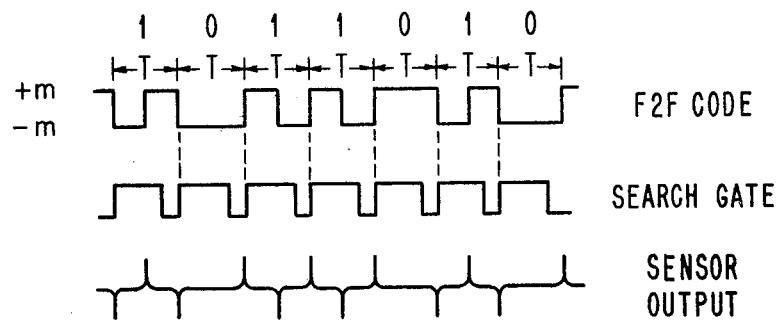
FIG. 1 is a schematic representation of the prior art F2F code and of the generally accepted method of decoding or reading such a code. A typical, but undistorted, sensor output or signal steam is also shown.

Turning then to FIG. 1, a schematic representation of the well-known "F2F" coding technique, as applied to a magnetic medium, for the digital number 1011010 is shown. F2F code is known in the art as an abbreviation for "frequency and two-frequency," or alternatively, "frequency and double frequency" coding. In this technique, transitions in the signal stream produced by an appropriate sensor occur at one frequency or at double that frequemcy. The assumption is made, under these ideal conditions, that the sensor moves at a constant velocity relative to the data bearing medium and the code was written under constant velocity conditions. A digital "1" may be recorded as one signal transition within a given period of time T written as illustrated in the upper line of FIG. 1 and sensed as shown in the bottom line of FIG. 1. A digital 0 may be represented as no transition over a similar time interval T. For optically printed bar codes, the top line of FIG. 1 may be thought of as a series of single or double width bars with single or double width white spaces between the bars. When scanned by a suitable optical sensing means, such patterns would produce a signal train similar to that shown in the lower line of FIG. 1. Where an electrical signal is produced by a magnetic sensing head sensing a magnetically encoded data record, or by an optical sensing head scanning a series of black and white bars of varying widths, the bottom line of FIG. 1 represents an output signal stream.

It wll be observed, in FIG. 1, that a varying signal is produced at the output of a magnetic sensing head when it passes over a suitable magnetized medium bearing a pattern of magnetization for the digital character 1011010 as shown. The magnetization on the particular medium varies between a +M magnetization and a −M magnetization as shown. Various equal time intervals T are illustrated equally spaced along the upper line of FIG. 1. The well-known F2F code shown here is already used in magnetic stripe credit card reader systems and is written on the credit cards themselves, of course. It is also used in a variety of optical scanning devices, such as shown generally in the aforementioned U.S. Pat. Nos. 3,750,108 and 3,811,033. In the magnetic sense, it will be observed in FIG. 1 that a transition from −M to +M occurs midway in the interval time T, when viewed from left to right, on the top line of FIG. 1. This is arbitrarily chosen to represent the digital data bit "1" as shown. The succeeding interval time T contains no transition of signal and is thus interpreted as a digital data bit "0". Succeeding time intervals are shown in which transitions either occur or do not occur to generate the codes 11010 following the initial 1 and 0 just discussed.

The top line in FIG. 1 may be alternatively viewed as either a magnetic code pattern on a magnetic media or an optical code pattern, such as a series of black and white bars of varying widths on a sheet of paper as was previously discussed. The varying signal levels may then be taken either as varying magnetization levels or variable optical reflectivity levels between two general values, high and low. It is desirable to make a single assumption and suggest that this transitional pattern may also be viewed as an analog electrical signal, assuming that a suitable sensor of the desired optical or magnetic source is used to scan across the appropriate media producing electrical signals which are suitably amplified and shaped to produce the typical waveform shown in the bottom line of FIG. 1. The waveform pattern in the bottom line of FIG. 1 corresponds to the transitions in the analog pattern in the top line of FIG. 1. All similar waveform figures will, for simplicity, be omitted in the figures following FIG. 1. But it should be understood that the transitional waveform in the bottom of FIG. 1 contains the data information which would be utilized in logic embodiments. As will be readily appreciated by those of skill in the art, the production of a suitable waveform involves sensing an analog signal with a sensor, converting it to a digital output in an A to D converter or similar device, suitably amplifying and shaping the waveform to produce clean square-edged waves, which may be differentiated, etc., to produce the waveform in the bottom line of FIG. 1. The foregoing operations, being well-understood in the various arts of either optical or magnetic sensing, will not be discussed further here. It will be assumed that a suitable sensor will be provided together with the necessary waveform modifying apparatus to produce a clean square-edged waveform and that a suitable sensor scanning a particular encoded media will produce a waveform such as shown in the top and bottom lines of FIG. 1.

F2F coding as just described must, of course, be decoded in order to extract from it the data contents of 1 or 0. This is accomplished, in the classical sense, as shown in U.S. Pat. No. 3,750,108 for example. It involves setting up a gate function which gates the output of the sensor to a using system under certain conditions such that, for example, the presence of a transitional pulse appearing from the scanner during the time in which the search gate is open arbitrarily signifies a binary 1 for example, and the absence of a transitional pulse from the sensor during a search gate time signifies a digital 0. The classic or ideal timing of the required search gate is shown in FIG. 1, in the line of graphical transitions labeled "search gate". It is assumed in FIG. 1 that the relative velocity between the appropriate sensor and the ideally encoded media is constant so that the widths T are all equal. It will be readily apparent to those of skill in the art that in order to sense the transition which is significant for a binary 1 and which occurs exactly midway in a time interval T, it is desirable to set up a "search gate" to run from the instant a time interval T begins to a point exactly equal to ¾ the time interval T, where the search gate is ended. If a transition is detected, it will unambiguously denote a binary 1, whereas if no transition is detected, an unambiguous binary 0 will be the information content described.

Given the assumption that T is the intended width of each of the character symbol periods, whether they contain a binary 1 or a binary 0, the normal length of the search gate to accurately detect the ¾significant of a 1, without inadvertently picking up the transition at the boundaries of a symbol time period T, is equal to ¾ of a symbol time period T. The search gate of the prior art is started at the beginning of each the symbol time T and is terminated when ¾ of the previous symbol length is reached. A suitable mechanism for providing this result is shown, for example, in U.S. Pat. No. 3,750,108, where specific timing circuitry to create the 3/4 T search gate period is disclosed and explained. The object of the search gate is to permit the response signal in the top line, which originates from the binary 1 intermediate symbol transition, to be detected without confusion with the response signal resulting from the symbol boundary transitions occurring at either end of each symbol. The symbol boundary transitions correspond to the so-called "single frequency" signals and the intermediate transitions correspond to to so-called "double frequency" signals.

Having thus discussed the general field to which the invention relates and the basic prior art of F2F coded optical bar or magnetic symbols, the discussion will now turn to the problem which exists when optical bar codes are printed on ordinary media using ink, for example.

When optical bar codes are printed in the F2F code format as discussed above, a phenomenon known as print spread takes place. Print spread may be defined as the widening of the ink pattern due to spreading and diffusion of the ink into the paper medium. The resulting printed black bars become wider than originally intended when they were printed. The situation compounds itself in complexity since the widening of adjacent black bars narrows the intervening white bar or space on an optical printed media. In the magnetic equivalent of this phenomenon, assuming that a magnetic media is "written" with alternating magnetization areas, the effect of spread as it is known in the optical printing art can also exist and is known as "intersymbol interference" to those in the art.

Figure 2A:
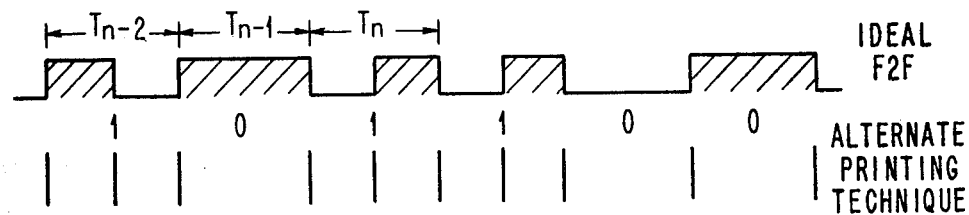
FIG. 2A illustrates an ideal F2F code pattern.
Figure 2B:
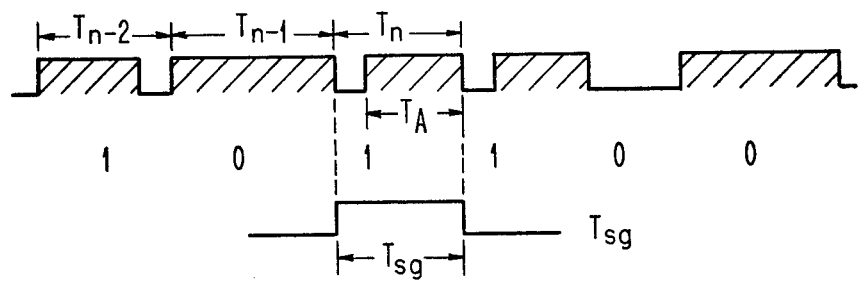
FIG. 2B illustrates the ideal pattern of FIG. 2A as distorted by spread.

Turning to FIG. 2A, an example of a binary code written in F2F format for the characters 101100 is shown for an ideal F2F code not having any print spread. Fig. 2B, shown directly below FIG. 2A, illustrates the situation for the same code in which print spread has taken place. In FIG. 2B, the widths of the black bars, shown by the cross hatched areas in FIGS. 2A and 2B, are increased by some arbitrary and uncontrolled amount due to the flow of ink. FIG. 2B thus illustrates a spread F2F code pattern and it also represents the un-differentiated train which would be produced from a primary sensor of the optical or magnetic type reading the appropriate coded media. The search gate termination time, or length $T_{sg}$ which would be predicted for a given symbol time $T_n$, is determined by the use of equation (1) below, $$T_{sg} = \tfrac{3}{4} T_{n-1} \qquad (1)$$

where $T_{n-1}$ is the width of the previous symbol.

This is the generalized form of the equation which is used, for example, in decoding F2F code as taught in U.S. Pat. No. 3,750,108. If equation (1) is used to predict a search gate termination time for the interval $T_n$ in the spread F2F symbol series of FIG. 2B, serious errors result. Taking ¾ of the interval $T_{n-1}$ and beginning the search gate at the end of $T_{n-1}$, the prediction for ending the search gate will end the search gate as shown below the data line of FIG. 2B (as the signal $T_{sg}$) with the termination of the gate ending beyond the end of the time period $T_n$ shown in the signal portion of FIG. 2B. As will be readily apparent, at least two transitions will be detected during a search gate so defined. The using system will then interpret the data signal received during the search gate time for that time period as being one or more binary 1's. The ambiguity which results in interpreting this signal is readily apparent. The difficulty arises, as will be apparent, from the fact that the time intervals $T_n$, $T_{n-1}$, and $T_{n-2}$, etc., are no longer equal, as they should be for the ideal case illustrated in FIG. 2A. The inequality in the time intervals $T_{n-2}$, $T_{n-1}$, $T_n$, etc., results from the flow of ink outward from the printed black bars, or "spreading" as that term has been defined. Given a system which relies on the previous time interval of a character symbol for generating the next search gate by using the algorithm of equation (1), serious errors in interpreting the coded data occur because of terminating the search gate at an inappropriate time.

Equation (2) given below, gives the basic new statement for terminating a search gate where spread exitst in the encoded F2F character chain.

$$T_{sg} = \gamma \left( \frac{T_{n-2} + T_{n-1}}{2} \right) \qquad (2)$$

The spread coefficient is defined as $\gamma$ and it is determined on a symbol by symbol basis. This allows the spread factor $\gamma$ to vary monotonically within a printed character (consisting of multiple bits) and from character to character, as will appear below. In order to determine $\gamma$ initially and to set up search gates properly thereafter, the present invention provides in addition to the coded data to be interpreted, a preamble symbol or bit recorded with the data at the time the original data is laid down on the media. The preamble bit, which is a particular type of digital 1, provides information to the using system which is used to determine the spread coefficient for a new printed character. It appears in this invention, with each multi-bit printed or magnetically encoded data stream or with any other F2F data character.

A search gate function would be deleted while the sensing of a preamble bit is conducted. The search gate interval for the first bit of data after the preamble symbol, regardless of whether the bit is a 1 or a 0, may be established by determining the spread coefficient $\gamma$ for that character from its preamble symbol. Monotonic changes in the spread throughout the character can be corrected for by the continued use of the spread algorithm as the character scanning operation proceeds. As will be developed below, different spread effects exist for various time intervals $T_{n-2}$, $T_{n-1}$, etc., depending on their binary 0 or 1 content.

Figure 3A:
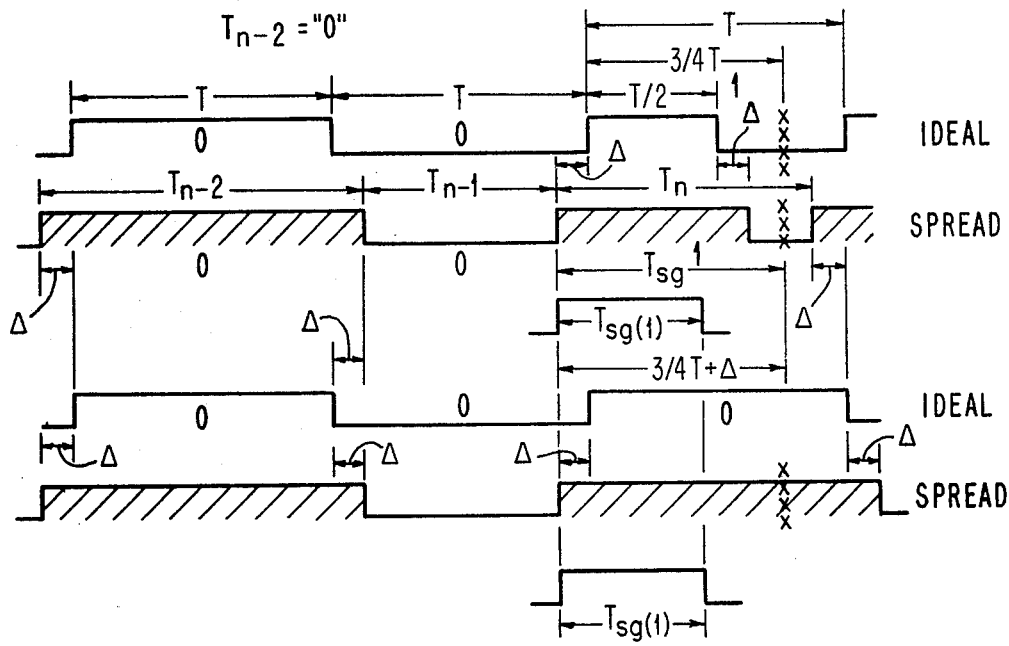
FIG. 3A illustrates the graphical considerations made which lead to the derivation of an algorithm for defining a search gate length under certain conditions, where there is arbitrarily written "001" or "000".
Figure 3B:
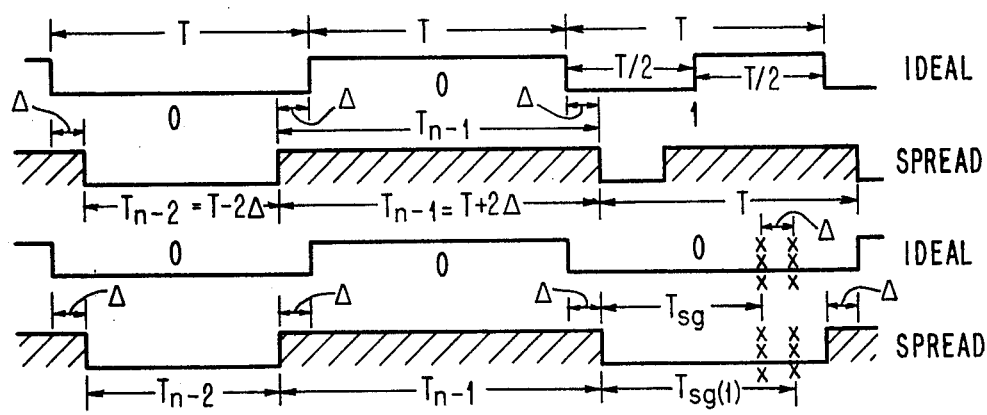
FIG. 3B illustrates the complementary case for that shown in FIG. 3A where the signal transitions are at the same point in time, but are of opposite polarity.

FIG. 3A illustrates the derivation of an algorithm which defines the time of termination for a search gate $T_{sg}$ for an F2F coding scheme in which it is assumed that there are encoded two successive 0's followed by a 1 or by a 0, in the alternative. In FIG. 3B, the complementary case of FIG. 3A is illustrated in which the signal transitions are opposite in polarity to those shown in FIG. 3A, but in which the encoding 00 followed by a 1 or a 0 is the same.

Turning to FIG. 3A, the upper line illustrates the ideal F2F code having three successive, equal time intervals T in which are encoded the digital values 0, 0, and 1. In the line below the ideal code pattern is shown the code pattern assumed to exist when print spread occurs in either ink or magnetic recording on an appropriate medium. The spread code pattern illustrated in the second line of FIG. 3A is appropriately cross-hatched to show the spread dimensions of the code pattern which result. The interval which will be measured and in which is desired to define the search gate will be defined as interval $T_n$ in the second line of FIG. 3A, and preceding time intervals will be designated $T_{n-1}$, $T_{n-2}$, etc. The length of the search gate $T_{sg}$ ideally should be defined to exist as shown in the second line of FIG. 3A. If the classical equation (1) defining the termination of $T_{sg}$ were used in the second line of FIG. 3A, it is apparent that the search gate would end somewhere intermediate the time interval $T_n$ as shown if it were based on $\frac{3}{4}$ of the preceding time interval $T_{n-1}$. This is shown in the small portion of the graph labeled $T_{sg(1)}$ to define it as being derived by equation (1). As is readily apparent, the search gate thus defined ends prior to the time that the desired transition indicative of data bit 1 is actually encoded and would be sensed; the data would thus be read incorrectly as a binary 0, when in fact a "1" has been recorded.

In the third and fourth lines of FIG. 3A, the situation for three ideal and spread representations of binary 0's in three equal time intervals T is shown, and it is again desired to define the time interval for ending the search gate $T_{sg}$ as shown in the second line of FIG. 3A in order to unambiguously read the coded O following two initially coded 0's. It will be observed that the classically defined search gate would end prior to the time at which it is desired to end the search gate to accurately sense a 0 since it is necessary to extend a search gate time at least long enough to pick up a possible transition intermediate the symbol transitions defining time interval T.

In FIG. 3B the complementary situation of that shown for FIG. 3A is illustrated in which opposite polarity of transitions from that shown in FIG. 3A are used to encode the identical data. This situation would exist in real life in the event that wide white spaces were used in printing to designate a 0 followed by a wide dark space to encode another 0 followed by a narrow light space and a narrow dark space (which combined equal an ideal time interval T) to encode a 1 as shown in the top line of FIG. 3B. In the second line of FIG. 3B the spred pattern which results when print spread occurs is shown. In the third line of FIG. 3B the ideal pattern for three 0's in a row is shown and in the last line the actual spread pattern which results when print spread occurs is shown for the same three 0's. The derivation of the first algorithm follows.

If the amount of print spread which occurs is defined as $\Delta$, and $\Delta$ is positive, i.e., the ink spreads rather than contracts, it is apparent that $T_{n-1}$, for example, is equal to T-2$\Delta$ in FIG. 3A, and that $T_{n-2}$ is equal to T+2$\Delta$. By subtraction, $T_{n-2} - T_{n-1}$ is equal to 4$\Delta$ and, solving for $\Delta$, $$\Delta = \frac{T_{n-2} - T_{n-1}}{4}$$

Applying equation (2), it will be observed that $$T_{sg} = \gamma \left( \frac{T_{n-2} + T_{n-1}}{2} \right) = \gamma T$$

as a result of substituting values for $T_{n-2}$ and $T_{n-1}$, $$\gamma T = \frac{\frac{T}{2} + 2\Delta + T}{2}$$

from observing FIG. 3A, $\gamma T$ must equal the average of (T/2+2$\Delta$) + (T) so that $T_{sg}$ will fall in the center of the second half of $T_n$, which simplifies to $\frac{3}{4}$ T+$\Delta$ as shown in the second ideal line of FIG. 3A where $$T = \frac{T_{n-2} + T_{n-1}}{2}.$$

The opposite case exists for FIG. 3B, i.e., $$T = \tfrac{3}{4} T - \Delta.$$

Substituting the expression for $\Delta$ just developed in the equation defining $T_{sg}$ above, it will be observed that $T_{sg}$ is equal to $$\frac{3}{4} \left( \frac{T_{n-2} + T_{n-1}}{2} \right) + \frac{T_{n-2} - T_{n-1}}{4}$$

which simplifies to $$T_{sg} = \tfrac{1}{8} [T_{n-1} + 5 T_{n-2}] \qquad (3)$$

for the case where $T_{n-1}$ is a 0 and $T_{n-2}$ is a 0. The derivation for the complementary situation shown in FIG. 3B leads to exactly the same expression since $T_{sg}$ is $\frac{3}{4}$ T-$\Delta$ because of the effect of spread being the opposite for the same time periods $T_{n-1}$ and $T_{n-2}$ which situation occurs because of the inverted polarity, as is apparent from comparing FIGS. 3A and 3B. The same expression results because the expressions for $T_{n-1}$ and $T_{n-2}$ are inverted from those in FIG. 3A and cancel, when the average for $\gamma T$ is written, as is shown beneath FIG. 3B where the derivation is given as was stated above for FIG. 3A. Alternatively stated, equation 3 may be used to accurately predict the termination of a search gate $T_{sg}$ for the condition where the two preceding symbols have both been 0's.

Figure 3C:
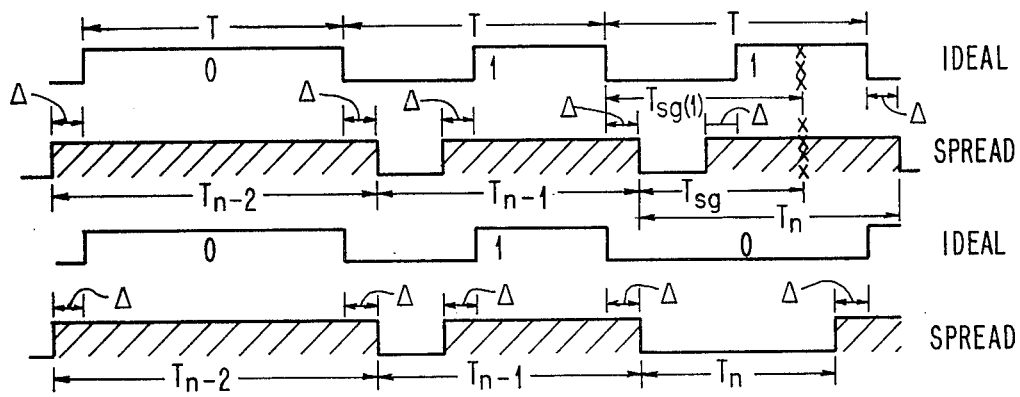
FIG. 3C illustrates the graphical considerations in a manner similar to FIG. 1, but FIG. 3C is drawn for the condition where there is a code "001" or "010".
Figure 3D:
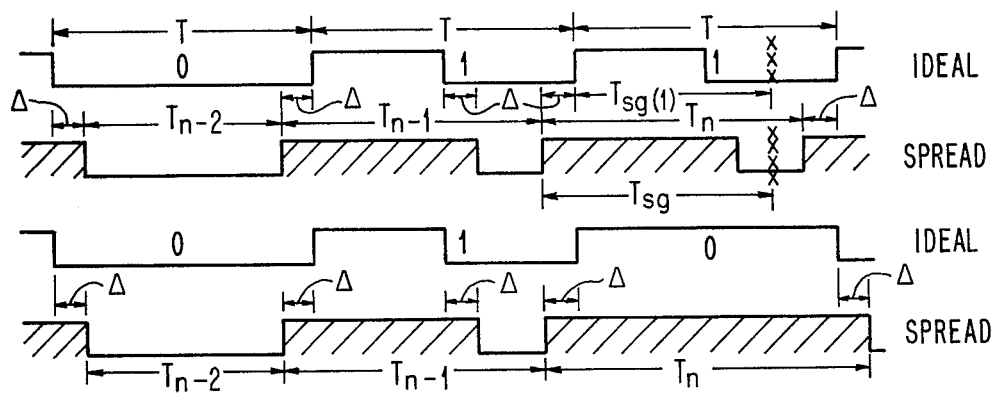
FIG. 3D illustrates the complementary case for that shown in FIG. 3C in the same manner that FIG. 3B illustrates the complement of FIG. 3A.

Turning to FIGS. 3C and 3D, the diagrams are given for the condition where there is a 0 encoded followed by a 1, which is then followed by a 1 or a 0. The same techniques as applied in the derivation of equation 3 will be used. Using FIG. 3D, it will be apparent that $T_{n-2}$ is equal to $T - 2\Delta$, where $\Delta$ is the amount by which the time intervals are spread due to print spread, and $T_{n-1}$ is equal to T. Observing FIG. 3D, it will be seen that $$\Delta = \frac{T_{n-1} - T_{n-2}}{2}$$

and that T is equal to $$\frac{T_{n-2} + T_{n-1}}{2} + \frac{T_{n-1} - T_{n-2}}{2}.$$

$T_{sg}$ is defined as equal to $$\gamma \left( \frac{T_{n-2} + T_{n-1}}{2} \right) = \frac{\frac{T}{2} + 2\Delta + T}{2} = \frac{3}{4} T + \Delta.$$

Substituting the expression for T and for $\Delta$, it may be seen that $$T_{sg} = \frac{3}{4} \left( \frac{T_{n-2} + T_{n-1}}{2} + \frac{T_{n-1} - T_{n-2}}{2} \right) + \frac{T_{n-1} - T_{n-2}}{2}$$

and collecting terms, equation (4) results in which $$T_{sg} = 5/4\ T_{n-1} - \tfrac{1}{2}\ T_{n-2} \qquad (4)$$

which is true for the condition where $T_{n-1}$ is equal to a binary 1 and $T_{n-2}$ is equal to a 0. As with FIGS. 3A and 3B, the complementary figures yield identical results and the situation of FIG. 3C is hence not derived here.

Figure 3E:
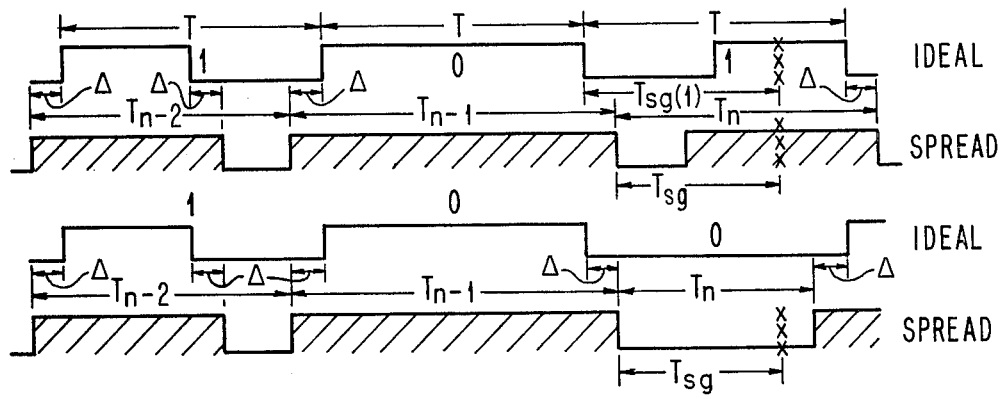
FIG. 3E illustrates the case of a "100" or "101".
Figure 3H:
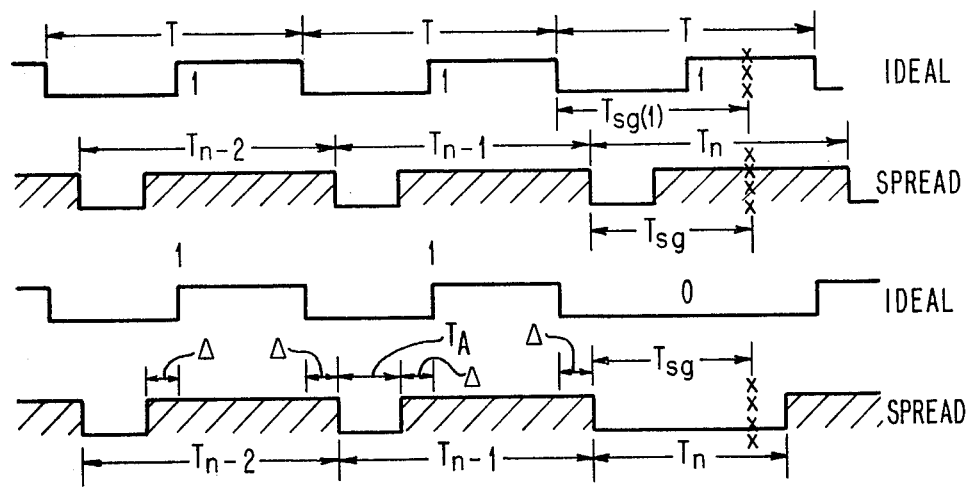
FIG. 3H illustrates the complementary case of that shown in FIG. 3G in the same manner that FIG. 3B illustrates the complement of FIG. 3A.

FIGS. 3E and 3F illustrate the complementary cases where there is encoded a 1, 0, followed by a 1 or a 0 and, utilizing the same approach as just used for FIGS. 3A through 3D, it may be shown that $T_{sg}$ is defined as equation (5) as $$T_{sg} = 5/4\ T_{n-2} - \tfrac{1}{2}\ T_{n-1} \qquad (5)$$

for the condition where $T_{n-2}$ is a 1 and $T_{n-1}$ is a 0. FIGS. 3G and 3H illustrate the condition where there is encoded a 1, and 1 followed by a 1 or a 0 and, using a derivation similar to that for the other equations discussed with relationship to FIGS. 3A through 3F, it may be shown that:

$$T_{sg} = \tfrac{1}{2}\ (T_{n-1} + T_A) \qquad (6)$$

for the condition where $T_{n-1}$ is a 1 and $T_{n-2}$ is a 1. $T_A$ is defined in the FIGS. as the length of the actual period between transitions defining a half, or one time slot, of any "1". This measurement is used in equation 6.

Figure 3I:
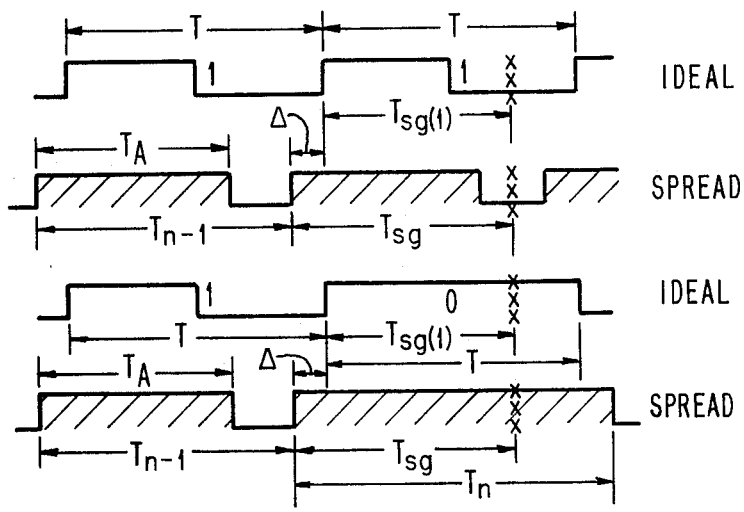
FIG. 3I illustrates the special case where a binary "1" preamble symbol is used to precede a data character of one or more bits.

In FIG. 3I, as illustrated in graphical form, the situation for a binary "1" preamble symbol to the character 1 or 0 in which the binary "1" preamble symbol is arbitrarily defined as a 1 is shown. It will be observed that $T_{sg}$ is defined as equal to $\gamma \times T_{n-1}$ which in turn in equal to $$T_{sg} = \frac{\frac{T}{2} + 2\Delta + T}{2}$$

which is equal to $\tfrac{3}{4} T + \Delta$. It will also be seen that $T_{n-1}$ equals T, that $T_A$ is equal to $(T/2) + 2\Delta$, and that $$\Delta = \tfrac{1}{2} \left( T_A - \frac{T_{n-1}}{2} \right)$$

from which $$T_{sg} = \tfrac{3}{4} \times T_{n-1} + \tfrac{1}{2} \left( T_A - \frac{T_{n-1}}{2} \right)$$

from which equation (7) results for the condition where $T_{n-1}$ is a preamble bit and is written as a binary 1.

$$T_{sg} = \tfrac{1}{2}\ (T_{n-1} + T_A) \qquad (7)$$

From the foregoing discussion of all of FIGS. 3A-3I, it will be observed that if a preamble bit is used, the search gate time, $T_{sg}$ for the next symbol following the preamble bit, is uniquely defined by eqn. (7) in all cases, and that when F2F symbols are strung together without a preamble bit, the symbols themselves may be read and measured to generate a measurement for $\gamma$ according to the various algorithms of eqns. (3), (4), (5), and (6) depending on the binary content of the symbols which precede the symbol to be read next.

As is readily apparent, the search gate time is not $\tfrac{3}{4}$, or generally any other coefficient, of the time interval of the symbol preceding the one to be read, nor can a prediction generally be made knowing only the data of a single preceding symbol which is not a preamble symbol, except under the extreme limiting condition in which there is not print spread or other distortion.

The foregoing considerations or correction for print spread, or intersymbol interference in the magnetic sensing type of system, while they are essential as a practical matter in the preferred embodiment, are not sufficient to completely satisfy the requirements of an operating system since no correction for acceleration effects has yet been made. Some attempts at correcting for acceleration or velocity variations were made in Herrin et al, U.S. Pat. No. 3,811,033, for example, in which a running average of the bar widths is compiled and compared against the measured width of a given bar to determine whether the measured bar is greater less les than the width of the average that has been computed. The difficulty with this approach is that, as the length of a string of code increases, the average changes only slightly, even for huge variations in acceleration which appear aa great variations in the measured bar width which is added into the average; therefore, in Herrin et al, it is possible that due to high accelerations, such as may be experienced in a hand scanning or hand wanding system, the data may not be read accurately since the average will not change fast enough to accommodate rapid accelerations over the latter portion of the scan.

Similarly, too, the classical definition of a search gate as $\tfrac{3}{4}$ of the preceding measured time interval is totally unable to accommodate major velocity variations such as are experienced in hand operated systems or in nonconstant transport velocity systems which are machine driven. In fact, this approach is particularly sensitive to acceleration effects at low velocities. It can be shown that the maximum tolerable acceleration is proportional to the scanning velocity squared and is inversely proportional to the coded symbol width.

It is particularly desirable to provide a means to increase the tolerance to acceleration effects in F2F decoding systems. The algorithms summarized below and their derivations which are explained subsequently, provide an accurate means of accommodating velocity variations which will accurately predict the termination of a search gate, even under high acceleration conditions.

The conventional, constant velocity algorithm for predicting the termination of a search gate is $$T_{sg} = \tfrac{3}{4} T_{n-1}. \tag{8}$$

This is eqn. (8) and eqn. (1). The new algorithms which have been developed go beyond this conventional, or first order solution, and provide as follows:

$$T_{sg} = \gamma T_{n-1} \left( \frac{T_{n-1}}{T_{n-2}} \right) \tag{9}$$

This is the second order solution and provides a correction for velocity variation which is quite acceptable. The third order correction for acceleration variations is $$T_{sg} = \gamma T_{n-1} \times \frac{T_{n-1}}{T_{n-2}} \times \left(2 - \frac{T_{n-2}^2}{T_{n-1} \times T_{n-3}}\right) \tag{10}$$

A fourth order solution also exists written as $$T_{sg} = \gamma T_{n-1} \left( \frac{T_{n-1}}{T_{n-2}} \right) \left(2 - \frac{T_{n-2}^2}{T_{n-1} \times T_{n-3}} \left(2 - \frac{T_{n-3}^2}{T_{n-2} \times T_{n-4}}\right)\right) \tag{11}$$

As will be readily understood by those with mathematical inclination, what has been described in equations (9) through (11) are McClaurin series expansions of the basic second order algorithm in equation (9). It has been found that the second order solution of equation (9) is adequate to correct for even the most radical changes in velocity and it provides an acceptable solution. The derivation of this basic algorithm will now be given.

Figure 4:
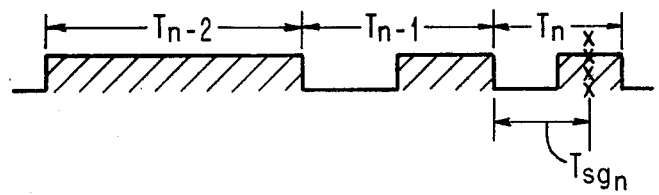
FIG. 4 illustrates a series of F2F encoded bits which have been distorted by an assumed positive acceleration.

Turning to FIG. 4, a series of F2F encoded symbols having time periods $T_{n-2}$, $T_{n-1}$, and $T_n$. These are shown as monotonically decreasing in length as a result of acceleration effects between a sensor, not shown, and the code carrying media. It is desired to produce an algorithm or an expression which will accurately predict the time of termination for the search gate period to find the central transition in time period $T_n$. This is designated as $T_{sgn}$.

Equation (12) is the mathematical statement of a basic algorithm which has been conceived to produce the search gate length in a symbol given acceleration over the preceding two symbols. As will be apparent to those skilled in mathematics and in physics, it is impossible to make a prediction for acceleration unless at least two time periods have been measured and compared.

Equation (12) is as follows:

$$T_{sgn} =$$

-continued $$\gamma \left[ T_{n-2} - f(T_{n-1}, T_{n-2}) \frac{T_{n-1}}{T_{n-2}} (T_{n-2} - T_{n-1}) \right] \tag{12}$$

Referring to FIG. 4, it will be observed that the desired search gate length can be developed from the diagram as $$T_{sgn} = \frac{T_n + \frac{T_n}{2}}{2} \tag{13}$$

Stated another way, equation (13) states that the length of the search gate time period will be the mathematical average of the time period $T_n$ and $\tfrac{1}{2}$ the time period $T_n$, so that it falls midway in the second half of the total time period $T_n$. This was previously elaborated in the discussion of equation (3).

It is convenient to assume that the length of time period $T_n$ is equal to $T_{n-1}$, times a factor which is the ratio of $T_{n-1}$ to $T_{n-2}$. This is equation (14).

$$T_n = K T_{n-1} \left( \frac{T_{n-1}}{T_{n-2}} \right) \tag{14}$$

By substituting equation (14) into equation (13) and equation (13) into equation (12), it may be shown that $$\gamma \left[ T_{n-2} - f(T_{n-1}, T_{n-2}) \frac{T_{n-1}}{T_{n-2}} (T_{n-2} - T_{n-1}) \right] = \frac{3}{4} \frac{T_{n-1}^2}{T_{n-2}} \tag{15}$$

It was assumed that an F2F recording was accomplished without introducing spread in this example. The spread coefficient $\gamma$ which was derived earlier in this specification would be equal to $\tfrac{3}{4}$ for the condition in which no print spread exists.

Solving equation (15) for $f(T_{n-1}, T_{n-2})$ gives $$f(T_{n-1}, T_{n-2}) = \frac{T_{n-2} + T_{n-1}}{T_{n-2}} \tag{16}$$

Substituting equation (16) into equation (12) gives the solution for $$T_{sg} = \frac{3}{4} \left[ T_{n-2} - \frac{(T_{n-2} + T_{n-1})(T_{n-2} - T_{n-1})}{T_{n-2}} \right] \tag{17}$$

Rearranging equation (17) provides the solution $$T_{sg} = \frac{3}{4} T_{n-1} \left( \frac{T_{n-1}}{T_{n-1}} \right) \tag{18}$$

which, with $\gamma$ understood to be $\tfrac{3}{4}$ due to the condition of no print spread. This is the same expression as given in eqn. (9) above. This is equation (18).

Using equation (17) as the basis for determining higher order correction terms, the prediction algorithms would have the following form. The first order solution, equation (19) is:

$$T_{sg} = \tfrac{3}{4} T_{n-1}. \tag{19}$$

The second order solution, equation (20) is $$T_{sg} = \frac{3}{4} T_{n-1} \left( \frac{T_{n-1}}{T_{n-2}} \right). \tag{20}$$

The third and fourth order equations follow in the same form (with $\gamma$ understood to be $\frac{3}{4}$) as those shown in equations (10) and (11) above.

It has been found that the second order solution, equation (9), (18) or (20), is the simplest to implement in terms of hardware and provides an excellent search gate length prediction, given substantially monotonic variations in scan velocity, i.e., the scanning velocity may change, but the acceleration must be a smooth function. The higher order algorithms are suggested for use only when there are rapid changes in acceleration, such as step functions or discontinuities in the acceleration curve.

Figure 5A:
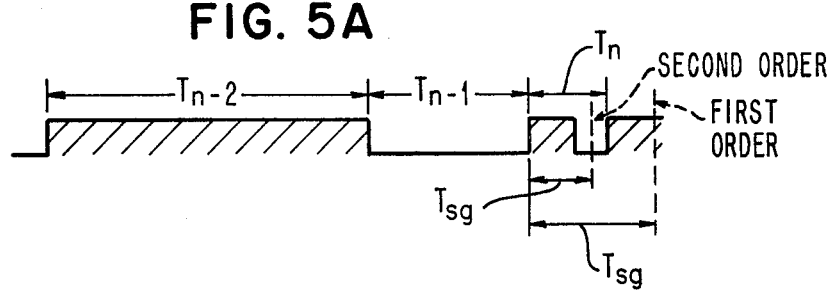
FIG. 5A illustrates an accelerated scan on an F2F code of "001" with the endings of the classical search gate and of the search gate of the present invention contrasted.
Figure 5B:
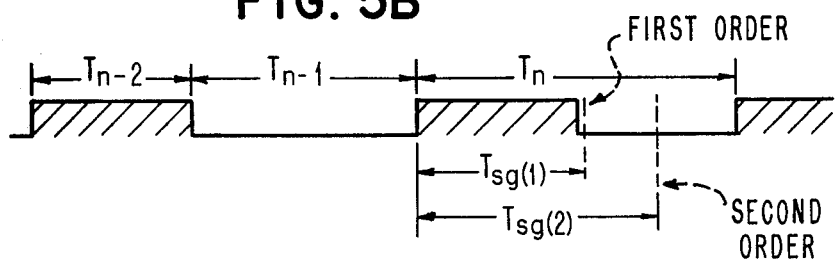
FIG. 5B illustrates the same set of circumstances as FIG. 5A, but the acceleration is negative.

FIGS. 5A and 5B illustrate the performance of the second order search gate prediction as compared with the classical first order prediction shown above. In FIG. 5A a schematic diagram of an accelerated scan on an F2F code of "001"(is shown with the positions of the search gate termination for the second order and for the first order solutions shown in dotted lines. It will be apparent that the first order solution predicts the ending of a search gate long after the final boundary transition of the symbol, far removed from the center transition which is desired to be picked up to properly decode the encoded "1" in this example. The second order solution falls precisely at the correct point to encompass the central transition of the encoded)"1", but without extending farther into the end or boundary transition of the "1".

FIG. 5B shows the result of a decelerated scan on a code 001 and also shows the positions at which the search gate predictions would fall for the first order and second order solutions. In this case, it may be seen that the first order solution is on the very verge of producing an error, since it falls nearly on the central transition point of the 1, and might possibly come slightly too early and thus miss the transition entirely and interpret the fianl bit as a 0 instead of a 1. On the other hand, the second order solution predicts the search gate to end precisely in the center of the second time slot of the binary 1 which has been encoded in this example and takes in the central transition which is significant for reading a 1 in the F2F code system.

Having discussed the related problems of compensating for print spread and for acceleration effects, it is apparent that a truly versatile system must be able to simultaneously compensate for both acceleration and for print spread effects. The following discussion will describe such a system in some detail, giving specific embodiments and certain improvements in the embodiments which form the basis of a truly universally functional F2F code reading technique and apparatus.

Returning momentarily to FIGS. 2A and 2B, it will be observed that the symbol bars are uniformly spread in width as a result of printing F2F characters. It is significant to note that the symbol width of a binary 1 is constant and is independent of spread. However, the symbol width of binary 0's is altered by the spread so that they may be wider or narrower than the ideal. The consistency of a binary 1 symbol width, which is independent of spread, leads to its choice as a preamble bit to be associated with a stand alone multi-bit character. As alluded to previously, it is desirable to include with each encoded character or a data stream a preamble bit from which a degree of print spread can be measured and computed for correcting for print spread; and it is also desirable to have a series of transition signals which can be measured in evaluating the degree of acceleration which is being experienced. A binary 1 preamble bit serves this purpose.

Returning also to eqn. (9), it will be observed that the algorithm given accounts for acceleration effects at the second order level, and for print spread, as well, by the coefficient $\gamma$. The spread coefficient $\gamma$ is determined from the preamble bit of each printed character and, if desired, can be updated within a character by the use of each binary 1 symbol as it appears in the printed character.

Figure 6:
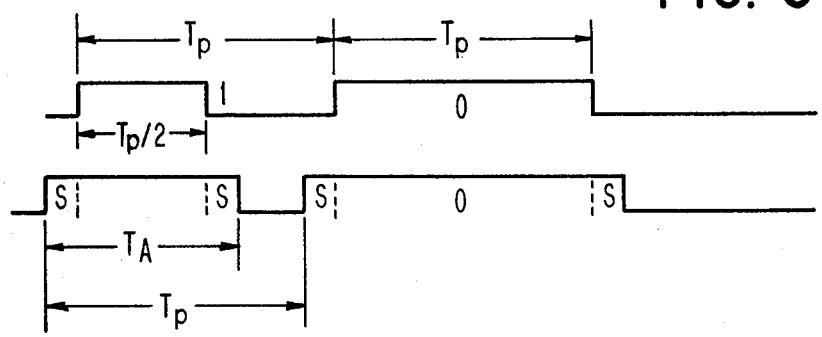
FIG. 6 illustrates a typical binary "1" preamble symbol preceding data bits and showing how the total width of a "1" is unaffected by spread.

The product quantity $$T_{n-1} \left( \frac{T_{n-1}}{T_{n-2}} \right)$$

was the algorithm previously developed to account for the effects of acceleration in the second order. Turning now to FIG. 6, a typical binary 1 given as a preamble bit is illustrated as having a total length in the ideal, or unspread condition, of $T_p$ in the upper part of FIG. 6. This is followed by binary 0's for simplicity. In the lower line of FIG. 6, the initial preamble bit is shown with the bar width of the first time slot T/2 expanded by spread amounts S at either edge, as would result typically from positive print spread. The width of either time slot T/2 identified in the upper part of FIG. 6 as $T_p/2$ is identified as $T_A$, in the spread condition, in the lower line of FIG. 6. This is the same $T_A$ as appears in FIG. 3I. It will, however, be seen that the total length of the character $T_p$ remains constant in both the upper and the lower line due to the fact that the width of the following binary 0 is also increased.

Returning to equation (7) momentarily and writing an expressiion for $\gamma$ in terms of $T_A$ and $T_P$ where $T_A$ is, in the unspread or ideal condition equal to $T_p/2$, a spread constant $K_p$ may be defined as shown in equation (21) as follows:

$$K_p = \frac{2T_A - T_p}{T_p} \tag{21}$$

or, stated alternatively, $$K_p = \frac{4s}{T_p} \tag{22}$$

since it is clear that $2T_A$ will be greater than $T_p$ by the amount 4s.

The relationship between $K_P$ and the previously used expression for $\gamma$ is that the spread constant $K_p$ is an integral part of the spread coefficient $\gamma$ given previously but, since it is applied to the preamble binary 1 bit and deals with the comparison of the time periods within the single 1 bit, and not on two successive character periods, it is written as $K_p$, where $T_p$ is the measured duration of the preamble bit, $T_A$ is the binary 1 spread transition time at a constant velocity in either time slot, and S is the amount of spread which is experienced.

It will instantly be apparent that the spread constant $K_p$ has a maximum value of unity and a minimum value of 0.

When F2F characters are printed with multi bits, the minimum space desired between the separate characters is one slot width. An F2F character consisting of many bits consists of symbols for the bits, each symbol being two slot widths in length. The slot widths, in the ideal sense, are exactly equal to $T_p/2$. In the event that various F2F characters are written with the preamble bit as suggested above, a counter would have to be employed for counting individual symbols as they are scanned. When the requisite number of symbols have been counted to make up the requisite number of bits for the given character format, i.e., four bit, six bit, eight bit, etc., the counter would be able to instruct using logic that the next bit sent would be a preamble bit for a succeeding character. The search gate function alluded to earlier would be deleted while reading the preamble bit with a scanner.

For the data bits which follow the preamble bit, regardless of whether they are 1's or 0's, the search gate length is predicted by using one of two algorithms listed in table 1 for the case $T_{n-1} = 1$ and $T_{n-2} = 1$. The choice of the appropriate algorithm from table 1, given the preceding conditions for $T_{n-1}$, are that $T_{n-1}$ is less than $2T_A$ or $T_{n-1}$ is greater than $2T_A$, as will become apparent in the discussion which follows. Given positive spread, $2T_A$ will be greater than $T_{n-1}$ and the inverse is true for negative spread.

In table 1, which follows, there are five columns.

spread S has been shown in each of the time segments and the length of time $T_p$ for a digital 1 is the same as the upper line, as discussed previously. The length $T_A$ of the first time slot of a binary 1 is also shown in the spread pattern of the bottom line. The derivation for the first and for the second order solutions for a predicted search gate time $T_{sg}$ will now be given.

For the first order solution, it is presumed that there is no acceleration. The time at which a search gate should be terminated is then the average which lies between $\frac{1}{2} T_p$ and $T_p$, i.e., it lies midway in the second time slot of a symbol. The reason for this is that, in the unspread and unaccelerated condition, the time for ending the search gate lies ideally midway through the second time slot of a symbol, thus insuring that any transition at the center of the symbol, which would be the case for a binary 1, will be detected without interference from the transition at the end boundary of the symbol time $T_p$. In the event of print spread, where the first time slot of a binary 1 is spread to a width $T_A$, the search gate must be terminated at the average length time midway between the end of $T_A$ and the end of a full time, $T_p$. It is obvious from the diagram that $$T_A = \frac{T_p}{2}(1 + K_p)$$

TABLE 1

| $T_{n-1}$ | $T_{n-2}$ | Condition | First Order Solution | Second Order Solution |
|---|---|---|---|---|
| "0" | "0" | $T_{n-1} < T_{n-2}$ | $T_{sg} = \frac{(3 + K_p)}{2(2 - K_p)}(T_{n-1})$ | $T_{sg} = \frac{(3 + K_p)(2 + K_p)}{2(2 - K_p)^2}(T_{n-1})(\frac{T_{n-1}}{T_{n-2}})$ |
| "0" | "0" | $T_{n-1} > T_{n-2}$ | $T_{sg} = \frac{(3 - 2K_p)}{2(2 + K_p)}(T_{n-1})$ | $T_{sg} = \frac{(3 - 2K_p)(2 - K_p)}{2(2 + K_p)^2}(T_{n-1})(\frac{T_{n-1}}{T_{n-2}})$ |
| "0" | "1" | $T_{n-1} < T_{n-2}$ | $T_{sg} = \frac{(3 + K_p)}{2(2 - K_p)}(T_{n-})$ | $T_{sg} = \frac{(3 + K_p)}{(2 - K_p)^2}(T_{n-1})(\frac{T_{n-1}}{T_{n-2}})$ |
| "0" | "1" | $T_{n-1} > T_{n-2}$ | $T_{sg} = \frac{(3 - 2K_p)}{2(2 + K_p)}(T_{n-1})$ | $T_{sg} = \frac{(3 - 2K_p)}{(2 + K_p)^2}(T_{n-1})(\frac{T_{N-1}}{T_{n-1}})$ |
| "1" | "0" | $T_{n-1} < T_{n-2}$ | $T_{sg} = \frac{(3 - 2K_p)}{4}(T_{n-1})$ | $T_{sg} = \frac{(3 - 2K_p)(2 + K_p)}{8}(T_{n-1})(\frac{T_{n-1}}{T_{n-2}})$ |
| "1" | "0" | $T_{n-1} > T_{n-2}$ | $T_{sg} = \frac{(3 + K_p)}{4}(T_{n-1})$ | $T_{sg} = \frac{(3 + K_p)(2 - K_p)}{8}(T_{n-1})(\frac{T_{n-1}}{T_{n-2}})$ |
| "1" | "1" | $T_{n-1} < 2T_A$ | $T_{sg} = \frac{(3 + K_p)}{4}(T_{n-1})$ | $T_{sg} = \frac{(3 + K_p)}{4}(T_{n-1})(\frac{T_{n-1}}{T_{n-2}})$ |
| "1" | "1" | $T_{n-1} > 2T_A$ | $T_{sg} = \frac{(3 - 2K_p)}{4}(T_{n-1})$ | $T_{sg} = \frac{(3 - 2K_p)}{4}(T_{n-1})(\frac{T_{n-1}}{T_{n-2}})$ |

To convert the above algorithms to the general form, substitute 4C for the numeral 3 wherever it occurs.

The first two columns define the binary content found to exist in the data symbols identified as $T_{n-1}$ and $T_{n-2}$ which are the two preceding symbols before the symbol in question which is to be sensed and interpreted. The third column defines a control condition which relates to the measured length of $T_{n-1}$ and to the length which has been measured for $T_{n-2}$ or, in the alternative, to a length equal to $2T_A$, as $T_A$ has been defined previously. The fourth column lists the first order solution algorithm which is accceptable to account for print spread alone. The last column lists the second order algorithm set which also correct for acceleration effects.

The above algorithms are derived as follows. With reference to FIG. 7, in the top line, four equal length time periods $T_p$, each consisting of two time slots $T_p/2$, are illustrated. The ideal F2F code for the digits 1001 has been arbitrarily assigned to the data pattern in the top and in the bottom lines. It will be observed that the time period $T_n$, in which it is desired to predict a search gate $T_{sg}$ time, is illustrated in the spread pattern of the same code sequence as in the top line. The amount of where $T_A$ is the width of the spread time slot $T_p/2$. From the diagram, it will be seen that the quantity $$\frac{T_p}{2} + 2S$$

defines the length $T_A$. To find the average of $T_A + T_p$ as previously indicated then, one writes the equation $$\frac{T_A + T_p}{2}$$

Inserting the previous expression for $T_A$ and rewriting, it becomes $$\frac{\frac{(1 + K_p)T_p}{2} + T_p}{2}$$

which, when rearranged, yields;

$$T_{sg} = \frac{T_p(3 + K_p)}{4}.$$

Now it will be observed that $T_{n-1}$ will be equal to $T_p \times (1 - K_1)$ where $K_1$ is understood to be the spread factor in the time slot $T_{n-1}$. Rewriting this formulation, it can be said that $T_{n-1} = T_p(1 - K_p/2)$ since, in the ideal condition, $K_1$ will be $\frac{1}{2}$ the total spread $K_p$. Rewriting the expression $$T_{n-1} = T_p(\frac{2 - K_p}{2}).$$

Now it is also true that the length of the search gate $T_{sg}$ should equal some fraction of the time period $T_{n-1}$ which is expressed as $\gamma \times T_{n-1}$. Equating terms for the length of the search gate $T_{sg}$, $$\gamma \times (T_{n-1}) = \gamma T_p(\frac{2 - K_p}{2}) = T_p \frac{(3 + K_p)}{4}$$

Solving for $\gamma$ it is found that $$\gamma = \frac{3 + K_p}{4 - 2K_p} = \frac{3 + K_p}{2(2 - K_p)}$$

Substituting the expression for $K_p$ which equals $$\frac{2T_A - T_p}{T_p}$$

as previously indicated, $$\gamma = \frac{T_p + T_A}{3T_p - 2T_A}.$$

Inserting the expression for $\gamma$ in the equation for $T_{sg}$, $$T_{sg} = \frac{T_p + T_A}{3T_p - 2T_A} (T_{n-1}).$$

Rearranging terms, this equals $$T_{sg} = \frac{3 + K_p}{2(2 - K_p)} (T_{n-1})$$

This is the first order solution for $T_{sg}$ for the conditions under which the data bits in the the two preceding time periods $T_p$ prior to the time in which it is desired to predict a search gate for its time $T_n$ are equal to "0", and further $T_{n-1}$ is less than $T_{n-2}$, as has been drawn in the bottom line of FIG. 7 and in Table 1.

Continuing now with the derivation for the second order solution for the diagram given in FIG. 7, it will now be assumed that acceleration is present as well as print spread. The basic expression for defining the time of the search gate $T_{sg}$ is as follows.

$$T_{sg} = \gamma \times T_{n-1}(\frac{T_{n-1}}{T_{n-2}})$$

Substituting the expression for $T_{n-1}$ which is $$T_p(\frac{2 - K_p}{2})$$

and for $T_{n-2}$ which is $$T_p(\frac{2 + K_p}{2})$$

and rewriting the expression it is found that $$T_{sg} = \gamma \frac{T_p}{2} (\frac{(2 - K_p)^2}{2 + K_p}).$$

At this point, it should be understood that the $\gamma$ for the second order derivation is not the same $\gamma$ which was found in the first order solution due to the fact that a correction for acceleration must be taken into account along with the spread. Also, the basic expression $$T_{sg} = T_{n-1} \times \frac{T_{n-1}}{T_{n-2}}$$

comes about from the assumption that, over the space of two succeeding symbol periods $T_p$ or $T_{n-1}$ and $T_{n-2}$, where $T_{n-1}$ is less than $T_{n-2}$ in this case, that the acceleration curve which would be produced on a plot of distance and time is essentially approximated by a straight line projection from the preceding two symbol periods, i.e., the slope of the acceleration curve is approximately linear over the small distances of succeeding $T_p$, s.

Writing the expression for $T_{sg}$, $$T_{sg} = \gamma \times \frac{T_p}{2} \frac{(2 - K_p^2)}{2 + K_p}.$$

This expression, in turn, should be equal to the expression for the termination of the search gate as derived from the first order solution since the average of $\frac{1}{2} T_p$ and of $T_p$ is the point at which the search gate should be terminated regardless of acceleration and spread. This expression as derived previously is $$T_p(\frac{3 + K_p}{4}).$$

Equating this last expression with the expression for $T_{sg}$ and solving for $\gamma$ it will be found that $$\gamma = \frac{(3 + K_p)(2 + K_p)}{2(2 - K_p^2)}.$$

Substituting this expression for $\gamma$ into the expression for $T_{sg}$ it will be found that $$T_{sg} = \frac{(3 + K_p)(2 + K_p)}{2(2 - K_p)^2} T_{n-1}(\frac{T_{n-1}}{T_{n-2}}).$$

This is the algorithm given for the second order solution in Table 1 for the conditions of $T_{n-1}$ and $T_{n-2}$ containing binary 0's and $T_{n-1}$ being less than $T_{n-2}$.

Turning now to FIG. 8, the derivation of the first order solution and for the second order solution under the conditions of $T_{n-1} = 0$, $T_{n-2} = 0$, and $T_{n-1}$ is greater than $T_{n-2}$ will be given.

For the first order solution, as with the previous derivation, $T_{sg}$ is defined as equal to $\gamma \times T_{n-1}$.

Referring to the second line of FIG. 8, it can be seen that the search gate $T_{sg}$ is the average value of $T_p - 2S$ and $T_p/2 - 2S$ giving:

$$T_{sg} = \frac{T_p + \frac{T_p}{2} - 4S}{2}$$

Recalling that $4S = K_p T_p$ and substituting this expression for $4S$ into the above expression and rearranging terms gives:

$$T_{sg} = \frac{T_p}{4}[3 - 2K_p].$$

This expression gives $T_{sg}$ in terms of $T_p$ and $K_p$. However, for the first order solution, it is desired to obtain an expression for $T_{sg}$ in terms of $T_{n-1}$ and $K_p$.

Referring again to FIG. 8, it is evident that $$T_{n-1} = T_p + 2S = T_p + \frac{K_p T_p}{2} = \frac{T_p}{2}[2 + K_p].$$

Solving for $T_p$ gives:

$$T_p = \frac{2T_{n-1}}{2 + K_p}.$$

Substituting this definition for $T_p$ into the expression for $T_{sg}$ gives:

$$T_{sg} = \frac{T_{n-1}}{2}\left[\frac{3 - 2K_p}{2 + K_p}\right].$$

This is the equation appearing in Table 1 under the conditions $T_{n-1}$, $T_{n-2}$ contained binary 0's and $T_{n-1}$ is greater than $T_{n-2}$.

Continuing with the second order solution, the same steps are followed as was done with the previous derivation. The expressions for $T_{n-1}$ and $T_{n-2}$ are substituted into the general expression $$T_{sg} = \gamma \times T_{n-1} \times \frac{T_{n-1}}{T_{n-2}}$$

which is equated to the search gate time $$T_p\left(\frac{3 - 2K_p}{4}\right)$$

as was done previously. Solving for $\gamma$ again, it will be found that $$\gamma = \frac{(3 - 2K_p)(2 - K_p)}{2(2 + K_p)^2}$$

Solving for $T_{sg}$ it will be found that $$T_{sg} = \frac{(3 - 2K_p)(2 - K_p)}{2(2 + K_p)^2} T_{n-1}\left(\frac{T_{n-1}}{T_{n-2}}\right).$$

This is the expression for the second order solution for the aforementioned conditions of $T_{n-1}$ and $T_{n-2}$ which is listed in Table 1.

Continuing with the derivations, FIG. 9 shows the diagram utilized for the condition $T_{n-1}$ contains a 1, $T_{n-2}$ contains a 0, (an odd zero, as will be apparent) and $T_{n-1}$ is less than $T_{n-2}$. The derivations follow the same procedure as set forth in the previous two examples and will not be repeated in full here, for the sake of simplicity. The expressions which result for the first and second order solutions are given in Table 1 under the appropriate condition headings.

In FIG. 10, the procedure is repeated for the condition $T_{n-1} = 1$, $T_{n-2} = 0$, and $T_{n-1}$ is greater than $T_{n-2}$. The first and second order solutions which result using the same technique are as shown in Table 1.

Figure 11:
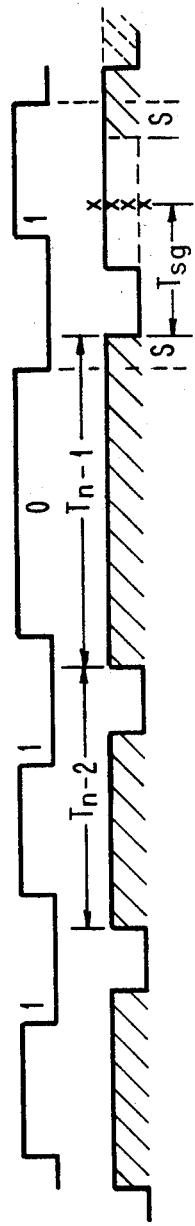
FIG. 11 illustrates another set of conditions similar to FIGS. 7 through 10.

Turning to FIG. 11, the diagram is drawn for the condition $T_{n-2} = 1$, $T_{n-1} = 0$, and $T_{n-1}$ is greater than $T_{n-2}$. The solutions which result are listed in Table 1 as shown.

Figure 12:
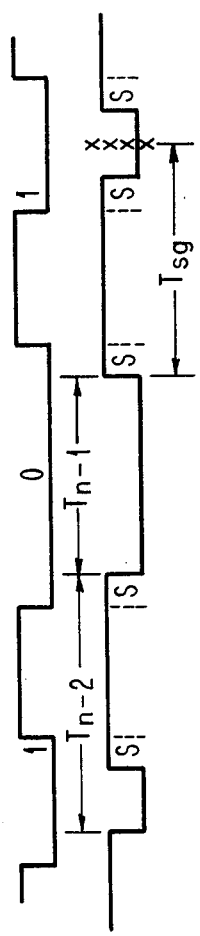
FIG. 12 illustrates another set of conditions similar to FIGS. 7 through 11.

FIG. 12 is drawn for the condition $T_{n-2} = 1$, $T_{n-1} = 0$, and $T_{n-1}$ is less than $T_{n-2}$, the resulting solutions being presented in Table 1 as before.

Figure 13:
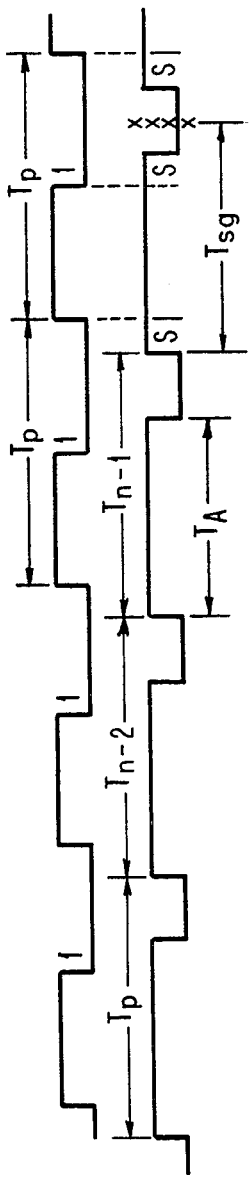
FIG. 13 illustrates another set of conditions similar to FIGS. 7 through 12.

Turning to FIG. 13, the derivation for the conditions $T_{n-2}$ is a 1, $T_{n-1}$ is a 1, and $T_{n-2}$ is less than $2T_A$ as shown. The reason that the condition $T_{n-1}$ is less than $2T_A$ is used, is that the spread factor is indicated positive and a binary one immediately precedes the symbol for which a search gate prediction is desired and $T_A$ is used, as was discussed earlier, under these circumstances. The rest of the derivation for the first and the second order solutions follows as with the previous examples and will not be repeated for the sake of simplicity. The resulting solutions are illustrated in Table 1 for the conditions specified.

Figure 14:
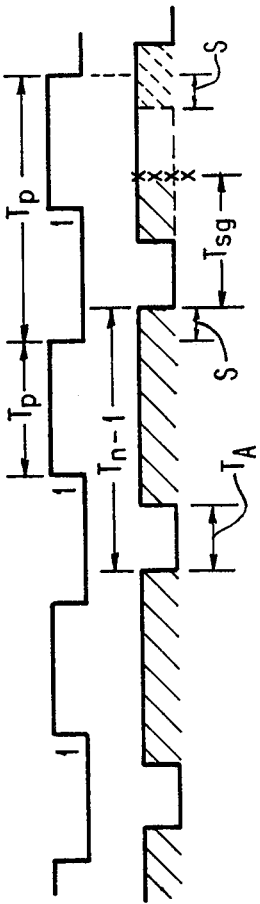
FIG. 14 illustrates another set of conditions similar to FIGS. 7 through 13.

In FIG. 14, a diagram is drawn for the condition $T_{n-1} = 1$, $T_{n-2} = 1$, and $T_{n-1}$ is greater than $2T_A$. The resulting solutions following the same methods as before are given in Table 1.

This completes the derivations for all of the various permutations of conditions for the two time periods, or symbol periods, preceding time $T_n$ in which it is desired to define a search gate $T_{sg}$. Returning to Table 1, it is apparent that all of the solutions given depend on determining the difference between $T_{n-2}$ and $T_{n-1}$, if any. These are real, measurable times which are experienced when the scanning head transits the given coded media. The data for the length between boundary transitions, or a time count, for $T_{n-2}$ and $T_{n-1}$ may be gathered and manipulated and a proper selection for choice of algorithm made. However, this technique has an inherent failure condition under which the choice of proper algorithm, when governed by the comparison of $T_{n-1}$ and $T_{n-2}$, becomes ambiguous. This occurs whenever $T_{n-1}$ equals $T_{n-2}$ and $T_{n-1}$ and $T_{n-2}$ time registers both record binary 0's (if at least one of the $T_{n-1}$ registers or $T_{n-2}$ registers happens to contain a 1, no problem generally exists, so long as there is spread of the printed data, because the times between transitions will be spread by different amounts depending on whether a 1 or a 0 appears). In the rare condition in which no spread exists, equality of $T_{n-1}$ and $T_{n-2}$ can occur, regardless of the content of those time periods being a 1 or a 0. The conditions given in Table 1 may also produce equality of $T_{n-1}$ and $T_{n-2}$ under the proper conditions of acceleration and spread in combination. This leads to an ambiguity in selection of the correct algorithm also. Nevertheless, in certain situations where acceleration is small, or is very controlled, such as in slot readers or in machines which have automated scan heads which move at a constant velocity, the problem does not ordinarily appear and these selection criteria would be acceptable.

In overcoming the aforementioned difficulty, different algorithms, based on different selection criteria, have been devised in which the sensitivity to equality between $T_{n-1}$ and $T_{n-2}$ is eliminated. Instead, under the improved system, the condition columns shown in Table 2 require only the knowledge of the polarity of the spread factor $K_p$ being positive or negative, and the knowledge of whether the time $T_{n-2}$ contains an odd or an even 0 quantity following the last 1 sensed. In this context, "odd" or "even" is defined as the serial position occupied by a 0, reading from left to right, since the last 1 occurred. This same selection criteria may also be used for the Table 1 algorithms if desired, as shown in Table 4. These criteria were shown in the figures for the derivations of the Table 1 algorithms.

Figure 15B:
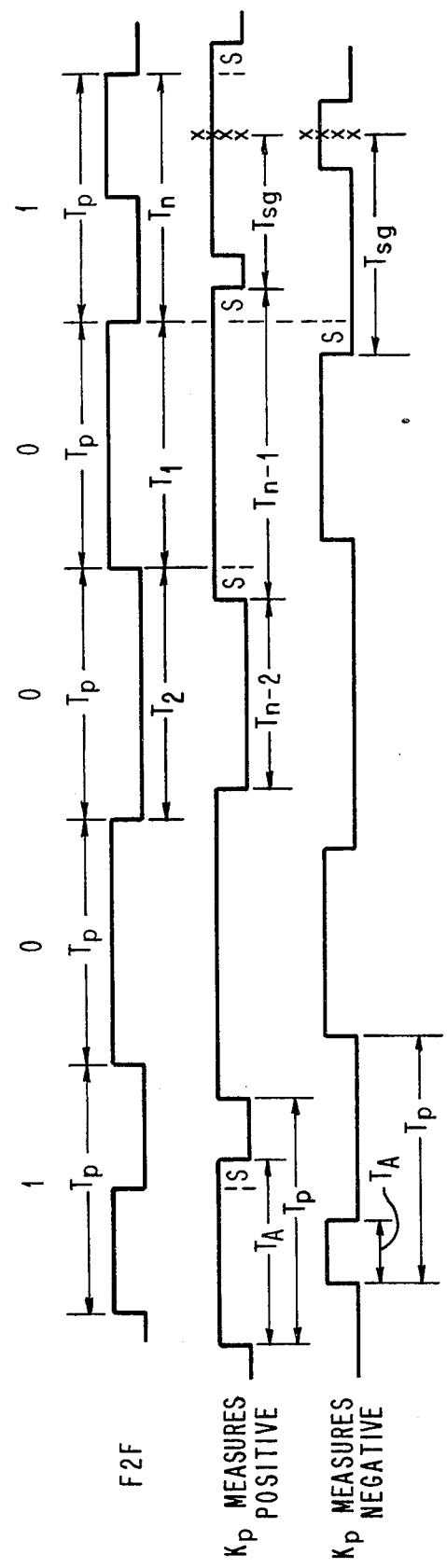
FIG. 15B illustrates circumstances similar to those of FIG. 15A, but three "0's" are placed between the preamble symbol and the $T_n$ symbol.

The algorithms listed in Table 2 will now be derived and explained in detail, and then attention will be turned to describing the specific embodiments utilizing these algorithms in a functional F2F code reader and decoder.

measurement. For $K_p$ being negative, a 0 content in a period $T_p$ which follows a binary 1 will exhibit a shortened length if it is in the odd numbered position following a binary 1. This is due to the spread coefficient $K_p$ being negative and reducing the width of such a "0". Secondly, an even numbered 0 following the last binary 1 will have a lengthened time period $T_p$. (See FIG. 15A contrasted with FIG. 15B.)

Both "long" and "short" are relative terms and are referenced to the standard length $T_p$ of the unspread and unaccelerated code in the top line. For $K_p$ positive, the odd numbered 0 content occurring after the last binary 1 will be lengthened and an even numbered 0 after the last binary 1 will be shortened. The length of binary 1's is unchanged regardless of spread, although the position at which the binary 1 appears in the graph will be shifted to the left or right, accordingly, by distance S equal to the spread.

The second line in FIG. 15A illustrates the same sequence of code as the top line, but with a positive

TABLE 2

| $T_{n-1}$ | $T_{n-2}$ | Conditions $T_{n-2}$ (Zero) | Comp. $K_p$ | First Order Solution | Second Order Solution |
|---|---|---|---|---|---|
| "0" | "0" | Odd | Pos. | $T_{sg} = \dfrac{T_{n-1}}{2} [\dfrac{3+|K_p|}{2-|K_{10}|}]$ | $T_{sg} = \dfrac{T_{n-1}}{2} [3(\dfrac{2+|K_p|}{2-|K_p|}) \dfrac{T_{n-1}}{T_{n-2}} + |K_p|] \dfrac{1}{2-|K_p|}$ |
| "0" | "0" | Even | Neg. | | |
| "0" | "0" | Even | Pos. | $T_{sg} = \dfrac{T_{n-1}}{2} [\dfrac{3-|K_p|}{2+|K_p|}]$ | $T_{sg} = \dfrac{T_{n-1}}{2} [3(\dfrac{2-|K_p|}{2+|K_p|}) \dfrac{T_{n-1}}{T_{n-2}} - |K_p|] \dfrac{1}{2+|K_p|}$ |
| "0" | "0" | Odd | Neg. | | |
| "1" | "0" | Odd | Pos. | $T_{sg} = \dfrac{T_{n-1}}{4} (3 - |K_p|)$ | $T_{sg} = \dfrac{T_{n-1}}{4} [3\dfrac{T_{n-1}}{T_{n-2}}(1 + \dfrac{|K_p|}{2}) - |K_p|]$ |
| "1" | "0" | Even | Neg. | | |
| "1" | "0" | Even | Pos. | $T_{sg} = \dfrac{T_{n-1}}{4} (3 + |K_p|)$ | $T_{sg} = \dfrac{T_{n-1}}{4} [3\dfrac{T_{n-1}}{T_{n-2}}(1 - \dfrac{|K_p|}{2}) + |K_p|]$ |
| "1" | "0" | Odd | Neg. | | |
| "0" | "1" | | Pos. | $T_{sg} = \dfrac{T_{n-1}}{2} (\dfrac{3-|K_p|}{2+|K_p|})$ | $T_{sg} = \dfrac{T_{n-1}}{2+|K_p|} [(\dfrac{3}{2+|K_p|}) \dfrac{T_{n-1}}{T_{n-2}} - \dfrac{|K_p|}{2}]$ |
| "0" | "1" | | Neg. | $T_{sg} = \dfrac{T_{n-1}}{2} (\dfrac{3+|K_p|}{2-|K_p|})$ | $T_{sg} = \dfrac{T_{n-1}}{2-|K_p|} [(\dfrac{3}{2-|K_p|}) \dfrac{T_{n-1}}{T_{n-2}} + \dfrac{|K_p|}{2}]$ |
| "1" | "1" | | Pos. | $T_{sg} = \dfrac{T_{n-1}}{4} [3 + |K_p|]$ | $T_{sg} = \dfrac{T_{n-1}}{4} [3\dfrac{T_{n-1}}{T_{n-2}} + |K_p|]$ |
| "1" | "1" | | Neg. | $T_{sg} = \dfrac{T_{n-1}}{4} [3 - |K_p|]$ | $T_{sg} = \dfrac{T_{n-1}}{4} [3\dfrac{T_{n-1}}{T_{n-2}} - |K_p|]$ |

To conver the above algorithms to the general form, substitute 4C for the numeral 3 wherever it occurs.

Turning to FIG. 15A, derivation of the first and second order solutions for the situation in which the spread constant $K_p$ is positive, $T_{n-1}$ contains a 0 which is an even time period following the last occurrence of a binary 1, and time period $T_{n-2}$ contains an odd 0 following the last occurrence of a binary 1. It is desired to write algorithms to predict the ending of time of a search gate $T_{sg}$ for the aforementioned conditions. In FIG. 15A, the top line illustrates a normal, unspread and otherwise undistorted F2F code for the sequence 1001. The lengths of the symbols, in time, are all equal to $T_p$. The period of time $T_p$ for which it is desired to predict a search gate length $T_{sg}$, is illustrated and is denominated as $T_n$. The preceding time periods $T_p$ are then identified $T_{n-1}$, $T_{n-2}$, etc.

At the outset, certain observations may be made. Firstly, the sequence in which a binary 1 occurs, which relates to the way in which a "1" may be written (as will be discussed later), makes no difference in the derivations which follow for the prediction of the search gate time given a spread coefficient $K_p$, since the sign, positive or negative of $K_p$ is obtained properly by direct measurement.

spread introduced into the signals as discussed previously, due to printing ink and paper effects. The time period $T_A$ is defined, as previously, as one of the time slots, i.e., the first time slot is the first half of the code for a binary 1. The third line in FIG. 15A illustrates the same code drawn for the situation where the spread coefficient $K_p$ is negative. In each case it is desired to predict, by using measurable quantities, the termination of a search gate at a time corresponding to the X'ed vertical line intersecting all three lines in FIG. 15A.

With reference to the second line in FIG. 15A, it is evident that $T_A - 2S$ is equal to $T_p/2$ or, rearranging terms, $$2S = \frac{2T_A - T_p}{2} \qquad (23)$$

This is equation (23). It is also clear that $$T_p/2 (1 + K_p) = T_A$$

since $T_A$ is the spread dimension of $T_{p/2}$ when it is spread by a positive coefficient $K_p$. This, in turn, is equal to $T_i/2 + 2S$ since there is an S amount of spread on each side of a given width $T_p/2$. Solving the two equivalent expressions for $T_A$ for the quantity 2S, it will be found that $$2S = \frac{T_p}{2} K_p \quad (24)$$

This is equation (24). Equating the two expressions for 2S in equations (23) and (24), and solving for $K_p$, yields $$K_p = \frac{2T_A - T_p}{T_p}. \quad (25)$$

This is equation (25).

Returning to FIG. 15A, it is apparent in the first line that, under ideal circumstances with no spread, the time of search gate termination $T_{sg}$ should equal ¾ of $T_1$, where $T_1$ is defined as the time period $T_p$ just preceding the time period in which it is desired to predict the search gate. Given an amount of spread S, it is evident that $T_{sg}$ will equal ¾ of $T_1 + S$, since the search gate is measured from a leading edge, which will be extended by an amount S, and it ends in a gap between a trailing edge and the leading edge of the next succeeding symbol; therefore an additional spread on the trailing edge of the bar which occurs does not lengthen the ideal search gate. It does, however, narrow the "window" in which the proper search gate time must fall.

substituting equation (24) as an expression for S, where S is the spread factor in the $T_{n-1}$ symbol, it may be written that $$T_{sg} = \frac{T_1 + T_1}{2} + \frac{T_1 K_p}{4}$$

or, simplifying, $$T_{sg} = \frac{T_1}{4} [3 + K_p] \quad (26)$$

This is equation (26). It will be noted, however, that equation (26) is in terms of $T_1$ which is the time period in the top line of FIG. 15A just preceding the symbol in which it is desired to determine a proper search gate length. This is not a measurable time quantity since, under conditions of spread, it does not exist. However, $T_1$ may be expressed in terms of a measurable quantity, $T_{n-1}$, as $T_1 = T_{n-1} + 2S$ and, substituting equation (24) for 2S $$T_1 = T_{n-1} + \frac{T_1 K_p}{2}$$

Solving for $T_1$ it will be found that $$T_1 = T_{n-1} \left( \frac{2}{2 - K_p} \right) \quad (27)$$

This is equation (27). By substituting the expression in equation (27) for $T_1$ into equation (26), it may be derived that $$T_{sg} = \frac{T_{n-1}}{2} \left[ \frac{3 + K_p}{2 - K_p} \right] \quad (28)$$

This is equation (28) and is the solution to the first order conditions listed at the top of Table 2.

If one now examines equation (3) and compares it with equation (28), it may be conclusively proved that they are equivalent expressions and result in identical $T_{sg}$ predictions, the only difference being that the notion of $K_p$ has been introduced and substituted for the combined factors involving S and $T_{n-1}$ and $T_{n-2}$. The practical difference is that equation (3) requires time measurements of two whole symbols $T_{n-1}$ and $T_{n-2}$, while equation (28) requires only the measurement of $T_{n-1}$ and the original time measurements to compute the $K_p$ factor which may then be properly applied by following the rules developed above. The equivalence of equation (3) with equation (28) may be shown as follows:

$$T_{sg} = \tfrac{1}{8} [T_{n-1} + 5T_{n-2}] \quad (3)$$

$$T_{sg} = \frac{T_{n-1}}{2} \left[ \frac{3 + K_p}{2 - K_p} \right] \quad (28)$$

now given spread (positive);

$$4S = T_p K_p,$$

$$T_{n-1} = T_p - 2S = T_p - \frac{T_p K_p}{2},$$

$$T_{n-2} = T_p + 2S = T_p + \frac{T_p K_p}{2},$$

and substituting the expressions for $T_{n-1}$ and $T_{n-2}$ into eqn. (3).

$$T_{sg} = \frac{T_p}{16} [12 + 4K_p] = T_{sg} = \frac{T_p}{4} \text{ or } (3 + K_p);$$

now expressing $T_p$ in terms of $T_{n-1}$, $$T_p = \frac{2T_{n-1}}{2 - K_p}$$

and substituting this expression for $T_p$, gives:

$$T_{sg} = \frac{T_{n-1}}{2} \left[ \frac{3 + K_p}{2 - K_p} \right] \text{Q.E.D.}$$

It may easily be demonstrated that there exists total equivalence between equations (3) and (28), (4) and (34), (5) and (36) and between (6) and (38). The proofs of the remaining equation equivalencies are not repeated here for simplicity. The choice of implementation of these algorithms for the first order (spread only) solution is arbitrary, but, due to the added benefits of using a binary "1" preamble bit, the second set of algorithms (which are equivalent to those first developed) are easier to implement and require only one preamble or lead symbol prior to the data while the first-developed algorithms require two preceding smybol measurements, although it will easily be appreciated that both implementations require at least one symbol measurement prior to the data, and hence the choice of algorithm set can then be made without affecting the outcome.

Continuing now with the second order solution for the same conditions: (under which $K_p$ is positive, $T_1$ is an even numbered 0 following a 1, and $T_2$ is an odd numbered 0 following a 1). As developed previously, a general expression to acount for acceleration in the search gate time is $$I_{sg} = \frac{3}{4} T_1 (\frac{T_1}{T_2}).$$

Turning to the second line of FIG. 15A, it is apparent that the expression $$T_{sg} = \frac{3}{4} T_1 (\frac{T_1}{T_2})$$

must be augmented by one increment of spread S which leads to equation $$T_{sg} = \frac{3}{4} T_1 \times \frac{T_1}{T_2} + S.$$

Substituting the expression from equation (24) for S (note; the spread value S used is based on the previous symbol's spread, not that of the symbol for which a search gate is being computed)

$$T_{sg} = \frac{3}{4} T_1 (\frac{T_1}{T_2}) + \frac{T_1 (K_p)}{4}. \tag{29}$$

This is equation (29). Simplifying terms, $$T_{sg} = \frac{T_1}{4} [3 (\frac{T_1}{T_2}) + K_p] \tag{30}$$

This is equation (30). This solution, however, is not in terms of measurable quantities such as $T_{n-1}$ and $T_{n-2}$. However, $T_1 = T_{n-1} + 2S$ as was previously developed, which is equal to $T_{n-1} + T_1 (K_p/2)$. Solving for $T_{n-1}$, $$T_{n-1} = T_1 [1 - \frac{K_p}{2}] \tag{31}$$

and $$T_1 = T_{n-1} \times (\frac{2}{2 - K_p}).$$

This is equation (31). For $T_2$, it is also clear from the figure that $T_2 = T_{n-1} - 2S$. Substituting the expression 2S, $$T_2 = T_{n-2} - T_2 (\frac{K_p}{2})$$

solving for $T_2$ $$T_2 = T_{n-2} (\frac{2}{2 + K_p}). \tag{32}$$

This is equation (32). Substituting the two expressions for $T_1$ and $T_2$ into equation (30), the time for the search gate may be expressed.

$$T_{sg} = \frac{T_{n-1}}{2} [3 (\frac{2 + K_p}{2 - K_p}) \frac{T_{n-1}}{T_{n-2}} + K_p] \frac{1}{2 - K_p} \tag{33}$$

This is equation (33) and is the second order solution listed at the top of Table 2 for the aforementioned conditions.

These same conditions can be used to select the first algorithm in Table 1, as previously noted, and have been set forth as Table 4. The algorithms of Tables 1 and 4 are identical, only the selection criteria dffer. The solutions provided by the algorithms of Tables 1 and 4 are slightly different from those of Table 2. Under the highest accelerations, combined with spread, the algorithms of Tables 1 and 4 yield better predictions, but Table 2's algorithms will ordinarily suffice and they have been chosen for implementation in the preferred embodiments herein since the logic and flow charts to be given for the Table 2 algorithms are simpler to construct and since it is only required to substitute the Table 1 and 4 algorithms in place of the Table 2 algorithms in the Table 2 embodiments to achieve operative embodiments using the Table 1 and 4 algorithms.

Examining equations (28) and (33), the first and second order solutions for the conditions $K_p$ positive, $T_1$ even and 0 following the "1" and $T_2$ an odd 0 following a "1", several observations may be made. Firstly, in the event that $T_{n-1}$ contains a 0, which is odd following a "1", and $T_{n-2}$ contains a 0 which is even following a "1", and $K_p$ is positive, all that is required is that the sign of $K_p$ in the equations be changed wherever it appears from $a +$ to $a -$ and vice versa. The reason for this is seen by comparing FIG. 15A with FIG. 15B as follows.

The search gate length required for time interval $T_n$ is greater than or less than the ideal length by an amount corresponding to the spread factor S. The factor which governs the greater than or less than criteria is whether the $T_{n-1}$ symbol contains an even or odd zero, respectively. Given a positive spread factor $K_p$ or vise versa, given a negative spread factor, $K_p$ will therefore have different effects. Another condition exists in the event that $K_p$ is computed to be negative, $T_{n-1}$ is 0 and is an evan numbered 0 following the last "1", and $T_{n-2}$ is odd and is a 0. In this event, the sign of $K_p$ in the equations should also be changed as is shown in Table 2 for these conditions. The reason for this is as given above. Furthermore, equation (24) reflects the condition that $K_p$ is directly proportional to the spread factor S. When the ideal search gate length must be increased by S, the algorithm must reflect a positive $K_p$ term. When the ideal search gate length must be decreased by the spread factor S, the algorithm must reflect negative $K_p$ form. Finally, if $K_p$ is computed to be negative and $T_{n-1}$ is an odd numbered 0 following the last "1" and $T_{n-2}$ is an even numbered 0 following the last "1", the equations may be used without change. The reason for this is that the sign must be changed once for the conditon that the $T_{n-1}$ zero is odd and once again since $K_p$ is negative. The result is no net change.

This completes the derivation for the condition under which $T_{n-1}$ and $T_{n-2}$ both contain a 0. Turning attention to the condition under which $T_{n-1}$ contains a "1" and $T_{n-2}$ contains a 0, the derivation of the equations given in Table 2 will now be pursued.

Turning to FIG. 16, three lines of F2F code are shown, with the top line being normal, unspread F2F code for the sequence 1011. The second line is the pattern which would appear for the top line in the event that $K_p$ is a positive amount. The bottom line is the effect that would appear on the top line of code in the event that $K_p$ is a negative amount. For the condition in which the time period $T_{n-1}$ contains a "1" and $T_{n-2}$ contains a "0", and it is desired to predict a search gate for time $T_n$, (which can contain a "1" or "0") consider the following: The ideal search gate termination time for time $T_n$ in the event that there was no spread, would be $T_{sg} = \frac{3}{4}T_1$, where $T_1$ is the time period of the last symbol just preceding the one in which it is desired to construct a search gate. For the second order solution the ideal search gate ending would be $$T_{sg} = \frac{3}{4} T_1 \left( \frac{T_1}{T_2} \right)$$

as has been previously developed. Given the time period $T_{n-2}$ contains a "0", which is an odd "0" following the last "1", the first order solution is as follows: $T_{sg} = \frac{3}{4}T_1 - S$ and $$S = T_1 \left( \frac{K_p}{4} \right)$$

as has been previously developed. Substituting the expression for S into the expression for $T_{sg}$, it is found $$T_{sg} = \frac{3}{4} T_1 - \frac{K_p}{4} T_1$$

and simplifying terms, $$T_{sg} = \frac{T_1}{4} (3 - K_p).$$

However, since $T_{n-1}$ in the figure is a binary "1", $T_{n-1}$ equals $T_1$ because there is no effect of spread on the total length of a binary "1", as has been previously developed. Therefore, the first order solution equation (34) for these conditions is $$T_{sg} = \frac{T_{n-1}}{4} (3 - K_p). \tag{34}$$

Using the same approach as used previously in deriving the second order solution, it will be found that $$T_{sg} = \frac{T_1}{4} \left[ 3 \left( \frac{T_1}{T_2} \right) - K_p \right].$$

$T_1$, however, equals $T_{n-1}$ as previously discussed, since it is a binary "1". $T_2$, on the other hand, is equal to $T_{n-2} - 2S$ as, is apparent from FIG. 16. Solving for $T_2$ in terms of $T_{n-2}$, it is found that $$T_2 = 2 \left( \frac{T_{n-2}}{2 + K_p} \right).$$

Substituting the expression for $T_1$ and $T_2$ into the expression for $T_{sg}$, it is found that $$T_{sg} = \frac{T_{n-1}}{4} \left[ 3 \frac{T_{n-1}}{T_{n-2}} \left( 1 + \frac{K_p}{2} \right) - K_p \right]. \tag{35}$$

This is equation (35). Equations (34) and (35) appear in Table 2 as the solutions for the first and second order, respectively, for the set of conditions $T_{n-1}$ is a "1", $T_{n-2}$ is a "0" which is an odd "0" following the last "1", and $K_p$ is computed to be positive. Under the conditions in which the contents of $T_{n-1}$ and $T_{n-2}$ are "1" and "0", respectively, but the "0" in $T_{n-2}$ is an even numbered "0" following the last "1" and $K_p$ is computed to be negative, the equations used are the same for the following reasons: The sign of $K_p$ must be changed once for the condition $T_{n-2}$ is an even number "0", and once again for the condition $K_p$ is stated as negative. The net result is no change in algorithm selection.

Under the conditions in which $K_p$ is computed to be negative, and the $T_{n-2}$ symbol contains an odd numbered "0", the sign of $k_p$ in the equations would be changed as was done previously. Under the event in which the computed $K_p$ is positive, and the $T_{n-2}$ time period contains an even numbered "0" following the last "1", the sign would also be changed on $K_p$ for use in the equations. In the event that $K_p$ is computed to be negative, and $T_{n-2}$ contains an even numbered "0", the equations would be used without change as was previously pointed out.

Turning to FIG. 17, the conditions are shown under which $T_{n-1}$ contains a "0" $T_{n-2}$ contains a "1". Note, since it will be assumed that $T_{n-2}$ contains a "1" and $T_{n-1}$ contains a "0", the state of $T_{n-2}$ being odd or even does not apply since it is an odd or even "0" which is affected by the spread, as has been previously discussed, the width of a binary "1" staying constant.

For the first order solution under these conditions, the ideal solution is $T_{sg} = \frac{3}{4}T_1 - S$, where $$S = T_1 \left( \frac{K_p}{4} \right)$$

as has been previously developed; and therefore $$T_{sg} = \frac{T_1}{4} (3 - K_p).$$

However, $T_1 = T_{n-1} = 2S$, as is apparent from FIG. 17 for positive spread which is illustrated in the second line of FIG. 17. Solving for $T_1$, $$T_1 = 2 \left( \frac{T_{n-1}}{2 + K_p} \right).$$

Substituting the expression for $T_1$ into the expression for $T_{sg}$ in place of $T_1$, it is found $$T_{sg} = \frac{T_{n-1}}{2} \left( \frac{3 - K_p}{2 + K_p} \right). \tag{36}$$

This is equation (36) and is the first order solution listed in Table 2 for the conditions $T_{n-1}$ is a "0", $T_{n-2}$ is a "1", and $K_p$ is computed positive. In the event that $K_p$ is computed to be negative, all that occurs is that the equations developed for these conditions have the sign of $K_p$ changed, as is shown in Table 2.

For the second order solution, $$T_{sg} = 3/4 T_1 \left( \frac{T_1}{T_2} \right) - S.$$

$T_2 = T_{n-2}$, however, since it is a binary 1 and $$T_1 = 2 \left( \frac{T_{n-1}}{2 + K_p} \right)$$

as was previously developed, and substituting the expressions for $T_1$ and $T_2$, as well as the expression for S as was previously developed, it results that:

$$T_{sg} = \frac{T_{n-1}}{2 + K_p} [(\frac{3}{2 + K_p}) \frac{T_{n-1}}{T_{n-2}} - \frac{K_p}{2}] \quad (37)$$

This is equation (37). This equation appears under the proper heading in Table 2 for the conditions as noted.

For the sole remaining possibility where both $T_{n-1}$ and $T_{n-2}$ both contain a "1", it is irrelevent to consider the condition of $T_{n-2}$ containing an odd or an even "0" and, assuming $K_p$ to be computed positive, FIG. 18 shows this set of conditions.

From FIG. 18, the second line shows positive $K_p$ spread and the ideal search gate time for the second line would be $T_{sg} = \frac{3}{4}T_1 + S$ where $$S = T_1 (\frac{K_p}{4})$$

as has been previously developed. However, $T_{n-1} = T_1$ and $T_{n-2} = T_2$ because they are both assumed to contain binary 1's which are not affected by spread as has been previously discussed. Therefore, the first order solution is $$T_{sg} = \frac{T_{n-1}}{4} (3 + K_p). \quad (38)$$

This is equation (38).

The second order solution proceeds as has been done with the foregoing examples, and results in:

$$T_{sg} = \frac{T_{n-1}}{4} [3 \frac{T_{n-1}}{T_{n-2}} + K_p] \quad (39)$$

This is equation (39). These expressions are shown in the next to the last line of Table 2. For the condition in which $K_p$ is computed to be negative, all that is required is that the sign of $K_p$ be changed in the equations developed for the condition in which it was assumed $K_p$ was positive. This is shown in the last line of Table 2.

This completes the derivation of all of the algorithms which define first and second order solutions for the search gate termination period. These algorithms are dependent upon the contents and length of the previous two symbols and on whether spread is positive or negative and the zeros following the last "1" are odd or even, and whether the $T_{n-2}$ measurement contained a "0" or "1". The second order solution includes a correction for acceleration effects as well as spread.

A specific embodiment of an electronic logic circuit constructed to receive the transition signals from an appropriate magnetic or optical sensor, or from a data transmission channel, assuming those signals have been properly amplified and freed from noise, will now be given together with a flow chart describing the operation of the logic circuit. As will be apparent to those skilled in the art, the algorithms listed in Table 2 require the use of some mathematical computation for the division and multiplication functions, as well as for the addition and subtraction. It might be presumed that a general purpose computer, appropriately programmed to carry out these functions, would be suitable to perform these operations. However, in the preferred embodiment, this is not the case since the use of an expensive general purpose computer, dedicated to the task of calculating the various products and quotients, sums, etc., for the algorithms, would be too expensive and cumbersome for use in an economical F2F code reader and processor. Therefore, the preferred embodiment relies upon integrated circuits with standard logic components for carrying out these functions. In light of the current technology and low cost of even so complicated a circuit pattern as will be discussed, it is more advantageous to build actual logic circuits to carry out the mathematical operations. However, the methods, involved in solving the algorithms and in applying the results is exactly the same and are fully equivalent, whether the results are computed on a general purpose computer or whether the results occur from the logic manipulations of the logic circuits to be discussed.

As was discussed previously, it is desirable to use a preamble symbol containing a binary 1 bit preceding each F2F coded message so that the initial data as to spread may be calculated before the actual reading of data is commenced. One or two preable bits may be used as will be discussed, and the advantage of using two preamble bits is that acceleration calculations and corrections may be accomplished before actually reading the first bit of data, instead of waiting and using the first bit of data in addition to the preamble bit (as was first discussed herein) for calculating acceleration when only a single preamble bit is used.

Figures 3, 21A:
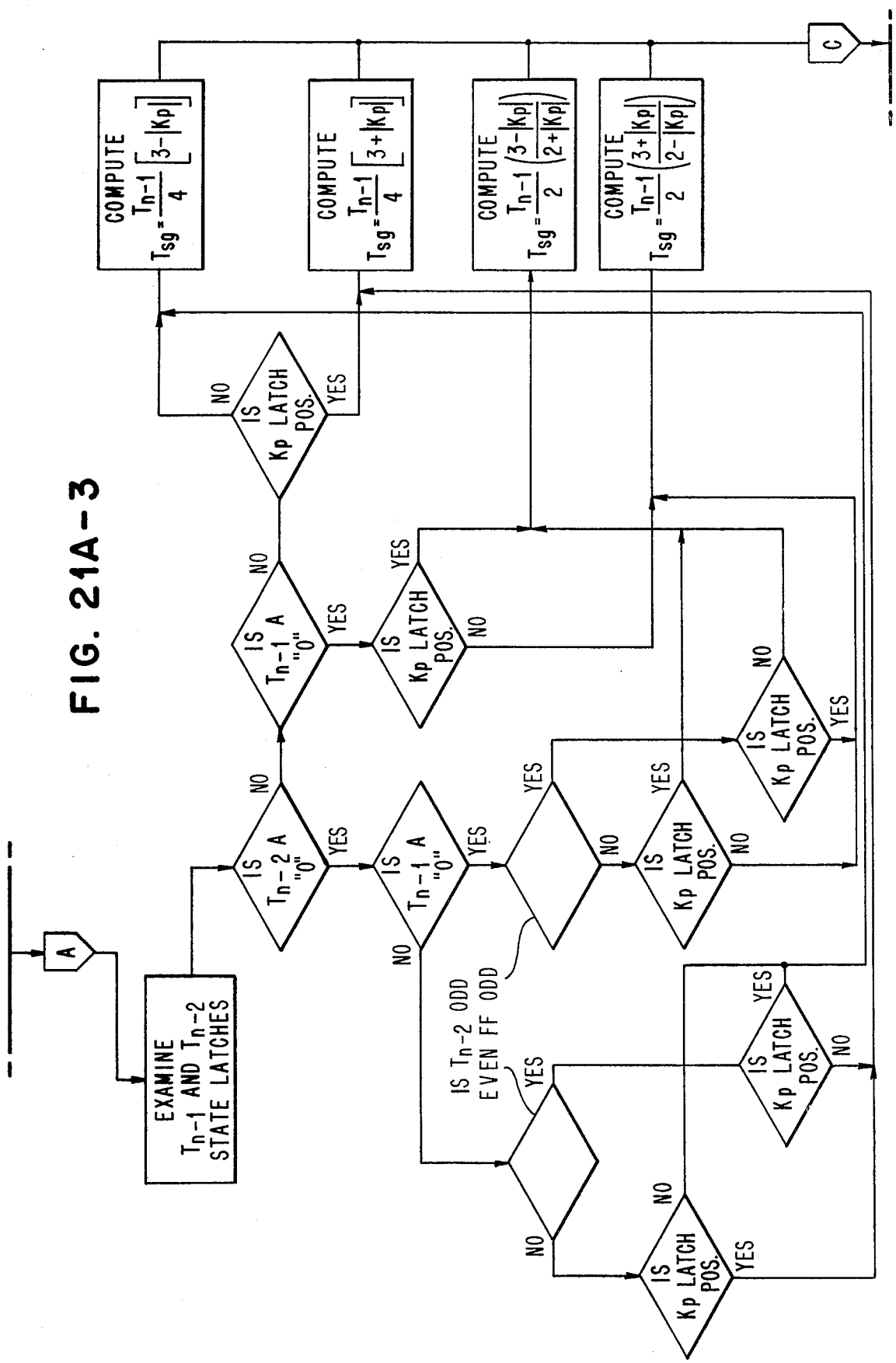
FIG. 21A illustrates a functional flow chart for the logic operations to be carried out pursuant to the timing requirements of FIG. 19 and shows the method of a preferred embodiment.

Turning to FIG. 19, a timing diagram illustrating the sequence of events required to decode an F2F (or double frequency transition code) using a unipolar sense pulse and a single preamble bit preceding each coded message is shown. FIG. 20 is similar to FIG. 19, except that two preamble bits are used to precede the data. FIGS. 21A and 21B are system functional flow charts which apply to the timing diagrams of FIG. 19. FIG. 22 is a logic diagram in schematic form which shows the circuit embodiment for an F2F code scanner and processing system which may be configured for first or second order prediction functions and which is operative with one preamble bit and, if desired, one data bit to define F2F characters in correct form with acceleration and spread corrections.

FIG. 23 is a detailed logic diagram for the algorithm selector control logic block which is indicated in FIG. 22. FIGS. 24A through 24G illustrate the functional logic configurations for all of the decode algorithms required to implement both the first and the second order system configurations illustrated in FIGS. 22 and 23. The logic diagrams in FIGS. 24A through 24F are for the second order algorithm function and those shown in FIG. 24G are for the first order algorithm functions. A discussion of the timing diagrams of FIGS. 19 and 20 will now be given.

Referring to FIG. 19, there are nine horizontal waveforms which illustrate various distinct timing functions, to be described. The top line, line 1, illustrates double frequency or F2F symbols preceded by a single preamble bit consisting of a binary 1. This bit must be provided in order to give a print spread compensation measurement prior to the initial data bit. The form of the binary "1" preamble bit must be the type which begins with a printed black bar (or similar transition producer) in the first time slot. This will be discussed in detail later as a "Phase A" one.

Line 2 illustrates a series of unidirectional pulses obtained from either an optical or a magnetic sensing means (or other source) which would scan the code bearing medium. The peaks of the sensor pulses in line 2 correspond very closely in time to the state transitions of the F2F code in line 1.

Line 3 illustrates the logic level data gate activated to the up level by the sensor pulse which corresponds to the transition terminating the preamble bit in line 1. This gate would be set by the system to stay open for a sufficient amount of time or a sufficient number of pulses to receive a number of coded bits according to a prescribed format.

Line 4 is labeled search gate. The function of this logic signal is to allow the passage of a portion of the sensor output signal, over time, to a data register. In effect, the search gate searches for the presence or absence of a pulse intermediate the single frequency (boundary transition) signals; specifically, the search gate admits the central transition signal in a binary 1. If a sensed pulse occurs coincident with the search gate being on (in the up level) a binary 1 will be transmitted to the data register. If no pulse is coincident with the search gate, a binary "0" is transmitted. The details of the system which will be discussed allow the positioning of this search gate at proper times to account for changes in scan velocity due to acceleratin of the sensor or due to distortion of the F2F code as the result of the recording mechanism, and for print spread.

Line 5 corresponds to the binary content of the data which is loaded into the input stage of a data shift register.

Line 6 illustrates the shift pulses sent to the data shift register. The shift pulses correspond in time to the trailing edges of the search gate times in line 4.

Line 7 is a delay reset gate which is activated by counting the proper number of shift pulses for a given code format which requires a given number of binary bits to construct a complete character. This count should correspond to the number of symbols needed to code a message or character and is used to reset the various registers.

Line 8 is the system reset signal pulse which would be given by the trailing edge of the reset gate in line 7, at the end of a reading cycle.

Line 9 is a fixed delay gate which is incorporated in the system in order to reset it in the event that the bar code is improperly read or is improperly recorded. This delay gate will automatically reset the system in the event N shift pulses are not received within a specific time period as the result of scanning the bar coded message. After reset a new scan attempt can be made.

FIG. 20 is identical to FIG. 19 in all respects except that there are two preamble bits utilized. The use of two preamble bits illustrates an embodiment for which second order (acceleration prediction) corrections can be made for the initial and all succeeding data bits. Since no prediction function is required while sensing preamble bits (it is already known to the system that two preamble bits consisting of binary 1's must be read, which indicates that five pulses must be sensed prior to receiving data) time registers $T_{n-1}$ and $T_{n-2}$ can be filled with measured time interval data. This produces a self-clocking system with accurate spread, velocity and acceleration data prior to reading the coded message. The use of a single preamble bit can be accommodated and used to create a second order prediction; however, the acceleration data must be obtained from time interval measurements derived from the first data bit of a coded message together with the preamble bit, which is a slightly less satisfactory method than the use of two preamble bits.

Turning to FIG. 21A, a system functional flow chart, which is applicable to the timing diagram of FIG. 19, is illustrated. In FIG. 21A, incoming pulse signals from a primary sensor and amplifier, not a part of this invention, are applied to the input of the reading system with the following logic and control functions and sequences.

Starting at the top of FIG. 21A, incoming signals are examined and the question is asked whether the first sensor pulse has yet been received. If no pulse has yet been received by the system, the system waits. If a pulse has been received, a sense pulse counter is incremented by 1 and two time counters are started from 0 to count time periods corresponding to $T_A$ and $T_n$ (as have already been defined). The terminal data register is also reset to 0 at this point. The system awaits the receipt of a second sensor pulse and when the second pulse is received, it stops the $T_A$ counter, sets both $T_{n-1}$ and $T_{n-2}$ latches (indicators) to a binary 1 state (corresponding to the receipt of the binary "1" preamble bit just scanned). Then the system sets a second odd-even indicator to even for a purpose to be described later. The $T_A$ register is transferred to the $2T_A$ register which produces a product $2T_A$ by shifting the data one high order bit, as is well-known for the handling of binary multiplication. The output of the $2T_A$ register is placed in a $K_p$ algorithm register for further computaton, and the sense pulse counter is incremented one more time, corresponding to the receipt of the second pulse.

The system then awaits the receipt of the next sensor pulse, which would correspond to the end of the preamble bit and start of data. When the next pulse is received, the sense pulse counter is incremented by 1, the data gate is brought up to the "on" level, and the fixed delay gate is turned on. The $T_n$ counter is stopped from counting further clock pulses and an elapsed time counter, which accounts for the time involved in computation, is started. The count contains in the $T_n$ register is transferred into the $T_{n-1}$ register, the $T_{n-2}$ register, and into the $K_p$ algorithm register for further computation. This count is also copied into the search gate start register and is shifted three places to the left to load into that register a count equal to $\frac{1}{8}$ of the count $T_n$ (a shift three places to the left is equal to dividing by 8, as is well-known in binary manipulations). This is done to create a short delay in starting the search gate so that the system has time to stabilize following the register loading and count functions. It could, ideally, be omitted, but is shown to allow for this practical problem. The $T_A$ and $T_n$ count registers are reset to 0 and the counters start counting when the next clock pulse is received. Simultaneously, the search gate start register starts counting down to 0.

The system now asks whether $K_p$ is to be recomputed with each occurrence of a binary "1", and if the answer is NO, a second question is asked whether the $T_{n-1}$ indicator is set to a zero state. If the $T_{n-1}$ indicator (a first indicator) is set to the zero state, a first odd-even indicator for the first ($T_{n-1}$) indicator is set to the opposite of whatever state it is then in, but if the $T_{n-1}$ indicator is in the binary "1" state, the first odd-even indicator is set to even. If, however, the $T_{n-1}$ indicator is set to a "1", (as it will be following a binary "1" preamble bit) then first odd-even indicator is forced to the even state. Finally, if $K_p$ is to be recomputed with each occurrence of a binary "1", then nothing else is done to the first odd-even indicator except as determined during the flow of data.

A check is made to determine whether all of the search gate start register bit positions, except for the low order bit, are 0. If the search gate start counter register has not yet reached 0, the system waits. When all but the last bit position, the low order bit position in the search gate start register, have been found to be 0, the search gate driver latch is set to the "on" (binary 1) state, and the system continues to check to see if all of the stages in the search gate start register are 0. When all of the stages in the search gate start register are 0, the search gate start register is stopped from counting down further. The question is then asked by the system as to whether the $T_{n-1}$ latch (first indicator) is currently in the 1 state (as it will be following the reading of a preamble bit). If the answer is no, indicative of the fact that no signals occurred during the previous search gate interval, then the system goes on to examine the state of the $T_{n-1}$ nd $T_{n-2}$ latches (first and second indicators) to determine whether 0's or 1's are stored in them, as will be discussed below.

If the answer to the inquiry as to the $T_{n-1}$ latch being in the "1" state is yes, the system asks if it is required to compute $K_p$ and if it is "yes", the system examines the $K_p$ algorithm register where the question, "is $2T_A$ greater than $T_n$?" is asked. If the answer is yes, the $K_p$ latch is set to a 1, indicating that $K_p$ is positive. If the answer is no, the $K_p$ latch is set to a 0, indicating that $K_p$ has a negative sign. The algorithm is then computed for $$K_p = \frac{2T_A - T_n}{T_n}$$

and the value computed is stored in the $K_p$ algorithm register. If the system is not required to compute $K_p$, no computation is done.

The system next examines the state of the $T_{n-1}$ and $T_{n-2}$ condition indicators, or state latches, to determine which of the various algorithms for computing the search gate time should be selected. The first question asked is $T_{n-2}$ a "0", etc., until the various conditions of $T_{n-1}$ and $T_{n-2}$, as indicated in Table 2, have been determined; the decision logic eventually actuates one of the computation boxes for $T_{sg}$ each of which contains a different algorithm for the first or second order solution indicated in Table 2.

The system then asks the question, has the search gate time been computed?, and waits until the answer is yes. When the search gate time has been computed, the system stops the elapsed time count and transfers that count together with the computed search gate time count to an elapsed time compensator, where the search gate prediction time has subtracted from it the elapsed time count since the last initiating pulse was sensed. If a positive difference exists, then correct data has been sensed and stored; if there is a negative difference, then either no data has been properly sensed, or the computation time has exceeded the predicted search gate and an error has resulted, from which the system generates an error signal, resets all registers and indicators (latched) to 0's and returns to the start. When the data has been properly detected and the time to compute the search gate time has not exceeded the predicted time of the search gate, the system stores the data (which is the positive amount of time left to run before the termination of a search gate) into the search gate countdown register (counter).

The data content of the $T_{n-1}$ register is transferred to the $T_{n-2}$ register and the $T_{n-1}$ register is reset to zero at this time and the state of the $T_{n-1}$ (first) indicator is transferred to the $T_{n-2}$ (second) indicator and the $T_{n-1}$ (first) indicator is reset.

The elapsed time counter is reset to zero, and the system examines the search gate termination register to determine whether all except the lowest order bit have reached 0 and waits until all but the lowest order bit have reached 0.

When all but the lowest order bit in the search gate termination register have reached 0, the system sets the search gate driver latch to 0 and proceeds to do two functions simultaneously: 1) the system activates the shift pulse driver for the data shift register and increments the shift pulse counter by 1. It then checks to see that a shift pulse has occurred and waits until one does occur. When a shift pulse has occurred, the system checks the state of the $T_{n-2}$ latch (second indicator) for a 1 condition. If this latch is not in a 1 condition, the state of the second even-odd flip-flot (second odd-even indicator) is shifted with a shift pulse and the system waits for the next sensor pulse to be received. If the second indicator is in the 1 condition, the second odd-even indicator is set to the even state. When the next sensor pulse has been received, the system checks for whether N shift pulses have been received and if N shift pulses have been received, the system transfers the shift register data to the terminal register for output. If N shift pulses have not been received, the system checks for whether the fixed delay gate has been terminated, and if it has, it shifts the content of the data shift register to the terminal register for output. If it has not been terminated, the system goes to point B in the flow diagram and it resumes data collection.

The second thing that occurs when the search gate driver latch is set to 0, is that the system checks for whether there has been a sense pulse coincident with a search gate. If the answer is no, the system goes ahead and activates the shift pulse driver to the data shift register and proceeds as above. If the answer is yes, the system stops the $T_A$ counter from counting when this pulse occurs, sets the $T_{n-1}$ latch (first indicator) to a binary 1 (indicative that a 1 has been sensed), sets the one side of the data shift register to load a 1 into this register, and then asks the question whether the system is required to update the $K_p$ register after reading a 1. If the answer is no, the question is asked whether the first odd-even indicator is odd, and if it is, then the sign of $K_p$ is changed; but if the first odd-even indicator is even, $K_p$ is left unchanged. If the answer to the recomputation question is yes, the system parallel transfers the contents of the $T_A$ count register to the $2T_A$ register, shifts the data one high order position to multiply it by two, places the multiplied amount in the $K_p$ algorithm register, and then proceeds to activate the shift pulse driver as before, with a new $K_p$ being computed and the system continuing to gather data. If the system is not required to recompute $K_p$ and the first odd-even indicator is even, the system then activates the shift pulse driver to the data shift register.

If the system recomputes $K_p$ with each binary "1" sensed, the proper sign of $K_p$ is automatically produced, but if the system does not recompute $K_p$ with each occurrence of a "1", after the preamble symbol, then a problem may arise due to the fact that "1's" may exhibit positive or negative spread effects because of their phase (type A or B) even though the actual spread is positive. This will be discussed in greater detail later, but the method of the flow diagram just discussed covers all situations correctly.

Turning to FIG. 21B, the flow chart for a system in which the second order algorithms are embodied will be discussed. This flow chart has been truncated at the point just prior to where, in FIG. 21A, the system examines the state of the $T_{n-1}$ and $T_{n-2}$ state latches, and just prior to the point where the system asks the question, has the search gate time been computed; in all other respects, FIG. 21B is identical to FIG. 21A and the top and bottom portions of FIG. 21A show exactly the flow of material to the aforementioned points at which 21B begins. For simplicity, the flow chart leading up to the aforementioned point is truncated at a symbol "A", in a small box and following the aforementioned point has been truncated and omitted at a symbol "C" in a small box. In FIG. 21B, the system examines the state of the $T_{n-1}$ and $T_{n-2}$ state latches (first and second indicators, respectively) and asks the question whether $T_{n-2}$ is a "0", ect. The system then continues to examine the states of the $T_{n-1}$ and $T_{n-2}$ latches until it has determined, along with the sign of the $K_p$ latch + or −, which of the eight algorithms is to be utilized. Having made the determination, the search gate termination time is computed and the output proceeds as with FIG. 21A. The flow diagram of FIG. 21B accomplishes an acceleration correction which utilizes the preamble bit and the first data bit as the first two measurements of time, and all but the first data bit will have an accurate acceleration correction computed for them.

Turning to FIG. 22, a logic diagram for one preferred embodiment of an F2F code interpreting system which is operated according to the directions given in the flow charts of FIGS. 21A and 21B is illustrated. It must be understood that the various output algorithm functions will be different and diagram 22 does not show the specific logic circuits for computing these algorithms. These are shown separately in FIGS. 24A-24G, as will be discussed later.

Turning now to FIG. 22, a discussion of the logic diagram for an embodiment of the present invention will be described. In FIG. 22, the basic system clock, or timing pulse generator 1, is illustrated schematically as having two outputs. These outputs are a CP, or clock pulse output, and an X output which is a delayed CP output. Clock 1 comprises, for example, an oscillator operating at the basic system clocking frequency, for example, one megahertz and although the oscillator should be stable, drift can be accommodated so long as it occurs gradually. The clock would also include suitable waveform shaping circuits to produce a steady train of, for example, narrow impulse type signals at the basic clocking (oscillator) frequency. The details of such an oscillator or multi-vibrator are well-known to those of skill in the art and it will not be further illustrated or explained here. At various points in the logic diagram of FIG. 22, the connections to the basic clock 1 are illustrated without the interconnecting circuit lines which would add undue confusion to the diagram.

Sensor 2, as has been discussed previously, should be understood as either a magnetic read head or an optical pickup system which is scanned across the appropriate type of bar code, or two frequency code, to pick up the transitional signals making up the code. An equivalent system would receive a signal train of pulses from a communications channel. Sensor 2 does not, per se, form a part of this invention, but is a state-of-the-art piece of equipment which would be employed in generating the basic input signals for use in the invention. Sensor 2 is connected to an amplifier and signal shaper 3 which is continuously activated. The output of amplifier 3 is a train of pulses, amplified and cleaned of spurious noise. These primary signals are identified as signals $SP_0$ and each signal pulse $SP_0$ is applied simultaneously to a fixed delay circuit 4 and to an AND gate 5. The output of the delay circuit 4, a signal pulse like $SP_0$ but delayed in time perhaps ½ a microsecond, is identified as $SP_1$. $SP_1$ is also the input to another fixed delay circuit 6A for generating a second delay signal, $SP_2$. The fixed delay of delay circuit 6A would be approximately that of number 4. The delays of delay circuits 4 and 6A must be such that the delayed pulses $SP_1$ and $SP_2$ follow $SP_0$ and occur much before the next succeeding $SP_0$ pulse is picked up. The logic line connections to the timing pulses $SP_0$, SP, and $SP_4$ are like CP, not shown with lines to avoid confusion.

The delayed signal pulses $SP_1$ and $SP_2$ are also used for timing functions as will appear later. These timing functions are shown schematically at various points in FIG. 22 as being connected to the signal $SP_1$ or $SP_2$.

The input of the amplified series of sensed pulses, $SP_0$ is applied, as previously noted, to AND gate 5. The other leg of AND gate 5 is conditioned by the up level 0 output from the last stage of binary coungter 6B. When binary counter 6B is reset, all of the 0 and 1 states are as illustrated. The incoming train of signal pulses $SP_0$ will then be counted in binary counter 6B. When the first signal pulse is counted, an output on line 7 will be produced and applied to AND gates 8, 9, and 87.

AND gate 8 is conditioned by the output of the first signal pulse $SP_0$ as counted in counter 6B, and by a clock pulse CP as shown. Thus, when the first pulse $SP_0$ is sensed and amplified, AND gate 8 will be fully conditioned with an occurring clock signal and will produce two effects. First, AND gate 8 signals the terminal data register to reset and, through OR gate 10, it starts incrementing a binary counter 11 which will be called the $T_A$ register. As will be apparent, with each succeeding clock pulse CP, the $T_A$ register 11 will be incremented by one count.

When the second pulse $SP_0$ has been received, the output in the second stage of binary counter 6B will be in the up level and will produce an output on line 12 which is applied to AND gates 13, 9, and 14 as shown.

AND gate 14 produces an output whenever a clock pulse CP is present and an output on line 12 is present. AND gate 14 applies, through OR gate 15, to gate, through a series of AND gates 16, the output of the various stages of the binary counter 11 which is the current count of time $T_A$ as expressed in clock periods CP at the basic clocking frequency. The N output lines of $T_A$ register 11 are applied in parallel to the input of what is the basic $K_p$ function block 17 where they are entered in parallel into the 2 × $T_A$ register 18 which produces a multiplication effect. As discussed previously, register 18 is a register in which the binary data coming from $T_A$ register 11 is shifted one bit position to the left which, in binary mathematics, effects a multiplication by two, as will be understood to those skilled in the art.

When outputs are present on both lines 7 and 12 at the third sense pulse $SP_0$, from binary counter 6B, and a clock pulse CP occurs, AND gates 87 will be activated to gate the contents of the $T_n$ register 23 through OR gate 101, to the $T_{n-2}$ register 102 in the algorithm computation block 42, and also AND gates 9 will be actuated and will output a signal to OR gate 19 which will reset latch 20. Latch 20 was initially set to the 1 or high position by an output from AND gate 8 coincident with the first clock pulse and the first count of a sensed pulse $SP_0$. Latch 20 has an output in its high level condition to AND gate 21 which is conditioned by clock pulse CP to apply, through OR gate 22, incremental count pulses to the binary counter 23 which is the $T_n$ register. Another input to OR gate 19 is the reset signal which will reset latch 20 to its off or 0 level condition when a reset signal occurs.

AND gate 13 takes the output from the second stage of binary counter 6 and, when the delayed pulse $SP_2$ occurs, the output of AND gate 13 is applied to OR gates 24 and 90 to set the states of the $T_{n-1}$ and $T_{n-2}$ latches, the first and second indicators respectively, to the on or "one" condition. These are latches 26 and 27, respectively.

When binary counter 6B reaches a count of 4, the final state of the last stage of counter 6B will reach the 1, or off condition, and AND gate 5 will no longer transmit pulses $SP_0$ to counter 6B. For the duration of the scan cycle then, counter 6B no longer functions. However, it is necessary to provide some means of continuing to drive the $T_n$ register or binary counter 23, as well as the binary counter 11 which is the $T_A$ register. This will be described later.

The output of AND gate 9, which occurs at the third pulse $SP_0$, is applied to AND gates 29 and 30. AND gates 29 and 30 are connected to the first delayed signal pulse $SP_1$ and, with the next succeeding delayed signal pulse, will produce outputs applied, respectively, to data gate latch 31 and to fixed delay gate generator 32. The input from AND gate 29 to the data gate latch 31, sets it to the on or up level, and applies its output to an AND gate 33 which, when conditioned by the second delayed signal pulse $SP_2$ and by the presence of a signal indicating that no search gate is presently on, provides several functions. It applies an output to a pulse delay unit 34, to an elapsed time latch 35 to set latch 35 to the on or up level, and to the inputs of AND gates 36 at the input to a search gate start register, which is binary counter 37, and to the AND gates 38 which transfer the output of binary counter 23, which is the $T_n$ register, to the input of the $T_{n-1}$ register 39 in parallel and also, in parallel, to the $T_n$ register 40 in the $K_p$ computation function block 17. Also, the $T_n$ count is transferred by a cable 41, to the input in the search gate prediction algorithm computation function block 42, to the two dividing registers 43 and 44. There, by shifting two places to the left and one place to the left, respectively, registers 43 and 44 produce quotients of the content of the $T_n$ register, which is also the content of the $T_{n-1}$ register, as counts divided by 4 and divided by 2 respectively. The quotients are used in the search gate algorithm computations conducted in block 42 as will be described later.

As noted previously, the output from AND gate 33 operates to generate a slightly delayed pulse after a short delay in delay unit 34. This is applied to set the count gate latch 45 to the on or up level. Latch 45 then activates one leg of AND gate 46, which is fully conditioned whenever a clock pulse CP is applied, as shown. The output of AND gate 46 is applied simultaneously to AND gate 47, to OR gate 22, and to AND gate 48. Thus, so long as latch 45 remains in the up or on condition, pulses at the basic clock frequency CP will be applied through OR gate 22 to the binary counter 23 which counts elapsed time during $T_n$.

The output of the fixed delay 34 is also applied to OR gate 49 which produces a reset signal for resetting registers 23, 39, 11 and search gate latch 50, respectively. The counts in registers 23 and 39 and 11 respectively, which may have been accumulated to this time, are therefore destroyed. It is significant to note that this occurs at the third pulse $SP_0$, and at every symbol boundary transition thereafter. The significance of resetting the registers at the third pulse $SP_0$ and at symbol boundaries is that if a binary 1 is used as a preamble bit in the coded data, as indicated previously, three pulses must pass to get through the preamble bit. In other words, the first three pulses produced by sensor 2 and amplified in amplifier 3, will be the pulses corresponding to the preamble bit which is a binary 1. The preamble bit, not being part of the data to be read, is not counted and hence the various registers are all reset as just indicated after the third pulse $SP_0$.

Resetting the search gate latch 50 to the 0 or off condition, conditions AND gate 48 to on so that pulses appearing from AND gate 46, at the basic clock frequency CP, will then be applied, through OR gate 10, to the binary counter 11 to start timing the elapsed time for $T_A$ in the $T_A$ register 11. The $T_n$ register, having been reset, will still continue to count pulses at the basic rate CP, so that the elapsed time accumulated in counter 23 for the period $T_n$ will start with the beginning of data following the third pulse $SP_0$, and after each major symbol transition.

This third pulse, as previously mentioned, actuates AND gate 30 when the delayed pulse $SP_1$ appears. AND gate 30 then applies its output to the fixed delay gate 32. The fixed delay gate 32 produces an up level of suitable duration, such as shown in line 9 of FIG. 19, to encompass the full receipt of an entire multibit coded character. At the end of the passage of sufficient time, as determined by the delay unit 32, an output is applied to the pulse shaper 51. Pulse shaper 51 produces a brief signal which is applied to OR gate 52 which sets latch 53 to the on or up level. The output of latch 53 is applied through AND gate 54, at the next clock pulse CP, to the inputs of transfer signal driver unit 55 and to delay unit 56. The pulse output from the transfer driver 55 conditions one leg of all of the AND gates 57, which parallel transfer the content of the data shift register 58 into the terminal data register 59 whenever data is present in the data shift register 58. The output of the delay unit 56, after a short delay, resets latch 53 to the off or 0 condition and also applies an input to the reset driver 60 which produces the basic reset timing $\text{\textcircled{R}}$ which is used throughout FIG. 22 to show when the reset occurs and where. The reset so produced resets all counters and registers to 0 and restores all latches to the appropriate state as shown.

Beginning with the third pulse $SP_0$, AND gate 13 will be activated when the second delay pulse $SP_2$, derived from the second pulse $SP_0$, occurs. The output of AND gate 13, as previously noted, is applied to OR gates 24 and 90, respectively. OR gates 24 and 90 set their respective latches 26 ad 27 for the $T_{n-1}$ and $T_{n-2}$ condition to the 1 or on state. The output of latch 26, the $T_{n-1}$ latch, in the up condition is applied to AND gate 25 and also provides a signal identified as $T_{n-1} = 1$ to the algorithm selector control logic box 61, which will be described in greater detail separately. The $T_{n-1} = 1$ output condition is also applied to AND gate 62 so that with each succeeding clock pulse CP, the comparator 63 in the $K_p$ function block 17 will compare for the condition whether $2T_A$ is greater than $T_n$. If comparator 63 determines that $2T_A$ is not greater than $T_n$, an output indicative of "no" is produced which is applied to AND gate 64. When this happens coincident with the next clock pulse CP, it will apply a 0 level output through OR gate 104 to latch 65, the $K_p$ polarity latch, which is indicative of $K_p$ in the negative condition, to the algorithm selector logic box 61. It also applies this signal to the $K_p$ register 66 which sets the sign held for $K_p$ in register 66. This is included in the search gate prediction algorithm computation box 42 and will be discussed in greater detail later.

If the comparator 63 should determine that $2T_A$ is greater than $T_n$, the appropriate output on the "yes" line is fed, via AND gate 67, at the next clock pulse to set, through OR gate 103, the high or up level of the $K_p$ polarity latch 65 to produce the signal indicative of $K_p$ is positive. This is applied to the algorithm selector control logic box 61 and to the $K_p$ register 66.

Another output from comparator 63 sends the result of $2T_A - T_n$ to the $K_p$ algorithm unit 68 which is contaned in the $K_p$ function block 17 and will be discussed in greater detail later. In the algorithm unit 68, which computes $K_p$ in absolute terms, an output is produced on N parallel lines for N bits of data. One of these N bits is applied, through an appropriate delay 69, to the algorithm selector control logic box 61 and also all bits are loaded into the $K_p$ register 66 as the current value of $K_p$.

When the third sense pulse $SP_0$ is sensed, AND gate 9 is activated at the succeeding clock pulse and AND gate 29 comes on when the delayed pulse $SP_1$ from this third sense pulse occurs. This sets the data gate latch 31 and raises the data gate signal. Also, in the absence of search gate being on, the second delayed $SP_2$ pulse from the third sense pulse $SP_0$, in combination with the data gate latch 31 being on, turns on AND gate 33 and causes a transmit signal to be given. This loades the search gate start register 37 with ⅛ of the content of the $T_n$ register 23. The ⅛ is arbitrary, it merely being important that at some small, fixed time following the third sense pulse, that the search gate start register be started counting down to begin the search gate timing function. This is accomplished, by shifting left three positions and transferring the content from register 23 through AND gates 36 into register 37 so that register 37 holds ⅛ of whatever was in the binary counter 23.

The signal from AND gate 33 also passes through a fixed delay unit 34, and, after the transfer of data from the $T_n$ register to register 37, it resets, through OR gate 49, the registers 23 and 39 as previously noted. The continuing signal sets latch 45, which conditions AND gate 46, which actuates AND gate 47 and allows, with each succeeding clock pulse CP, the binary counter for the search gate start register 37, to count down. When the next sense pulse is received, counter 37 will already have counted to 0, and the presence of a data gate signal with an ensuing $SP_0$ signal, will turn off latch 45 and stop the counting down if it has already not been stopped at this point. The transmit signal from AND gate 33 also conditions latch 70 which conditions the other leg of AND gate 47 to permit the countdown operation to proceed in register 37.

The output from search gate start register 37 is monitored in AND gate 71 until all but the lowest order bits are 0. At this point, AND gate 71 produces an output which sets the search gate latch 72 to the on position and raises the search gate signal which is applied as shown at various places in the diagram. When the content of the search gate start register 37 is all 0's, AND gate 73 is conditioned to turn off latch 70 at the next succeeding clock pulse, as shown.

As noted previously, when the data gate lach 31 is on, this produces a data gate signal. This signal, together with the next succeeding pulse $SP_0$, is applied to AND gate 74. AND gate 74 resets latch 45 which ends the countdown sequence in binary counter 37, (although counter 37 will already have reached 0 and have stopped due to the action of latch 70 as is previously noted. This is due to the fact that the counting rate CP is many times higher than the rate at which the signal pulses $SP_0$ occur.) Typically, for data recorded at a density of 10 characters to the inch, and assuming a scan velocity of approximately ten inches per second, 300 microseconds will pass between succeeding sense pulses $SP_0$. When this is contrasted with the basic clock frequencies CP of approximately one megahertz, it may be seen that at least 300 clock pulses CP will occur between succeeding sense pulses $SP_0$.

Another function of the signal coming from the data gate latch through AND gate 33, as previously noted, was to set the elapsed time latch 35 to the on condition. Setting the elapsed time latch 35 to the on condition, together with the occurrence of the next clock pulse CP, activates AND gate 75. AND gate 75 produces a signal which starts the elapsed time binary counter 76 counting at the basic clock frequency CP.

When AND gate 71, connected to the search gate start register 37, senses that all but the lowest order bits in counter 37 have reached 0, a signal is applied to the search gate latch 72 which turns it on, generating the search gate output and, at the next occurrence of the signal pulse $SP_0$, actuating AND gate 77.

The output of AND gate 77 provides several functions. First, the output is used to set search gate latch 50 to the "one" condition which deconditions AND gate 48. Secondly, the signal from AND gate 77, delayed typically by ½ a microsecond in delay unit 78, is applied to OR gate 15 to energize AND gates 16 and provide the output from the $T_A$ register 11 to the $2T_A$ register 18 in the $K_p$ function block 17. Thirdly, the output of AND gate 77 is applied to data shift register 58 to store a 1 in the event that a signal $SP_0$ occurs during the period in which the search gate latch 72 is in the on condition. Fourthly, the output of AND gate 77 is applied to OR gate 24 to set the $T_{n-1}$ latch 26 to the on condition, which initiates the train of activity previously described for this latch.

The output from AND gate 33 also transmits the contents of the $T_n$ binary counter, when the third signal, and all subsequent symbol boundary transitions, pulse has been received, in parallel to the $T_n$ register 40 in the $K_p$ function block 17 and to the $T_{n-1}/4$ and $T_{n-1}/2$ registers, 43 and 44, respectively, in the search gate prediction algorithm block 42. What transpires next is that the $K_p$ function block 17 performs the comparison for $2T_A$ greater than $T_n$ and provides an output giving the polarity and the absolute magnitude of the spread coefficient $K_p$ which has been determined from the preamble bit (which comprises the first three signal pulses $SP_0$ which have been sensed.) The search gate prediction algorithm computation in block 42 will be carried out, as will be discussed in detail later, in accordance with a particular algorithm selected by the algorithm selector control logic box 61.

The result of the computation in block 42 is loaded into the $T_{sg}$ register 49 from which the output, in parallel, is applied as the "uncorrected" search gate termination pulse count to register 80. The contents of register 76 and 80 are then subtracted, when the delayed clock pulse X occurs, and the subtractor unit 81 provides its output on N parallel lines through AND gate 82.

The result of the subtraction in subtractor 81 is to take the difference between the total elapsed time, expressed as a pulse count of clock pulses CP, and the predicted time of search gate termination, expressed as a total of clock pulses CP at which the search gate should be ended, according to the algorithm selected. This subtraction accounts for the time which has been used up in doing the calculation and control functions.

The remaining time to elaspse before the end of the search gate, is applied to the search gate termination register 83.

At the next clock pulse CP, several things happen. First, AND gates 84 are conditioned to transfer the content of the $T_{n-1}$ register 39 to the $T_{n-2}$ register 85 in parallel. This same clock pulse, delayed sightly by delay unit 86, is utilized to reset the $T_n$ register 23 and the $T_{n-1}$ register 39 through OR gate 49. It also resets the $T_A$ register 11 and sets the search gate latch 50 to the 0 position, at which time AND gate 48 is energized to permit the start of counting pulses for the $T_A$ register through OR gate 10 again. The delayed clock pulse from delay unit 86 also is applied to the $T_{n-1}$ latch 26 to set it to the 0 or off position and it is also applied to the countdown gate latch 88, setting this latch to the on condition. The undelayed clock pulse is passed directly and resets the elapsed time latch 35 and conditions the AND gates 25 and 89 to transfer the contents of the $T_{n-1}$ latch 26 to the $T_{n-2}$ latch 27 through OR gate 90, which shift occurs prior to the receipt of the delayed clock pulse coming from delay unit 86.

With the countdown gate latch 88 set to the on condition, AND gate 91 is energized with each succeeding clock pulse CP and drives the search gate termination register, which is a binary counter 83, to count down. AND gate 92 monitors the condition of the search gate termination register 83 and, when all but the lowest order bits are 0, AND gate 92 is activated at the next succeeding clock pulse to reset the seach gate latch 72 to the off or non-search gate signal condition. This also produces the signal Ⓒ which is utilized to drive the shift pulse driver 93 which shifts the data shift register 58 by one position and increments the shift pulse counter 94 by one count. When the appropriate number of shift pulses have occurred, indicative that the number of symbols have been read, or a number of search gates have been constructed sufficient to have read a given character in a typical $2^n$ code format, AND gate 95 will be energized at the next succeeding clock pulse and, through OR gate 52 and latch 53, will cause the reset function Ⓡ to be generated.

The content of the search gate termination register 83 is also monitored by AND gate 96, and when all of the positions in register 83 are 0, AND gate 96 is actuated at the next clock pulse to reset the countdown gate latch 88 to the 0 or off position to halt the counting down of the search gate termination register counter 83.

The clock pulse CP which gates the output from the subtractor unit 81, is also applied to a delay unit 97 whose output, delayed slightly, is used as a reset pulse to reset the elapsed time counter 76 and the search gate register 79. It is also used to reset the algorithm selector control box 61 in preparation for the next symbol occurrence.

The state of the $T_{n-2}$ latch 27 is continuously monitored through AND gates 98 and 99 and OR gate 90A which, whenever a shift pulse occurs from the shift pulse driver 93, are activated to set the odd or even flip flop 100 to the appropriate state, dependent upon the condition of the $T_{n-2}$ latch 27. These conditions are utilized in the algorithm selector control logic box 61 as will be discussed in greater detail later.

With reference to FIGS. 22 and 19 jointly, it may be observed that the embodiment of FIG. 22 is constructed to operate with a single preamble bit containing a binary 1 ahead of the rest of the data. The function of the embodiment in FIG. 22 is to measure the time $T_A$ as a number of clock pulses CP. This is the count stored in register 11, the $T_A$ register, which is transferred to the $K_p$ function block at the occurrence of the second pulse $SP_0$. In tracing back the operation in FIG. 22, it may be seen that AND gate 14 will be activated at the second pulse $SP_0$ and the following clock pulse CP and will cause the gating of the $T_A$ register 11 through AND gates 16. It will also be noted that the time $T_p$, which in this case corresponds to the count in the $T_n$ register 23, is maintained until the third pulse $SP_0$.

In tracing the logic diagram of FIG. 22, it may be seen that at the third pulse $SP_0$ the count in the $T_n$ register 23 is gated via AND gates 38 to the $T_n$ register 40 in the $K_p$ function block 17.

At this time, the data gate signal is also raised at the output of the data gate latch 31. Also ⅛ of the content of the $T_n$ register 23 is loaded into the search gate start register 37, which is then counted down to start the search gate at a time ⅛($T_n$) after the third pulse $SP_0$. During the meantime, following the third pulse $SP_0$, the $K_p$ function block 17 is calculating the absolute value and the sign of $K_p$; the algorithm selector control logic box 61 is selecting which of the various algorithms in the search gate prediction algorithm computation block 42 are to be chosen; the computations are being carried out and loaded into the search gate register 79; a correction is made for the elapsed time used during the computation; the resulting count which predicts the remainder of the seach gate period which is left to run is loaded into the search gate termination register 83 and is counted down until the end of the search gate time; at this time the search gate latch 72 is reset ending the search gate. In the event that a pulse $SP_0$ occurs during the time that the search gate is in the up or on state, a digital 1 will have been read. By comparing the remaining functions in FIG. 19 with the logic diagram in FIG. 22 it may be seen that all of the timing functions called for are built in the embodiment shown.

FIG. 22 also shows two modifications of the embodiment which allow choices to be made in constructing it. First, it will be apparent that it is not necessary to recompute the spread coefficient every time that a "1" occurs in the data stream of a given charcter because spread tends to be approximately constant for short distances such as are involved in the coding of a single multi-bit character and hence the $K_p$ computation made using the preamble symbol may suffice for the measurements to be made on the data bits inthe character. If $K_p$ is not recomputed with each occurrence of a "1", however, certain modifications must be made because of the way in which spread affects the width of zeros.

Specifically, when a "1" occurs following an odd-numbered "0" (since the last "1"), that "1" will be written as a phase "B" "1" and the spread coefficient, if it were measured on such a "1", would turn out to be of the opposite sign to that originally measured on the preamble bit for reasons which will be detailed herein at a later time. Consequently, under these conditions, a provision is made for changing the sign of $K_p$ appropriately. These modifications are shown in FIG. 22, as follows.

An odd-even indicator 105 is added which is driven by AND gates 106 and 107 to monitor the state of the first indicator, the $T_{n-1}$ latch 26 so that, if a "1" occurs in the first indicator, the odd-even indicator 105 is forced to the even state since any "0" occurring next will be an "odd" zero because it will be the first "0". This first odd-even indicator is controlled, as stated, by AND gates 106 and 107. AND gate 106 changes the state of the first odd-even indicator 105 to the opposite of whatever state it is in whenever a "0" occurs. AND gate 106 is conditioned by the "0" output of latch 26, by the reset signal for the $T_n$ register 23 at each symbol boundary, and by a switch function ⓡ which comes from switch 108 which is a manual selector for determining whether or not $K_p$ is to be recomputed with every "1", or whether it is to be computed only for preamble bits. AND gate 107 forces the first odd-even indicator 105 to the even state with every occurrence of a "1" in latch 26 as shown.

The odd output of the first odd-even indicator 105 is applied to a terminal ⓟ for use at the inputs to AND gates 109 and 110. These AND gates are controlled by the odd indications and by the $K_p$ selection switch 108 and the delayed sense pulses $SP_1$ and $SP_2$, respectively, and both gates require an input from the search gate latch 72 and from "1" output of the third stage of counter 6B which occurs after the preamble symbol has been sensed. When AND gate 109 is conditioned its output is applied to AND gates 111 and 112 to transfer the content of latch 65 to latch 113 as shown. AND gate 110 applies its output to AND gates 114 and 115 to interchange the outputs of latch 113 and reload latch 65 through OR gates 103 and 104 to change the sign of $K_p$ under these conditions.

Additionally, as will be apparent to those of skill in this field, it is possible to select the proper search gate termination algorithm based on the state of the $T_{n-1}$ latch 26 and odd-even indicator 105 instead of using the state of the $T_{n-2}$ latch since and the second odd-even indicator 100. This is true since the state of the $T_{n-1}$ latch at a given symbol will be the state of the $T_{n-2}$ latch for the next symbol. The changes in FIG. 22 to accomplish the use of the $T_{n-1}$ latch and odd-even indicator instead of latch 27 and odd-even indicator 100 are shown in dashed lines with the elements on the dashed box at the inputs to the algorithm selector 61 being omitted. The algorithms are the same as shown in Table 2, but the selection criteria (and the algorithm selected thereby) are as shown in Table 3 where proper account is kept of the new selection factors used.

The appropriate changes to the flow diagrams, FIGS. 21A and 21B, to reflect the foregoing modifications have been shown in these figures in dashed boxes as noted on the drawing. An additional change to the figures is the addition of a "shorting switch" to eliminate the second odd-even indicator when the first odd-even indicator alone is used.

With reference to FIG. 20, the timing diagram is given for a condition in which two individual preamble bits precede a data message. The embodiment in FIG. 22 is built to utilize only one such preamble bit, but a second embodiment will be described shortly in which both preamble bits are utilized. FIG. 22 embodies the basic logic, however, for constructing the second order solution system which would operate by using the first preamble bit and succeeding data bits from the timing diagram of FIG. 19, as has been previously explained.

FIG. 23 illustrates an algorithm selector control logic box 61 which selects one of eight algorithms listed in the second order solution Table 2 according to the input conditions which exist at the time a selection is to be made. It should be easily understood that, if only a first order solution is desired, the selection criteria utilizing $T_{n-2}$ and the odd and even considerations are not utilized in selecting the proper algorithm. Instead, the selection outputs from the selector block 61 would be wired to individual first order solution circuits embodied in block 42 and shown separately in FIG. 24G.

Turning now to FIG. 23, the details of the algorithm selector control logic box 61 will be given. With reference to FIG. 23, it will be observed that the inputs from $T_{n-2}$ latch 27 are applied to AND gates 116 and 117 respectively, the outputs of which are applied to latch 118 to indicate either a "yes" (equivalent to 0) or a "no" (equivalent to 1) condition. AND gates 116, 117, 119 and 120 are controlled by the coincidence with an algorithm box clock output (which is generated when the $K_p$ algorithm box 17 completes its calculation. And gates 119 and 120 are connected, respectively to the outputs of the $T_{n-1}$ latch 26 and are used to set a latch 121 to the on or off conditions, depending upon whether $T_{n-1}$ is a 0. The output of latches 118 and 121 are AND'ed together in a series of AND gates 122 with four other selection factors, $K_p$ negative and $K_p$ positive and odd-even flip flop 100, odd or even, as shown in FIG. 23. The outputs from some adjacent pairs of AND gates 122 are OR'ed together by OR gates 123 and are used to set a series of latches 124, the output of each of which is connected to an individual algorithm computation network shown in one of the FIGS. 24A, 24D.

FIG. 23E shows a network embodied in the $K_p$ function block 17 as the algorithm unit 68. This network computes the absolute value of $K_p$. The algorithm unit 68 is shown schematically as consisting of two inputs connected to the numerical counts of $2I_A$ and $T_p$, respectively. These inputs are fed to a subtraction unit, the output of which is divided by the quantity $T_p$ in the dividing unit. The output of the dividing unit gives the value of $(2T_A - T_p)$ divided by $T_p$, as a number. These outputs are fed to an Exclusive OR, the output of which is the magnitude of $K_p$. The subtractor, the divider, and the Exclusive OR circuits are not shown in detail in FIG. 24E. This is done because it is within the skill of the art to construct suitable adders, subtractors, multipliers, and dividers as well as Exclusive OR and other functional logic circuits to handle these mathematical calculations for any of the algorithms of Tables 1 through 5 herein. For example, a standard treating on the subject matter is "Arithmetic Operations in Digital Computers," by Richards; Van Nostrand, 1955. Other useful articles showing hardware for these operational circuits are "A Signed Binary Multiplication Technique," by Andrew D. Booth, appearing in the Quarterly Journal of Mechanics and Applied Mathematics, Vol. IV, Pt. 2, 1951, pages 236–240; "Fast Economical Binary Divider," by A. B. Gardiner, in Electronics Letters, 18 Nov. 1971, Vol. 7, No. 23, pages 691–692; and "Asynchronous Binary Restoring Divider Array," by A. B. Gardiner, in Electronics Letters, 9 Sept, 1971, Vol. 7, No. 18, pages 542–544. It will be understood by those of skilled in the art that the individual circuits, their appropriate signal voltage levels, and other operating conditions, are a matter of design choice depending on the type of technology used and are well within the capabilities of the logic designer to select.

Figure 24A:
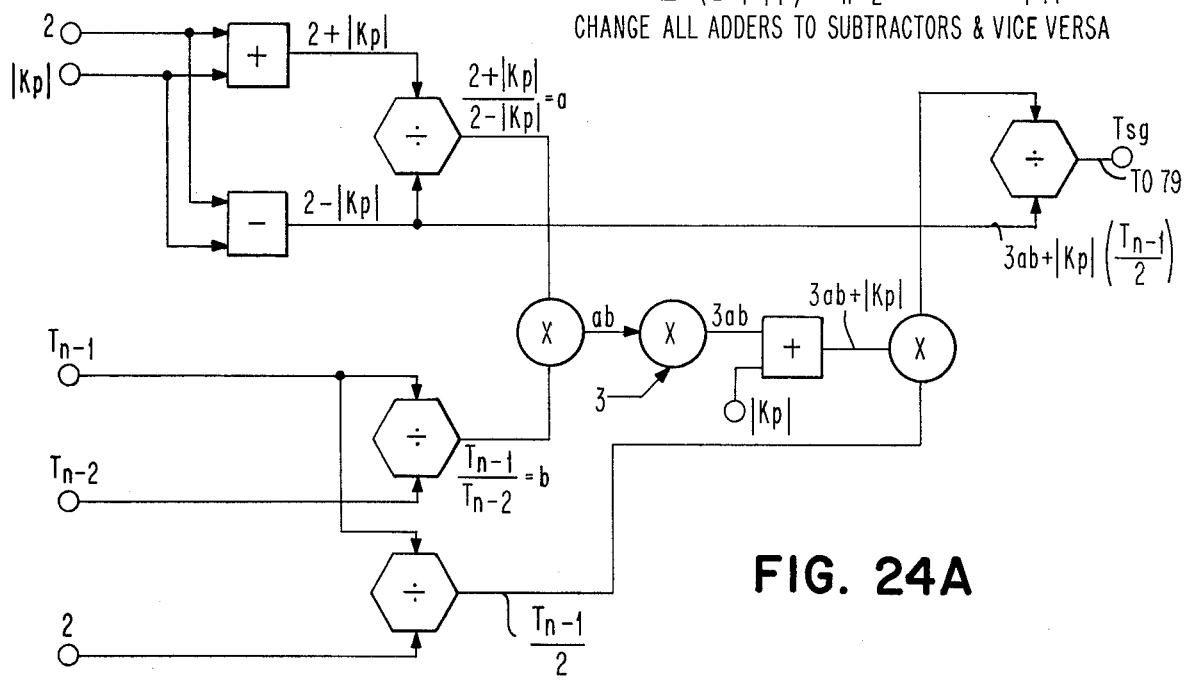
FIGS. 24A through 24G illustrate logic circuits for all of the decode algorithms for first and second order solutions of a preferred embodiment and are used in conjunction with FIGS. 22 and 23.

With reference to FIG. 24A, an individual search gate prediction algorithm computation circuit, schematically adapted to compute the first-listed second order solution in Table 2, is shown. As is noted in FIG. 24A, the same circuit may be utilized to calculate the second listed second order solution of Table 2, since all that is required is to change the sign of the various adders to subtractors and vice versa. FIG. 24A is self-explanatory. The numerical values 2 and the absolute value of $K_p$ are added together to form the $2 + K_p$ and are subtracted to form the result $2 - K_p$. These two results are divided in the divider unit to form a quotient A, which is multiplied by the quotient B. Quotient B is the result of dividing the $T_{n-1}$ input by the $T_{n-2}$ input. The result of the product AB is then multiplied in a multiplier which has a constant multiplication factor 3 entered into it. The resulting product 3AB is added to $K_p$ is an adder and is then multiplied by the quotient $T_{n-1}/2$ which is computed separately. The resulting product is then divided by $2 - K_p$ in the divider to yield the calculated count for the search gate $T_{sg}$ which would be entered into the register 79.

Figure 24B:
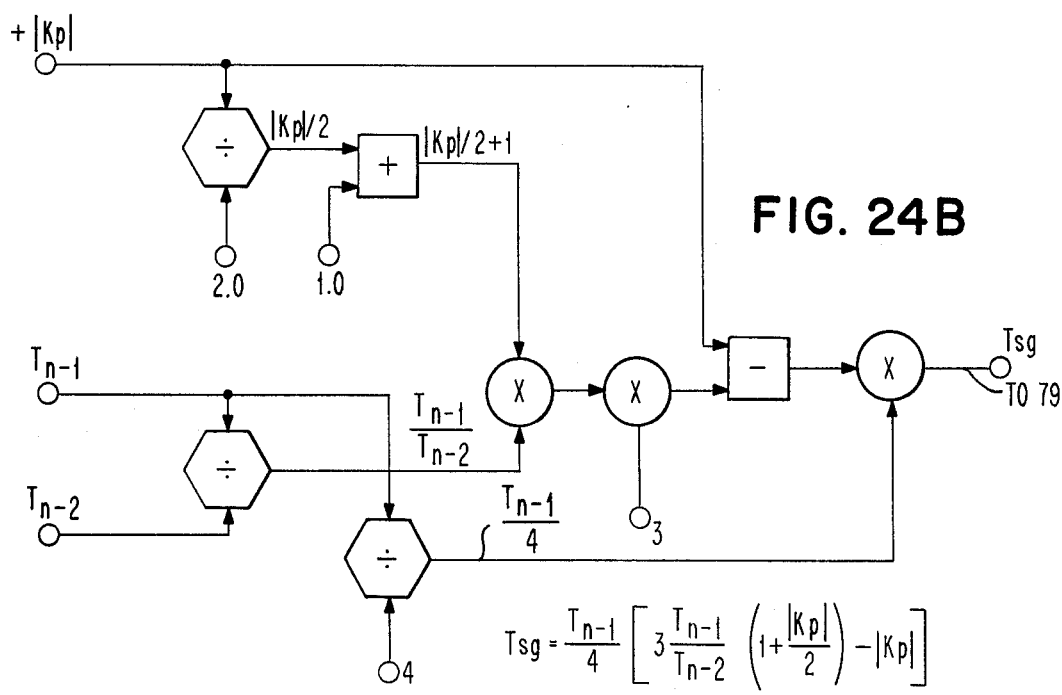
Figure 24C:
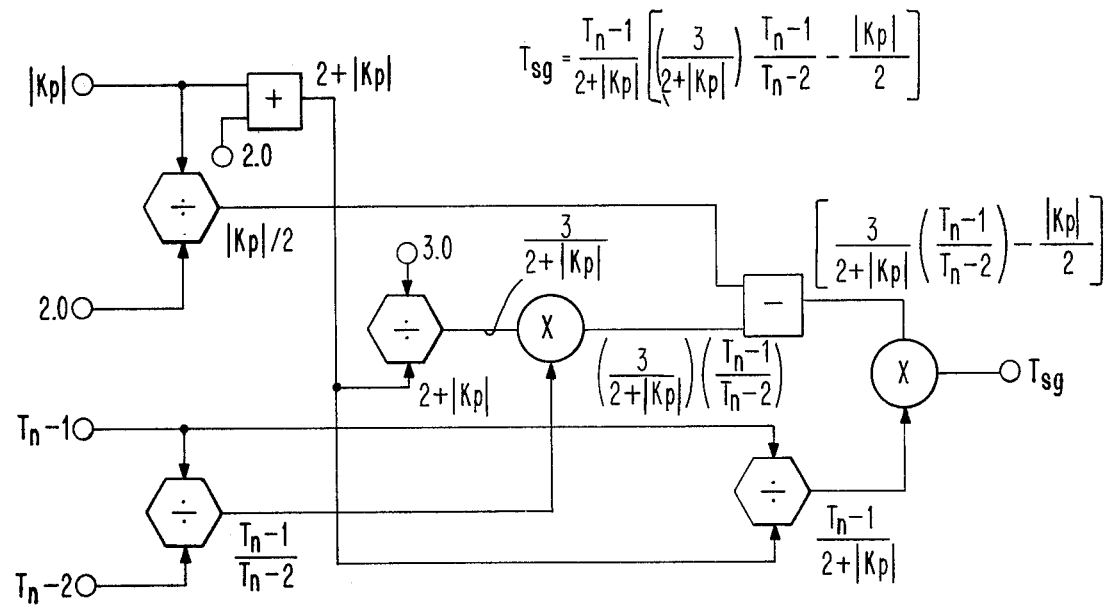

In FIG. 24B, a specific network for calculating the third listed algorithm of Table 2 and the fourth listed algorithm of Table 2 is shown. The fourth listed algorithm circuit may be obtained from FIG. 24B merely by changing the adders to subtractors and the subtractors to adders as they are shown in FIG. 24B. FIG. 24F illustrates this concept and shows the same type of network as FIG. 24B, but with adders changes subtractors and vice versa to calculate the fourth listed search gate time of Table 2.

Figure 24D:
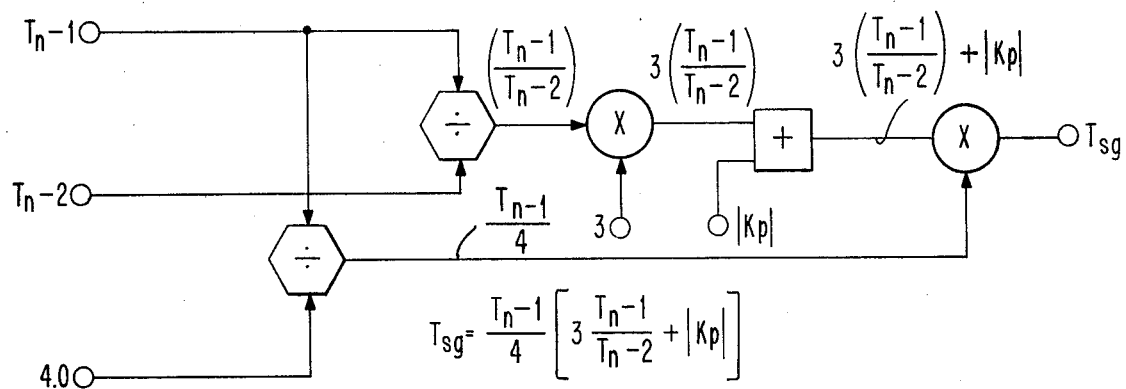
Figure 24E:
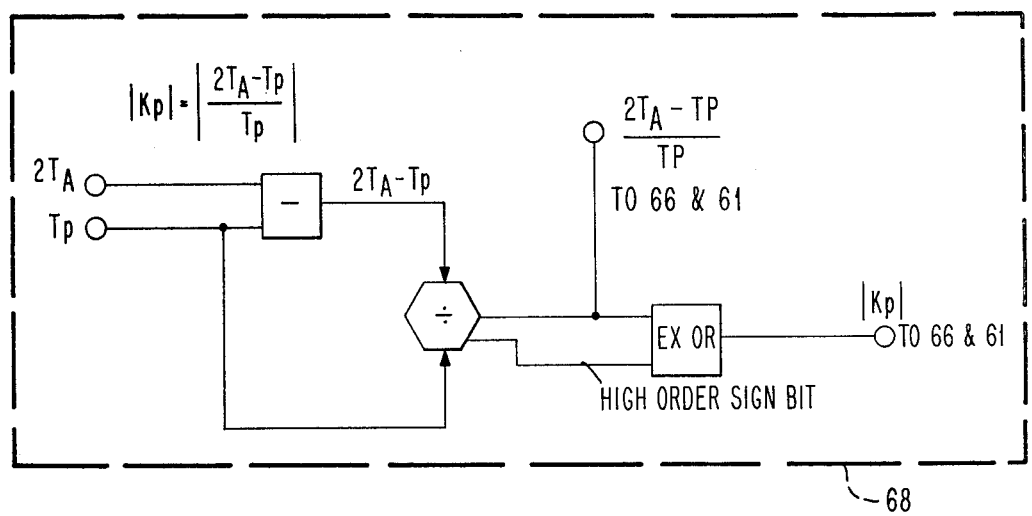
Figure 24F:
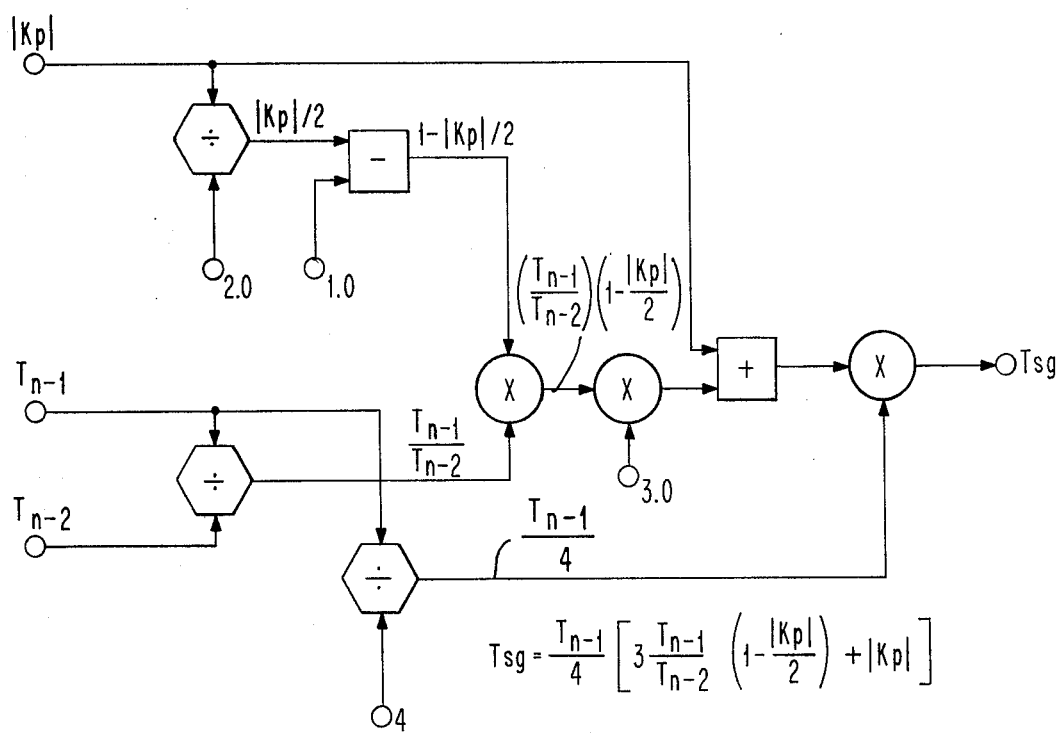
Figures 1, 24G:
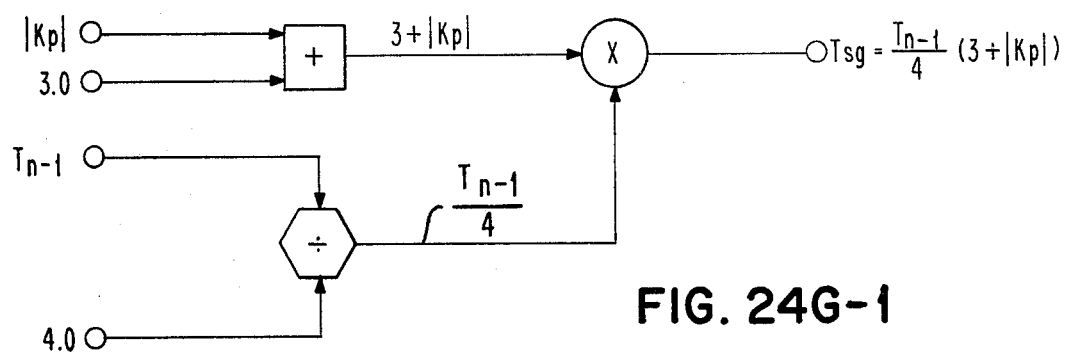
Figures 2, 24G:
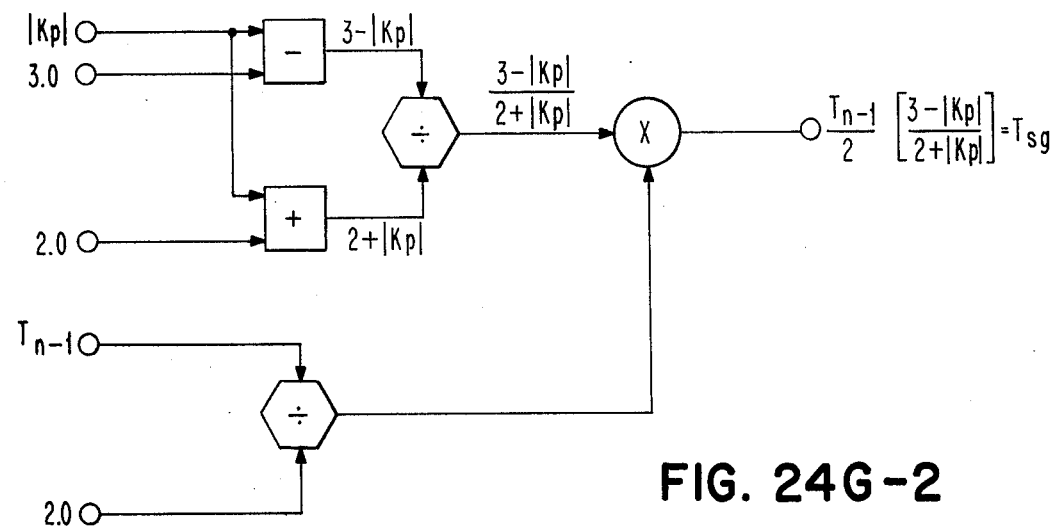
Figure 25A:
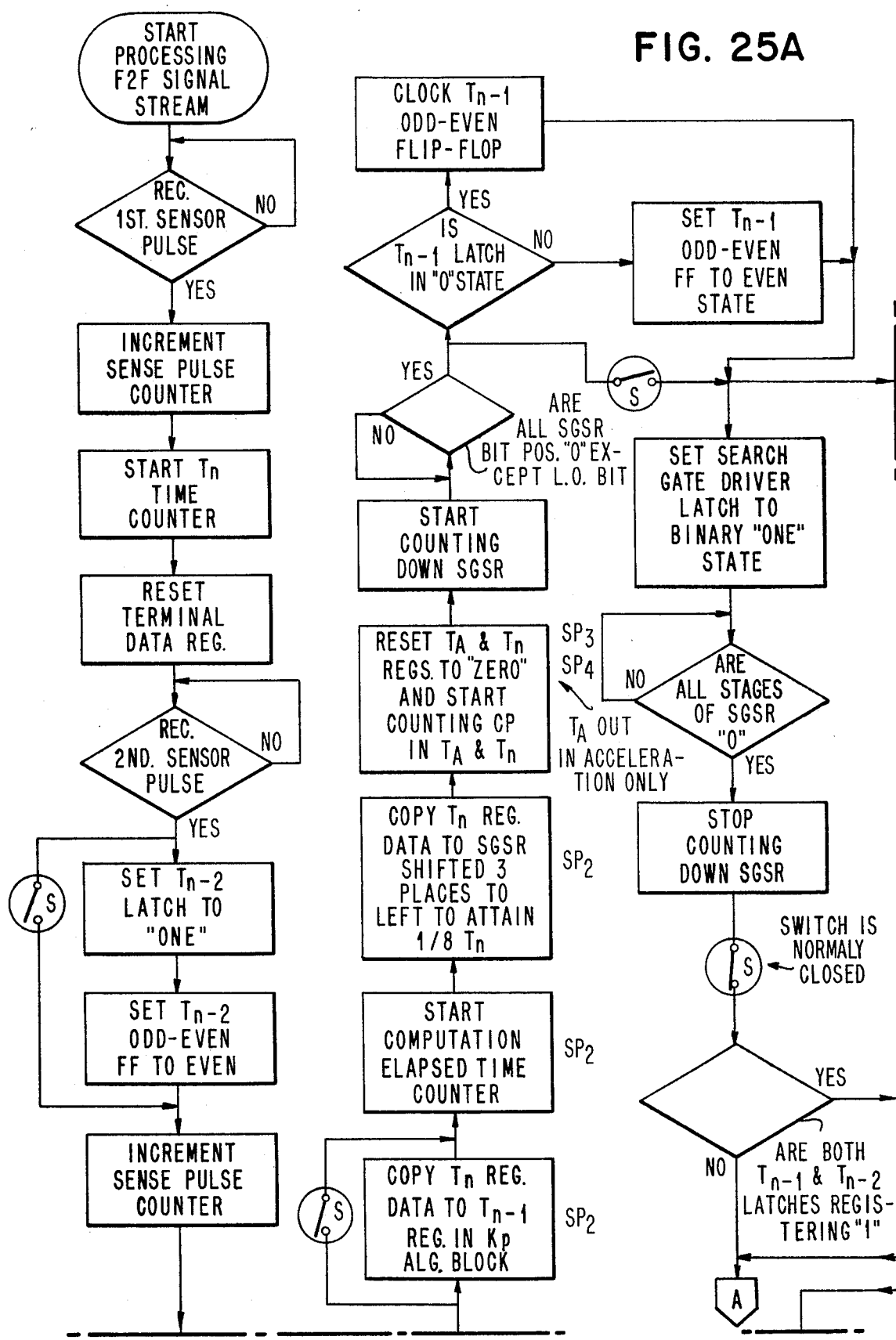
FIG. 25 illustrates a functional flow chart for the logic operations to be carried out pursuant to the timing chart of FIG. 20 and shows the method of a preferred embodiment.
Figure 25B:
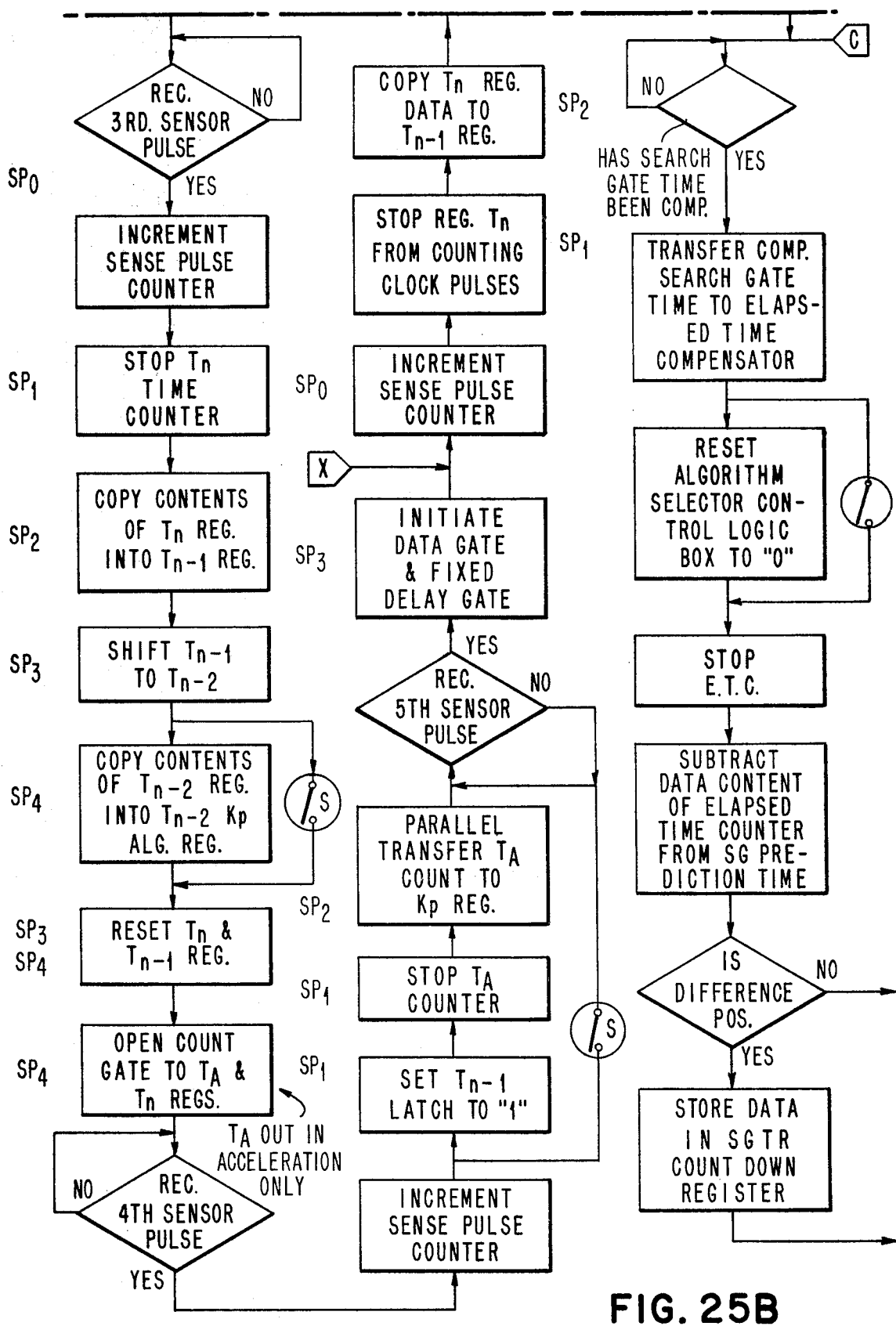
Figure 25D:
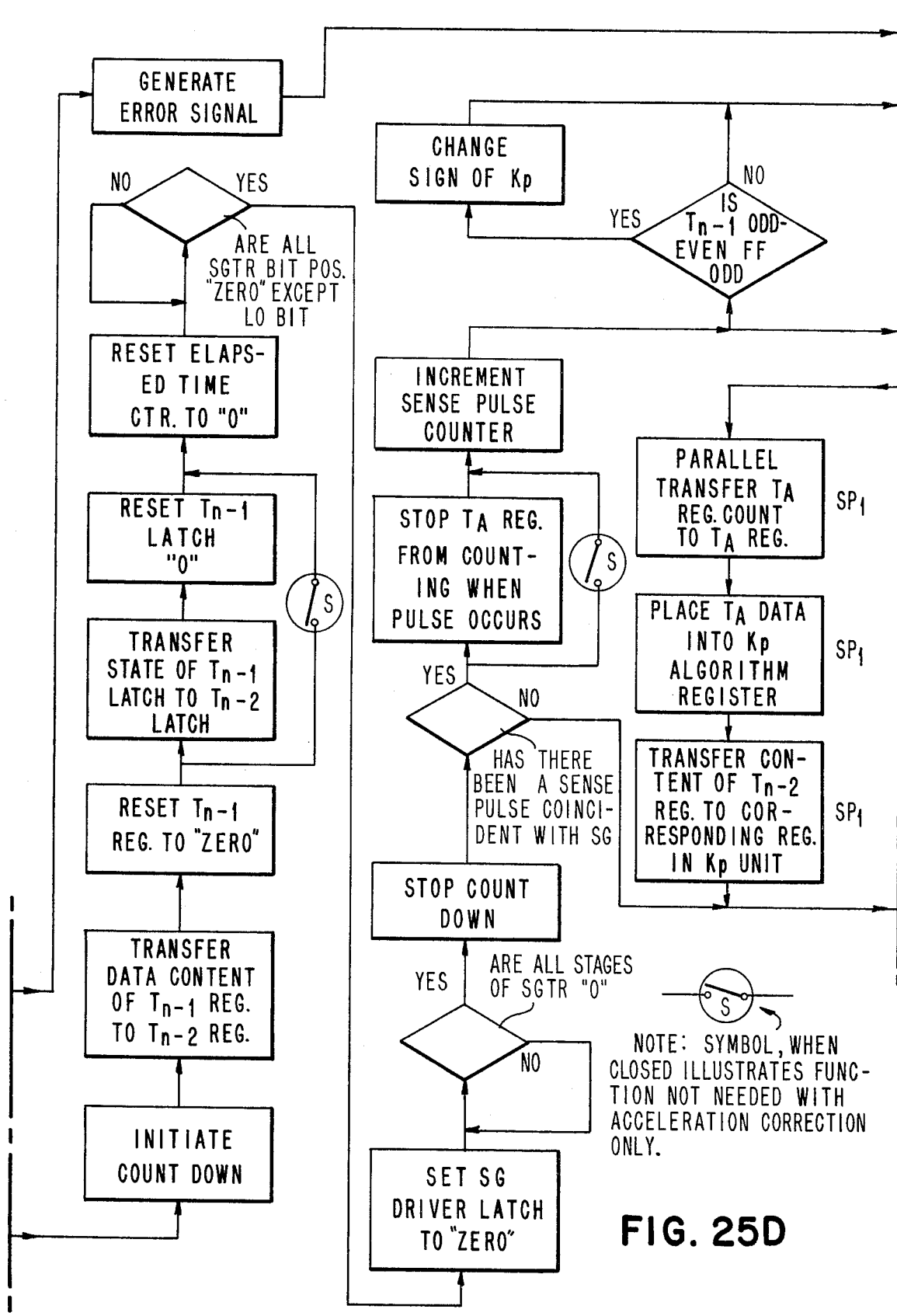
Figure 25E:
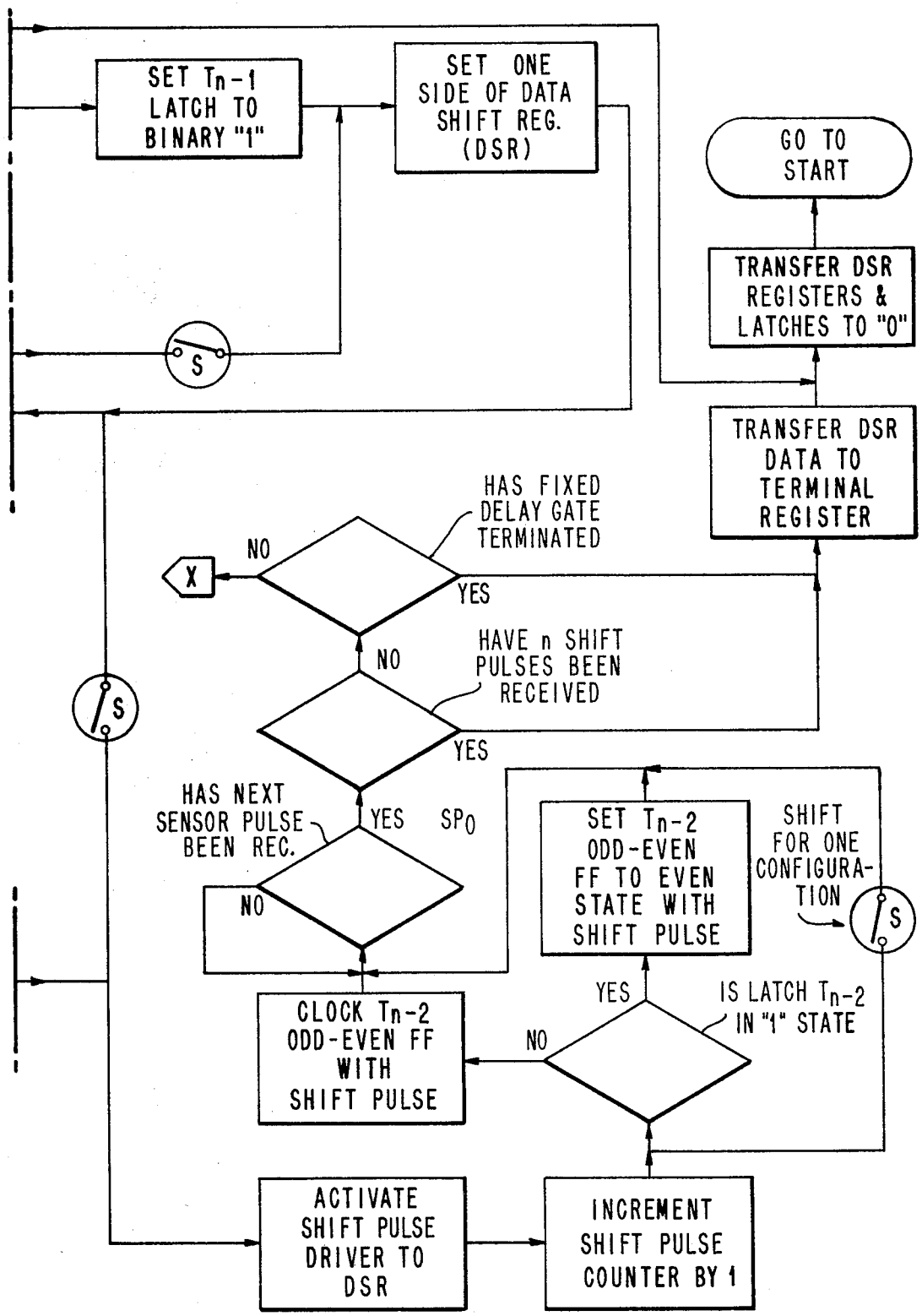
Figure 26B:
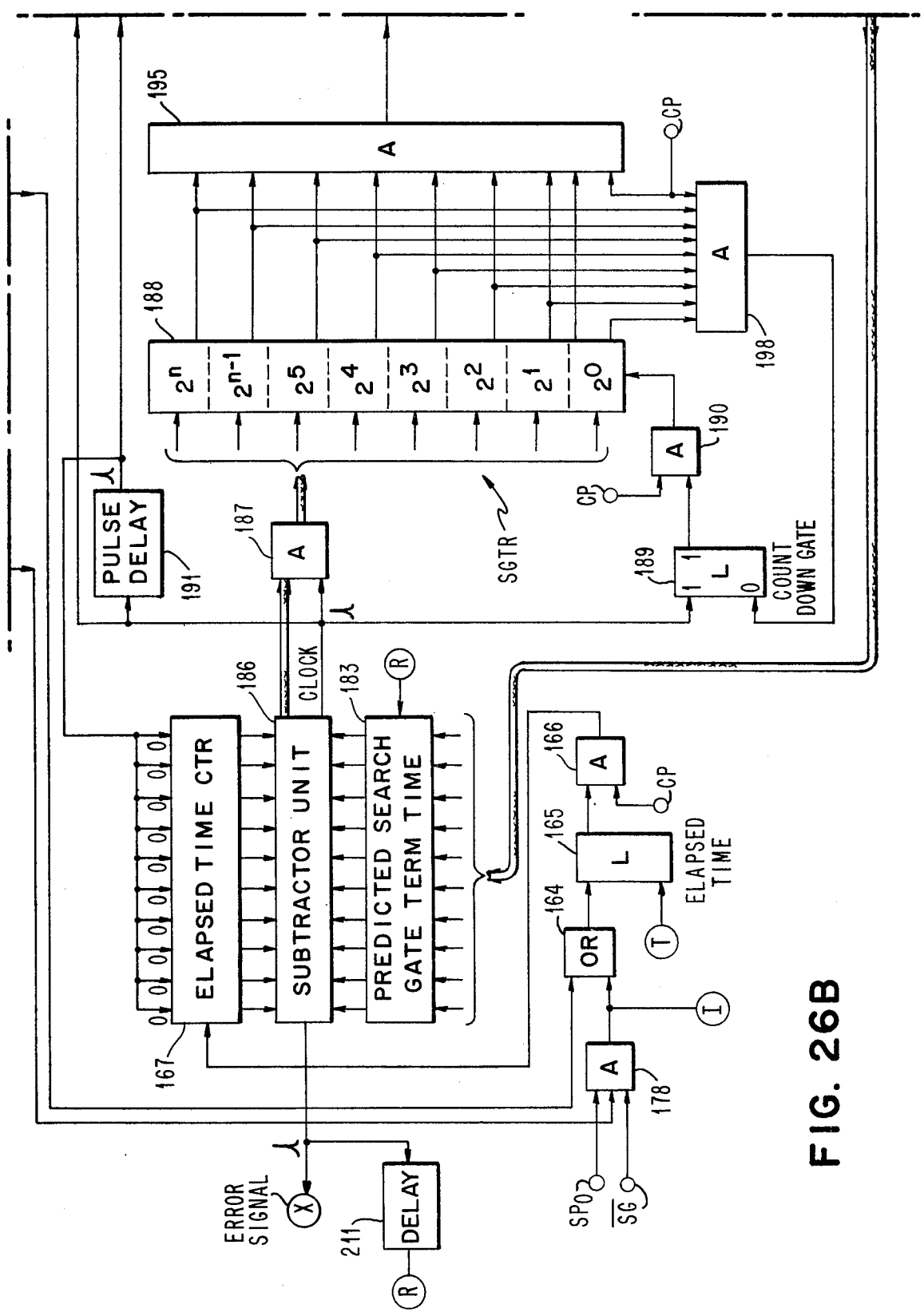
FIG. 26 illustrates a logic diagram for a preferred circuit embodiment of the invention.
Figure 26C:
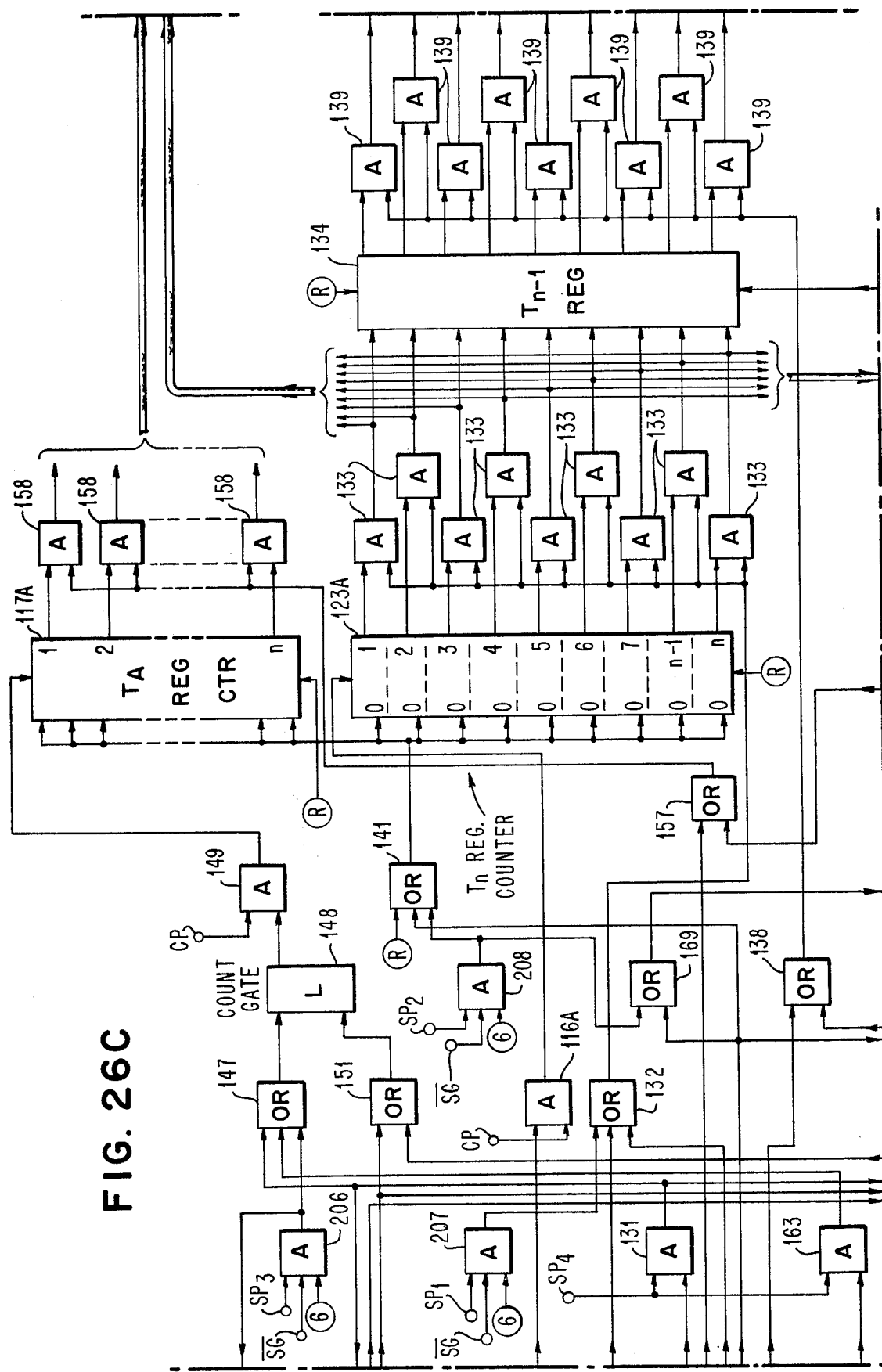
Figure 26E:
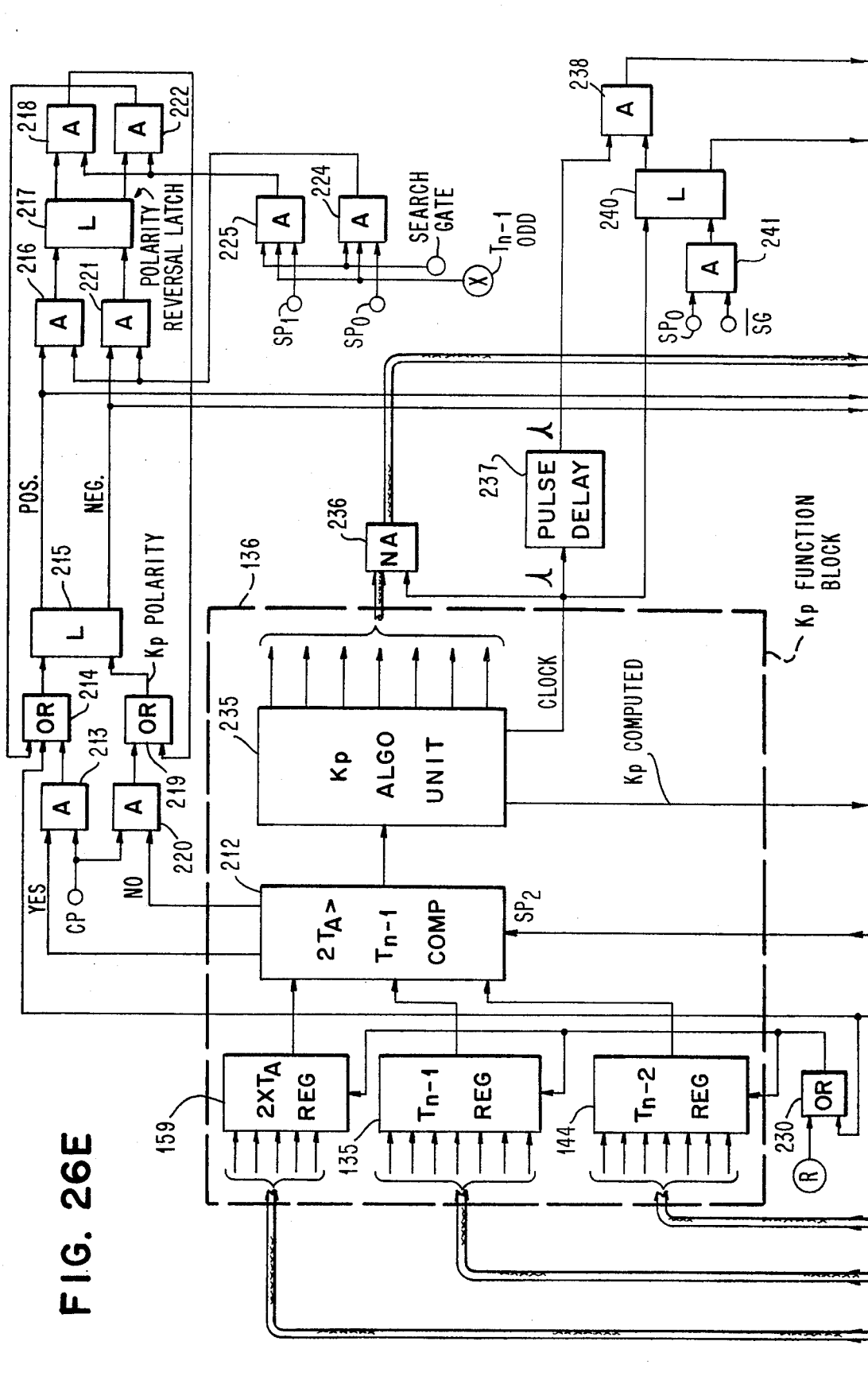
Figure 26G:
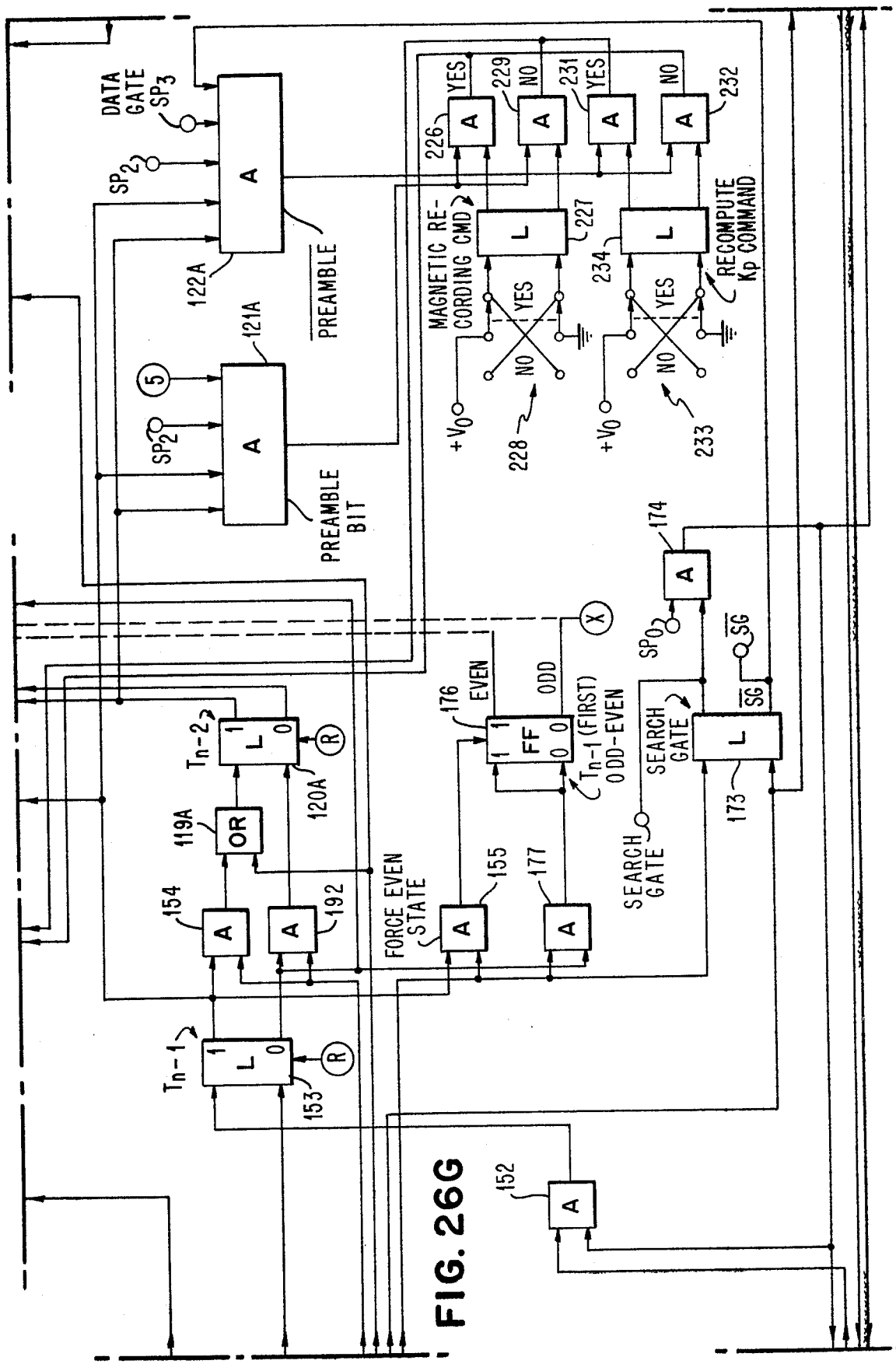
Figure 26H:
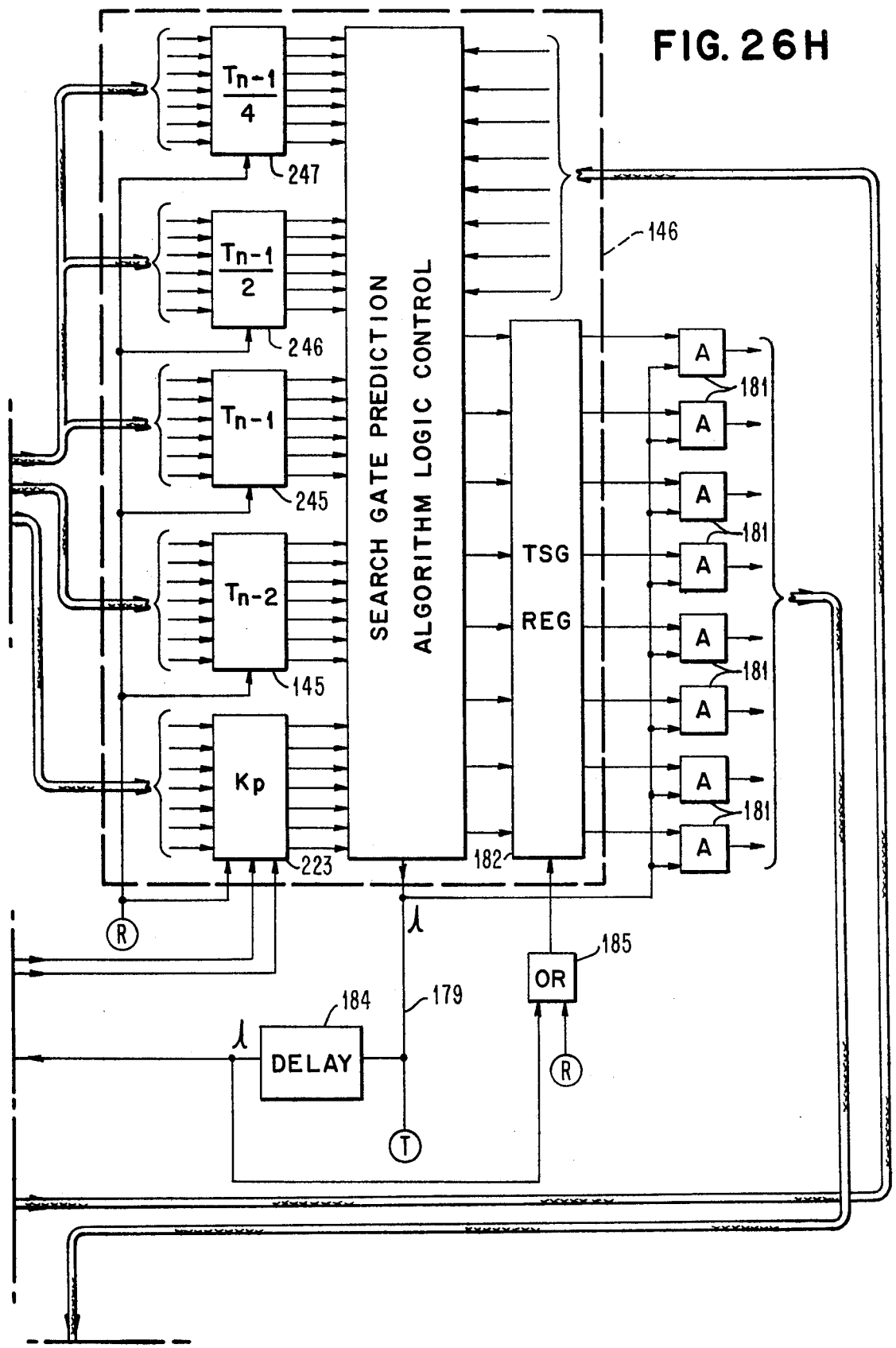

FIG. 24D illustrates the specific circuit for calculating the seventh listed algorithm for the second order solution in Table 2 and, by changing the sign of the adder to a subtractor, by algorithm for the eighth listed second order solution of Table 2 may be embodied as shown in FIG. 24D.

FIG. 24C gives a specific network embodiment for the fifth listed second order solution of Table 2 and, by changing the adders to subtractors and vice versa, the embodiment may be used to generate the sixth listed algorithm.

FIGS. 24G1 and G2 show specific embodiments for calculating the first order solution algorithms from Table 2, from which by a quick perusal, it will be observed that only four unique algorithms exist for the first order solution, and only two unique arithmetic configurations are shown, since the other two complementary solution configurations may be obtained by changing adders to subtractors and vice-versa.

Figure 33:
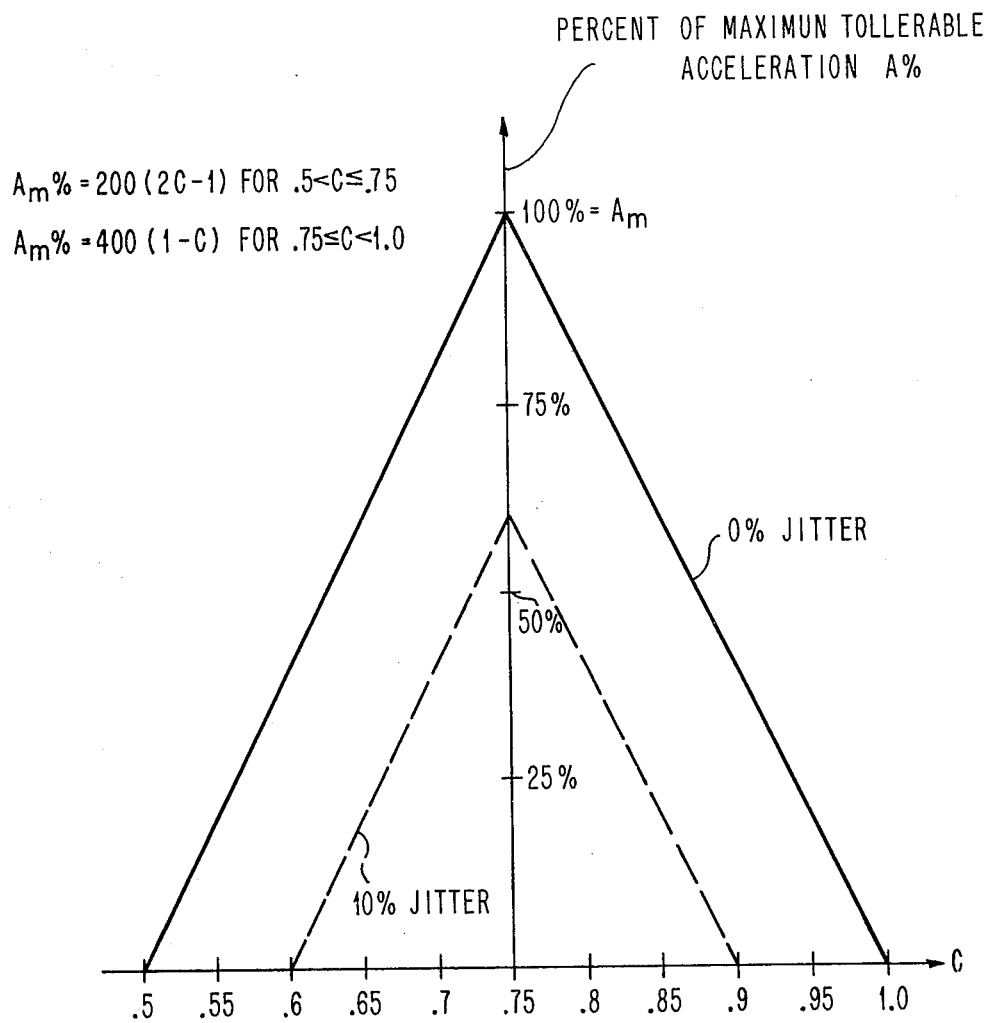
FIG. 33 illustrates the relationship of acceleration tolerance and the choice of C between 0.5 and 1.0.

The system just described is completely capable of being utilized for hand-held scanner applications or for machine driven scanning operations for media carrying the F2F or double frequency code system discussed. The present method and apparatus take account of both acceleration and of print spread factors and create an exceptionally accurate prediction for the proper termination of the search gate. While it may be presumed that some absolute limits exist on the amount of acceleration which can be tolerated and adjusted for, experimental analysis and mathematical models have been constructed in which the acceleration has been varied from 0, i.e., constant velocity, to very high acceleration figures, several orders of magnitude above those normally encountered in the scanning systems of this sort, and the search gate so constructed are without error. While the absolute limits as to the amount of acceleration tolerance which these correction techniques provide is not shown, it is enough to say that all known acceleration rates for hand wanding or hand held scanning applications are easily accommodated. In this regard, it should be apparent that the coefficient defining the ideal termination point of a search gate in a non-spread and non-acceleration environment was, as earlier defined, chosen as ¾. This value of the ideal search gate termination is indeed the ideal value and will yield the maximum acceleration tolerance with or without accompanying spread. Other values of the coefficient will also work, but the degree of acceleration tolerance will fall, as illustrated in FIG. 33. As is obvious to anyone familiar with this field, values of the coefficient must lie between 0.5 and 1.0 and are centered at 0.75. Any value other than ¾ which lies in this operative range may be utilized in the algorithms and in their derivations to yield slightly different expressions than those of the preferred form which have already been developed, but this departure from the ideal teaching of ¾ as the preferred coefficient will result in reduced performance and acceleration tolerance as shown in FIG. 33. To illustrate this point, consider the following.

An expression for acceleration correction alone was developed earlier in which $$T_{sg} = 3/4 T_{n-1} \left( \frac{T_{n-1}}{T_{n-2}} \right),$$

as the reader will recall. The ¾ factor may take on other values, so let the expression be written:

$$T_{sg} = C T_{n-1} \left( \frac{T_{n-1}}{T_{n-2}} \right),$$

in which C is a variable coefficient lying in the range $0.5 < C < 1.0$. Now, C could have been used instead of ¾ in all of the derivations developed so far, but as stated above, a detrimental effect on the system performance and acceleration tolerance would occur as shown in FIG. 33. Thus, while ¾ is the best and most preferred value of the coefficient C, it is intended to encompass a range of values for C, as expressed above, it being left to the user to select a value for C depending upon the degree of reduced performance from that yielded by the value ¾, which is ideal, tht can be tolerated in a given system. If acceleration effects are so controlled by mechanical means that only low orders of acceleration will be actually experienced, then non-ideal values of C may be used without serious error, but failures will occur if the acceleration controls fail to keep the expected accelerations within bounds. Hence, the only totally safe and preferred value of C is ¾, but other suitable values in the range 0.5 - 1.0 may be used safely under limited acceleration conditions, with or without accompanying spread.

As stated above, C could be used in place of ¾ in all of the derivations for all of the algorithms shown in all of the tables herein. If this were done, it may be simply stated, all that would change in the rewritten algorithms would be that the numeral "3", wherever it appears, would be replaced by "4C" to yield new general expressions for each derived algorithm, with C chosen arbitrarily within the stated range and being optimum at a value of C = ¾. In the derivations shown, the value C = ¾ was used, although "C" was not mentioned then, because it is much easier to visualize and understand the concept of a search gate if ¾ is used and also because the best result is obtained by its use and can easily be illustrated.

The astute observer will be aware that the correction factor which calculates a spread coefficient $K_p$ is, in itself, slightly subject to acceleration since the $K_p$ is calculated from measurements made during the movement of the scanning head across the preamble bit, just prior to the data bits. The spread factor $K_p$ can, therefore, be in error if there is considerable acceleration introduced while the preamble bit (or bits) is being scanned. A second expression for $K_p$ which can be used in any of the algorithms where it appears and which takes account of the acceleration factor, has been developed and embodied in a preferred system in which $K_p$ is calculated according to the following equation.

$$K_p = 2\left[\frac{T_A}{T_{n-1}} - \frac{T_{n-2}}{T_{n-1} + T_{n-2}}\right] \quad (40)$$

The derivation of this expression is as follows:
The basic equation for spread is
as has been previously derived and discussed with relation to FIG. 6 and equation 21. The measurements $T_A$ and $T_p$ are time measurements expressed as a number of clock pulses and, in the event that acceleration takes place in the system and the intervals are being measured, the values of $T_A$ and $T_P$ will be distorted.

A general expression is that $K_p$ equals some function $f(S, A)$ where S is a spread factor and A is an acceleration factor. It is desirable to write an expression in which $K_p$ is not dependent on acceleration. This may be written in the general form $K_p = f(S, A) - f(A) = f(S)$.

Turning to FIG. 20, the two preamble bits may be numbered $T_{n-2}$ and $T_{n-1}$. If the major transition between time periods $T_p$ (which are $T_{n-2}$ and $T_{n-1}$) is viewed as the first half of a binary 1 in a system in which $T_p$ is equal to $T_{n-1} + T_{n-2}$, the expression for $K_p$ may be written, as with equation 21 as $$K_p = \frac{2 \times T_{n-2} - (T_{n-2} + T_{n-1})}{T_{n-2} + T_{n-1}} \quad (41)$$

or, this equals $$K_p = \frac{T_{n-2} - T_{n-1}}{T_{n-2} + T_{n-1}}. \quad (42)$$

This relationship comes about from the basic consideration that the width $T_p$ of a 1 in this coding system is unchanged by spread; therefore, the expressin for the total spread coefficient over two binary "1" preamble bits, being unaffected by spread, must be affected only by acceleration. Subtracting, and rearranging the expression which is affected only by acceleration, then, from the expression which affected both by acceleration and by spread, yields equation 40.

The use of this formula for computing $K_p$ is an ideal solution which is utilized in the following preferred embodiment. In the embodiment tht follows, the provision is mde for a manual switch for setting up the circuitry to recompute the $K_p$ factor whenever two binary 1's are sensed in sequence since, two binary 1's in a data stream are the equivalent of two preamble 1's in a data stream and offer the opportunity for recalculating a $K_p$ downstream in the data without halting data sensing operations. However, when a single one is sensed and the $T_{n-1}$ odd-even indicator is odd, the polarity of $K_p$ is automatically reversed without recomputing $K_p$ as was discussed earlier.

Turning to FIG. 25, a preferred embodiment will be illustrated in a functional flow chart of operations to be performed and specific timings to be maintained as required by the diagram of timing in FIG. 20. In FIG. 25, the provision has been made for handling two preamble symbols so that the improved calculation of the spread coefficient $K_p$ can be made before the reading of data begins. Also, under manual control, the function has been included which allows the arbitrary selection of a recomputation of $K_p$ whenever two digital 1's appear in the data stream together. Also included is a switch to choose between optical and magnetic recording decode techniques.

Starting at the top left of FIG. 25, the flow chart operations are as follows: the system starts by scanning F2F or double frequency encoded information on a media or received from a communications channel. The system awaits the receipt of the first sensor pulse and, when the first pulse is sensed, (indicating a transition at the edge of a bar) a sense pulse counter is incremented by 1, a time counter for $T_n$ is started and the terminal data register is reset to 0.

The system then awaits the recept of the second transition pulse from the sensor. When the second sensed pulse is received, the $T_{n-2}$ total is set to a 1 and the $T_{n-2}$, or second odd-even indicator, is set to the even state, and the sense pulse counter is incremented again. The system then awaits receipt of the third sensor pulse (the end of the first preamble symbol).

When the third sensor pulse arrives, the sense pulse counter is incremented by 1, the $T_n$ time counter is stopped, and the contents of the $T_n$ counter are loaded into the $T_{n-1}$ register, the contents of which are shifted to the $T_{n-2}$ register. The $T_{n-2}$ register contents are loaded into the $T_{n-2}$ and $K_p$ algorithm registers in the appropriate places, and the $T_n$ register and the $T_{n-1}$ register are reset to 0. The count gates to the $T_A$ and $T_n$ registers are opened and the system awaits the receipt of the fourth sensor pulse.

When the fourth sensor pulse is received, the sense pulse counter is incremented by 1 and the $T_{n-1}$ latch is set to a 1 since it is known that the second preamble bit is a 1. The $T_A$ counter is stopped at this point and a parallel transfer of the count in the $T_A$ count register is made to the $T_A$ register in the $K_p$ algorithm box. The system then awaits receipt of the fifth sensor pulse.

When the fifth pulse is received, the sense pulse counter is incremented by 1 and the data gate is raised, as is the fixed delay gate. The $T_n$ counter is stopped from counting clock pulses, and the content of the $T_n$ count register is loaded into the $T_{n-1}$ register and the $T_n$ register data is loaded into the $T_{n-1}$ registers in the $K_p$ algorithm box. The computation elapsed time counter is started and the content of the $T_n$ register is loaded into the search gate start register, shifted three places to the left, to load in ⅛ of $T_n$. The $T_A$ and $T_n$ count registers are reset to 0 and start counting clock pulses again and the search gate start registers starts counting down. The system then checks to determine whether all the search gate start register bit positions are 0, except for the low order bit.

When the system determines that all of the bit positions in the search gate start register, except for the low order bit, are 0, it checks to see if the $T_{n-1}$ latch is in the 0 state. If the latch is in the 0 state, the $T_{n-1}$ odd-even flip flop is pulsed to set it to the opposite state from that it is then in. If the $T_{n-1}$ latch is in the 1 state, however, the $T_{n-1}$ odd-even flip-flop is driven to the even state. This provision is made so that, in the event a 1 appears in the $T_{n-1}$ latch, a proper account of whether any following 0 will be odd or even can be maintained since it is important to know, for reasons which have been explained earlier and will appear again later, whether a 0, when it occurs, is an odd or even 0 following the last occurrence of a 1.

The system then goes on and sets the search gate driver latch to a binary 1 state, which raises the search gate. The system then checks for whether all of the stages in the search gate start register are 0 and, when all stages are 0, it stops the counting of the search gate start register. The system then examines the state of the $T_{n-1}$ and the $T_{n-2}$ latches to determine whether both register a 1. At this point, the content of both latches should be a 1 since two binary 1 preamble bits have been read and sensed.

If the answer is yes, and both latches are set to a 1, the question is asked to the system as to whether or not these represent preamble bits. In the event they do, a decision point is reached which may be manually controlled by switch in the logic diagram to select whether magnetic or an optical recording decode is desired. if it is a magnetic recording, the system sets the $K_p$ latch to a 1 indicating that $K_p$ will be positive and it sets $K_p = 0$ in the $K_p$ algorithm register since no spread occurs in magnetic recordings unless there is substantial intersymbol interference. (If such interference does occur, it can be handled by not setting the $K_p$ latch to 1 and measuring the spread, etc.)

If the choice is that this is not a magnetic recording, (or if it is magnetic having apprecible intersymbol interference) the system examines the $K_p$ algorithm register, computes the value for $K_p$, checks for whether $K_p$ is positive or negative and sets the $K_p$ latch to a 0 for $K_p$ negative and to a 1 for $K_p$ positive and then computes the absolute value of $K_p$.

When the absolute value of $K_p$ has been computed, this value is stored in the algorithm registers and the $T_{n-1}$, $T_{n-2}$ and $T_A$ and $K_p$ registers are all reset to 0.

In the event the system determines that the two 1's in the aforementioned $T_{n-1}$ and $T_{n-2}$ time periods do not represent preamble bits, the question is asked of a switch in the system as to whether a recomputation of $K_p$ is required since these 1's must be both successive data 1's. If the answer is yes, the system proceeds as before to examine the $K_p$ algorithm and computes $K_p$, etc. If the answer is no, the registers $T_{n-1}$, $T_{n-2}$, $T_A$ and $K_p$ are all set to 0.

The system is designed to select the appropriate search gate termination algorithm according to the contents of the $T_{n-1}$, $T_{n-2}$, $K_p$ and other condition registers, and to compute the predicted search time as a count and load the predicted search gate register with the computation. This is denoted merely by the arrow going to block A on FIG. 25. At the end of the computation, the system returns, via block C, to the remainder of FIG. 25 and asks the question, "has the search gate termination time been computed," and it awaits the affirmative answer to this question.

The computed search gate termination time is then transferred to the elapsed time compensator and the algorithm selector control logic box is rest to a 0. The elapsed time counter is stopped and its count is subtracted from the data content of the search gate termination prediction time. If the difference is positive, the remainder is stored in the search gate termination register for countdown, the countdown is initiated and the transfer of the data contents of the $T_{n-1}$ register to the $T_{n-2}$ register is carried out and the $T_{n-1}$ register is reset to a 0. The state of the $T_{n-1}$ latch is transferred to the $T_{n-2}$ latch to correlate with the present contents of the $T_{n-2}$ register, and the $T_{n-1}$ latch is reset to 0. The elapsed time counter is reset to a 0 and the system awaits the point at which the search gate termination register bit positions, except the low order bit, reach 0. When this occurs, the search gate driver latch is set to a 0 ending the search gate. When all the stages of a search gate termination register are 0, the countdown is stopped and the system inquires whether there has been a signal transition occurring during the duration of the search gate. If the answer is yes, the $T_A$ register was stopped from counting when the pulse occurred and the sense pulse counter was incremented.

The system then asks the question whether the $T_{n-1}$ flip flop (first odd-even indicator) is odd or even. If it is odd, the sign of $K_p$ is changed and if it is even it is left alone. The $T_{n-1}$ latch is then set to a binary 1 and, since the pulse has occurred during the duration of the search gate, and a binary 1 has been read, the one side of the data shift register is set to a 1, and there is a parallel transfer of the $T_A$ register count to the $T_A$ register. The $T_A$ measurement is placed in the $K_p$ algorithm register and the contents of the $T_{n-2}$ register are transferred to the corresponding register in the $K_p$ algorithm unit.

If there has been no sense pulse detected coincident with the duration of the search gate, the system moves on to the same point that it goes to after the transfer of the $T_{n-2}$ register contents, just described. The system moves on to activate the shift pulse driver and it shifts the content of the data shift register by one position. It also increments the shift pulse counter by 1. The system then checks to determine whether the $T_{n-2}$ latch is in the 1 state. If the answer is yes, the $T_{n-2}$ odd-even flip flop (the second odd-even indicator) is set to even, and if the answer is no, the second odd-even flip flop is clocked to its opposite polarity whichever that may be.

The system awaits the receipt of the next sensor pulse and, when the next sensor pulse is received, it checks to determine whether an arbitrary number of shift pulses have been generated. If the answer is no, the system checks to determine whether the fixed delay gate has been terminated. If the answer is yes, the data in the shift register is transferred to the data terminal, all registers and latches are reset to 0 except for the terminal data register, and the system goes back to the starting point. If the answer is no, the system exits via block X and returns into the flow diagram as shown at point X to await the receipt of further data.

When the elapsed time counter content is subtracted from the calculated search gate prediction time, if the difference turned out to be negative, it would mean that either the calculation is incorrect or the amount of time utilized in calculating has exceeded the time at which a search gate should have been terminated and this means that an error condition has resulted. Therefore, a negative difference in the flow chart at this operation generates an error signal which resets all registers and latches to 0, and the system returns to the start for rereading any data.

With reference now to FIG. 26. a preferred embodiment of the apparatus and method of the present invention as discussed in the flow diagram of FIG. 25 will now be described. When convenient, parallel numbering with the prefix 10 has been utilized in FIG. 26 where the various components are similar to those in FIG. 22.

In FIG. 26, the basic system clock is the timing pulse generator 101A which produces a string of evenly spaced pulses at a basic frequency, such as 1 megahertz. These pulses are identified as CP and are applied at various points in the logic diagram. A sensor for detecting the appropriate sort of coded marks, either optical or magnetic, is included generally as sensor 102A which feeds its output to the input of amplifier and pulse shaping circuit 103A. The output of amplifier 103A is fed through AND gate 104A under the control of latch 105A. Latch 105A is controlled by a signal A, reduced when a full character or message count has been detected, and is set to the on condition, insofar as AND gate 104A is concerned, by the reset pulse produced by a reset driver. At the output of AND gate 104A the various sense pulses $SP_0$ appear.

The sense pulses $SP_0$ are simultaneously applied to the input of a fixed delay unit 106A and to an AND gate 107A. AND gate 107A functions to pass the pulses $SP_0$ whenever a coincidence exists between the occurrence of a pulse $SP_0$ and a "0" in the last stage of sense pulse register 109A occurs. The sense pulse register 109A differs from the embodiment shown in FIG. 22 since it is not a binary counter, but is a shift register.

In shift register 109A, the reset signal sets all of the stages except the first one to 0, and loads a 1 into the first stage. Succeeding pulses $SP_0$ are utilized as shift register shift pulses to shift the "1" in the first stage to the second stage, to the third stage, etc. This produces a sequential timing function which is derived from the sense pulses $SP_0$ so that the code is self-clocking. The effect was also achieved with the binary counter 6B in FIG. 22, but required multiple AND gating due to the fact that more than one stage would have an indicating 1 in it at the same time. This is alleviated in FIG. 26 by utilizing the shift register which has only a single cell in the on condition at any given time.

The fixed delay unit 106A produces a delayed output from the input $SP_0$, the output being identified as the dalayed signal $SP_1$. The delayed signal from delay 106A is applied to the input of a delay 110A to produce the second delayed signal, $SP_2$. $SP_2$ is applied to another fixed delay unit 111A whose output. $SP_3$, is applied to yet another fixed delay unit 112A to provide the final delayed signal, $SP_4$. The initial pulse signal $SP_0$, and the for delayed derivatives of it, are utilized in clocking the various circuit elements of FIG. 26 so that the sequence of on and off states of the various devices is given sufficient time between changes to stabilize, as is well known to those of skill in the art of logic design.

With the occurrence of sensing the first pulse $SP_0$, the 1 which is resident in the first stage of register 109A is shifted to the second stage and, at the occurrence of the first delayed pulse $SP_1$, AND gate 113 A is activated. The output of AND gate 113A is used to produce the terminal data register reset signal, which is utilized elsewhere in the logic diagram, and also through OR gate 114A, to set the count gate latch 115A to the on condition. This starts the $T_n$ register, counter 123A, counting each clock pulse CP which is fed through AND gate 116A. The $T_A$ register 117A is not started counting at this point since two preamble bits are being used in this embodiment and the $T_A$ count will not be started until the first time slot in the second preamble bit has begun at the third pulse $SP_0$. However, the choice of either half of either preamble bit for measuring $T_A$ is arbitrary.

At the occurrence of the second pulse $SP_0$, the 1 which is resident in the second stage of shift register 109A, is moved to the third stage and, with the occurrence of the first delayed pulse $SP_1$ from the second pulse $SP_0$, AND gate 118A is activated. AND gate 118A through OR gate 119A, sets the $T_{n-2}$ latch 102A to the on or 1 condition. When the $T_{n-2}$ latch 120A is in the on condition, one of the legs to each of the AND gates 121A and 122A, respectively, is activated. The "$T_{n-2}$ is equal to 1" indication is given to the algorithm selector box 124A, and when a shift pulse is given to the data shift register, it is given to AND gate 125, which, through OR gate 108A, sets the odd-even flip flop 126 to the even condition.

At the occurrence of the third sense pulse $SP_0$, the 1 in the third cell of shift register 109A is moved to the fourth stage. AND gate 127 is then activated at the occurrence of the first delayed pulse $SP_1$ from the third sensed pulse $SP_0$. The output of AND gate 127 is applied, through OR gate 128, to reset the count gate latch 115A and stop counting, via AND gate 116A of clock pulses in the $T_n$ register, counter 123A.

The 1 in the fourth stage of the sense pulse register 109A is also utilized to activate, coincident with the second delayed pulse $SP_2$, an AND gate 129 and, upon coincidence with the third delayed shift pulse $SP_3$, to activate AND gate 130, and at the fourth delayed sense pulse $SP_4$, to activate AND gate 131. The output of AND gate 129 is fed, via OR gate 132, to gate the output of the $T_n$ register counter 123A, via AND gates 133, to the $T_{n-1}$ register 134 and also, on N parallel lines, to the $T_{n-1}$ register 135 contained in the $K_p$ function block 136. At the same time, the count in the $T_{n-1}$ register counter 123A, shifted right by three bits (or toward the low order section) to derive a $\frac{1}{8}T_n$ count which is applied, on N lines, to the search gate start register 137.

At the occurrence of the third delayed sense pulse $SP_3$ and the coincidence with a 1 being in the fourth stage of sense pulse shift register 109A, AND gate 130 is activated which, via OR gate 138, gates the content of the $T_{n-1}$ register 134 via AND gates 139 to the $T_{n-2}$ register 140.

At this point in time, the count for the first full preamble bit stored in the $T_n$ register 123A has been counted up, loaded into the algorithm function block 136 for $K_p$, shifted into the $T_{n-1}$ register 134, and, into the $T_{n-2}$ register 140, and a count equal to $\frac{1}{8}$ of $T_n$ has been set up into the search gate start register 137. The $T_{n-2}$ latch 120A has also been set to the 1 condition, since it is known that the preamble bits are both 1's.

At the occurrence of the fourth delayed pulse $SP_4$ derived from the third sense pulse $SP_0$, AND gate 131 is activated, which produces several results. First, the output of AND gate 131 is utilized, via OR gate 180, to reset the $T_{n-1}$ register 134. It is also utilized, via OR gate 142, to gate the content of the $T_{n-2}$ register 140 through the AND gates 143 on N parallel lines to the $T_{n-2}$ register 144 contained in the $K_p$ algorithm function block 136 and to the $T_{n-2}$ register 145 contained in the search gate prediction algorithm logic control block 146.

The output of AND gate 131 is also utilized, via OR gate 114A, to set the count gate latch 115A to the on position so that, through AND gate 116A, the $T_n$ register counter 123A will resume its counting. Also, the same output from AND gate 131, is used via OR gate 147 to set the count gate latch 148 to the on position so that, via AND gate 149, the $T_A$ register counter 117A will begin counting the clock pulses CP, since this is the start of the first time slot in the second preamble bit.

At the occurrence of the fourth sense pulse $SP_0$, the in i the sense pulse shift register 109A is shifted to the fifth stage and, upon coincidence with the first delayed pulse $SP_1$, activates AND gate 150. The output of AND gate 150 produces several results. First, the output of AND gate 150 is applied, via OR gate 151, to reset the count gate latch 148 and halt the counting, through AND gate 149, of clock pulses in the $T_A$ register counter 117A since this is the end of the first time slot in the preamble bit, and the width of te first time slot in the preamble bit is defined, for use here, as $T_A$. Secondly, the output of AND gate 150 is applied, via OR gate 152 to the $T_{n-1}$ latch 153, setting it to the 1 or on condition. When the $T_{n-1}$ latch is in the on condition, its output is applied to AND gate 154, which is not yet fully conditioned, and, to AND gate 155, not yet fully conditioned and to the AND gates 121A and 122A respectively, not yet fully conditioned. It is also applied to the algorithm selector control logic box 124A to give it an indication that $T_{n-1}$ is a 1, a fact consistent with the notion that the preamble bit is a 1 and that the 1 has been sensed at the central transition of the signal stream in the preamble.

The output from the fourth stage of the sense pulse register 109A is also utilized, coincident with the second delayed pulse $SP_2$, to activate ANd gate 156, the output of which, via OR gate 157, gates the output of the $T_A$ register counter 117A, via AND gates 158, on N parallel lines to the $T_A$ register 159 contained in the $K_p$ function block 136.

At the occurrence of the fitth sense pulse $SP_0$, the sixth cell of shift register 109A is activated, producing and output 5 which is utilized as a condition signal at several points in the logic diagram. Also, coincident with the first delayed pulse $SP_1$ from the fifth sensed pulse, $SP_0$, AND gate 160 is activated which, via OR gate 128, resets the count gate latch 115A and halts the counting, through AND gate 116A, of the $T_n$ register counter 123A. This is the end of the second preamble bit.

The output from the sixth cell of shift register 109A is also applied to AND gates 161, 162 and 163. AND gate 161 is activated at the occurrence of the second delayed pulse $SP_2$ and its output is utilized, through OR gate 132, to gate the output of the $T_n$ register 123A through ANd gates 133 as before. The output is also utilized through OR gate 164, to set the elapsed time latch 165 to the on condition, so that the output of elapsed time latch 165 actuates AND gate 166 at each clock pulse and steps the elapsed time counter 167 accordingly. This is required, since, at the fifth pulse $SP_0$, data begins and it is necessary to start the elapsed time counter 167.

The output from the sixth cell of register 109A is also applied to AND gate 162 which, upon coincidence with the third delayed pulse $SP_3$, provides an output which, via OR gate 141, resets the $T_A$ register counter 117A. The output of AND gate 162 is also utilized to set the data gate latch 168 to the on condition to produce the data gate signal which is utilized in the logic diagram at various points. The output of ANd gate 162 is also utilized via OR gate 169 to start the countdown by setting the countdown gate latch 170 to the on condition so that, with each ensuing clock pulse CP, AND gate 171 is energized to count down the search gate start register 137.

The AND gate 163 is activated by the 1 in the sixth cell of register 109A at the occurrence of the fourth delayed pulse $SP_4$. This signal is utilized, via OR gate 147, to set the count gate latch 148 to the on condition to restart, through AND gate 149, the $T_A$ register counter 117A counting again.

The search gate start register 137 counting down, finally reaches the condition in which all but the last, or lowest order bits are 0. At this point, AND gate 172 is activated at the next clock pulse CP to produce an output whch sets the search gate latch 173 to the on condition to start the search gate. This raises the search gate signal used at several points in the diagram and, via AND gate 174, coincident with the occurrence of a sensed pulse $SP_0$, will set a 1 into the first stage of the data shift register 175 since, if a pulse is sensed during the time that the search gate signal is up, a binary 1 has been sensed.

The output from AND gate 172 is also utilized, via AND gate 155, to set the $T_{n-1}$ odd-even flip flop (the first odd-even indicator) 176 to the even state if the $T_{n-1}$ latch 153 (the first indicator) was previously set to a 1. The output from AND gate 172 is also applied via AND gate 177 to set the first odd-even flip flop 176 to the opposite of its current state in the event that the $T_{n-1}$ latch happens to be a 0. The odd output of the first odd-even flip flop 176 produces a signal which is utilized in the $K_p$ polarity latch 215 to set it to its opposite state and at other points on the diagram.

When the sixth pulse is sensed, the 1 in the shift register 109A moves to the seventh stage. This has the effect of deconditioning AND gate 107A to stop further shifting of register 109A. Also, the 1 output of the seventh stage of register 109A is utilized, via AND gate 178, to start the elapsed time latch 165 at the occurrence of each sense pulse marking symbol transitions. The double frequency transitions are inhibited by AND gate 178 by applying to its input a "not search gate" function.

When AND gate 178 passes sense pulse $SP_0$, the elapsed time counter 167 counts clock pulses CP during the time that the calculation of the predicted search gate termination time is being done in block 146. When the search gate prediction is completed in block 146, a completion signal T is issued on line 179 which is applied through OR gate 180 to stop the elapsed time counter 167 by resetting the elapsed time latch 165 before the occurrence of the next symbol transition, sense pulse $SP_0$. Signal 179 also operates AND gates 181 to feed the output from the predicted search gate termination time register 182 on N lines in parallel to the prediction search gate termination time register 183. The T signal is also applied to a delay unit 184 which, after a brief delay, causes a reset through OR gate 185 to reset the $T_{sg}$ register 182. The delayed signal T is also applied to reset the algorithm selector control logic box 124A. These actions reset the algorithm selector and search gate prediction time units to zero, permitting their use for the next symbol time $T_n$.

The subtractor unit 186 then calculates the difference between the content of the prediction search gate termination time from register 183 and the elapsed time from counter 167. The result is outputted on N parallel lines via AND gates 187. The result is loaded in parallel into the search gate termination register 188, which starts counting down when the internal clock pulse signal from the subtractor unit is applied to the countdown gate latch 189, which sets AND gate 190 on and starts the search gate termination register 188 counting down at the rate of the clock pulses, CP. The internal clock from the subtractor unit is used via OR gate 138, to gate the output of the $T_{n-1}$ register via AND gates 139, to the $T_{n-2}$ register 140. This clock pulse, delayed slightly in delay unit 191, is utilized to reset the elapsed time counter 167, the $T_{n-1}$ latch 153 to the off position and, via OR gate 180, to reset the $T_{n-1}$ register 134 to 0. The undelayed clock pulse, as utilized previously, gates the outputs of the $T_{n-1}$ latch 153 through AND gates 154 and 192 and OR gate 119A into the $T_{n-2}$ latch 120A inputs so that, at the time the $T_{n-1}$ latch 153 is set to the off position by the delayed pulse from delay unit 191, the content of latch 153 has already been transferred into the $T_{n-2}$ latch 120A.

The zero side of the $T_{n-1}$ latch 153, indicating "0", is applied to AND gate 177 to set the $T_{n-1}$ odd or even flip flop 176 to its opposite state at the start of the search gate and, it also provides a signal to the algorithm logic control box 124A. The "0" output from the $T_{n-1}$ latch 153 is transferred via AND gate 192 to the $T_{n-2}$ latch 120A if the $T_{n-1}$ latch is in the 0 state when the initial clock pulse occurs coming from the subtractor unit. The 0 output of the $T_{n-2}$ latch is utilized to provide an input into the algorithm selector control box 124A and, via AND gate 194, controls switching the second odd-even flip flop 126 to its opposite state at the occurrence of the next shift pulse from the data shift register 175.

With the search gate termination register counting down, eventually all the stages of this register 188, except for the least order bit, reach 0. When this occurs, AND gate 195 is activated to provide a reset to the search gate latch 173, whose output then creates the non-search gate signal and provides an input to the not preamble AND gate 122 which is used to determine whether $K_p$ is to be recomputed, given the condition $T_{n-1}$ and $T_{n-2}$ latches contain "ones". The output of AND gate 195 is also applied to a shift pulse driver 196 which produces a pulse to shift the data shift register 175 and to pulse the shift pulse counter 197. When the content of the search gate termination register 188 reaches 0, AND gate 198 is activated to reset the countdown gate latch 189 to await the start of the next search gate. By this means, the search gate termination register is left in the empty state.

When the shift pulse counter 197 has counted enough shift pulses to make up a complete $2^n$ code, $n$ being arbitrary, and a search gate is not present, the next pulse sensed $SP_0$ applies to create, via AND gate 199, the A output signal labeled A which resets the input latch 105A to stop AND gate 104A from passing further pulses from amplifier 103A. This signal, applied through OR gate 200, also activates a delay univibrator 201 whose output is differentiated in differentiator 202 to provide a reset signal 203 which resets all the elements in the system where the R symbol is present. The undelayed reset signal is also used to gate the content of the data shift register 175, via AND gates 204, to the terminal data register 205.

Several other control functions occur as follows. At the third delayed pulse $SP_3$, after a signal pulse $SP_0$ which has placed a sense pulse in register 109A, in the seventh position, and no search gate is present, AND gate 206 is activated to set the count gate latch to the on position via OR gate 147. It is also utilized via OR gate 114A to set the count gate latch 115A on to start counting $T_n$. This is done for the following reasons.

First, this is the end of the second preamble bit, and at every symbol ending, it is necessary to open the count gates at $SP_3$ time to begin counting CP's for the receipt of data and this is done at every major symbol transition thereafter. The intermediate transitions, if any, are blocked by the search gate when it is on and the major transitions are allowed through by the not search gate signal.

Also, at the first delayed pulse $SP_1$ for a pulse $SP_0$, in the absence of a search gate when the sense pulse register 109A is in the seventh cell, AND gate 207 is activated so that, via OR gate 132, AND gates 133 will be activated to transfer the contents of the $T_n$ register counter 123A to the $T_{n-1}$ register 134. At the second delayed pulse $SP_2$, in the absence of a search gate when the sense pulse register is in the seventh cell position, AND gate 208 is activated to provide, via OR gate 169, a pulse to set the countdown gate latch 170 in the on position to start the system counting down and, via OR gate 141, it also provides a reset signal to the $T_A$ register counter 117A. This is done for the following reasons:

As was indicated for the $SP_3$ pulse above, it is necessary at every major data transition (symbol transition) to begin counting CP's again and it is required to store the previous count first. This is done at $SP_1$ as detailed above and then a reset occurs at $SP_2$, as detailed above.

At the occurrence of a search gate condition, which happens when the search gate latch 173 is on, the next delayed sense pulse $SP_1$ is applied, via AND gate 209 and OR gate 142, to transfer the content of the $T_{n-2}$ register 140 via AND gates 143 on N lines in parallel to the $T_{n-2}$ register 144 in the $K_p$ function block 136 and to the $T_{n-2}$ register 145 in the algorithm unit 146. The signal is also utilized, via OR gate 157, to transfer the content of the $T_A$ register counter 117A via AND gates 158 to the $T_A$ register 159.

When the search gate start register 137 has reached an all 0 content, AND gate 210 is activated to reset the countdown gate latch 170 and halt counting.

In the event that the subtractor unit 186 should produce a negative result, an error signal is generated as shown and, after a delay in delay unit 211, a reset is produced for the system and the error signal resets the terminal data register 205.

Several additional controls are included to keep track of the polarity of $K_p$ calculated by the comparator unit 212. If $K_p$ is positive, there is an affirmative comparison from comparator 212, AND gate 213 is activated and, via OR gate 214, the $K_p$ polarity latch 215 is set to the positive position. This output is applied to the algorithm selector box 124 and also to AND gate 216 to apply, at the coincidence of another signal, an input to the polarity reversal latch 217 whose output, via AND gate 218, is fed back in inverse, i.e., from positive to negative, via OR gate 219 to the $K_p$ polarity latch 215 to reverse its polarity.

The opposite situation exists if the output of the comparator is negative. If it is negative, AND gate 220 is activated through OR gate 219 to set the $K_p$ polarity latch 215 to the negative position and, via AND gate 221, sets latch 217 to the negative. The output of the $K_p$ polarity latch 215, whether positive or negative, is applied to the algorithm selector box 124A and is also applied to the $K_p$ register 223. The AND gates 224 and 225 are utilized to control whether or not the polarity of $K_p$ will be reversed under certain circumstances for the reasons which will be discussed as follows:

When $T_{n-1}$ (first odd-even indicator) odd-even flip flop 176 is in the odd state, an up level is provided to AND gates 224 and 225. At $SP_0$ time, the content of the $K_pSP_0$ latch 215 is transferred to latch 217 temporarily. At $SP_1$ time, coincident with a search gate and $T_{n-1}$ flip flop in the odd state (up level), the content of latch 217 is inverted and transferred to the $K_p$ polarity latch 215. This done because a binary one was detected during a search gate interval and the last "0" preceding that "1" was an odd zero and hence, the polarity of $K_p$ must be changed to give the proper spread dimension for the next sample or search gate, as was discussed for type A and type B "ones". This will be discussed in much greater detail below.

Some further controls are as follows. At the occurrence of the fifth sensed pulse $SP_0$, and the second delayed pulse $SP_2$, with both latches 153 and 120A set to the 1 position, the preamble bit AND gate 121A will be activated to apply, via AND gate 226, an output, if the magnetic recording command latch 227 has been set to the on condition by selection switch 228 indicative of the fact that a magnetic recording decode function is required. If such a function is required, an output is provided on AND gate 226, the selection of which gives: a positive indication of magnetic recording decode required which is utilized via OR gate 230 to reset the $T_{n-2}$ register 144 and the $T_A$ register 159. A signal is also derived which is utilized via OR gate 214 to set the $K_p$ polarity latch to the positive condition since negative spread is not found in magnetic recordings.

If a negative output from the magnetic recording command 227 is produced, AND gate 229 provides a signal which drives the comparator 212 to do the comparison.

If AND gate 122A is on, indicative that a preamble bit is not present, yet 1's are contained in both latches 153 and 120A, at the occurrence of a second delayed pulse $SP_2$ and a data gate signal, an input is provided to the AND gates 231 and 232. One of these AND gates may be activated by the choice set into switch 233 to give a recomputation of $K_p$ command, via latch 234. If it is desired to recompute $K_p$ whenever two data 1's are found together in the stream of data, the output appropriately selected by switch 233 and latch 234 will energize the proper AND gate 231 or 232 to either reset the $T_{n-2}$ register and set the polarity positive in latch 215, or, via AND gate 231, will drive the comparator unit to make the comparison.

When the comparator unit 212 has produced the required comparison, it is fed to the $K_p$ algorithm unit 235 which calculates the absolute value of the $K_p$ function, as shown, and produces an internal clock pulse indicative that $K_p$ has been computed. This pulse is applied to AND gate 236 to gate the content of the algorithm unit to the $K_p$ register 223 and, via pulse delay unit 237, an extra input is provided to AND gate 238 to turn it on and provide a signal indicative that the algorithm clock should be started via OR gate 239 so that the correct algorithm may be selected. The $K_p$ algorithm clock output is provided to latch 240 to set it in the on condition to provide the other input to AND gate 238 to provide this signal.

In the event a sense pulse $SP_0$ is sensed, and no search gate is present, AND gate 241 will be activated to set the latch 240 off and to provide an input to AND gate 242 which, on the occurrence of the fourth delayed pulse $SP_4$ and the presence of a data gate signal, will clock the algorithm selector box 124A to select the appropriate algorithm.

The fixed delay gate univibrator 243 is started when the third delayed pulse $SP_3$ occurs coincident with the sense pulse register 109A being in the sixth position, i.e., the end of the two preamble bits has been sensed. The fixed delay univibrator 243 operates for a period of time and then falls, after a sufficient time has passed in which a complete code should have been read. When it falls, the output is applied to the differentiator 244 to provide a fixed delay gate signal FDG which is utilized at various points in the logic diagram as shown. Its main purpose is to provide a system reset signal ⓡ through OR gate 200 which resets the entire system preparatory to reading the next code.

As is also apparent from viewing the logic diagram FIG. 26, the content of the $T_n$ register counter 123A, when it is gated out, is also applied to the various input registers in the search gate algorithm prediction box 146 with the lines shifted appropriately to load in either an uncorrected $T_{n-1}$ in register 245, or a $T_n-\frac{1}{2}$ in register 246 or $T_n-\frac{1}{4}$ in register 247. When the algorithm selector control box 124A has chosen which of the eight algorithms is the appropriate one for the various input conditions to this box, as discussed below, the appropriate algorithm will be activated in the search gate prediction control and the ideal search gate length will be calculated with the output being stored in register 182, as previously discussed.

The algorithm selector control logic box 124A is the same as that shown in FIG. 23 and the various algorithm circuits included in the algorithm computation box 146 are the same as those shown in FIGS. 24A through 24D, the only difference being that the $K_p$ which is loaded into the register 223 is different from that shown in FIG. 22 because a different $K_p$ algorithm is utilized as drawn in box 235 of FIG. 26. However, either expression for $K_p$ could be utilized, although the preferred form takes account of acceleration in measuring $K_p$.

By referring to the timing diagram FIG. 20 and to the logic flow chart FIG. 25, the operation of the embodiment in FIG. 26 may now be understood to follow the following general pattern: when the system senses the start of pulses, the pulses are counted until sufficient pulses have been accumulated to determine that the first preamble bit has been sensed. Also the period of time for the first three pulses to be sensed is measured as a number of clock pulse counts and is stored for further use as $T_{n-2}$ in the $K_p$ algorithm unit. The next two clock pulses are also awaited and the first time slot in the second preamble bit $T_A$ is measured as a count of clock pulses and it, too, is stored for the computation of $K_p$. When the fifth pulse is sensed, the end of the two preamble bits has been reached and the start of data is at hand. Appropriate steps are taken to set the data gate latch and to start timing in the various measuring registers and to start calculating a predicted search gate termination time based on the two preamble bits which have been read. Also, since the second preamble bit has been measured, its time, defined as $T_{n-1}$ and the previous $T_{n-1}$ time, defined as $T_{n-2}$ in the $K_p$ algorithm unit, is utilized so that $K_p$ may be calculated. When $K_p$ has been calculated and an appropriate algorithm based on the condition that $T_{n-1}$ is a 1, $T_{n-2}$ is a 1, the polarity of $K_p$ is as calculated, and the fact that the second odd-even flip flop will be set to the even state, have all been considered, the appropriate algorithm in the algorithm unit is run using the calculated $K_p$ and the two measured $T_{n-1}$ and $T_{n-2}$ periods to determine when the search gate should theoretically be terminated following the occurrence of the fifth pulse $SP_0$. Since the time to do these various calculations goes on simultaneously with the fact that the search gate is on, an elapsed time count is also maintained for the duration of the search gate until the calculation has been completed. The time utilized in computation is then subtracted from the predicted search gate termination time to provide the corrected search gate termination time. When this time has elapsed, the search gate is discontinued. If a pulse is sensed during the time that the search gate is on, it is interpreted as a binary 1 in this system and the various latches are set to retain the fact that a binary 1 has been read as well as a data shift register being set with a 1 bit in the first position. The system then continues measuring the time periods. In general, the mode of operation is as follows:

At the start of each data bit, an elapsed time count is begun, a search gate is activated, and calculations are performed to predict the ideal length for the search gate. When the result is computed, it is compared, by subtraction, with the elapsed time and a positive result, indicative of the time yet to run to search gate termination is stored in a counter which is then counted down. At the count of zero, or nearly zero, the search gate ends. If a pulse occurred during the time the search gate was on, a "1" is stored in the data shift register and operation proceeds as detailed above. If no pulses are received prior to termination of the data search gate, the next pulse following the end of the search gate or the system timeout (fixed delay gate) starts the process of time measurement and search gate computation all over again, using the measurements afrom the two preceding symbols as the basis for the acceleration correction, etc., as described above.

As is apparent in FIG. 26, the apparatus is designed to maintain an account of two symbol transition periods. The account kept is a record of the sign of $K_p$ and of the states of $T_{n-1}$ and $T_{n-2}$, whether a 0 or a 1, and the lengths of the periods $T_{n-1}$ and $T_{n-2}$. The algorithms of Table 2 show these conditions (except for the lengths of $T_{n-1}$ and $T_{n-2}$) as the selective factors for choosing which algorithm is to be applied for a given search gate prediction. It will be apparent that the spread factor $K_p$ has different effects if it is positive or negative, and has a varying effect depending on whether it is applied to a 0 or a 1. The type of effects and the order in which these effects occur will now be discussed.

Figure 27:
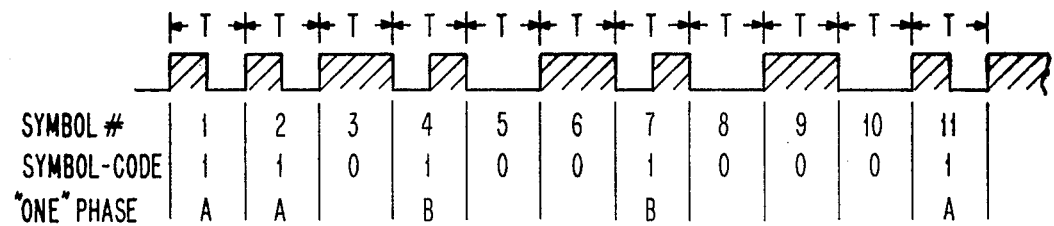
FIG. 27 illustrates a sequence of F2F coded data exhibiting phase "A" and phase "B" "1's" and their effects.

FIG. 27 illustrates an arbitrary sequence of F2F coded data. The convention chosen for binary 1's is that they are represented by the double frequency symbols, i.e., those having a transition in the center part of the symbol period T. Zeros, on the other hand, are the single frequency symbols which do not have a transition during the time T. For example, the symbols are numbered sequentially from left to right and symbols 1, 2, 4, 7, and 11 are binary 1's. Similarly, symbols 3, 5, 6, 8, 9, and 10 are binary 0's. In a perusal of FIG. 27, it will be evident that the binary 1 symbols are of two types (or phases) depending on the number of 0 symbols which are inserted between the 1's which occur. Specifically, the binary 1 symbols change phase if the number of intervening 0 symbols is odd. The phase remains unchanged if the number of intervening 0 symbols is even. For example, in FIG. 27 symbols 1, 2, and 11 are arbitrarily designated "phase A" 1's and symbols 4 and 7 are "phase B" 1's.

To understand the meaning of the phase if 1's as used in this context, consider the cross-hatched portion of the coded symbols. In FIG. 27, these cross-hatched areas represent, for example, solid printed bars which would be printed on a medium or which can be taken to represent a magnetization of one polarity in a magnetically recorded medium having a width as wide as the cross-hatched section. The phase of a binary 1 is determined by the consideration of whether the solid bar, or magnetization polarity, occupies the left or right half of the symbol interval T. Stated otherwise, the phase of a binary 1 depends on whether the printed bar occurs in the first or second time slot of the symbol period.

System measurements and computations are utilized to determine the phase of a binary 1 along with the degree of print spread which can occur. As has beem discussed fully above, the degree of print spread is determined by the value of the spread coefficient $K_p$. As is already known, $K_p$ can have a magnitude in the range of $0 \leq K_p < 1$. The polarity of the spread coefficient $K_p$ is derived from the time measurements made on the various widths of the signal transition periods, as previously discussed, and results in either a positive or a negative spread being calculated as previously shown. The effect of print spread is to distort the measured width of an F2F type 0 symbol, while the width of binary 1's in this coding scheme remains constant, regardless of the phase of the 1's.

The distortionless (considering spread only) property of the F2F type coded 1 symbol is utilized in this invention.

The width variation of 0 symbols in the F2F code format, given a print spread positive or negative, requires keeping track of whether the 0 symbols following the last 1 is odd or even in the chain of 0's following the 1. It also requires keeping track of whether the last referenced 1 is a "phase A" or a "phase B" type of 1. For example, given $K_p$ positive, the measured width of odd 0's after a "phase A" type 1 will be wider than the unspread 0. Conversely, the even numbered 0's which occur since the last referenced 1, are measured to be narrower than the ideal or unspread 0. The opposite situation occurs for the same 0's following a 1 which happens to exhibit a "phase B" characteristic.

Figure 28A:
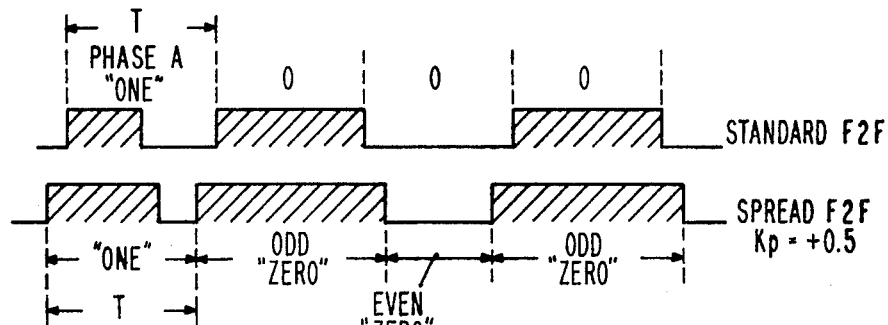
FIG. 28A illustrates the effects of a phase A binary "1" on zeros.
Figure 28B:
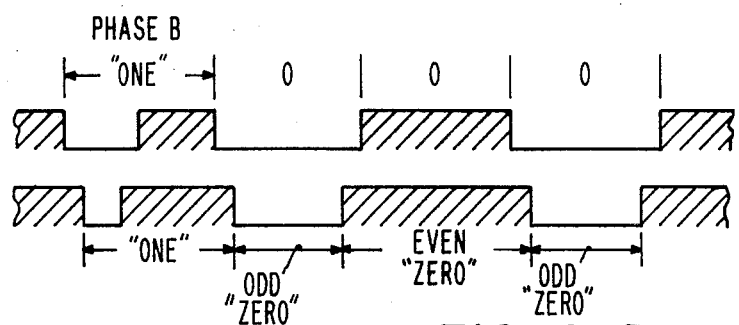
FIG. 28B illustrates the effects of a phase B binary "1" on zeros.

The situation is illustrated in FIGS. 28A and 28B. The FIGS. 28A and 28B are self-explanatory, with 28A being drawn for the condition of a standard F2F code sequence of a "phase A" 1 followed by 000. The first line shows the unspread code pattern and the second line shows the spread F2F code pattern, with the $K_p$ assumed equal to approximately +0.5. FIG. 28A illustrates the odd-even 0 width distortion which happens following a "phase A" type 1. It can be seen that the odd 0's are widened and that the even 0's are narrowed, while the width of the 1 remains the same, although shifted slightly to the left.

In FIG. 28B the situation for a "phase B" 1 followed by three binary 0's is shown in the first line. In the second line, the spread code pattern assuming the same positive $K_p$ equal to approximately 0.5 is illustrated. It will be readily observed that the width of the spread 1 remains constant, but now the odd 0's following it are narrow and the even 0 is wide, which is the opposite situation of that illustrated in FIG. 28A.

The first and second order search gate prediction algorithms given in Table 2 utilize the spread constant $K_p$ in the calculations. The magnitude and polarity of the spread constant $K_p$ is always, at a minimum, measured and computed by the use of one or two preamble bits which are provided at the start of each F2F coded character sequence.

As previously discussed, the preamble bits are binary 1's. It should be clear that they must be "phase A" ones which have a bar in the first time slot so that the start of the time slot will be properly detected.

Turning to the system in FIG. 26, it will now be understood that the second or $T_{n-2}$ odd-even flip flop 126 keeps track of the status of the 0 bits which follow the last referenced 1 bit. The first, or $T_{n-1}$ odd-even flip flop 176 keeps track of whether the referenced 1 is a "phase A" or a "phase B" 1. In this manner, two flip flops were utilized in the preferred embodiment in order to simplify understanding the system operation. As will be readily apparent to those who understand the system, measuring $T_{n-1}$ is equivalent to measuring the $T_{n-2}$ for the next succeeding time period since the measurement $T_{n-1}$ in the present time frame becomes $T_{n-2}$ in the next succeeding time frame. Given this consideration, it is apparent that a single odd-even flip flop could have been used to keep track of the odd-even status of a $T_{n-1}$ 0 bit in addition to controlling the phase designation of the referenced 1 bit.

Tables 3, 4 and 5 list algorithm conditions needed to control the choice of the prediction algorithm given a single odd-even flip flop. The algorithm selection conditions are noticably different from those shown for the two flip flop system utilized in Table 2. Three of the four conditions are similar in both systems, i.e., the binary states of the $T_{n-1}$ and $T_{n-2}$ latches, and a column which identifies the polarity of the computed spread coefficient $K_p$. However, the state of the odd-even indicator listed in Table 3 is the reverse of that listed in Table 2. The reversal is obvious, since $T_{n-2}$ time is always adjacent to a $T_{n-1}$ time. For example, if $T_{n-2}$ and $T_{n-1}$ are both 0's, and $T_{n-2}$ is odd, it follows that $T_{n-1}$ must be even and conversely, if $T_{n-1}$ is even, $T_{n-2}$ must be odd. The difference which exists between the conditions given in Table 2 and Table 3 is that the $T_{n-1}$ odd-even state is substituted for the $T_{n-2}$ odd-even state in Table 3.

TABLE 3

| | | Conditions | | | |
|---|---|---|---|---|---|
| $T_{n-1}$ | $T_{n-2}$ | $T_{n-1}$ "0" (Odd-Even) | Comp. $K_p$ | Final Order Solution | Second Order Solution |
| "0" | "0" | Even | Pos. | $T_{sg} = \frac{T_{n-1}}{2} [\frac{3 + |K_p|}{2 - |K_p|}]$ | $T_{sg} = \frac{T_{n-1}}{2} [3(\frac{2 + |K_p|}{2 - |K_p|}) \frac{T_{n-1}}{T_{n-2}} + |K_p|] \frac{1}{2 - |K_p|}$ |
| "0" | "0" | Odd | Neg. | | |
| "0" | "0" | Odd | Pos. | $T_{sg} = \frac{T_{n-1}}{2} [\frac{3 - |K_p|}{2 + |K_p|}]$ | $T_{sg} = \frac{T_{n-1}}{2} [3(\frac{2 - |K_p|}{2 + |K_p|}) \frac{T_{n-1}}{T_{n-2}} - |K_p|] \frac{1}{2 + |K_p|}$ |
| "0" | "0" | Even | Neg. | | |
| "1" | "0" | Forced Even | Neg. | $T_{sg} = \frac{T_{n-1}}{4} (3 - |K_p|)$ | $T_{sg} = \frac{T_{n-1}}{4} [3 \frac{T_{n-1}}{T_{n-2}} (1 + \frac{|K_p|}{2}) - |K_p|]$ |
| "1" | "0" | | | | |
| "1" | "0" | Forced Even | Pos. | $T_{sg} = \frac{T_{n-1}}{4} (3 + |K_p|)$ | $T_{sg} = \frac{T_{n-1}}{4} [3 \frac{T_{n-1}}{T_{n-2}} (1 - \frac{|K_p|}{2}) + |K_p|]$ |
| "1" | "0" | | | | |
| "0" | "1" | Odd | Pos. | $T_{sg} = \frac{T_{n-1}}{2} (\frac{3 - |K_p|}{2 + |K_p|})$ | $T_{sg} = \frac{T_{n-1}}{2 + |K_p|} [(\frac{3}{2 + |K_p|}) \frac{T_{n-1}}{T_{n-2}} - \frac{|K_p|}{2}]$ |
| "0" | "1" | Odd | Neg. | $T_{sg} = \frac{T_{n-1}}{2} (\frac{3 + |K_p|}{2 - |K_p|})$ | $T_{sg} = \frac{T_{n-1}}{2 - |K_p|} [(\frac{3}{2 - |K_p|}) \frac{T_{n-1}}{T_{n-2}} + \frac{|K_p|}{2}]$ |
| "1" | "1" | Forced Even | Pos. | $T_{sg} = \frac{T_{n-1}}{4} [3 + |K_p|]$ | $T_{sg} = \frac{T_{n-1}}{4} [3 \frac{T_{n-1}}{T_{n-2}} + |K_p|]$ |
| "1" | "1" | Forced Even | Neg. | $T_{sg} = \frac{T_{n-1}}{4} [3 - |K_p|]$ | $T_{sg} = \frac{T_{n-1}}{4} [3 \frac{T_{n-1}}{T_{n-2}} - |K_p|]$ |

To convert the above algorithms to the general form, substitute 4C for the numeral 3 wherever it occurs.

TABLE 4

| | | Conditions | | First Order | Second Order |
|---|---|---|---|---|---|
| $T_{n-1}$ | $T_{n-2}$ | $T_{n-2}$ "0" | $K_p$ | Solution | Solution |
| "0" | "0" | Odd | Pos. | $T_{sg} = \frac{T_{n-1}}{2} [\frac{3 + |K_p|}{2 - |K_p|}]$ | $T_{sg} = 1/2\, T_{n-1}(\frac{T_{n-1}}{T_{n-2}}) [\frac{(2 + |K_p|)(3 + |K_p|)}{(2 - |K_p|)^2}]$ |
| "0" | "0" | Even | Neg. | | |
| "0" | "0" | Even | Pos. | $T_{sg} = \frac{T_{n-1}}{2} [\frac{3 - 2|K_p|}{2 + |K_p|}]$ | $T_{sg} = 1/2\, T_{n-1}(\frac{T_{n-1}}{T_{n-2}}) [\frac{(3 - 2|K_p|)(2 - |K_p|)}{(2 + |K_p|)^2}]$ |
| "0" | "0" | Odd | Neg. | | |
| "1" | "0" | Odd | Pos. | $T_{sg} = \frac{T_{n-1}}{4} [3 - 2|K_p|]$ | $T_{sg} = T_{n-1}(\frac{T_{n-1}}{T_{n-2}}) [\frac{(3 - 2|K_p|)(2 + |K_p|)}{8}]$ |
| "1" | "0" | Even | Neg. | | |
| "1" | "0" | Even | Pos. | $T_{sg} = \frac{T_{n-1}}{4} [3 + |K_p|]$ | $T_{sg} = T_{n-1}(\frac{T_{n-1}}{T_{n-2}}) [\frac{(2 - |K_p|)(3 + |K_p|)}{8}]$ |
| "1" | "0" | Odd | Neg. | | |
| "0" | "1" | Forced Even | Pos. | $T_{sg} = \frac{T_{n-1}}{2} [\frac{3 - 2|K_p|}{2 + |K_p|}]$ | $T_{sg} = T_{n-1}(\frac{T_{n-1}}{T_{n-2}}) \frac{3 - 2|K_p|}{[2 + |K_p|]^2}$ |

TABLE 4-continued

| | | Conditions | | First Order Solution | Second Order Solution |
|---|---|---|---|---|---|
| $T_{n-1}$ | $T_{n-2}$ | $T_{n-2}$ "0" | $K_p$ | | |
| "0" | "1" | Forced Even | Neg. | $T_{sg} = \frac{T_{n-1}}{2}[\frac{3+|K_p|}{2-|K_p|}]$ | $T_{sg} = T_{n-1}(\frac{T_{n-1}}{T_{n-2}})\frac{3+|K_p|}{[2-|K_p|]^2}$ |
| "1" | "1" | Forced Even | Pos. | $T_{sg} = \frac{T_{n-1}}{4}[3+|K_p|]$ | $T_{sg} = T_{n-1}(\frac{T_{n-1}}{T_{n-2}})(\frac{3+|K_p|}{4})$ |
| "1" | "1" | Forced Even | Neg. | $T_{sg} = \frac{T_{n-1}}{4}[3-2|K_p|]$ | $T_{sg} = T_{n-1}(\frac{T_{n-1}}{T_{n-2}})(\frac{3-2|K_p|}{4})$ |

To convert the above algorithms to the general form, substitute 4C for the numeral 3 wherever it occurs.

TABLE 5

| | | Conditions | | First Order Solution | Second Order Solution |
|---|---|---|---|---|---|
| $T_{n-1}$ | $T_{n-2}$ | $T_{n-1}$ "0" | $K_p$ | | |
| "0" | "0" | Even | Pos. | $T_{sg} = \frac{T_{n-1}}{2}[\frac{3+|K_p|}{2-|K_p|}]$ | $T_{sg} = \frac{1}{2}T_{n-1}(\frac{T_{n-1}}{T_{n-2}})[\frac{(2+|K_p|)(3+|K_p|)}{(2-|K_p|)^2}]$ |
| "0" | "0" | Odd | Neg. | | |
| "0" | "0" | Odd | Pos. | $T_{sg} = \frac{T_{n-1}}{2}[\frac{3-2|K_p|}{2+|K_p|}]$ | $T_{sg} = \frac{1}{2}T_{n-1}(\frac{T_{n-1}}{T_{n-2}})[\frac{(3-2|K_p|)(2-|K_p|)}{(2+|K_p|)^2}]$ |
| "0" | "0" | Even | Neg. | | |
| "1" | "0" | Forced Even | Neg. | $T_{sg} = \frac{T_{n-1}}{4}[3-2|K_p|]$ | $T_{sg} = T_{n-1}(\frac{T_{n-1}}{T_{n-2}})[\frac{(3-2|K_p|)(2+|K_p|)}{8}]$ |
| "1" | "0" | | | | |
| "1" | "0" | Forced Even | Pos. | $T_{sg} = \frac{T_{n-1}}{4}[3+|K_p|]$ | $T_{sg} = T_{n-1}(\frac{T_{n-1}}{T_{n-2}})[\frac{(2-|K_p|)(3+|K_p|)}{8}]$ |
| "1" | "0" | | | | |
| "0" | "1" | Odd | Pos. | $T_{sg} = \frac{T_{n-1}}{2}[\frac{3-2|K_p|}{2+|K_p|}]$ | $T_{sg} = T_{n-1}(\frac{T_{n-1}}{T_{n-2}})\frac{3-2|K_p|}{[2+|K_p|]^2}$ |
| "0" | "1" | Odd | Neg. | $T_{sg} = \frac{T_{n-1}}{2}[\frac{3+|K_p|}{2-|K_p|}]$ | $T_{sg} = T_{n-1}(\frac{T_{n-1}}{T_{n-2}})\frac{3+|K_p|}{[2-|K_p|]^2}$ |
| "1" | "1" | Forced Even | Pos. | $T_{sg} = \frac{T_{n-1}}{4}[3+|K_p|]$ | $T_{sg} = T_{n-1}(\frac{T_{n-1}}{T_{n-2}})(\frac{3+|K_p|}{4})$ |
| "1" | "1" | Forced Even | Neg. | $T_{sg} = \frac{T_{n-1}}{4}[3-2|K_p|]$ | $T_{sg} = T_{n-1}(\frac{T_{n-1}}{T_{n-2}})(\frac{3-2|K_p|}{4})$ |

To convert the above algorithms to the general form, substitute 4C for the numeral 3 wherever it occurs.

In the system in which the algorithm choice is governed by the conditions of Table 3, the $T_{n-1}$ odd-even flip flop serves the dual purpose of: keeping track of whether the 0 in the $T_{n-1}$ time slot was odd or even and if not a 0, the $T_{n-1}$ flip flop is forced to the even state, since any succeeding 0 following the 1 that must be present will, of course, be odd. Secondly, the $T_{n-1}$ flip flop, if it is odd and is a 1, is sensed in the search interval $T_n$ and the $K_p$ polarity latch is reversed using the $T_{n-1}$ flip flop as the gate function so that the proper reversal and sign to account for the difference in phase A or phase B "1's" will be taken account of.

Figure 30:
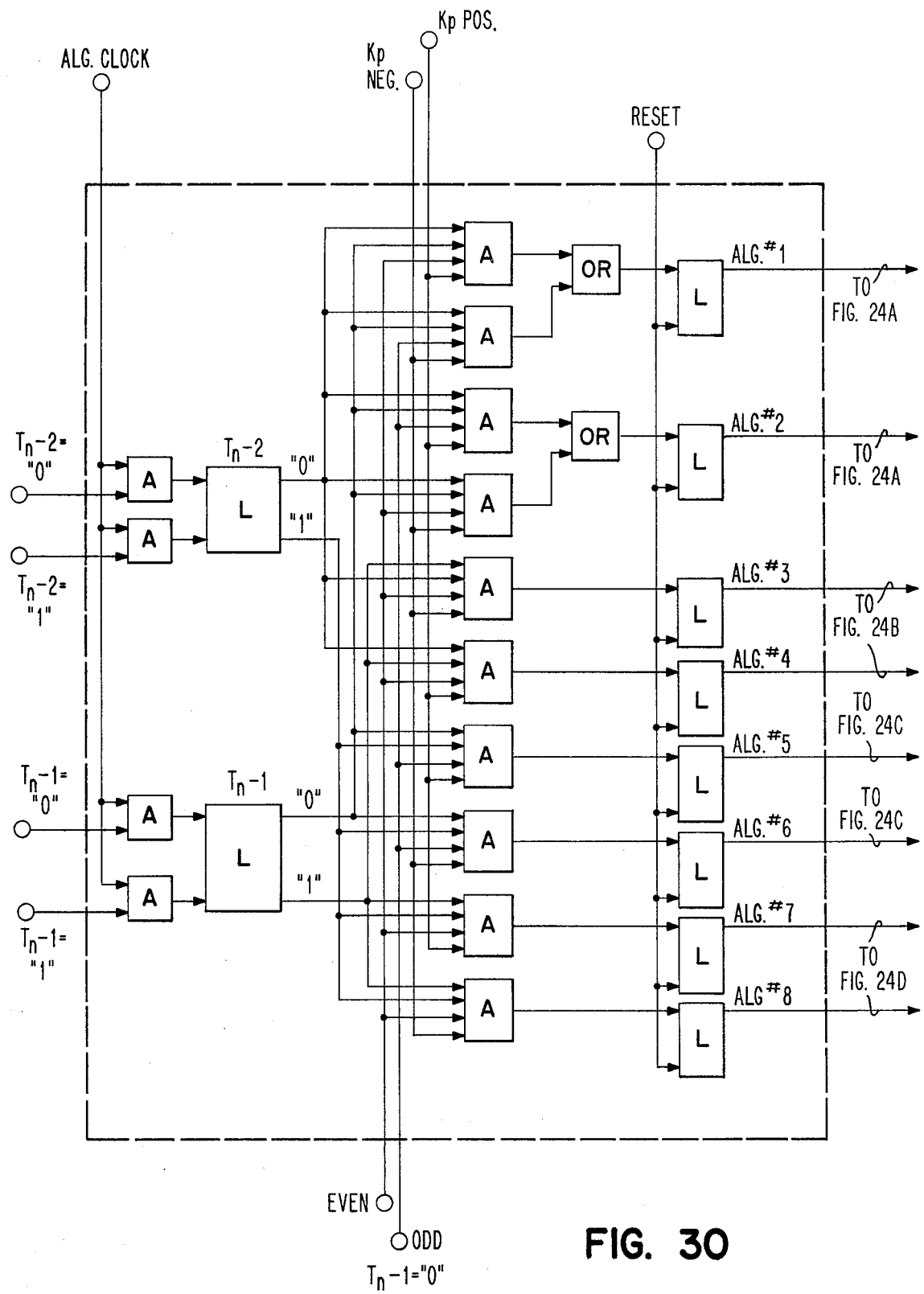
FIG. 30 illustrates, in functional flow chart form, the algorithm selector to be used in conjunction with the embodiment of FIGS. 22 and 26.

An actual logic diagram which would be built to utilize the single flip flop instead of two, has been illustrated in FIG. 26 using the indicator 176, the first odd-even indicator, connected by dashed lines to the algorithm selector 124A. It should be noted that a new selector circuit as in FIG. 30 is used to select the algorithm based on the new input conditions. The portion of FIG. 26, labeled block 300, would be eliminated in this modification, but otherwise the operation of the system is the same.

Returning momentarily to FIG. 25, it will be observed that a plurality of symbols which have a circle, a normally open switch, and a symbol Ⓢ in the circle, are shown at various points or on particular functional boxes in the flow chart of FIG. 25. The purpose of the S switches is to short out or logically disable the specific function illustrated or to connect or disconnect functions illustrated according to whether the switches are shown normally opened or closed. All of the normally open switches would be closed and all of the normally closed switches would be open to modify the diagram in FIG. 25 to illustrate a system which corrects for acceleration only without any correction for spread. Such systems might be used, for example, for magnetic stripe or card readers or for a communications channel in which spread might not be present.

One modification in FIG. 25 serves the dual purpose of also modifying the system for use with a single odd-even indicator and this is the S switch which shorts out the boxes which ask the question, "is the $T_{n-2}$ latch in the one state," and set the odd-even flip flop for the $T_{n-2}$ indicator to even state with the shift pulse. Therefore, FIG. 25 also illustrates, in functional form, the flow that is required for using a single odd-even indicator for both spread and acceleration systems combined, and for the acceleration system alone.

The system for spread correction alone has been shown in FIG. 21A. FIG. 25 would serve to do a spread correction alone and would be modified to follow the teaching of FIG. 21A, if this were desired, simply by omitting the terms that are utilized for acceleration. The resulting diagram would be essentially identical to that in FIG. 21A and hence, has not been shown here to avoid undue complications.

FIG. 21B illustrates that algorithm selector which would be utilized for a system such as in 21A, but for which it is desired to do acceleration and spread corrections. The algorithm selector portions of FIGS. 21A and 21B which lie between the boxes labeled A and C are intended to be inserted between the same boxes labeled A and C on FIG. 25 to complete it, in the event that it is desired to use the system described in FIG. 25 for spread only or for spread and acceleration combined corrections. Also, if it is desired in either of the flow charts in which spread and acceleration corrections are made, the improved formula for the computation of $K_p$ may be utilized.

Figures 4, 21A:
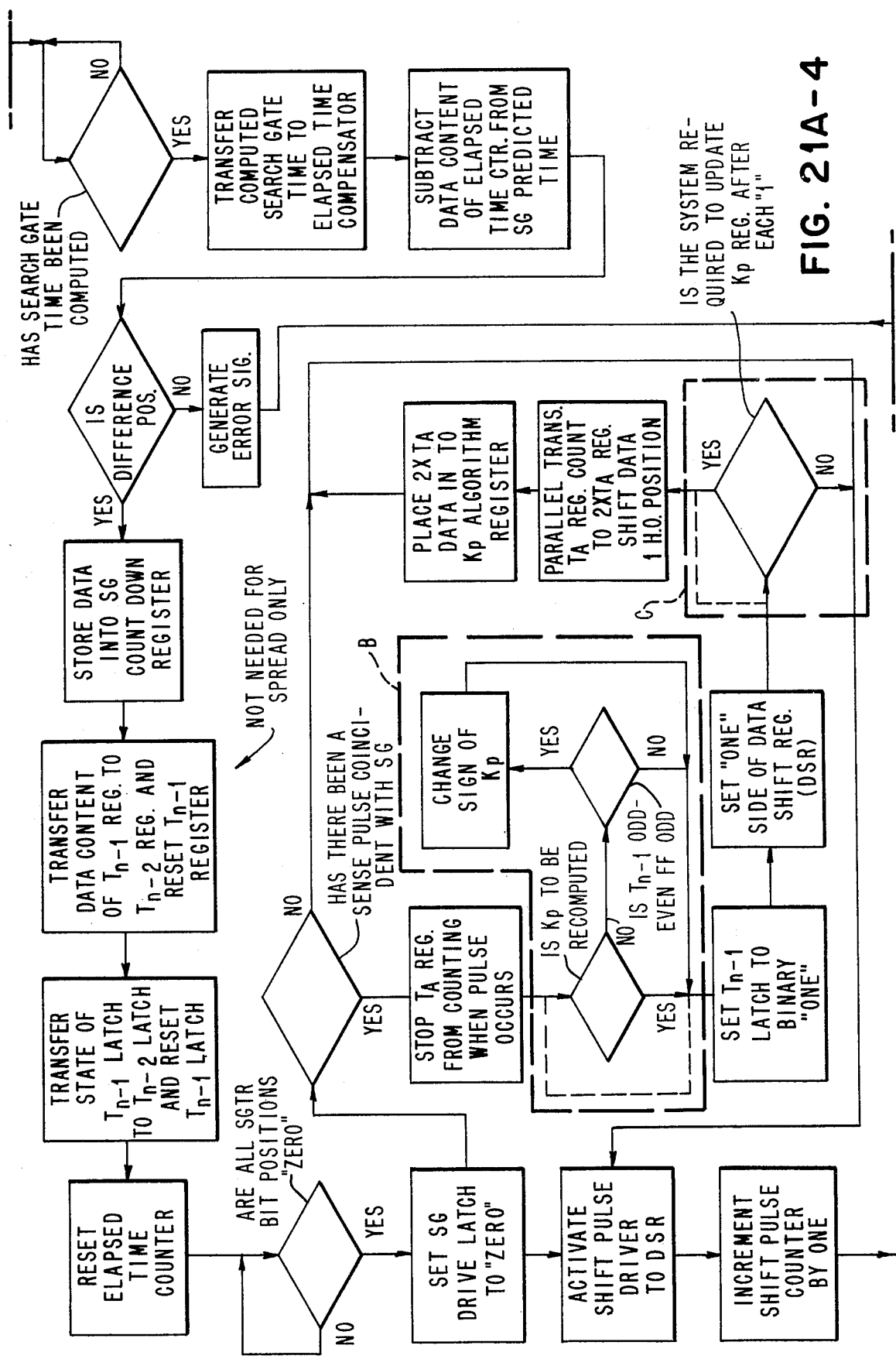
Figures 5, 21A:
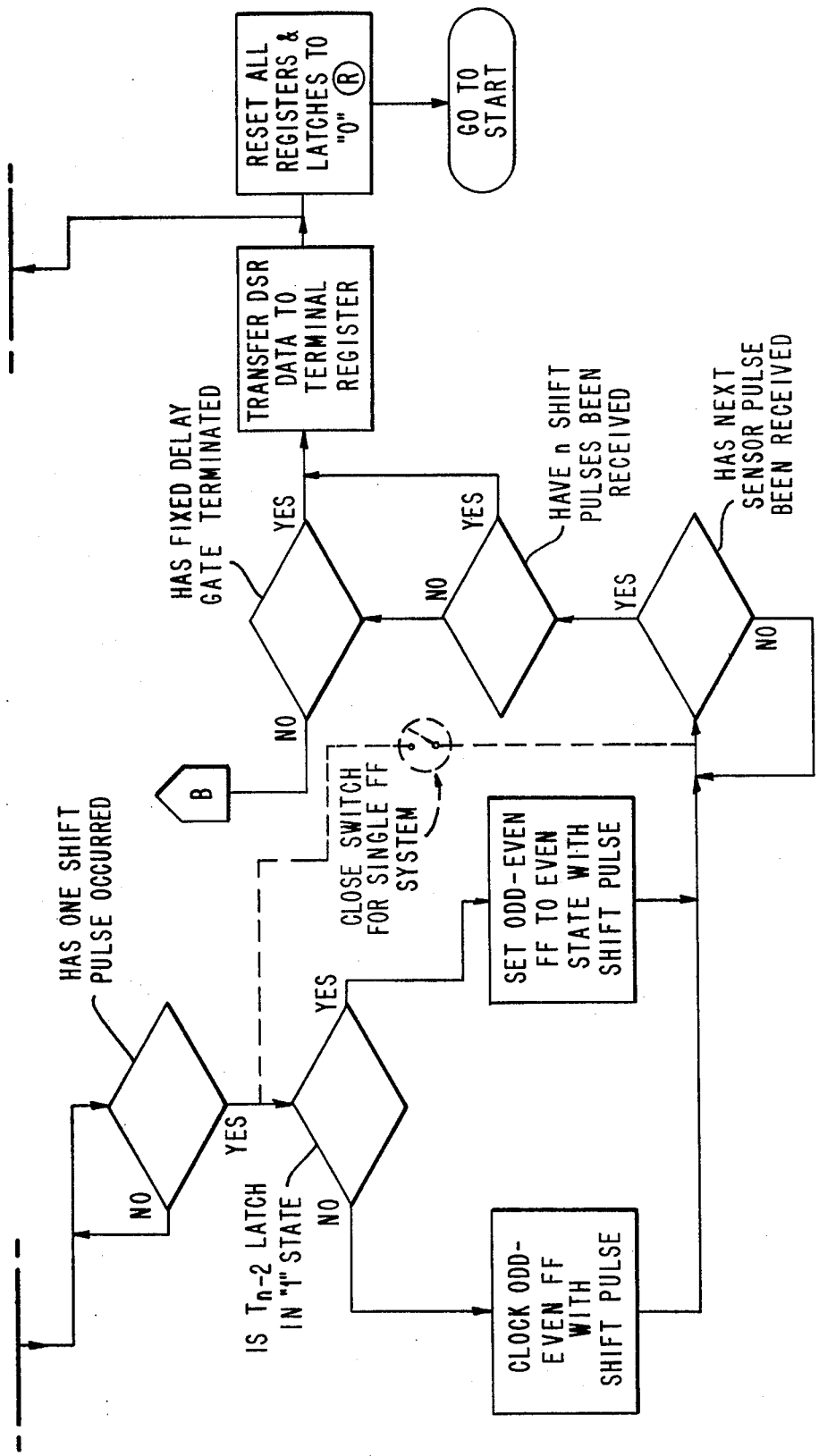
Figure 22B:
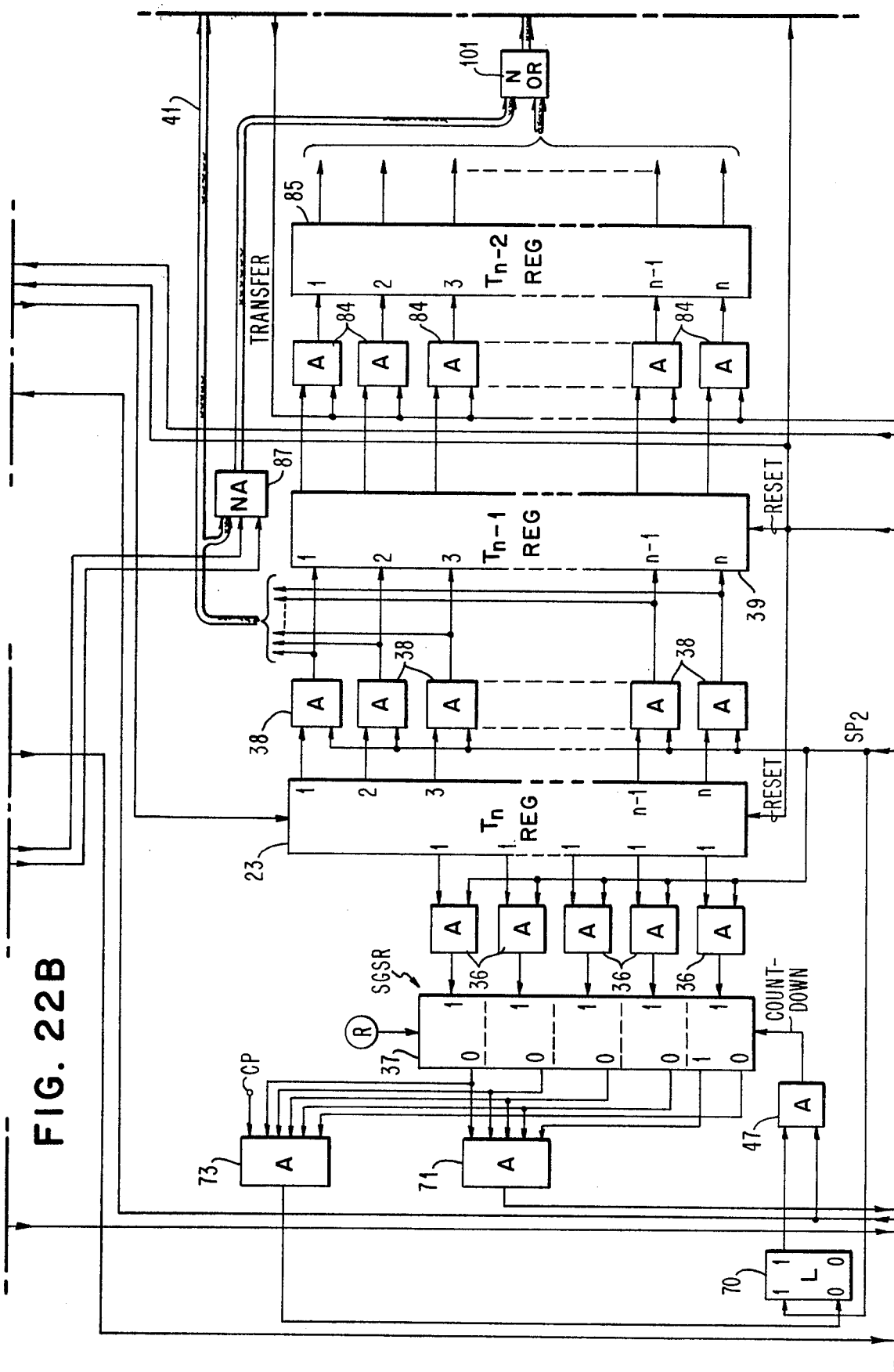
FIG. 22 illustrates a logic diagram for a preferred circuit embodiment of the invention.
Figure 22D:
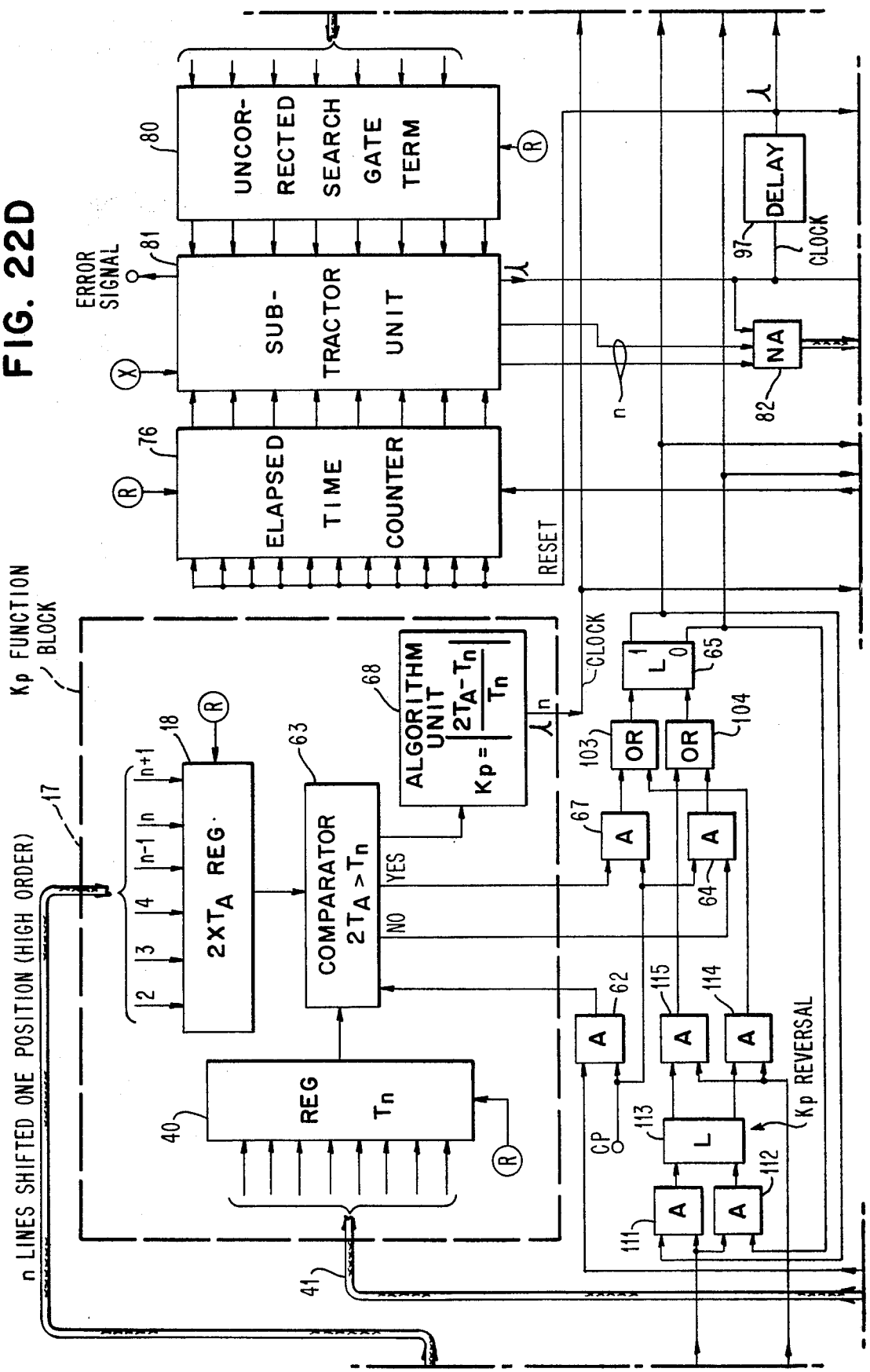
Figure 22E:
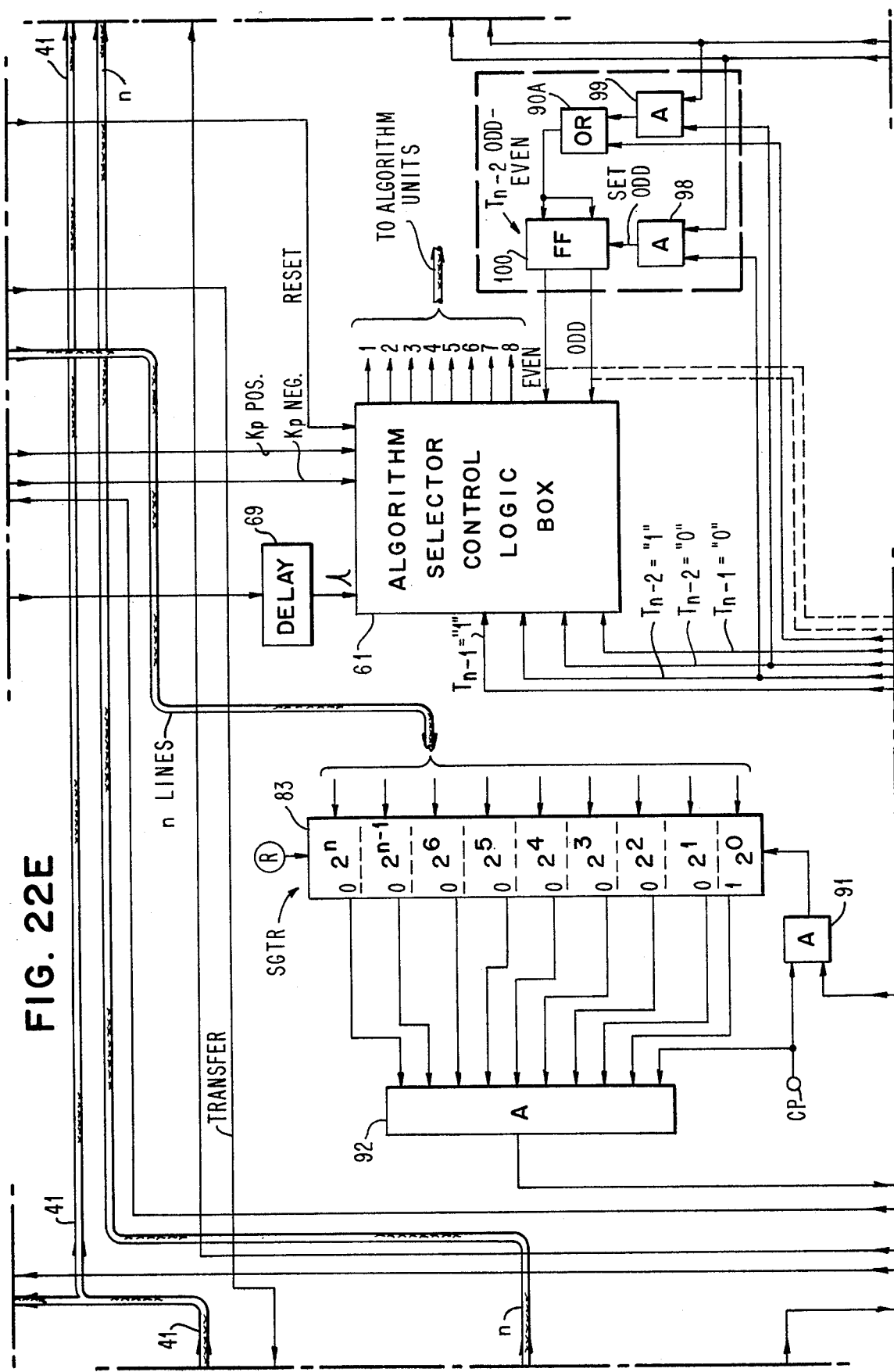
Figure 22F:
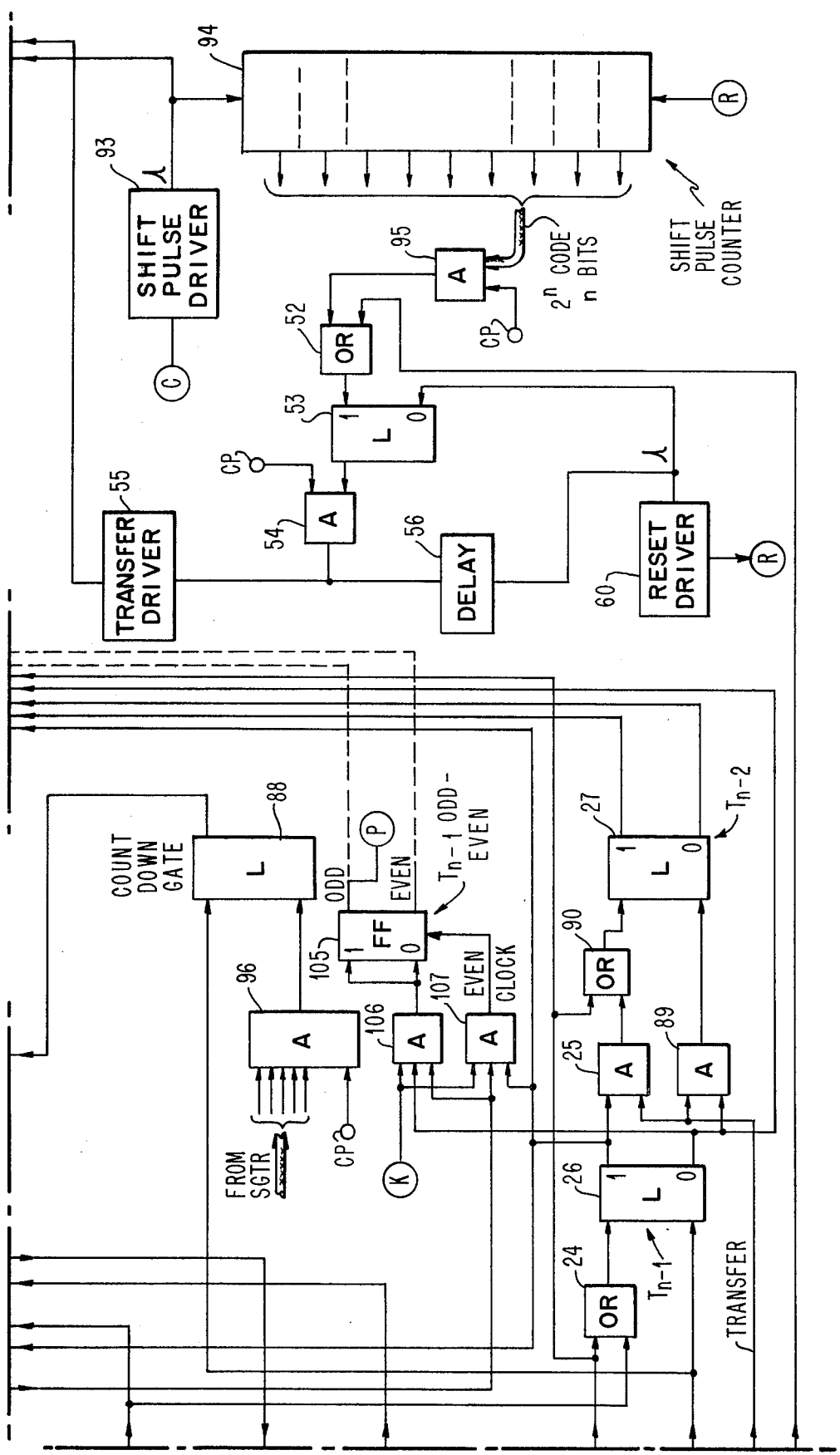
Figure 22G:
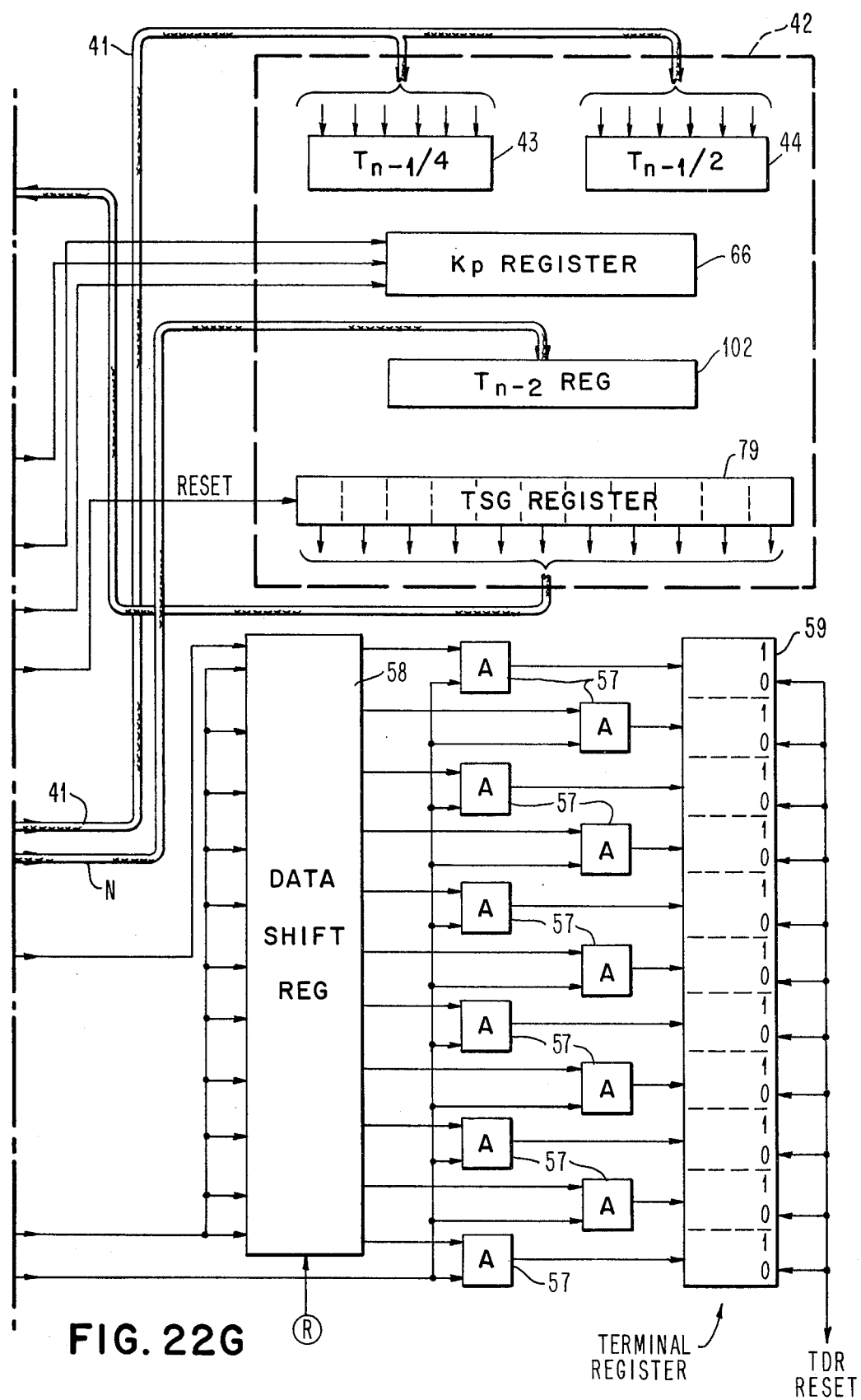
Figure 29B:
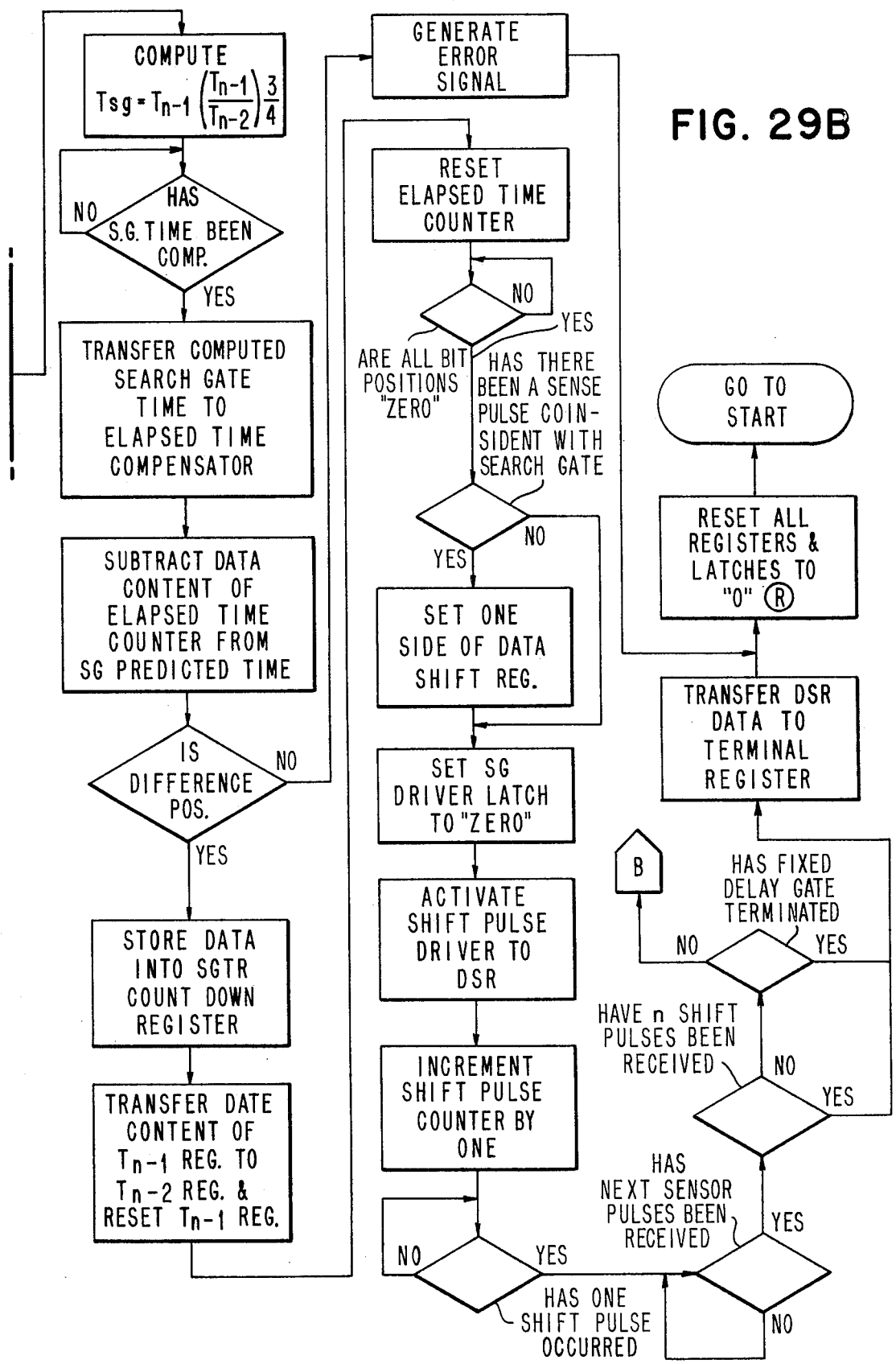
FIG. 29 illustrates a functional flow chart for a system such as in FIG. 25, but is for acceleration correction only.

FIG. 29 illustrates the functional flow chart for a system such as illustrated in FIG. 21, but modified from that shown in FIG. 21 so as to correct for acceleration effects alone. In this regard, FIG. 29 illustrates the flow chart for either system in FIG. 21 or in FIG. 25 modified for doing an acceleration correction alone.

FIG. 30 illustrates an algorithm selector circuit diagram for use with the logic diagrams of either FIG. 22 or FIG. 26 when it is desired to use a single odd-even indicator and, as has been pointed out previously, the logic diagrams of FIGS. 22 and 26 respectively have been modified with dashed lines in appropriate positions to show the changes that would be made to implement the use of a single odd-even indicator in combination with the algorithm selector shown in FIG. 30.

Figure 31:
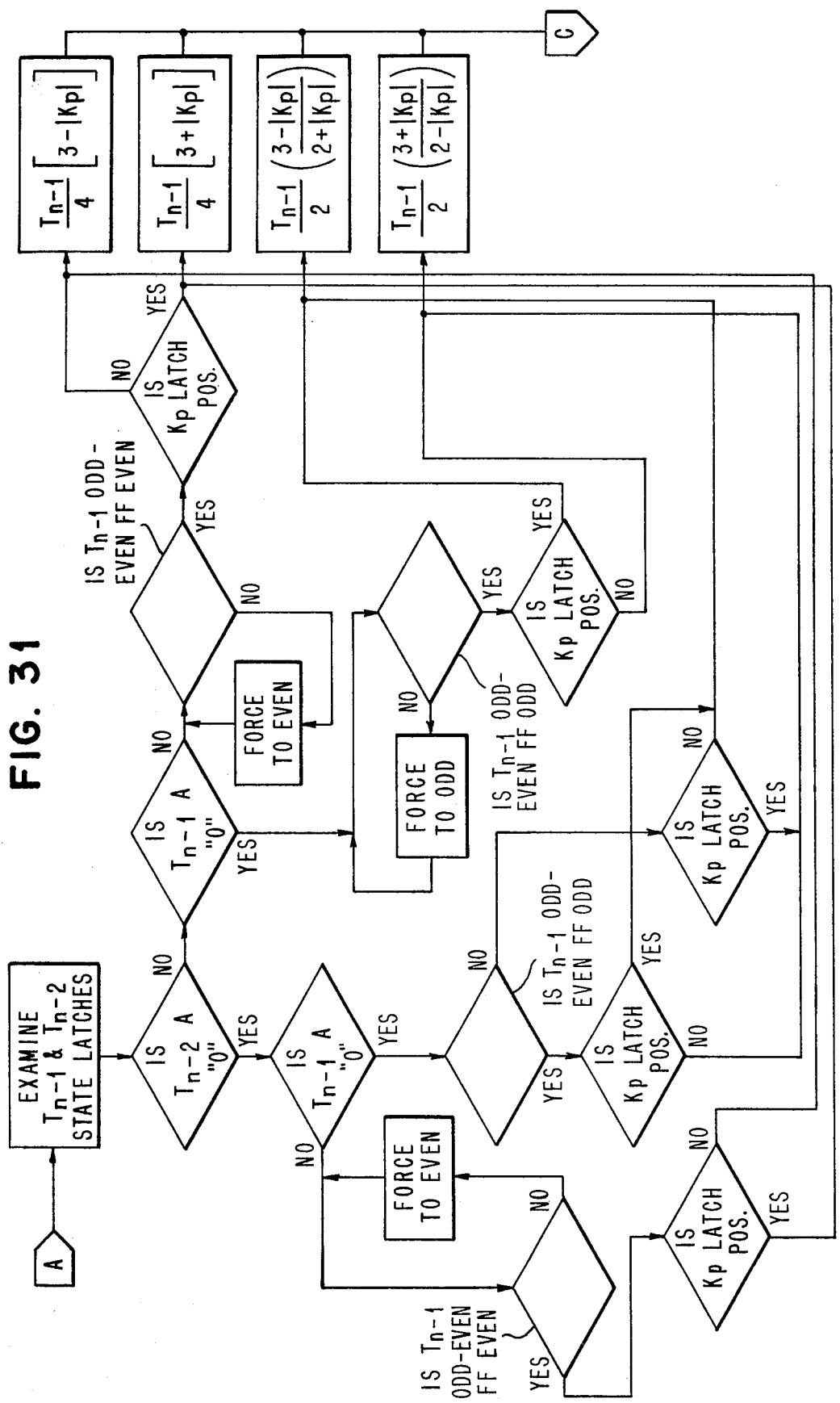
FIG. 31 illustrates, in functional flow chart form, the algorithm selector to be used in conjunction with the embodiment of FIGS. 21A and 25.
Figure 32:
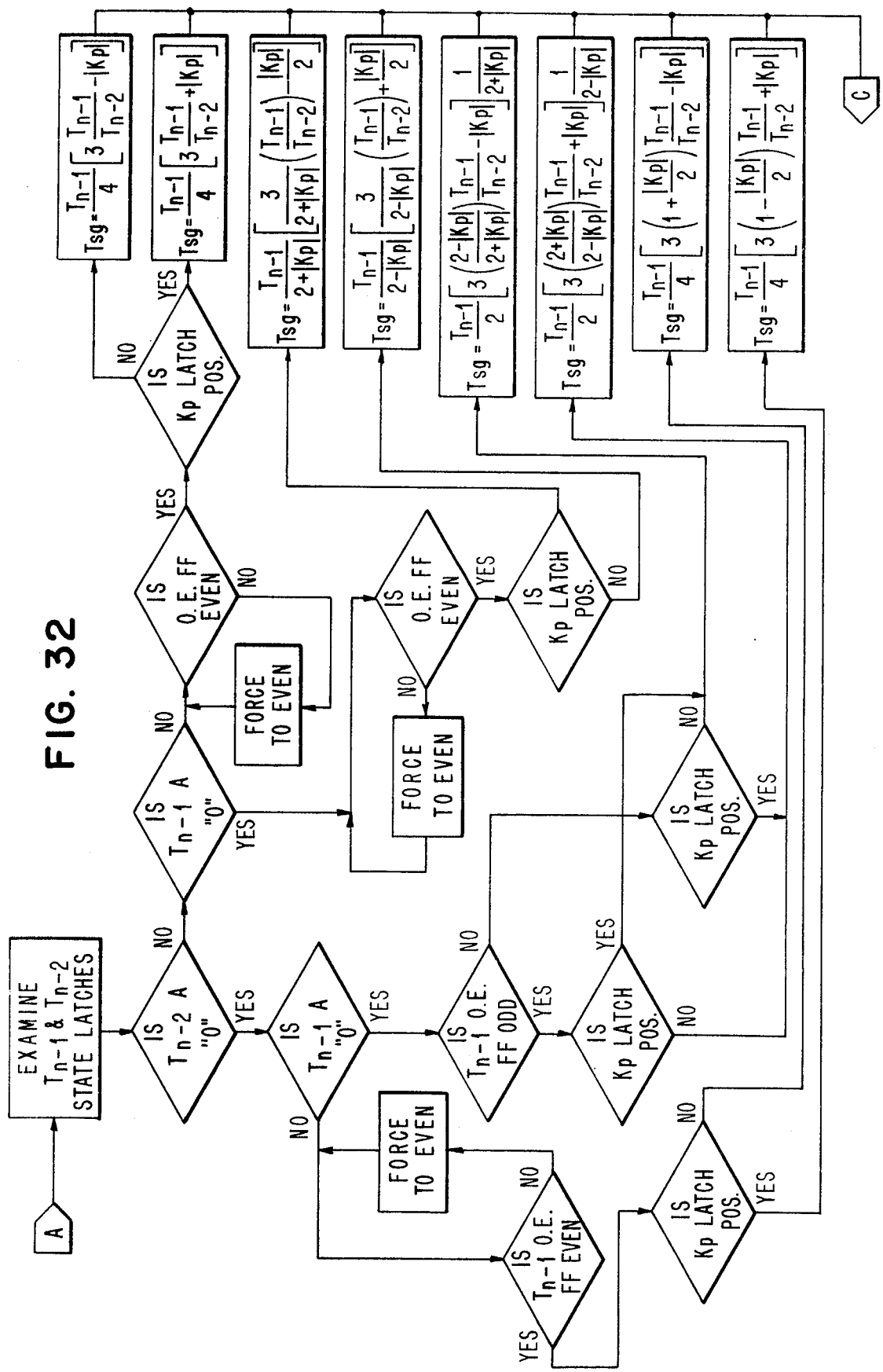
FIG. 32 illustrates, in functional flow chart form, the algorithm selector to be used in conjunction with the embodiment of FIG. 25 when modified to use a single odd-even indicator.

FIG. 31 illustrates a modification of the flow chart which would be required for FIG. 21A if it were desired to use a single odd-even indicator instead of two odd-even indicators as has been shown. In this regard, FIG. 31 illustrates the functional algorithm selection for a spread correction alone in a system using a single odd-even indicator.

Returning to FIG. 29, the diagram given is self-explanatory and serves to do the calculation for a predicted search gate using acceleration corrections alone and using the first two bits in the message. These bits may be either the preamble bit and the first bit of data, or two preamble bits. Hence, is essentially the basic system configuration for either the single or double preamble symbol embodiments. It should now be apparent that several systems have been detailed and discussed at length, all of which utilize the same basic factors in calculating what the search gate termination time should be, to accurately detect any transitions occurring in the central portion of an F2F code symbol, regardless of print spread or acceleration effects. Two systems have been described in which the flow diagram and method utilized correct for print spread $K_p$ alone. Two other systems have been described in which correction for acceleration alone can be accomplished. Fifth and sixth systems have been described and shown in which both acceleration and print spread can be accommodated, and in the sixth system, an improved version with a better calculation algorithm for $K_p$ has been utilized as a preferred embodiment. The seventh and eighth systems utilize the single odd-even indicator (the first odd-even indicator) and the same general algorithms as the fifth and sixth systems. They have also been described, discussed and shown in both logic embodiments, so that their implementation may be understood.

While flow diagrams for the spread only configurations and the acceleration only configurations are shown and explained, no corresponding completed logic diagrams have been shown. The reason for this is that, given the complete logic diagrams for making both spread and acceleration corrections, it is quite obvious, by following the proper flow diagram, to bypass or eliminate the unnecessary logic components from the combined spread and acceleration logic diagrams to yield spread only correction or acceleration only corrections for the search gate prediction using the algorithms developed and shown for those conditions.

All of these systems utilize the same basic discoveries and phenomenon, but do so in slightly different ways. The essential facts are that the width of a binary 1, absent acceleration, but given print spread, remains constant in an F2F code system. Secondly, as has been discussed above, the odd or even sequence of 0's following a binary 1, which may be of two different phases, affects whether the 0 will appear, given spread alone, to be wider or narrower than the ideal. A correction for acceleration is made wherever it is employed in the system, utilizing the essential fact that binary 1's remain of constant width and that, knowing what amount of print spread is present, the additional effects introduced by acceleration may be measured and utilized in calculating when a predicted search gate should occur. All of the algorithms developed stem from these basic facts and considerations and those algorithms developed cover all conditions of print spread and acceleration which may be experienced with F2F code symbols. As will be apparent to those of skill in the art, the choice of the particular embodiment to be utilized depends upon the operating characteristics of the reading system in which F2F code is to be utilized.

For example, given a hand wand hand held scanner approach, correction must be made for acceleration effects or reading will be totally inaccurate. If the code is a magnetic code, and the scanner or hand sensor is held in contact with the code bearing medium, little print spread, if any, will be experienced, although it should be understood by those of skill in the art that, by holding the hand scanner away from the magnetic print medium, an effective print spread will be introduced due to intersymbol interference. In a printed code system which would be optically scanned with such a wand or hand held scanner, the effect of print spread must be compensated for as well as acceleration effects.

In machine scanned or constant velocity scanned systems, the effect of print spread alone may be accounted for since acceleration effects can be reduced or controlled so as not to create difficulties.

It will be apparent that what has been described is a truly universal F2F code reading method and apparatus which can handle either optical or magnetic code systems with print spread and acceleration, or either individually. It is also apparent that a whole new system need not be constructed to employ this invention. For example, in given systems which have already built a sensor and an amplifier, etc., to produce the F2F signal transitions as a record bearing medium is scanned, or F2F data is received from a communications medium, one need only build the circuitry of the appropriate logic diagram from the present invention, attach it to the output of the sense amplifier, and let the output of the circuit so produced be the code output to a using system. This is to say, that the present invention as an F2F code reading and interpreting system and apparatus, stands alone and apart and may be plugged in at will to existing systems with full effect.

While the present invention has been illustrated in several preferred embodiments to show typical modifications which can be made in the implementation of the invention, it will be appreciated by those of skill in the art that varius departures from the specific implementations may be made which will still embody the basic method and technique and will utilize the same general algorithms which have been developed. To that end, therefore, the claims which follow are intended not to be limited to the specific nature of the circuit embodiments described herein.

What is claimed is:

1. A method of initiating correct decoding of spread or acceleration distorted F2F encoded data messages which are received in a distorted form at decoding apparatus from a communications channel or from record media scanning apparatus, each said F2F encoded data message comprising one or more bits of data and at least one preamble symbol, each said preamble symbol being composed of two 1F frequency machine sensible optic, magnetic or electrical signal transitions and one 2F frequency machine sensible optic, magnetic or electric signal transition located between said two 1F frequency signal transitions, said preamble symbol having an undistortable characteristic with respect to spreading distortion and a separate, distortable characteristic with respect to spreading distortion, said initiating method comprising the steps of:

measuring said undistortable characteristics of said received preamble symbol signals by measuring the interval between said two 1F frequency signal transitions, and;

controlling the duration of searching for a 2F frequency signal in the succeeding data message bit cells in proportion to the results of said measurement of said preamble symbol.

2. A method of initiating correct decoding of spread or acceleration distorted F2F encoded data messages which are received in a distorted form at decoding apparatus from a communications channel or from record media scanning apparatus, each said F2F encoded data message comprising one or more bits of data and at least two preamble symbols, each said preamble symbols being composed of two 1F frequency machine sensible optic, magnetic or electric signal transitions and one 2F frequency machine sensible optic, magnetic or electric signal transition located between said two 1F frequency signal transitions, said preamble symbols having an undistortable characteristic with respect to spreading distortion and a separate, distortable chatacteristic with respect to spreading distortion, said initiating method comprising the steps of:

measuring said undistortable characteristics of said received preamble symbol signals by measuring the intervals between said two 1F frequency signal transitions, and controlling the duration of searching for a 2F frequency signal in the succeeding data message bit cells in proportion to the ratio of said measurement of said first preamble symbol squared to said measurement of said second preamble symbol obtained in said measuring step.

3. In an F2F coded data system, in which the time periods or widths between signal transitions corresponding to the two frequencies originally used to encode the data may be distorted by acceleration, when received at a decoder, so as to exhibit their single transition points spaced at other than the original frequency transition spacing or times, a method of interpreting said distorted F2F coded data to extract therefrom its correct digital content whenever each multibit data block is preceded by at least a binary "1" preamble or first symbol having two double frequency time slots, or nominal half-symbol widths, by predicting and controlling the duration of a search for any double frequency signal transitions occurring intermediate the single frequency symbol boundary transitions, comprising steps of:

a. measuring the width of said first symbol and, when said measurement is completed, storing said measurement in a first and a second storage and indicating a data sensing time measurement and reinitiating said symbol width measurement for the next succeeding symbol;

b. predicting an ideal length for said data sensing time measurement according to the following algorithm:

$$T_{sg} = T_{n-1}[\frac{T_{n-1}}{T_{n-2}}] \times C,$$

where C is a variable coefficient arbitrarily chosen from the range of 0.5 to 1.0 and being optimum at $C = \frac{3}{4}$, $T_{sg}$ is said ideal length for said data sensing time measurement, $T_{n-1}$ is said first stored width measurement, $T_{n-2}$ is said second stored width measurement;

c. replacing the content of said second storage with the content of said first storage;

d. terminating said data sensing time measurement when it equals said ideal predicted length and, if a signal transition was detected during said data sensing time measurement period, entering a "one" into a data register and if no transition occurred during said data sensing time period, entering a "zero" into said data register;

e. terminating said reinitiated symbol width measurement following the termination of said data sensing time period at the next occurring signal transition and storing said measurement in said first storage, reinitiating said data sensing time measurement and said symbol width measurement and returning to step b).

4. In an F2F coded data system, in which the time periods or widths between signal transitions corresponding to the two frequencies originally used to encode the data may be distorted by acceleration, when received at a decoder, so as to exhibit their signal transition points spaced at other than the original frequency transition spacing or times, a method of interpreting said distorted F2F coded data to extract therefrom its correct digital content whenever each multibit data block is preceded by at least two binary "1" preamble or first symbols having two double frequency time slots, or nominal half-symbol widths, by predicting and controlling the duration of a search for any double frequency signal transitions occurring intermediate the single frequency symbol boundary transitions, comprising steps of:

a. measuring the width of said first symbol and storing said measurement in a second storage;

b. reinitiating said symbol width measurement for said second symbol;

c. storing said last reinitiated symbol width measurement in a first storage, and initiating a data sensing time measurement;

d. predicting an ideal length for said data sensing time measurement according to the following algorithm:

$$T_{sg} = C \times T_{n-1}[\frac{T_{n-1}}{T_{n-2}}]$$

where C is a variable coefficient arbitrarily chosen from the range 0.5 to 1.0 and being optimum at $C = \frac{3}{4}$, $T_{sg}$ is said ideal predicted length for said data sensing time measurement, $T_{n-1}$ is said first storage measurement, and $T_{n-2}$ is said second strorage measurement;

e. terminating said data sensing time measurement when it is equal to said ideal length of said data sensing time measurement predicted according to said algorithm and, if a signal transition was sensed during said data sensing time period, entering a one into a data register but, if no transitions occur during said data sensing time period, entering a zero into said data register;

f. replacing the content of said second storage with the content of said first storage and terminating and reinitiating said symbol width measurement at the next signal transition following said termination of said data sensing time and resuming operation at step c).

5. In an F2F coded data system, in which the time periods or widths between signal transitions corresponding to the two frequencies originally used to encode the data may be distorted by spread, when received at a decoder, so as to exhibit their signal transition points spaced at other than the original frequency transition spacing or times, a method of interpreting said distorted F2F coded data to extract therefrom its correct digital content whenever each multibit data block is preceded by at least a binary "1" preamble or first symbol having two double frequency time slots, or nominal half-symbol widths, by predicting and controlling the duration of a search for any double frequency signal transitions occurring intermediate the single frequency symbol boundary transitions, comprising steps of:

a. measuring the width of either of the two time slots in said first symbol;

b. measuring the total width of said first symbol and, after said measurement is completed, initiating a data sensing time measurement and reinitiating step b) for the next succeeding symbol;

c. setting a first and a second indicator to a binary "1" state;

d. doubling the measurement of said time slot;

e. dividing the difference between said doubled time slot measurement and said symbol width measurement by said symbol width measurement;

f. assigning an algebraic sign to the quotient resulting from said step e) said sign being positive if said doubled time slot measurement is greater than said symbol width measurement and being negative if said doubled time slot measurement is less than said symbol width measurement when said time slot measurement is made of the first time slot in said symbol, and said signs being the opposite when said time slot measurement is made of the second time slot of said symbol;

g. examining the state of said first indicator and if said first indicator is then in the "zero" state, setting an odd-even indicator to the opposite of whichever state it is then in, but if said first indicator is then in the "one" state, setting said odd-even indicator to the even state;

h. selecting an algorithm and predicting an ideal length for said data sensing time measurement, said algorithm being chosen from the following:

$$T_{sg} = \frac{T_{n-1}}{4} [4C - |K_p|], \quad (a)$$

$$T_{sg} = \frac{T_{n-1}}{4} [4C + |K_p|], \quad (b)$$

-continued $$T_{sg} = \frac{T_{n-1}}{2} [\frac{4C - |K_p|}{2 + |K_p|}], \text{ or} \quad (c)$$

$$T_{sg} = \frac{T_{n-1}}{2} [\frac{4C + |K_p|}{2 - |K_p|}] \quad (d)$$

where C is a variable coefficient arbitrarily chosen from the range 0.5 to 1.0 and being optimum at C = ¾, $T_{sg}$ is the predicted ideal length for said data sensing time, $T_{n-1}$ is the last symbol width measurment, and $K_p$ is the absolute value of said quotient, and said algorithm (a), (b), (c), or (d) is selected according to the following criteria: if the state of both said first and said second indicators is a "one" and said odd-even indicator is even, and the sign of said quotient is negative, select algorithm (a); if the state of both of said first and second indicators is a "one" and said odd-even indicator is even, and the sign of said quotient is positive, select algorithm (b); if the state of said second indicator is a "one" and the state of said first indicator is a "zero" and said odd-even indicator is odd, and the sign of said quotient is positive, select algorithm (c); if the state of said second indicator is a "one" and the state of said first indicator is a "zero" and said odd-even indicator is odd, and the sign of said quotient is negative, select algorithm (d); if the state of both said second indicator and said first indicator is a "zero" and the state of said odd-even indicator is odd and the sign of said quotient is positive, select algorithm (c); if the state of both said second indicator and said first indicator is a "zero" and the state of said odd-even indicator is odd and the sign of said quotient is negative, select algorithm (d); if the state of both said first and second indicators is "zero" and the state of said odd-even indicator is even and the sign of said quotient is positive, select algorithm (d); if the state of both said first and second indicators is "zero" and the state of said odd-even indicator is even and the sign of said quotient is negative, select algorithm (c); if the state of said second indicator is a "zero" and the state of said first indicator is a "one" and the state of said odd-even indicator is even and the sign of said quotient is positive, select algorithm (b); if the state of said second indicator is a "zero" and the state of said first indicator is a "one" and the state of said odd-even indicator is even and the sign of said quotient is negative, select algorithm (a);

i. replacing the state of said second indicator with the state of said first indicator;

j. terminating said data sensing time measurement when it equals said predicted ideal length resulting from the use of said algorithm and, if a signal transition was detected during said data sensing time measurement period, setting said first indicator to a binary "1", entering a "one" into a data register, and examining the state of said odd-even indicator, and if it is odd, changing the sign of said quotient, but if no signal transition occurred during said data sensing time period, entering a "zero" into said data register and setting said first indicator to a binary "0";

k. terminating said symbol width measurement and reinitiating said symbol width measurement and reinitiating said data sensing time measurement at the next signal transition following the termination of said data sensing time measurement period, and resuming operation at step g).

6. In an F2F coded data system, in which the time periods or widths between signal transitions corresponding to the two frequencies originally used to encode the data may be distorted by spread, when received at a decoder, so as to exhibit their signal transition points spaced at other than the original frequency transition spacing or times, a method of interpreting said distorted F2F coded data to extract therefrom its correct digital content whenever each multibit data block is preceded by at least a binary "1" preamble or first symbol having two double frequency time slots, or nominal half-symbol widths, by predicting and controlling the duration of a search for any double frequency signal transitions occurring intermediate the single frequency symbol boundary transitions, comprising steps of:

a. measuring the width of either of the two time slots in said first symbol;

b. measuring the width of said first symbol and, after said measurement is completed, initiating a data sensing time measurement and reinitiating steps a) and b) for the next succeeding symbol;

c. setting a first and a second indicator to a binary "1" state and an odd-even indicator to the "even" state;

d. doubling the measurement made of said time slot;

e. examining the state of said first indicator and, if it is in the binary "1" state, dividing the difference between said doubled time slot measurement and said symbol width measurement by said symbol width measurement;

f. assigning an algebraic sign to the quotient resulting from step e), said sign being positive if said doubled time slot measurement is greater than said symbol width measurement and negative if said doubled time slot measurement is less than said symbol width measurement when said time slot measurement is made of the first time slot in said symbol, and said signs being the opposite when said time slot measurement is made of the second time slot of said symbol;

g. selecting an algorithm and predicting an ideal length for said data sensing time measurement, said algorithm being selected from the following:

$$T_{sg} = \frac{T_{n-1}}{4} [4C - |K_p|],  \quad (a)$$

$$T_{sg} = \frac{T_{n-1}}{4} [4C + |K_p|], \quad (b)$$

$$T_{sg} = \frac{T_{n-1}}{2} [\frac{4C - |K_p|}{2 + |K_p|}], \text{ or} \quad (c)$$

$$T_{sg} = \frac{T_{n-1}}{2} [\frac{4C + |K_p|}{2 - |K_p|}] \quad (d)$$

where C is a variable coefficient arbitrarily chosen from the range 0.5 to 1.0 and being optimum at C = ¾, $T_{sg}$ is the predicted ideal length for said data sensing time, $T_{n-1}$ is the last said symbol width measurement and $K_p$ is the absolute value of said quotient, and said algorithm (a), (b), (c), or (d) is selected according to the following criteria: if the state of both said first and said second indicators in a "one" and said odd-even indicator is even, and the sign of said quotient is negative, select algorithm (a); if the state of both of said first and second indicators is a "one" and said odd-even indicator is even, and the sign of said quotient is positive, select algorithm (b); if the state of said second indicator is a "one" and the state of said first indicator is a "zero" and said odd-even indicator is odd, and the sign of said quotient is positive, select algorithm (c); if the state of said second indicator is a "one" and the state of said first indicator is a "zero" and said odd-even indicator is odd, and the sign of said quotient is negative, select algorithm (d); if the state of both said second indicator and said first indicator is a "zero" and the state of said odd-even indicator is odd and the sign of said quotient is positive, select algorithm (c); if the state of both said second indicator and said first indicator is a "zero" and the state of said odd-even indicator is odd and the sign of said quotient is negative, select algorithm (d); if the state of both said first and second indicators is "zero" and the state of said odd-even indicator is even and the sign of said quotient is positive, select algorithm (d); if the state of both said first and second indicators is "zero" and the state of said odd-even indicator is even and the sign of said quotient is negative, select algorithm (c); if the state of said second indicator is a "zero" and the state of said first indicator is a "one" and the state of said odd-even indicator is even and the sign of said quotient is positive, select algorithm (b); if the state of said second indicator is a "zero" and the state of said first indicator is a "one" and the state of said odd-even indicator is even and the sign of said quotient is negative, select algorithm (a);

h. replacing the state of said second indicator with the state of said first indicator;

i. terminating said data sensing time measurement when it is equal to the predicted ideal length resulting from the use of said selected algorithm and, if a signal transition was detected during said data sensing time measurement period, terminating or initiating said reinitiated measurement of said time slot, as appropriate for measuring either time slot being measured, setting said first indicator to a binary "1" and entering a one into a data register, and, at the next signal transition, terminating said reinitiated symbol width measurement, reinitiating said data sensing time measurement and reinitiating or terminating said time slot measurement as appropriate for measuring either time slot being measured, and reinitiating said symbol width measurement, and setting said odd-even indicator to the even state, and resuming operation at step d), but if no transition signal was detected during said data sensing time measurement period, entering a "zero" into said data register, setting said first indicator to a binary "0", setting said odd-even indicator to the opposite state to that it is then in, and, at the next signal transition, terminating said reinitiated symbol width measurement, reinitiating steps a) and b) and said data sensing time measurement and resuming operation with step g).

7. In an F2F coded data system, in which the time periods or widths between signal transitions corresponding to the two frequencies originally used to encode the data may be distorted by spread, when received at a decoder, so as to exhibit their signal transition points spaced at other than the original frequency transition spacing or times, a method of interpreting said distorted F2F coded data to extract therefrom its correct digital content whenever each multibit data block is preceded by at least two binary "1" preamble or first symbols having two double frequency time slots, or nominal half-symbol widths, by predicting and controlling the duration of a search for any double frequency signal transitions occurring intermediate the single frequency symbol boundary transitions, comprising steps of:

a. measuring the width of both of said preamble symbols;
b. setting a first and a second indicator to a binary "1" state;
c. measuring either one of the two time slots in either of said first two symbols, and, at the end of said second symbol, initiating a data sensing time measurement, and reininitating said symbol width measurement;
d. dividing said time slot measurement by said symbol width measurement corresponding to the symbol in which said time slot measurement was made and subtracting therefrom said second symbol width measurement divided by the sum of said first symbol width and said second symbol width and doubling the result, to yield a spread correction factor, but if said time slot measurement was made in the second time slot of either of said symbols, subtracting instead one said first symbol width measurement divided by the sum of said first symbol and said second symbol and doubling the result, to yield a spread correction factor;
e. assigning an algebraic positive or negative sign to said resulting spread correction factor, said sign being positive if said doubled time slot measurement divided by said symbol width is greater than and negative if it is less than said either symbol width divided by the sum of said second symbol width and said first symbol width and if said time slot measurement was made in the first time slot of either said symbol, but said signs being the opposite when said time slot measurement is made in the second time slot of either of said symbols;
f. examining the state of said first indicator, and if it is in the binary "1" condition, setting an odd-even indicator to the even state, but if said first indicator is not in the binary "1" state, setting said odd-even indicator to the opposite of whichever state it is then in;
g. selecting an algorithm and predicting an ideal length for said data sensing time measurement, said algorithm being chosen from the following:

$$T_{sg} = \frac{T_{n-1}}{2} \left[ \frac{4C + |K_p|}{2 - |K_p|} \right] \quad (a)$$

$$T_{sg} = \frac{T_{n-1}}{2} \left[ \frac{4C - |K_p|}{2 + |K_p|} \right] \quad (b)$$

$$T_{sg} = \frac{T_{n-1}}{4} \left[ 4C - |K_p| \right] \quad (c)$$

$$T_{sg} = \frac{T_{n-1}}{4} \left[ 4C + |K_p| \right] \quad (d)$$

where C is a variable coefficient arbitrarily chosen from the range 0.5 to 1.0 and being optimum at C = ⅜, $T_{sg}$ is the predicted ideal length for said data sensing time period, $T_{n-1}$ is the last symbol width measurement made, and $K_p$ is the absolute value of the result computed in step d) and said algorithm (a), (b), (c), or (d) is selected according to the following criteria; if said first and second indicators are both in the zero state, said odd-even indicator is in the odd state and the sign of $K_p$ is positive or if the state of said odd-even indicator is even and the sign of $K_p$ is negative or if the state of said first indicator is zero and of said second indicator is one and said odd-even indicator is odd, and the sign of $K_p$ is positive, choose algorithm (b); if the state of said first and said second indicators is zero and the state of said odd-even indicator is even and the sign of $K_p$ is positive or if the sign of said odd-even indicator is odd and the sign of $K_p$ is negative or if the state of said first indicator is zero and the state of said second indicator is one and said odd-even indicator is odd, and the sign of said $K_p$ is negative, choose algorithm (a); if the state of said first indicator is a one and of said second indicator is a zero and of said odd-even indicator is even and the sign of $K_p$ is negative or if the state of said first indicator is one and the state of said second indicator is one, and said odd-even indicator is even, and the sign of $K_p$ is negative, choose algorithm (c); if the state of said first indicator is a one and the state of said second indicator is a zero, the sign of said odd-even indicator is even and the sign of said $K_p$ is positive or if the state of said first indicator is a one and the state of said second indicator is a one, and said odd-even indicator is even, and the sign of said $K_p$ is positive, choose algorithm (d);

h. replacing the state of said second indicator with the state of said first indicator;
i. terminating said data sensing time measurement when it equals said predicted ideal length for said time measurement resulting from step g) and, if another signal transition was detected during said data sensing time period, setting said first indicator to a binary "1", entering a one into a data register, and examining the state of said odd-even indicator and if said odd-even indicator is in the odd state, changing the sign of said spread correction factor as was assigned to said factor in step e), and, at the next occurring signal transition, terminating said symbol width measurement and reinitiating said symbol width measurement for the next succeeding symbol, and resuming operation with step f), but if no other signal transition was detected during said data sensing time period, terminating said symbol width measurement at the next signal transition occurring after the termination of said data sensing time period, entering a zero into a data register, and setting said first indicator to a binary "0", reinitiating said symbol width measurement for the next succeeding symbol, and returning to step f).

8. In an F2F coded data system, in which the time periods or widths between signal transitions corresponding to the two frequencies originally used to encode the data may be distorted by spread, when received at a decoder, so as to exhibit their signal transition points spaced at other than the original frequency transition spacing or times, a method of interpreting said distorted F2F coded data to extract therefrom its correct digital content whenever each multibit data block is preceded by at least a binary "1" preamble or first symbol having two double frequency time slots, or nominal half-symbol widths, by predicting and controlling the duration of a search for any double frequency signal transition occurring intermediate the single frequency symbol boundary transition, comprising steps of:

a. measuring the width of either of the two time slots in said first symbol;
b. measuring the width of said first symbol and, after said measurement is completed, initiating a data sensing time measurement and reinitiating steps a) and b) for the next succeeding symbol;

c. setting a first and a second indicator to a binary "1" state and a second odd-even indicator to the "even" state;
d. doubling the measurement made of said time slot;
e. examining the state of said first indicator and, if it is in the binary "1" state, dividing the difference between said doubled time slot measurement and said symbol width measurement by said symbol width measurement;
f. assigning an algebraic sign to the quotient resulting from step e), said sign being positive if said doubled time slot measurement is greater than said symbol width measurement and negative if said doubled time slot measurement is less than said symbol width measurement when said time slot measurement is made of the first time slot in said symbol, and said signs being the opposite when said time slot measurement is made of the second time slot of said symbol;
g. selecting an algorithm and predicting an ideal length for said data sensing time measurement, said algorithm being selected from the following:

$$T_{sg} = \frac{T_{n-1}}{4}[4C - |K_p|], \quad (a)$$

$$T_{sg} = \frac{T_{n-1}}{4}[4C + |K_p|], \quad (b)$$

$$T_{sg} = \frac{T_{n-1}}{2}[\frac{4C - |K_p|}{2 + |K_p|}], \text{ or} \quad (c)$$

$$T_{sg} = \frac{T_{n-1}}{2}[\frac{4C + |K_p|}{2 - |K_p|}] \quad (d)$$

where C is a variable coefficient arbitrarily chosen from the range 0.5 to 1.0 and being optimum at C = ¾, $T_{sg}$ is the predicted ideal length for said data sensing time, $T_{n-1}$ is the last said symbol width measurement and $K_p$ is the absolute value of said quotient, and said algorithm (a), (b), (c), or (d) is selected according to the following criteria: if the state of both said first and said second indicators is a "one" and the sign of said quotient is negative, select algorithm (a); if the state of both of said first and second indicators is a "one" and the sign of said quotient is positive, select algorithm (b); if the state of said second indicator is a "one" and the state of said first indicator is a "zero" and the sign of said quotient is positive, select algorithm (c); if the state of said second indicator is a "one" and the state of said first indicator is a "zero" and the sign of said quotient is negative, select algorithm (d); if the state of both said second indicator and said first indicator is a "zero" and the state of said second odd-even indicator is odd and the sign of said quotient is positive, select algorithm (d); if the state of both said second indicator and said first indicator is a "zero" and the state of said second odd-even indicator is odd and the sign of said quotient is negative, select algorithm (c); if the state of both said first and second indicators is "zero" and the state of said second odd-even indicator is even and the sign of said quotient is positive, select algorithm (c); if the state of both said first and second indicators is "zero" and the state of said second odd-even indicator is even and the sign of said quotient is negative, select algorithm (d); if the state of said second indicator is a "zero" and the state of said first indicator is a "one" and the state of said second odd-even indicator is odd and the sign of said quotient is positive, select algorithm (a); if the state of said second indicator is a "zero" and the state of said first indicator is a "one" and the state of said second odd-even indicator is odd and the sign of said quotient is negative, select algorithm (b); if the state of said second indicator is a "zero" and the state of said first indicator is a "one" and the state of said second odd-even indicator is even and the sign of said quotient is positive, select algorithm (b); and if the state of said second indicator is a "zero" and the state of said first indicator is a "one" and the state of said second odd-even indicator is even and the sign of said quotient is negative, select algorithm (a);
h. replacing the state of said second indicator with the state of said first indicator;
i. examining the state of said second indicator and if said second indicator is then in the binary "1" state, setting said second odd-even indicator to the even state, but if said second indicator is then the "zero" state, setting said second odd-even indicator to the opposite of whichever state it is then in;
j. terminating said data sensing time measurement when it is equal to the predicted ideal length resulting from the use of said selected algorithm and, if a signal transition was detected during said data sensing time measurement period, terminating or initiating said reinitiated measurement of said time slot, as appropriate for measuring either time slot being measured, setting said first indicator to a binary "1" and entering a one into a data register, and, at the next signal transition, reinitiating said data sensing time measurement and reinitiating or terminating said time slot measurement as appropriate for measuring either time slot being measured, and reinitiating said symbol width measurement, and resuming operation at step d), but if no transition signal was detected during said data sensing time measurement period, entering a "zero" into said data register, setting said first indicator to a binary "0", and, at the next signal transition, reinitiating steps a) and b) and said data sensing time measurement and resuming operation with step g).

9. In an F2F coded data system, in which the time periods or widths between signal transitions corresponding to the two frequencies originally used to encode the data may be distorted by spread, when received at a decoder, so as to exhibit their signal transition points spaced at other than the original frequency transition spacing or times, a method of interpreting said distorted F2F coded data to extract therefrom its correct digital content whenever each multibit data block is preceded by at least a binary "1" preamble or first symbol having two double frequency time slots, or nominal half-symbol widths, by predicting and controlling the duration of a search for any double frequency signal transitions occurring intermediate the single frequency symbol boundary transitions, comprising steps of:
a. measuring the width of either of the two time slots in said first symbol;
b. measuring the total width of said first symbol and, after said measurement is completed, initiating a data sensing time measurement and reinitiating step b) for the next succeeding symbol;
c. setting a first and a second indicator to a binary "1" state and a second odd-even indicator to the "even" state;
d. doubling the measurement of said time slot;

e. dividing the difference between said doubled time slot measurement and said symbol width measurement by said symbol width measurement;

f. assigning an algebraic sign to the quotient resulting from said step e) said sign being positive if said doubled time slot measurement is greater than said symbol width measurement and being negative if said doubled time slot measurement is less than said symbol width measurement when said time slot measurement is made of the first time slot in said symbol, and said signs being the opposite when said time slot measurement is made of the second time slot of said symbol;

g. examining the state of said first indicator and if said first indicator is then in the "zero" state, setting a first odd-even indicator to the opposite of whichever state it is then in, but if said first indicator is then in the "one" state, setting said first odd-even indicator to the even state;

h. selecting an algorithm and predicting an ideal length for said data sensing time measurement, said algorithm being chosen from the following:

$$T_{sg} = \frac{T_{n-1}}{4} [4C - |K_p|], \quad (a)$$

$$T_{sg} = \frac{T_{n-1}}{4} [4C + |K_p|], \quad (b)$$

$$T_{sg} = \frac{T_{n-1}}{2} [\frac{4C - |K_p|}{2 + |K_p|}], \text{ or} \quad (c)$$

$$T_{sg} = \frac{T_{n-1}}{2} [\frac{4C + |K_p|}{2 - |K_p|}] \quad (d)$$

where C is a variable coefficient arbitrarily chosen from the range 0.5 to 1.0 and being optimum at C = $\frac{3}{4}$, $T_{sg}$ is the predicted ideal length for said data sensing time, $T_{n-1}$ is the last said symbol width measurement, and $K_p$ is the absolute value of said quotient, and said algorithm (a), (b), (c), or (d) is selected according to the following criteria: if the state of both said first and said second indicators is a "one" and the sign of said quotient is negative, select algorithm (a); if the state of both of said first and second indicators is a "one" and the sign of said quotient is positive, select algorithm (b); if the state of said second indicator is a "one" and the state of said first indicator is a "zero" and the sign of said quotient is positive, select algorithm (c); if the state of said second indicator is a "one" and the state of said first indicator is a "zero" and the sign of said quotient is negative, select algorithm (d); if the state of both said second indicator and said first indicator is a "zero" and the state of a second odd-even indicator is odd and the sign of said quotient is positive, select algorithm (d); if the state of both said second indicator and said first indicator is a "zero" and the state of a second odd-even indicator is odd and the sign of said quotient is negative, select algorithm (c); if the state of both said first and second indicators is "zero" and the state of a second odd-even indicator is even and the sign of said quotient is positive, select algorithm (c); if the state of both said first and second indicators is "zero" and the state of a second odd-even indicator is even and the sign of said quotient is negative, select algorithm (d); if the state of said second indicator is a "zero" and the state of said first indicator is a "one" and the state of a second odd-even indicator is odd and the sign of said quotient is positive, select algorithm (a); if the state of said second indicator is a "zero" and the state of said first indicator is a "one" and the state of a second odd-even indicator is odd and the sign of said quotient is negative, select algorithm (b); if the state of said second indicator is a "zero" and the state of said first indicator is a "one" and the state of a second odd-even indicator is even and the sign of said quotient is positive, select algorithm (b); and if the state of said second indicator is a "zero" and the state of said first indicator is a "one" and the state of a second odd-even indicator is even and the sign of said quotient is negative, select algorithm (a);

i. replacing the state of said second indicator with the state of said first indicator;

j. examining the state of said second indicator and if said second indicator is then in the binary "1" state, setting a second odd-even indicator to the even state, but if said second indicator is then in the binary "zero" state, setting said second odd-even indicator to the opposite of whichever state it is then in;

k. terminating said data sensing time measurement when it equals said predicted ideal length resulting from the use of said algorithm and, if a signal transition was detected during said data sensing time measurement period, setting said first indicator to a binary "1", entering a "one" into a data register, and examining the state of said first odd-even indicator, and if it is odd, changing the sign of said quotient, but if no signal transition occurred during said data sensing time period, entering a "zero" into said data register and setting said first indicator to a binary "0";

l. terminating said symbol width measurement and reinitiating said symbol width measurement and reinitiating said data sensing time measurement at the next signal transition following the termination of said data sensing time measurement period, and resuming operation at step g).

10. In an F2F coded data system, in which the time periods or widths between signal transitions corresponding to the two frequencies originally used to encode the data may be distorted by spread and by acceleration effects in the sensing or in the encoding of said data to exhibit their signal transition points spaced at other than the original frequency transition spacing or times, a method of interpreting said distorted F2F coded data to extract therefrom its correct digital content whenever each multibit data block is preceded by at least a binary "1" preamble or first symbol having two double frequency time slots, or half-symbol widths, by predicting and controlling the duration of a search for any double frequency signal transitions occurring intermediate the single frequency symbol boundary transitions, comprising steps of:

a. measuring either one of said two time slots in said first symbol;

b. measuring the total width of said first symbol and, when said measurement is complete, storing said measurement in a first and a second storage and initiating a data sensing time measurement and reinitiating said step b) measurement for the next succeeding symbol and setting a first and a second indicator to a binary "1" state;

c. doubling said time slot measurement;

d. dividing the difference between said doubled time slot measurement and said symbol width measurement by said symbol width measurement to yield a quotient;

e. assigning an algebraic positive or negative sign to said quotient, said sign being positive if said doubled time slot measurement is greater than said symbol width measurement and negative if said doubled time slot measurement is less than said symbol width measurement, provided that said time slot measurement is made on said first time slot in said first symbol, said signs being the opposite of said second time slot that was measured in said first symbol;

f. examining the state of said first indicator and if said first indicator is then in the "zero" state, setting an odd-even indicator to the opposite of whichever state it is then in, but if said first indicator is then in the "one" state, setting said first odd-even indicator to the even state;

g. selecting an algorithm and predicting an ideal length for said data sensing time measurement, said algorithm being chosen from the following:

$$T_{sg} = \frac{T_{n-1}}{4} [4C \frac{T_{n-1}}{T_{n-2}} - |K_p|], \quad (a)$$

$$T_{sg} = \frac{T_{n-1}}{4} [4C \frac{T_{n-1}}{T_{n-2}} + |K_p|], \quad (b)$$

$$T_{sg} = \frac{T_{n-1}}{2 + |K_p|} [(\frac{4C}{2 + |K_p|}) \frac{T_{n-1}}{T_{n-2}} - \frac{|K_p|}{2}], \quad (c)$$

$$T_{sg} = \frac{T_{n-1}}{2 - |K_p|} [(\frac{4C}{2 - |K_p|}) \frac{T_{n-1}}{T_{n-2}} + \frac{|K_p|}{2}], \quad (d)$$

$$T_{sg} = \frac{T_{n-1}}{2} [4C (\frac{2 - |K_p|}{2 + |K_p|}) \frac{T_{n-1}}{T_{n-2}} - |K_p|] \frac{1}{2 + |K_p|}, \quad (e)$$

$$T_{sg} = \frac{T_{n-1}}{2} [4C (\frac{2 + |K_p|}{2 - |K_p|}) \frac{T_{n-1}}{T_{n-2}} + |K_p|] \frac{1}{2 - |K_p|}, \quad (f)$$

$$T_{sg} = \frac{T_{n-1}}{4} [4C \frac{T_{n-1}}{T_{n-2}} (1 + \frac{|K_p|}{2}) - |K_p|], \quad (g)$$

$$T_{sg} = \frac{T_{n-1}}{4} [4C \frac{T_{n-1}}{T_{n-2}} (1 - \frac{|K_p|}{2}) + |K_p|], \quad (h)$$

where C is a variable coefficient arbitrarily chosen from the range 0.5 to 1.0 and being optimum at C = ¾, $T_{sg}$ is the predicted ideal length for said data sensing time, $T_{n-1}$ is said first stored symbol width measurement, $T_{n-2}$ is the second stored symbol width measurement, and $K_p$ is the absolute value of said quotient, and said algorithm (a), (b), (c), (d), (e), (f), (g), or (h) is selected according to the following criteria: if said first and said second indicator are in the binary "1" state, and said odd-even indicator is even, and the sign of said quotient is negative, select algorithm (a); if the state of said first and said second indicator is a binary "1", and said odd-even indicator is even, and the sign of said quotient is positive, select algorithm (b); if the state of said second indicator is a one and the state of said first indicator is a zero, and said odd-even indicator is odd, and the sign of said quotient is positive, select algorithm (c); if the state of said first indicator is a zero and the state of said second indicator is a one, and said odd-even indicator is odd, and the sign, of said quotient is negative, select algorithm (d); if the state of said second indicator is a zero and the state of said first indicator is a zero and the state of said odd-even indicator is odd and the sign of said quotient is negative, select algorithm (f); if the state of said second indicator is a zero and the state of said odd-even indicator is odd, and the sign of said quotient is positive, select algorithm (e); if the state of said second indicator is a zero and the state of said first indicator is a zero and the state of said odd-even indicator is even and the sign of said quotient is positive, selected algorithm (f); if the state of said second indicator is zero and the state of said first indicator is zero and the state of said odd-even indicator is even and the sign of said quotient is negative, select algorithm (e); if the state of said second indicator is a zero and the state of said first indicator is a one and the state of said odd-even indicator is even and the sign of said quotient is negative, select algorithm (g); and, if the state of said second indicator is a zero and the state of said first indicator is a one and the state of said odd-even indicator is even and the sign of said quotient is positive, select algorithm (h);

h. replacing the state of said second indicator with the state of said first indicator;

i. replacing the content of said second storage with the content of said first storage;

j. terminating said data sensing measurement when it equals said ideal length resulting from the use of said algorithm and, if another signal transition was detected during said data sensing period, setting said first indicator to a binary "1" state, entering a one into a data register, examining the state of said first odd-even indicator, and if said first odd-even indicator is then in the odd state, changing the sign of said quotient to the opposite of whichever sign it is then in, but if no transition signal occurred during said data sensing time period, setting said first indicator to a binary "0" state, and entering a "0" into a data register;

k. terminating said symbol width measurement and storing said measurement in said first storage and reinitiating said symbol width measurement and reiniating said data sensing time measurement at the next signal transition and resuming operation at step f).

11. In an F2F coded data system, in which the time periods or widths between signal transitions corresponding to the two frequencies originally used to encode the data may be distorted by spread, when recieved at a decoder, so as to exhibit their signal transition points spaced at other than the original frequency transition spacing or times, a method of interpreting said distorted F2F coded data to extracted therefrom its correct digital content whenvever each multibit data block is preceded by at least two binary "1" preamble or first symbols having two double frequency time slots, or nominal half-symbol width, by predicting and controlling the duration of a search for any double frequency signal transitions occurring intermediate the single frequency symbol boundary transitions, comprising steps of:

a. measuring the width of both of said preamble symbols;

b. setting a first and a second indicator to a binary "1" state and a second odd-even indicator to the even state;

c. measuring either one of the two time slots in either of said first two symbols, and, at the end of said second symbol, initiating a data sensing time measurement, and reinitiating said symbol width measurement;

d. dividing said time slot measuremnt by said symbol width measurement corresponding to the symbol in which said time slot measurement was made and subtracting therefrom said second symbol width measurement divided by the sum of said first symbol width and said second symbol width and doubling the result, to yield a spread correction factor, but if said time slot measurement was made in the second time slot of either of said symbols, subtracting instead said first symbol width measurement divided by the sum of said first symbol and said second symbol and doubling the result to yield a spread correction factor;

e. assigning an algebraic positive or negative sign to said resulting spread correction factor, said sign being positive if said doubled time slot measurement divided by said symbol width is greater than and negative if it is less than said either symbol width divided by the sum of said second symbol width and said first symbol width and if said time slot measurement was made in the first slot of either said symbol, but said signs being the opposite when said time slot measurement is made in the second time slot of either of said symbols;

f. examining the state of said first indicator, and if it is in the binary "1" condition, setting a first odd-even indicator to the even state, but if said first indicator is not in the binary "1" state, setting said first odd-even indicator to the opposite of whichever state it is then in;

g. selecting an algorithm and predicting an ideal length for said data sensing time measurement, said algorithm being chosen from the following:

$$T_{sg} = \frac{T_{n-1}}{2} \left[ \frac{4C + |K_p|}{2 - |K_p|} \right] \quad (a)$$

$$T_{sg} = \frac{T_{n-1}}{2} \left[ \frac{4C - |K_p|}{2 + |K_p|} \right] \quad (b)$$

$$T_{sg} = \frac{T_{n-1}}{4} \left[ 4C - |K_p| \right] \quad (c)$$

$$T_{sg} = \frac{T_{n-1}}{4} \left[ 4C + |K_p| \right] \quad (d)$$

where C is a variable coefficient arbitrarily chosen from the range 0.5 to 1.0 and being optimum at C = ¾, $T_{sg}$ is the predicted ideal length for said data sensing time period, $T_{n-1}$ is the last symbol width measurement made, and $K_p$ is the absolute value of the result computed in step d) and said algorithm (a), (b), (c), or (d) is selected according to the following criteria: if said first and second indicators are both in the zero state, said second odd-even indicator is in the odd state and the sign of $K_p$ is posiitive or if the state of said second odd-even indicator is even and the sign of $K_p$ is negative or if the state of said first indicator is zero and of said second indicator is one and the sign of $K_p$ is negative, choose algorithm (a); if the state of said first and said second indicators is zero and the state of said second odd-even indicator is even and the sign of $K_p$ is positive or if the state of said second odd-even indicator is odd and the sign of $K_p$ is negative or if the state of said first indicator is zero and the state of said second indicator is one and the sign of said $K_p$ is positive, choose algorithm (b); if the state of said first indicator is a one and of said second indicator is a zero and of said second odd-even indicator is odd and the sign of $K_p$ is positive or if the state of said second odd-even indicator is even and the sign of $K_p$ is negative or if the state of said first indicator is one and the state of said second indicator is one and the sign of $K_p$ is negative, choose algorithm (c); if the state of said first indicator is a one and the state of said second indicator is a zero, the state of said second odd-even indicator is even and the sign of said $K_p$ is positive or if the state of said second odd-even indicator is odd and the sign of said $K_p$ is negative or if the state of said first indicator is a one and the state of said second indicator is a one and the sign of said $K_p$ is positive, choose algorithm (d);

h. replacing the state of said second indicator with the state of said first indicator;

i. examining the state of said second indicator and, if said second indicator is then in the one state, setting said second odd-even indicator to the even state, but if said second indicator is in the zero state, setting said second odd-even indicator to the opposite of whatever condition it is then in;

j. terminaing said data sensing time measurement when it equals said predicted ideal length for said time measurement resulting from step g) and, if another signal transition was detected during said data sensing time period, setting said first indicator to a binary "1", entering a one into a data register, and examining the state of said first odd-even indicator and if said odd-even indicator is in the odd state, changing the sign of said spread correction factor as was assigned to said factor in step e), and, at the next occurring signal transition, terminating said symbol width measurement and reinitiating said symbol width measurement for the next succeeding symbol, and resuming operation with step f), but if no other signal transition was detected during said data sensing time period, terminating said symbol width measurement at the next signal transition occurring after the termination of said data sensing time period, entering a zero into a data register, and setting said first indicator to a binary "0", reinitiating said symbol width measurement for the next succeeding symbol, and returning to step f).

12. In an F2F coded data system, in which the time periods or widths between signal transitions corresponding to the two frequencies originally used to encode the data may be distorted by spread, when received at a decoder, so as to exhibit their signal transition points spaced at other than the original frequency transition spacing or times, a method of interpreting said distorted F2F coded data to extract therefrom its correct digital content whenever each multibit data block is preceded by at least two binary "1" preamble or first symbols having two double frequency time slots, or nominal half-symbol widths, by predicting and controlling the duration of a search for any double frequency signal transitions occurring intermediate the single frequency symbol boundary transitions, comprising steps of:

a. measuring the widths of both of said preamble symbols;

b. setting a first and a second indicator to a binary "1" state;

c. measuring either of the two time slots in either of said first two symbols, and at the end of said second symbol reinitiating the symbol width measurement and the time slot measurement for the next succeeding symbol and initiating a data sensing time measurement;

d, examining the state of both said first and second second indicators and, if both are in the binary "1" state, and if said time slot measurement was made in the first slot of either of said symbols, dividing said time slot measurement by said symbol width measurement corresponding to the symbol in which said time slot measurement was made and subtracting therefrom said second symbol divided by the sum of said first symbol width and said second symbol width and doubling the result, to yield a spread correction factor, but if said time slot measurement was made in the second time slot of either of said symbols, subtracting instead said first symbol width measurement divided by the sum of said first symbol and said second symbol and doubling the result, to yield a spread correction factor and, if both said first and second indicators are not in the binary "1" state, proceeding to step f);

e. assigning an algebraic positive or negative sign to said spread correction factor, said sign being positive if the quotient resulting from said time slot divided by a symbol width is greater than, and negative if said quotient is less than the appropriate said symbol width divided by the sum of the said first and said second symbol widths and if said time slot measurement was made in the first slot of either of said symbols, but said sign being the opposite whenever said time slot measurement is made in the second time slot of either of said symbols;

f. examining the state of said first indicator, and if it is in the binary "1" condition, setting an odd-even indicator to the even state, but if said first indicator is not in the binary "1" state, setting said odd-even indicator to the opposite of whichever state is is then in;

g. selecting an algorithm and predicting an ideal length for said data sensing time measurement, said algorithm being chosen from the following:

$$T_{sg} = \frac{T_{n-1}}{2}\left[\frac{4C + |K_p|}{2 - |K_p|}\right] \quad (a)$$

$$T_{sg} = \frac{T_{n-1}}{2}\left[\frac{4C - |K_p|}{2 + |K_p|}\right] \quad (b)$$

$$T_{sg} = \frac{T_{n-1}}{4}[4C - |K_p|] \quad (c)$$

$$T_{sg} = \frac{T_{n-1}}{4}[4C + K_p] \quad (d)$$

where C is a variable coefficient arbitrarily chosen from the range 0.5 to 1.0 and being optimum at C = ¾, $T_{sg}$ is the predicted ideal length for said data sensing time period, $T_{n-1}$ is the last symbol width measurement made, and $K_p$ is the absolute value of the result computed in step d) and said algorithm (a), (b), (c), or (d) is selected according to the following criteria: if said first and second indicators are both in the zero state, said odd-even indicator is in the odd state and the sign of $K_p$ is positive or if the state of said odd-even indicator is even and the sign of $K_p$ is negative or if the state and said first indicator is zero and of said second indicator is one and said odd-even indicator is odd, and the sign of $K_p$ is positive, choose algorithm (b); if the state of said first and second indicators is zero and the state of said odd-even indicator is even and the sign of $K_p$ is positive of if the sign of said odd-even is odd and the sign of $K_p$ is negative or if the state of said first indicator is zero and the state of said second indicator is one and said odd-even indicator is odd, and the sign of said $K_p$ is negative, choose algorithm (a); if the state of said first indicator is a one and of said second indicator is a zero and of said odd-even indicator is even and the sign of $K_p$ is positive, if the state of said first indicator is one and the state of said second indicator is one and said odd-even indicator is even, and the sign of $K_p$ is positive, choose algorithm (d); if the state of said first indicator is a one and the state of said second indicator is a zero and the state of said odd-even indicator is even and the sign of said $K_p$ is negative or if the state of said first indicator is a one and the state of said second indicator is a one and said odd-even indicator is even, and the sign of said $K_p$ is negative, choose algorithm (c);

h. replacing the state of said second indicator with the state of said first indicator;

i. terminating said data sensing time measurement when it equals said predicted ideal length for said time measurement resulting from step g) and, if another signal transition was detected during said data sensing time period, terminating said reinitiated time slot width measurement, setting said first indicator to a binary "1", entering a one into a data register, and examining the state of said first odd-even indicator and if said odd-even indicator is in the odd state, changing the sing of said spread correction factor as was assigned to said factor in step e), and, at the next occurring signal transition, terminating said symbol width measurement and reinitiating said time slot and symbol width measurements for the next succeeding symbol, and resuming operation with step d), but if no other signal transition was detected during said data sensing time period, terminating said time slot and symbol width measurements at the next signal transition occurring after the termination of said data sensing time period, entering a zero into a data register, and setting said first indicator to a binary "", reinitiating said symbol width and time slot measurements for the next succeeding symbol, and returning to step f).

13. In an F2F coded data system in which the time periods or widths between signal transitions corresponding to the two frequencies originally used to encode the data may be distorted by spread and by acceleration effects in the sensing or in the encoding of said data to exhibit their signal transition points spaced at other than the ideal frequency transition spacing or times, a method of interpreting said distorted F2F coded data to extract therefrom its correct digital content whenever each multibit data block is preceded by at least a binary "1" preamble or first symbol having two double frequency time slots, or nominal half-symbol widths, by predicting and controlling the duration of a search for any double frequency signal transitions occurring intermediate the single frequency symbol boundary transitions, comprising steps of:

a. measuring the width of either of the two time slots in said first symbol;

b. measuring the width of said first symbol and, when said measurement is complete, storing said measurement in a first and a second storage, initiating a data sensing time measurement and reinitiating steps a) and b) for the next succeeding symbol and setting a first and a second indicator to a binary "1"

state and setting an odd-even indicator to the even state;

c. doubling the measurement made of said time slot;

d. examining the state of said first indicator and, if it is in the binary "1" state, dividing the difference between said doubled time slot measurement and said symbol width measurement by said symbol width measurement to yield a quotient;

e. assigning an algebraic positive or negative sign to said quotient, said sign being positive if said doubled time slot measurement is greater than said symbol width measurement and negative if said double time slot measurement is less than said symbol width measurement when said time slot measurement is made on said first time slot in said first measuring step, but said signs being the opposite if said second time slot was measured in said time slot measuring step;

f. selecting an algorithm and predicting an ideal length for said data sensing time measurement, said algorithm being chosen from the following:

$$T_{sg} = \frac{T_{n-1}}{4} [4C \frac{T_{n-1}}{T_{n-2}} - |K_p|], \quad (a)$$

$$T_{sg} = \frac{T_{n-1}}{4} [4C \frac{T_{n-1}}{T_{n-2}} + |K_p|], \quad (b)$$

$$T_{sg} = \frac{T_{n-1}}{2 + |K_p|} [(\frac{4C}{2 + |K_p|}) \frac{T_{n-1}}{T_{n-2}} - \frac{|K_p|}{2}], \quad (c)$$

$$T_{sg} = \frac{T_{n-1}}{2 - |K_p|} [(\frac{4C}{2 - |K_p|}) \frac{T_{n-1}}{T_{n-2}} + \frac{|K_p|}{2}], \quad (d)$$

$$T_{sg} = \frac{T_{n-1}}{2} [4C (\frac{2 - |K_p|}{2 + |K_p|}) \frac{T_{n-1}}{T_{n-2}} - |K_p|] \frac{1}{2 + |K_p|}, \quad (e)$$

$$T_{sg} = \frac{T_{n-1}}{2} [4C (\frac{2 + |K_p|}{2 - |K_p|}) \frac{T_{n-1}}{T_{n-2}} + |K_p|] \frac{1}{2 - |K_p|}, \quad (f)$$

$$T_{sg} = \frac{T_{n-1}}{4} [4C \frac{T_{n-1}}{T_{n-2}} (1 + \frac{|K_p|}{2}) - |K_p|], \quad (g)$$

$$T_{sg} = \frac{T_{n-1}}{4} [4C \frac{T_{n-1}}{T_{n-2}} (1 - \frac{|K_p|}{2}) + |K_p|], \quad (h)$$

where C is a variable coefficient arbitrarily chosen from the range 0.5 to 1.0 and being optimum at C = 3/4, $T_{sg}$ is the predicted ideal length for said data sensing time, $T_{n-1}$ is said last symbol width measurement, $T_{n-2}$ is the next to last symbol width measurement, and $K_p$ is the absolute value of said quotient, and said algorithm (a), (b), (c), (d), (e), (f), (g), or (h) is selected according to the following criteria: if said first and said second indicator are in the binary "1" state, and said odd-even indicator is even, and the sign of said quotient is negative, select algorithm (a); if the state of said first and said second indicator is a binary "1", and said odd-even indicator is even, and the sign of said quotient is positive, select algorithm (b); if the state of said second indicator is a one and the state of said first indicator is a zero and said odd-even indicator is odd, and the sign of said quotient is positive, select algorithm (c); if the state of said first indicator is a zero and the state of said second indicator is a one, and said odd-even indicator is odd, and the sign of said quotient is negative, select algorithm (d); if the state of said second indicator is a zero and the state of said first indicator is a zero and the state of said odd-even indicator is odd and the sign of said quotient is negative, select algorithm (f); if the state of said second indicator is a zero and the state of said first indicator is a zero and the state of said odd-even indicator is odd, and the sign of said quotient is positive, select algorithm (e); if the state of said second indicator is a zero and the state of said first indicator is a zero and the state of said of said odd-even indicator is even and the sign of said quotient is positive, select algorithm (f); if the state of said second indicator is zero and the state of said first indicator is zero and the state of said odd-even indicator is even and the sign of said quotient is negative, select algorithm (e); if the state of said second indicator is a zero and the state of said first indicator is a one and the state of said odd-even indicator is even and the sign of said quotient is negative, select algorithm (g); and, if the state of said second indicator is a zero and the state of said first indicator is a one and the state of said odd-even indicator is even and the sign of said quotient is positive, select algorithm (h);

g. replacing the state of said second indicator with the state of said first indicator;

h. replacing the content of said secnd storage with the content of said first storage;

i. terminating said data sensing measurement when it is equal to said predicted length resulting from the use of said algorithm and, if a signal transition was detected during said data sensing time measurement period, terminating or initiating said reinitiated measurement of said time slot as appropriate for measuring either time slot being measured, setting said first indicator to a binary "1" and, entering a one into a data register, and at the next signal transition, reinitiating said dta sensing time measurement and reinitiating or terminating said time slot measurement as appropriate for measuring either time slot being measured, and terminating said symbol width measurement, and reinitiating said symbol width measurement and storing said symbol width measurement just completed in said first storage, setting said odd-even indicator to the even state, and resuming operation at step c), but if no signal transition was detected during said data sensing time measurement period, terminating said symbol width measurement, reinitiating said measuring steps a) and b) and said data sensing time measurement period at the next signal transition and storing said completed symbol width measurement in said first storage and entering a zero into said data register, setting said first indicator to the "0" state, setting said odd-even indicator to the opposite of whatever state it is then in, and resuming operation with step f).

14. In an F2F coded data system, in which the time periods or widths between signal transitions corresponding to the two frequencies originally used to encode the data may be distorted by spread, when received at a decoder, so as to exhibit their signal transition points spaced at other than the original frequency transition spacing or times, a method of interpreting said distorted F2F coded data to extract therefrom its correct digital content whenever each multibit data block is preceded by at least two binary "1" preamble or first symbols having two double frequency time slots, or nominal half-symbol widths, by predicting and controlling the duration of a search for any double frequency signal transitions occurring intermediate the single frequency symbol boundary transitions, comprising steps of:
  a. measuring the widths of both of said preamble symbols;
  b. setting a first and a second indicator to a binary "1" state and a second odd-even indicator to the even state;
  c. measuring either of the two time slots in either of said first two symbols, and at the end of said second symbol reinitiating the symbol width measurement and the time slot measurement for the next succeeding symbol and initiating a data sensing time measurement;
  d. examining the state of both said first and said second indicators and, if both are in the binary "1" state, and if said time slot measurement was made in the first slot of either of said symbols, dividing said time slot measurement by said symbol width measurement corresponding to the symbol in which said time slot measurement was made and subtracting therefrom said second symbol width measurement divided by the sum of said first symbol width and said second symbol width, and doubling the result to yield a spread correction factor, but if said time slot measurement was made in the second time slot of either of said symbols, subtracting instead said first symbol width measurement divided by the sum of said first symbol and said second symbol, and doubling the result to yield a spread correction factor and, if both said first and second indicators are not in the binary "1" state, proceeding to step f);
  e. assigning an algebraic positive or negative sign to said spread correction factor, said sign being positive if the quotient resulting from said time slot divided by a symbol width is greater than, and negative if said quotient is less than the appropriate said symbol width divided by the sum of said first and second symbol widths and if said time slot measurement was made in the first slot of either of said symbols, but said sign being the opposite whenever said time slot measurement is made in the second time slot of either of said symbols;
  f. examining the state of said first indicator, and if it is in the binary "1" condition, setting a first odd-even indicator to the even state, but if said first indicator is not in the binary "1" state, setting said first odd-even indicator to the opposite of whichever state it is then in;
  g. selecting an algorithm and predicting an ideal length for said data sensing time measurement, said algorithm being chosen from the following:

$$T_{sg} = \frac{T_{n-1}}{2} \left[ \frac{4C + |K_p|}{2 - |K_p|} \right] \quad \text{(a)}$$

$$T_{sg} = \frac{T_{n-1}}{2} \left[ \frac{4C - |K_p|}{2 + |K_p|} \right] \quad \text{(b)}$$

$$T_{sg} = \frac{T_{n-1}}{4} \left[ 4C - |K_p| \right] \quad \text{(c)}$$

$$T_{sg} = \frac{T_{n-1}}{4} \left[ 4C + |K_p| \right] \quad \text{(d)}$$

where C is a variable coefficient arbitrarily chosen from the range 0.5 to 1.0 and being optimum at C = ¾, $T_{sg}$ is the predicted ideal length for said data sensing time period, $T_{n-1}$ is the last symbol width measurement made, and $K_p$ is the absolute value of the result computed in step d) and said algorithm (a), (b), (c), or (d) is selected according to the following criteria: if said first and second indicators are both in the zero state, said second odd-even indicator is in the odd state and the sign of $K_p$ is positive or if the state of said second odd-even indicator is even and the sign of $K_p$ is negative or if the state of said first indicator is zero and of said second indicator is one and the sign of $K_p$ is negative, choose algorithm (a); if the state of said first and said second indicators is zero and the state of said second odd-even indicator is even and the sign of $K_p$ is positive or if the sign of said second odd-even indicator is odd and the sign of $K_p$ is negative or if the state of said first indicator is zero and the state of said second indicator is one and the sign of said $K_p$ is positive, choose algorithm (b); if the state of said first indicator is a one and of said second indicator is a zero and of said second odd-even indicator is odd and the sign of $K_p$ is positive or if the state of said second odd-even indicator is even and the sign of $K_p$ is negative or if the state of said first indicator is one and the state of said second indicator is one and the sign of $K_p$ is negative, choose algorithm (c); if the state of said first indicator is a one and the state of said second indicator is a zero, the state of said second odd-even indicator is even and the sign of said $K_p$ is positive or if the state of said second odd-even indicator is odd and the sign of said $K_p$ is negative or if the state of said first indicator is a one and the state of said second indicator is a one and the sign of said $K_p$ is positive, choose algorithm (d);
  h. replacing the state of said second indicator with the state of said first indicator;
  i. examining the state of said second indicator and, if said second indicator is then in the one state, setting said second odd-even indicator to the even state, but if said second indicator is in the zero state, steeing said second odd-even indicator to the opposite of whatever condition it is then in;
  j. terminating said data sensing time measurement when it equals said predicted ideal length for said time measurement resulting from step g) and, if another signal transition was detected during said data sensing time period, terinating said reinitiated time slot width measurement, setting said first indicator to a binary "1", entering a one into a data register, and examining the state of said first odd-even indicator and if said odd-even indicator is in the odd state, changing the sign of said spread correction factor as was assigned to said factor in step e), and, at the next occurring signal transition, terminating said symbol width measurement and reinitiating said time slot and symbol width measurements for the next succeeding symbol, and resuming operation with step d), but if no other signal transition was detected during said data sensing time period, terminating said time slot and symbol width measurements at the next signal transition occurring after the termination of said data sensing time period, entering a zero into a data register, and setting said first indicator to a binary "0", reinitiating said symbol width and time slot measurements for the next succeeding symbol, and returning to step f).

15. In an F2F coded data system, in which the time periods or widths between signal transitions corresponding to the two frequencies originally used to encode the data may be distorted by spread and by acceleration effects in the sensing or in the encoding of said data to exhibit their signal transition points spaced at other than the original frequency transition spacing or times, a method of interpreting said distorted F2F coded data to extract therefrom its correct digital content whenever each multibit data block is preceded by at least two binary "1" preamble or first symbols having two double frequency time slots, or half-symbol widths, by predicting and controlling the duration or a search for any double frequency signal transitions occurring intermediate the single frequency symbol boundary transitions, comprising steps of:

a. measuring the width of said first symbol and storing said measurement in a second storage;
b. setting a second indicator to a binary "1" state;
c. measuring the width of said second symbol and storing said measurement in a first storage;
d. setting a first indicator to the binary "1" state;
e. measuring either one of the two time slots in either of said first two symbols, initiating a data sensing time measurement, and reinitiating said symbol width measurement;
f. dividing said time slot measurement by said symbol width measurement corresponding to the symbol in which said time slot measurement was made and subtracting therefrom said second symbol width measurement divided by the sum of said first symbol width and said second symbol width, and doubling the result, to yield a spread correction factor, but if said time slot measurement was made in the second time slot of either of said symbols, subtracting instead said first symbol width measurement divided by the sum of said first symbol and said second symbol, and doubling the result to yield a spread correction factor;
g. assigning an algebraic positive or negative sign to said resulting spread correction factor, said sign being positive if said doubled time slot measurement divided by said symbol width is greater than and negative if it is less than said either symbol width divided by the sum of said second symbol width and said first symbol width if said time slot measurement was made in the first time slot of either said symbol, but said signs being the opposite when said time slot measurement is made in the second time slot of either of said symbols;
h. examining the state of said first indicator, and if it is in the binary "1" condition, setting an odd-even indicator to the even state, but if said first indicator is not in the binary "1" state, setting said odd-even indicator to the opposite of whichever state it is then in;
i. selecting an algorithm and predicting an ideal length for said data sensing time measurement, said algorithm being chosen from the following:

$$T_{sg} = \frac{T_{n-1}}{4} [4C \frac{T_{n-1}}{T_{n-2}} - |K_p|], \quad (a)$$

$$T_{sg} = \frac{T_{n-1}}{4} [4C \frac{T_{n-1}}{T_{n-2}} + |K_p|], \quad (b)$$

$$T_{sg} = \frac{T_{n-1}}{2 + |K_p|} [(\frac{4C}{2 + |K_p|}) \frac{T_{n-1}}{T_{n-2}} - \frac{|K_p|}{2}], \quad (c)$$

$$T_{sg} = \frac{T_{n-1}}{2 - |K_p|} [(\frac{4C}{2 - |K_p|}) \frac{T_{n-1}}{T_{n-2}} + \frac{|K_p|}{2}], \quad (d)$$

$$T_{sg} = \frac{T_{n-1}}{2} [4C (\frac{2 - |K_p|}{2 + |K_p|}) \frac{T_{n-1}}{T_{n-2}} - |K_p|] \frac{1}{2 + |K_p|}, \quad (e)$$

-continued $$T_{sg} = \frac{T_{n-1}}{2} [4C (\frac{2 + |K_p|}{2 - |K_p|}) \frac{T_{n-1}}{T_{n-2}} + |K_p|] \frac{1}{2 - |K_p|}, \quad (f)$$

$$T_{sg} = \frac{T_{n-1}}{4} [4C \frac{T_{n-1}}{T_{n-2}} (1 + \frac{|K_p|}{2}) - |K_p|], \quad (g)$$

$$T_{sg} = \frac{T_{n-1}}{4} [4C \frac{T_{n-1}}{T_{n-2}} (1 - \frac{|K_p|}{2}) + |K_p|], \quad (h)$$

where C is a variable coefficient arbitrarily chosen from the range 0.5 to 1.0 and being optimum at $C = \frac{3}{4}$, $T_{sg}$ is the predicted ideal length for said data sensing time, $T_{n-1}$ is said first stored measurement, $T_{n-2}$ is said second stored measurement, and $K_p$ is said result computed in step f) above, and said algorithm (a), (b), (c), (d), (e), (f), (g), or (h) is selected according to the following criteria: if said first and said second indicator are in the binary "1" state and said odd-even indicator is even, and the sign of said result is negative, select algorithm (a); if the state of said first and said second indicator is a binary "1" and said odd-even indicator is even, and the sign of said result is positive, select algorithm (b); if the state of said second indicator is a one and the state of said first indicator is a zero, said odd-even indicator is odd, and the sign of said result is positive, select algorithm (c); if the state of said first indicator is a zero and the state of said second indicator is a one and said odd-even indicator is odd, and the sign of said result is negative, select algorithm (d); if the sign of said second indicator is a zero and the sign of said first indicator is a zero and the state of said odd-even indicator is odd and the sign of said result is negative, select algorithm (f); if the state of said second indicator is a zero and the state of said first indicator is a zero and the state of said odd-even indicator is odd, and the sign of said result is positive, select algorithm (e); if the state of said second indicator is a zero and the state of said first indicator is a zero and the state of said odd-even indicator is even and the sign of said result is positive, select algorithm (f); if the state of said second indicator is zero and the state of said first indicator is zero and the state of said odd-even indicator is even and the sign of said result is negative, select algorithm (e); if the state of said second indicator is a zero and the state of said first indicator is a one and the state of said odd-even indicator is even and the sign of said result is negative, select algorithm (g); and, if the state of said second indicator is a zero and the state of said first indicator is a one and the state of said odd-even indicator is even and the sign of said result is positive, select algorithm (h);

j. replacing the contents of said second storage with the contents of said first storage;
k. replacing the state of said second indicator with the state of said first indicator;
l. terminating said data sensing time measurement when it equals said predicted ideal length for said time measurement resulting from step i) and, if another signal transition was detected during said data sensing time period, setting said first indicator to a binary "1", entering a one into a data register, and examining the state of said odd-even indicator and if said odd-even indicator is in the odd state, changing the sign of said spread correction factor as was assigned to said factor in step g), and, at the next occurring signal transition, terminating said symbol width measurement, storing said symbol width measurement in said first storage, and reinitiating said symbol width measurement for the next succeeding symbol, and resuming operation with step h), but if no other signal transition was detected during said data sensing time period, terminating said symbol width measurement at the next signal transition occurring after the termination of said data sensing period, storing said symbol width measurement in said first storage, entering a zero into a data register, and setting said first indicator to a binary "0", reinitiating said symbol width measurement for the next succeeding symbol, and returning to step h).

16. In an F2F coded data system in which the time periods or widths between signal transitions corresponding to the two frequencies originally used to encode the data may be distorted by spread and by acceleration effects in the sensing or in the encoding of said data to exhibit their signal transition points spaced at other than the ideal frequency transition spacing or times, a method of interpreting said distorted F2F coded data to extract therefrom its correct digital content whenever each multibit data block is preceded by at least a binary "1" preamble or first symbol having two double frequency time slots, or nominal half-symbol widths, by predicting and controlling the duration of a search for any double frequency signal transitions occurring intermediate the single frequency symbol boundary transitions, comprising steps of:

a. measuring the width of either of the two time slots in said first symbol;

b. measuring the width of said first symbol and, when said measurement is complete, storing said measurement in a first and a second storage, initiating a data sensing time measurement and reinitiating steps a) and b) for the next succeeding symbol and setting a first and a second indicator to a binary "1" state and setting a second odd-even indicator to the even state;

c. doubling the measurement made of said time slot;

d. examining the state of said first indicator and, if it is in the binary "1" state, dividing the difference between said doubled time slot measurement and said symbol width measurement by said symbol width measurement to yield a quotient;

e. assigning an algebraic positive or negative sign to said quotient, said sign being positive if said doubled time slot measurement is greater than said symbol width measurement and negative if said doubled time slot measurement is less than said symbol width measurement when said time slot measurement is made on said first time slot in said first measuring step, but said signs being the opposite if said second time slot that was measured in said time slot measuring step;

f. selecting an algorithm and predicting an ideal length for said data sensing time measurement, said algorithm being chosen from the following:

$$T_{sg} = \frac{T_{n-1}}{4}[4C\frac{T_{n-1}}{T_{n-2}} - |K_p|], \quad (a)$$

$$T_{sg} = \frac{T_{n-1}}{4}[4C\frac{T_{n-1}}{T_{n-2}} + |K_p|], \quad (b)$$

-continued $$T_{sg} = \frac{T_{n-1}}{2 + |K_p|}[(\frac{4C}{2 + |K_p|})\frac{T_{n-1}}{T_{n-2}}) - \frac{|K_p|}{2}], \quad (c)$$

$$T_{sg} = \frac{T_{n-1}}{2 - |K_p|}[(\frac{4C}{2 - |K_p|})\frac{T_{n-1}}{T_{n-2}} + \frac{|K_p|}{2}], \quad (d)$$

$$T_{sg} = \frac{T_{n-1}}{2}[4C(\frac{2 - |K_p|}{2 + |K_p|})\frac{T_{n-1}}{T_{n-2}}) - |K_p|]\frac{1}{2 + |K_p|}, \quad (e)$$

$$T_{sg} = \frac{T_{n-1}}{2}[4C(\frac{2 + |K_p|}{2 - |K_p|})\frac{T_{n-1}}{T_{n-2}} + |K_p|]\frac{1}{2 - |K_p|}, \quad (f)$$

$$T_{sg} = \frac{T_{n-1}}{4}[4C\frac{T_{n-1}}{T_{n-2}}(1 + \frac{|K_p|}{2}) - |K_p|], \quad (g)$$

$$T_{sg} = \frac{T_{n-1}}{4}[4C\frac{T_{n-1}}{T_{n-2}}(1 - \frac{|K_p|}{2}) + |R_p|]; \quad (h)$$

where C is a variable coefficient arbitrarily chosen from the range 0.5 to 1.0 and being optimum at $C = \frac{3}{4}$, $T_{sg}$ is the predicted ideal length for said data sensing time, $T_{n-1}$ is said last symbol width measurement, $T_{n-2}$ is the next to last symbol width measurement, and $K_p$ is the absolute value of said quotient, and said algorithm (a), (b), (c), (d), (e), (f), (g), or (h) is selected according to the following criteria:

if said first and said second indicator are in the binary "1" state and the sign of said quotient is negative, select algorithm (a); if the state of said first and said second indicator is a binary "1" and the sign of said quotient is positive, select algorithm (b); if the state of said second indicator is a one and the state of said first indicator is a zero and the sign of said quotient is positive, select algorithm (c); if the state of said first indicator is a zero and the state of said second indicator is a one and the sign of said quotient is negative, select algorithm (d); if the state of said second indicator is a zero and the state of said first indicator is a zero and the state of an odd-even indicator is odd and the sign of said quotient is negative, select algorithm (e); if the state of said second indicator is a zero and the state of said first indicator is a zero and the state of said odd-even indicator is odd, and the sign of said quotient is positive, select algorithm (f); if the state of said second indicator is a zero and the state of said first indicator is a zero and the state of said odd-even indicator is even and the sign of said quotient is positive, select algorithm (e); if the state of said second indicator is zero and the state of said first indicator is zero and the state of said odd-even indicator is even and the sign of said quotient is negative, select algorithm (f); if the state of said second indicator is a zero and the state of said first indicator is a one and the state of said odd-even indicator is odd and the sign of said quotient is positive, select algorithm (g); if the state of said second indicator is a zero and the state of said first indicator is a one and the state of said odd-even indicator is odd and the sign of said quotient is negative, select algorithm (h); if the state of said second indicator is a zero and the state of said first indicator is a one and the state of said odd-even indicator is even and the sign of said quotient is negative, select algorithm (g); and, if the state of said second indicator is a zero and the state of said first indicator is a one and the state of said odd-even indicator is even and the sign of said quotient is positive, select algorithm (h);

i. replacing the state of said second indicator with the state of said first indicator;
j. replacing the content of said second storage with the content of said first storage;
k. examining the state of said second indicator and, if said second indicator is then in the binary "1" state, setting said second odd-even indicator to the even state, but if said second indicator is in the zero state, setting said second odd-even indicator to the opposite of whatever state it is then in;
l. terminating said data sensing measurement when it is equal to said predicted length resulting from the use of said algorithm and, if a signal transition was detected during said data sensing time measurement period, terminating or initiating said reinitiated measurement of said time slot as appropriate for measuring either time slot being measured, setting said first indicator to a binary "1" and, entering a one into a data register, and at the next signal transition, reinitiating said data sensing time measurement and reinitiating or terminating said time slot measurement as appropriate for measuring either time slot being measured, and terminating said symbol width measurement, and reinitiating said symbol width measurement and storing said symbol width measurement just completed in said first storage and resuming operation at step c), but if no signal transition was detected during said data sensing time measurement period, terminating said symbol width measurement, reinitiating said measuring steps a) and b) and said data sensing time measurement period at the next signal transition and storing said completed symbol width measurement in said first storage and entering a zero into said data register, setting said first indicator to the "0" state and resuming operation with step f).

17. In an F2F coded data system, in which the time periods or widths between signal transitions corresponding to the two frequencies originally used to encode the data may be distorted by spread and by acceleration effects in the sensing or in the encoding of said data to exhibit their signal transition points spaced at other than the original frequency transition spacing or times, a method of interpreting said distorted F2F coded data to extract therefrom its correct digital content whenever each multibit data block is preceded by at least a binary "1" preamble or first symbol having two double frequency time slots, or half symbol widths, by predicting and controlling the duration of a search for any double frequency signal transitions occurring intermediate the single frequency symbol boundary transitions, comprising steps of:
a. measuring either one of said two time slots in said first symbol;
b. measuring the total width of said first symbol and, when said measurement is complete, storing said measurement in a first and a second storage and initiating a data sensing time measurement and reinitiating said step b) measurement for the next succeeding symbol and setting a first and a second indicator to a binary "1" state and a second odd-even indicator to the even state;
c. doubling said time slot measurement;
d. dividing the difference between said doubled time slot measurement and said symbol width measurement by said symbol width measurement to yield a quotient;
e. assigning an algebraic positive or negative sign to said sign being positive if said doubled time slot measurement is greater than said symbol width measurement and negative if said said quotient, said sign being positive if said doubled time slot measurement is greater than said symbol width measurement and negative if said doubled time slot measurement is less than said symbol width measurement, provided that said time slot measurement is made on said first time slot in said first symbol, said signs being the opposite of said second time slot that was measured in said first symbol;
f. examining the state of said first indicator and if said first indicator is then in the "zero" state, setting a first odd-even indicator to the opposite of whichever state it is then in, but if said first indicator is then in the "one" state, setting said first odd-even indicator to the even state;
g. selecting an algorithm and predicting an ideal length for said data sensing time measurement, said algorithm being chosen from the following:

$$T_{sg} = \frac{T_{n-1}}{4} [4C \frac{T_{n-1}}{T_{n-2}} - |K_p|], \quad (a)$$

$$T_{sg} = \frac{T_{n-1}}{4} [4C \frac{T_{n-1}}{T_{n-2}} + |K_p|], \quad (b)$$

$$T_{sg} = \frac{T_{n-1}}{2 + |K_p|} [(\frac{4C}{2+|K_p|}) \frac{T_{n-1}}{T_{n-2}} - \frac{|K_p|}{2}], \quad (c)$$

$$T_{sg} = \frac{T_{n-1}}{2 - |K_p|} [(\frac{4C}{2-|K_p|}) \frac{T_{n-1}}{T_{n-2}} + \frac{|K_p|}{2}], \quad (d)$$

$$T_{sg} = \frac{T_{n-1}}{2} [4C(\frac{2-|K_p|}{2+|K_p|}) \frac{T_{n-1}}{T_{n-2}} - |K_p|] \frac{1}{2+|K_p|}, \quad (e)$$

$$T_{sg} = \frac{T_{n-1}}{2} [4C(\frac{2+|K_p|}{2-|K_p|}) \frac{T_{n-1}}{T_{n-2}} + |K_p|] \frac{1}{2-|K_p|}, \quad (f)$$

$$T_{sg} = \frac{T_{n-1}}{4} [4C \frac{T_{n-1}}{T_{n-2}}(1 + \frac{|K_p|}{2}) - |K_p|], \quad (g)$$

$$T_{sg} = \frac{T_{n-1}}{4} [4C \frac{T_{n-1}}{T_{n-2}}(1 - \frac{|K_p|}{2}) + |K_p|], \quad (h)$$

where C is a variable coefficient arbitrarily chosen from the range 0.5 to 1.0 and being optimum at C = $\frac{3}{4}$, $T_{sg}$ is the predicted ideal length for said data sensing time, $T_{n-1}$ is said first stored symbol width measurement, $T_{n-2}$ is the second stored symbol width measurement, and $K_p$ is the absolute value of said quotient, and said algorithm (a), (b), (c), (d), (e), (f), (g), or (h) is selected according to the following criteria:
if said first and said second indicator are in the binary "1" state and the sign of said quotient is negative, select algorithm (a); if the state of said first and said second indicator is a binary "1" and the sign of said quotient is positive, select algorithm (b); if the state of said second indicator is a one and the state of said first indicator is a zero and the sign of said quotient is positive, select algorithm (c); if the state of said first indicator is a zero and the state of said second indicator is a one and the sign of said quotient is negative, select algorithm (d); if the state of said second indicator is a zero and the state of said first indicator is a zero and the state of an odd-even indicator is odd and the sign of said quotient is negative, select algorithm (e); if the state of said second indicator is a zero and the state of said first indicator is a zero and the state of said odd-even indicator is odd, and the sign of said quotient is positive, select algorithm (f); if the state of said second indicator is a zero and the state of said first indicator is a zero and the state of said odd-even indicator is even and the sign of said quotient is positive, select algorithm (e); if the state of said second indicator is zero and the state of said first indicator is zero and the state of said odd-even indicator is even and the sign of said quotient is negative, select algorithm (f); if the state of said second indicator is a zero and the state of said first indicator is a one and the state of said odd-even indicator is odd and the sign of said quotient is positive, select algorithm (g); if the state of said second indicator is a zero and the state of said first indicator is a one and the state of said odd-even indicator is odd and the sign of said quotient is negative, select algorithm (h); if the state of said second indicator is a zero and the state of said first indicator is a one and the state of said odd-even indicator is even and the sign of said quotient is negative, select algorithm (g); and, if the state of said second indicator is a zero and the state of said first indicator is a one and the state of said odd-even indicator is even and the sign of said quotient is positive, select algorithm (h);

i. replacing the state of said second indicator with the state of said first indicator;

j. replacing the content of said second storage with the content of said first storage;

k. examining the state of said second indicator and, if said second indicator is then in the binary "1" state, setting said second odd-even indicator to the even state, but if said second indicator is in the zero state, setting said second odd-even indicator to the opposite of whatever state it is then in;

l. terminating said data sensing measurement when it equals said ideal length resulting from the use of said algorithm and, if another signal transition was detected during said data sensing period, setting said first indicator to a binary "1" state, entering a one into a data register, examining the state of said first odd-even indicator, and if said first odd-even indicator is then in the odd state, changing the sign of said quotient to the opposite of whichever sign it is then in, but if no transition signal occurred during said data sensing time period, setting said first indicator to a binary "0" state, and entering a "0" into a data register;

m. terminating said symbol width measurement and storing said measurement in said first storage and reinitiating said symbol width measurement and reinitiating said data sensing time measurement at the next signal transition and resuming operation at step f).

18. In an F2F coded data system in which the time periods or widths between signal transitions corresponding to the two frequencies originally used to encode the data may be distorted by spread and by acceleration effects in the sensing or in the encoding of said data to exhibit their signal transition points spaced at other than the ideal frequency transition spacing or times, a method of interpreting said distorted F2F coded data to extract therefrom its correct digital content whenever each multibit data block is preceded by at least two binary "1" preamble or first symbols having two double frequency time slots, or nominal half-symbol widths, by predicting and controlling the duration of a search for any double frequency signal transitions occurring intermediate the single frequency symbol boundary transitions, comprising steps of:

a. measuring the width of said first symbol and storing said measurement in a second storage;

b. setting a second indicator to a binary "1" state;

c. measuring the width of said second symbol and storing said measurement in a first storage;

d. setting a first indicator to the binary "1" state;

e. measuring either of the two time slots in either of said first two symbols, and reinitiating the symbol width measurement and the time slot measurement for the next succeeding symbol and initiating a data sensing time measurement;

f. examining the state of both said first and said second indicators and, if both are in the binary "1" state, and if said time slot measurement was made in the first slot of either of said symbols, dividing said time slot measurement by said symbol width measurement corresponding to the symbol in which said time slot measurement was made and subtracting therefrom said second symbol width measurement divided by the sum of said first symbol width and said second symbol width, but if said time slot measurement was made in the second time slot of either of said symbols, subtracting instead said first symbol width measurement divided by the sum of said first symbol and said second symbol and doubling the result, to yield a spread correction factor and, if both said first and second indicators are not in the binary "1" state, proceeding to step h);

g. assigning an algebraic positive or negative sign to said spread correction factor, said sign being positive if said time slot divided by a symbol width quotient is greater and negative if said quotient is less than the appropriate said symbol width divided by the sum of said first and second symbol widths and if said time slot measurement was made in the first slot of either of said symbols, but said sign being the opposite whenever said time slot measurement is made in the second time slot of either of said symbols;

h. examining the state of said first indicator, and if it is in the binary "1" condition, setting an odd-even indicator to the even state, but if said first indicator is not in the binary "1" state, setting said odd-even indicator to the opposite of whichever state it is then in;

i. a step of selecting an algorithm for predicting an ideal length for said data sensing time measurement, said algorithm being chosen from the following:

$$T_{sg} = \frac{T_{n-1}}{4} [4C \frac{T_{n-1}}{T_{n-2}} - |K_p|], \quad (a)$$

$$T_{sg} = \frac{T_{n-1}}{4} [4C \frac{T_{n-1}}{T_{n-2}} + |K_p|], \quad (b)$$

$$T_{sg} = \frac{T_{n-1}}{2 + |K_p|} [(\frac{4C}{2 + |K_p|}) \frac{T_{n-1}}{T_{n-2}} - \frac{|K_p|}{2}], \quad (c)$$

$$T_{sg} = \frac{T_{n-1}}{2 - |K_p|} [(\frac{4C}{2 - |K_p|}) \frac{T_{n-1}}{T_{n-2}} + \frac{|K_p|}{2}], \quad (d)$$

-continued $$T_{sg} = \frac{T_{n-1}}{2} [4C(\frac{2-|K_p|}{2+|K_p|})\frac{T_{n-1}}{T_{n-2}} - |K_p|]\frac{1}{2+|K_p|}, \quad (e)$$

$$T_{sg} = \frac{T_{n-1}}{2} [4C(\frac{2+|K_p|}{2-|K_p|})\frac{T_{n-1}}{T_{n-2}} + |K_p|]\frac{1}{2-|K_p|}, \quad (f)$$

$$T_{sg} = \frac{T_{n-1}}{4} [4C\frac{T_{n-1}}{T_{n-2}}(1+\frac{|K_p|}{2}) - |K_p|], \quad (g)$$

$$T_{sg} = \frac{T_{n-1}}{4} [4C\frac{T_{n-1}}{T_{n-2}}(1-\frac{|K_p|}{2}) + |K_p|], \quad (h)$$

where C is a variable coefficient arbitrarily chosen from the range 0.5 to 1.0 and being optimum at C = ¾, $T_{sg}$ is the predicted ideal length for said data sensing time measurement, $T_{n-1}$ is said first stored measurement, $T_{n-2}$ is said second stored measurement, and $K_p$ is said result computed in said step f) above, and said algorithm (a), (b), (c), (d), (e), (f), (g), or (h) is selected according to the following criteria: if said first and said second indicator are in the binary "1" state, and said odd-even indicator is even, and the sign of said result is negative, select algorithm (a); if the state of said first and said second indicator is a binary "1" and said odd-even indicator is even and the sign of said result is positive, select algorithm (b); if the state of said second indicator is a one and the state of said first indicator is a zero and said odd-even indicator is odd, and the sign of said result is positive, select algorithm (c); if the state of said first indicator is a zero and the state of said second indicator is a one and said odd-even indicator is odd, and the sign of said result is negative, select algorithm (d); if the state of said second indicator is a zero and the state of said first indicator is a zero and the state of said odd-even indicator is odd and the sign of said result is negative, select algorithm (f); if the state of said second indicator is a zero and the state of said first indicator is a zero and the state of said odd-even indicator is odd, and the sign of said result is positive, select algorithm (e); if the state of said second indicator is a zero and the state of said first indicator is a zero and the state of said odd-even indicator is even and the sign of said result is positive, select algorithm (f); if the state of said second indicator is zero and the state of said first indicator is zero and the state of said odd-even indicator is even and the sign of said result is negative, select algorithm (e); if the state of said second indicator is a zero and the state of said first indicator is a one and the state of said odd-even indicator is even and the sign of said result is negative, select algorithm (g); and, if the state of said second indicator is a zero and the state of said first indicator is a one and the state of said odd-even indicator is even and the sign of said result is positive, select algorithm (h);

j. replacing the contents of said second storage with the content of said first storage;

k. replacing the state of said second indicator with the state of said first indicator;

l. terminating said data sensing time measurement when it equals said predicted ideal length for said time measurement resulting from step i) and, if another signal transition was detected during said data sensing time period, terminating said reinitiated time slot width measurement, setting said first indicator to a binary "1", entering a one into a data register, and examining the state of said odd-even indicator and if said odd-even indicator is in the odd state, changing the sign of said spread correction factor as was assigned to said factor is step g), and, at the next occurring signal transition, terminating said symbol width measurement, storing said symbol width measurement in said first storage and reinitiating said time slot and symbol width measurements for the next succeeding symbol, and resuming operation with step f), but if no other signal transition was detected during said data sensing time period, terminating said time slot and symbol width measurements at the next signal transition occurring after the termination of said data sensing time period, storing said symbol width measurement in said first storage, entering a zero into a data register, and setting said first indicator to a binary "0", reinitiating said symbol width and time slot measurements for the next succeeding symbol, and returning to step h).

19. In an F2F coded data system, in which the time periods or widths between signal transitions corresponding to the two frequencies originally used to encode the data may be distorted by spread and by acceleration effects in the sensing or in the encoding of said data to exhibit their signal transition points spaced at other than the original frequency transition spacing or times, a method of interpreting said distorted F2F coded data to extract therefrom its correct digital content whenever each multibit data block is preceded by at least two binary "1" preamble or first symbols having two double frequency time slots, or half-symbol widths, by predicting and controlling the duration of a search for any double frequency signal transitions occurring intermediate the single frequency symbol boundary transitions, comprising steps of:

a. measuring the width of said first symbol and storing said measurement in a second storage;

b. setting a second indicator to a binary "1" state and a second odd-even indicator to the even state;

c. measuring the width of said second symbol and storing said measurement in a first storage;

d. setting a first indicator to the binary "1" state;

e. measuring either one of the two time slots in either of said first two symbols, initiating a data sensing time measurement, and reinitiating said symbol width measurement;

f. dividing said time slot measurement by said symbol width measurement corresponding to the symbol in which said time slot measurement was made and subtracting therefrom said second symbol width measurement divided by the sum of said first symbol width and said second symbol width and doubling the result, to yield a spread correction factor, but if said time slot measurement was made in the second time slot of either of said symbols, subtracting instead said first symbol width measurement divided by the sum of said first symbol and said second symbol and doubling the result, to yield a spread correction factor;

g. assigning an algebraic positive or negative sign to said resulting spread correction factor, said sign being positive if said doubled time slot measurement divided by said symbol width is greater than and negative if it is less than said either symbol width divided by the sum of said second symbol width and said first symbol width if said time slot measurement was made in the first time slot of either said symbol, but said signs being the opposite when said time slot measurement is made in the second time slot of either of said symbols;

h. examining the state of said first indicator, and if it is in the binary "1" condition, setting a first odd-even indicator to the even state, but if said first indicator is not in the binary "1" state, setting said first odd-even indicator to the opposite of whichever state it is then in;

i. selecting an algorithm and predicting an ideal length for said data sensing time measurement, said algorithm being chosen from the following:

$$T_{sg} = \frac{T_{n-1}}{4} [4C \frac{T_{n-1}}{T_{n-2}} - |K_p|], \quad (a)$$

$$T_{sg} = \frac{T_{n-1}}{4} [4C \frac{T_{n-1}}{T_{n-2}} + |K_p|], \quad (b)$$

$$T_{sg} = \frac{T_{n-1}}{2 + |K_p|} [(\frac{4C}{2 + |K_p|}) \frac{T_{n-1}}{T_{n-2}} - \frac{|K_p|}{2}], \quad (c)$$

$$T_{sg} = \frac{T_{n-1}}{2 - |K_p|} [(\frac{4C}{2 - |K_p|}) \frac{T_{n-1}}{T_{n-2}} + \frac{|K_p|}{2}], \quad (d)$$

$$T_{sg} = \frac{T_{n-1}}{2} [4C (\frac{2 - |K_p|}{2 + |K_p|}) \frac{T_{n-1}}{T_{n-2}} - |K_p|] \frac{1}{2 + |K_p|}, \quad (e)$$

$$T_{sg} = \frac{T_{n-1}}{2} [4C (\frac{2 + |K_p|}{2 - |K_p|}) \frac{T_{n-1}}{T_{n-2}} + |K_p|] \frac{1}{2 - |K_p|}, \quad (f)$$

$$T_{sg} = \frac{T_{n-1}}{4} [4C \frac{T_{n-1}}{T_{n-2}} (1 + \frac{|K_p|}{2}) - |K_p|], \quad (g)$$

$$T_{sg} = \frac{T_{n-1}}{4} [4C \frac{T_{n-1}}{T_{n-2}} (1 - \frac{|K_p|}{2}) + |K_p|], \quad (h)$$

where C is a variable coefficient arbitrarily chosen from the range 0.5 to 1.0 and being optimum at C = ¾, $T_{sg}$ is the predicted ideal length for said data sensing time, $T_{n-1}$ is said first stored measurement, $T_{n-2}$ is said second stored measurement, and $K_p$ is said result computed in step (f) above, and said algorithm (a), (b), (c), (d), (e), (f), (g), or (h) is selected according to the following criteria: if said first and said second indicator are in the binary "1" state and the sign of said result is negative, select algorithm (a); if the state of said first and said second indicator is a binary "1" and the sign of said result is positive, select algorithm (b); if the state of said second indicator is a one and the state of said first indicator is a zero and the sign of said result is positive, select algorithm (c); if the state of said first indicator is a zero and the state of said second indicator is a one and the sign of said result is negative, select algorithm (d); if the sign of said second indicator is a zero and the sign of said first indicator is a zero and the state of said second odd-even indicator is odd and the sign of said result is negative, select algorithm (e); if the state of said second indicator is a zero and the state of said first indicator is a zero and the state of said second odd-even indicator is odd, and the sign of said result is positive, select algorithm (f); if the state of said second indicator is a zero and the state of said first indicator is a zero and the state of said second odd-even indicator is even and the sign of said result is positive, select algorithm (e); if the state of said second indicator is zero and the state of said first indicator is zero and the state of said second odd-even indicator is even and the sign of said result is negative, select algorithm (f); if the state of said second indicator is a zero and the state of said first indicator is a one and the state of said second odd-even indicator is odd and the sign of said result is positive, select algorithm (g); if the state of said second indicator is a zero and the state of said first indicator is a one and the state of said second odd-even indicator is odd and the sign of said result is negative, select algorithm (h); if the state of said second indicator is a zero and the state of said first indicator is a one and the state of said second odd-even indicator is even and the sign of said result is negative, select algorithm (g); and, if the state of said second indicator is a zero and the state of said first indicator is a one and the state of said second odd-even indicator is even and the sign of said result is positive, select algorithm (h);

j. replacing the contents of said second storage with the contents of said first storage;

k. replacing the state of said second indicator with the state of said first indicator;

l. examining the state of said second indicator and, if said second indicator is then in the one state, setting said second odd-even indicator to the even state, but if said second indicator is in the zero state, setting said second odd-even indicator to the opposite of whatever condition it is then in;

m. terminating said data sensing time measurement when it equals said predicted ideal length for said time measurement resulting from step i) and, if another signal transition was detected during said data sensing time period, setting said first indicator to a binary "1", entering a one into a data register, and examining the state of said first odd-even indicator and if said odd-even indicator is in the odd state, changing the sign of said spread correction factor as was assigned to said factor in step g), and, at the next occurring signal transition, terminating said symbol width measurement, storing said symbol measurement in said first storage, and reinitiating said symbol width measurement for the next succeeding symbol, and resuming operation with step h), but if no other signal transition was detected during said data sensing time period, terminating said symbol width measurement at the next signal transition occurring after the termination of said data sensing period, storing said symbol measurement in said first storage, entering a zero into a data register, and setting said first indicator to a binary "0", reinitiating said symbol width measurement for the next succeeding symbol, and returning to step h).

20. In an F2F coded data system in which the time periods or widths between signal transitions corresponding to the two frequencies originally used to encode the data may be distorted by spread and by acceleration effects in the sensing or in the encoding of said data to exhibit their signal transition points spaced at other than the ideal frequency transition spacing or times, a method of interpreting said distorted F2F coded data to extract therefrom its correct digital content whenever each multibit data block is preceded by at least two binary "1" preamble or first symbols having two double frequency time slots, or nominal half-symbol widths, by predicting and controlling the duration of a search for any double frequency signal transitions occurring intermediate the single frequency symbol boundary transitions, comprising steps of:

a. measuring the width of said first symbol and storing said measurement in a second storage;

b. setting a second indicator to a binary "1" state and a second odd-even indicator to the even state;
c. measuring the width of said second symbol and storing said measurement in a first storage;
d. setting a first indicator to the binary "1" state;
e. measuring either of the two time slots in either of said first two symbols, and reinitiating the symbol width measurement and the time slot measurement for the next succeeding symbol and initiating a data sensing time measurement;
f. examining the state of both said first and said second indicators and, if both are in the binary "1" state, and if said time slot measurement was made in the first slot of either of said symbols, dividing said time slot measurement by said symbol width measurement corresponding to the symbol in which said time slot mesurement was made and subtracting therefrom said second symbol width measurement divided by the sum of said first symbol width and said second symbol width, but if said time slot measurement was made in the second time slot of either of said symbols, subtracting instead said first symbol width measurement divided by the sum of said first symbol and said second symbol and doubling the result, to yield a spread correction factor and, if both said first and second indicators are not in the binary "1" state, proceeding to step h);
g. assigning an algebraic positive or negative sign to said spread correction factor, said sign being positive if said time slot divided by a symbol width quotient is greater and negative if said quotient is less than the appropriate said symbol width divided by the sum of said first and second symbol widths and if said time slot measurement was made in the first slot of either of said symbols, but said sign being the opposite whenever said time slot measurement is made in the second time slot of either of said symbols;
h. examining the state of said first indicator, and if it is in the binary "1" condition, setting a first odd-even indicator to the even state, but if said first indicator is not in the binary "1" state, setting said first odd-even indicator to the opposite of whichever state it is then in;
i. a step of selecting an algorithm for predicting an ideal length for said data sensing time measurement, said algorithm being chosen from the following:

$$T_{sg} = \frac{T_{n-1}}{4} [4C \frac{T_{n-1}}{T_{n-2}} - |K_p|], \quad (a)$$

$$T_{sg} = \frac{T_{n-1}}{4} [4C \frac{T_{n-1}}{T_{n-2}} + |K_p|], \quad (b)$$

$$T_{sg} = \frac{T_{n-1}}{2 + |K_p|} [(\frac{4C}{2 + |K_p|}) \frac{T_{n-1}}{T_{n-2}} - \frac{|K_p|}{2}], \quad (c)$$

$$T_{sg} = \frac{T_{n-1}}{2 - |K_p|} [(\frac{4C}{2 - |K_p|}) \frac{T_{n-1}}{T_{n-2}} + \frac{|K_p|}{2}], \quad (d)$$

$$T_{sg} = \frac{T_{n-1}}{2} [4C(\frac{2 - |K_p|}{2 + |K_p|}) \frac{T_{n-1}}{T_{n-2}} - |K_p|] \frac{1}{2 + |K_p|}, \quad (e)$$

$$T_{sg} = \frac{T_{n-1}}{2} [4C(\frac{2 + |K_p|}{2 - |K_p|}) \frac{T_{n-1}}{T_{n-2}} + \quad (f)$$

-continued $$|K_p|] \frac{1}{2 - |K_p|},$$

$$T_{sg} = \frac{T_{n-1}}{4} [4C \frac{T_{n-1}}{T_{n-2}} (1 + \frac{|K_p|}{2}) - |K_p|], \quad (g)$$

$$T_{sg} = \frac{T_{n-1}}{4} [4C \frac{T_{n-1}}{T_{n-2}} (1 - \frac{|K_p|}{2}) + |K_p|], \quad (h)$$

where C is a variable coefficient arbitrarily chosen from the range 0.5 to 1.0 and being optimum at $C = \frac{3}{4}$, $T_{sg}$ is the predicted ideal length for said data sensing time measurement, $T_{n-1}$ is said just stored measurement, $T_{n-2}$ is said second stored measurement, and $K_p$ is said result computed in said step (f) above, and said algorithm (a), (b), (c), (d), (e), (f), (g), or (h) is selected according to the following criteria: if said first and said second indicator are in the binary "1" state and the sign of said result is negative, select algorithm (a); if the state of said first and said second indicator is a binary "1" and the sign of said result is positive, select algorithm (b); if the state of said second indicator is a one and the state of said first indicator is a zero and the sign of said result is positive, select algorithm (c); if the state of said first indicator is a zero and the state of said second indicator is a one and the sign of said result is negative, select algorithm (d); if the state of said second indicator is a zero and the state of said first indicator is a zero and the state of said second odd-even indicator is odd and the sign of said result is negative, select algorithm (e); if the state of said second indicator is a zero and the state of said first indicator is a zero and the state of said second odd-even indicator is odd, and the sign of said result is positive, select algorithm (f); if the state of said second indicator is a zero and the state of said first indicator is a zero and the state of said second odd-even indicator is even and the sign of said result is positive, select algorithm (e); if the state of said second indicator is zero and the state of said first indicator is zero and the state of said second odd-even indicator is even and the sign of said result is negative, select algorithm (f); if the state of said second indicator is a zero and the state of said first indicator is a one and the state of said second odd-even indicator is odd and the sign of said result is positive, select algorithm (g); if the state of said second indicator is a zero and the state of said first indicator is a one and the state of said second odd-even indicator is odd and the sign of said result is negative, select algorithm (h); if the state of said second indicator is a zero and the state of said first indicator is a one and the state of said second odd-even indicator is even and the sign of said result is negative, select algorithm (g); and, if the state of said second indicator is a zero and the state of said first indicator is a one and the state of said second odd-even indicator is even and the sign of said result is positive, select algorithm (h);
j. replacing the contents of said second storage with the content of said first storage;
k. replacing the state of said second indicator with the state of said first indicator;
l. examining the state of said second indicator and, if said second indicator is then in the one state, setting said second odd-even indicator to the even state, but if said second indicator is in the zero state, setting said second odd-even indicator to the opposite of whatever condition it is then in;
m. terminating said data sensing time measurement when it equals said predicted ideal length for said time measurement resulting from step i) and, if another signal transition was detected during said data sensing time period, terminating said reinitiated time slot width measurement, setting said first indicator to a binary "1", entering a one into a data register, and examining the state of said first odd-even indicator and if said odd-even indicator is in the odd state, changing the sign of said spread correction factor as was assigned to said factor in step g), and, at the next occurring signal transition, terminating said symbol width measurement, storing said symbol width measurement in said first storage, and reinitiating said time slot and symbol width measurements for the next succeeding symbol, and resuming operation with step f), but if no other signal transition was detected during said data sensing time period, terminating said time slot and symbol width measurements at the next signal transition occurring after the termination of said data sensing time period, storing said symbol width measurement in said first storage, entering a zero into a data register, and setting said first indicator to a binary "0", reinitiating said symbol width and time slot measurements for the next succeeding symbol, and returning to step h).

21. A method as described in claim 19, further comprising steps of:
initiating an elapsed time measurement coincident with the initiation of said data sensing time measurement;
terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

22. A method as described in claim 6, further comprising steps of:
initiating an elapsed time measurement coincident with the initiation of said data sensing time measurement;
terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

23. A method as described in claim 8, further comprising steps of:
initiating an elapsed time measurement coincident with the initiation of said data sensing time measurement;
terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

24. A method as described in claim 5, further comprising steps of::
initiating an elapsed time measurement coincident with the initiation of said data sensing time measurement;
terminating said elapsed time measurement when said ideal length for said data sensing time measurement has been predicted, and subtracting said elapsed time measurement from said predicted ideal length measurement and, if said difference is negative, generating an error signal, terminating all time mesurements and returning to step a) but, if said difference is positive, continuing operation.

25. A method as described in claim 9, further comprising steps of:
initiating an elapsed time measurement coincident with the initiation of said data sensing time measurement;
terminating said elapsed time measurement when said ideal length for said data sensing time measurement has been predicted and subtracting said elapsed time measurement from said predicted ideal length measurement, and, if said difference is negative, generating an error signal, terminating all time measurements, and returning to step a) but, if said difference is positive, continuing operation.

26. A method as described in claim 13, further comprising steps of:
initiating an elapsed time measurement coincident with the initiation of said data sensing time measurement;
terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

27. A method as described in claim 3, further comprising steps of:
initiating an elapsed time measurement coincident with the initiation of said data sensing time measurement;
terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

28. A method as described in claim 27, further comprising steps of:
initiating an elapsed time measurement coincident with the initiation of said data sensing time measurement;
terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

29. A method as described in claim 16, further comprising steps of:
initiating an elapsed time measurement coincident with the initiation of said data sensing time measurement;

terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

30. A method as described in claim 12, further comprising steps of:
initiating an elapsed time measurement coincident with the initiation of said data sensing time measurement;
terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

31. A method as described in claim 17, further comprising steps of:
initiating an elapsed time measurement coincident with the initiation of said data sensing time measurement;
terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

32. A method as described in claim 7, further comprising steps of:
initiating an elapsed time measurement coincident with the initiation of said data sensing time measurement;
terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

33. A method as described in claim 14, further comprising steps of:
initiating an elapsed time measurement coincident with the initiation of said data sensing time measurement;
terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

34. A method as described in claim 33, further comprising steps of:
initiating an elapsed time measurement coincident with the initiation of said data sensing time measurement;
terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

35. A method as described in claim 11, further comprising steps of:
initiating an elapsed time measurement coincident with the initiation of said data sensing time measurement;
terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

36. A method as described in claim 35, further comprising steps of:
initiating an elapsed time measurement coincident with the initiation of said data sensing time measurement;
terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

37. A method as described in claim 8, in which:
said algorithms (a) and (c) are replaced by the following algorithms:

$$T_{sg} = \frac{T_{n-1}}{4} [4C - 2 |K_p|], \quad (a)$$

$$T_{sg} = \frac{T_{n-1}}{2} [\frac{4C - 2 |K_p|}{2 + |K_p|}]. \quad (c)$$

38. A method as described in claim 37, further comprising steps of:
initiating an elapsed time measurement coincident with the initiation of said data sensing time measurement;
terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

39. A method as described in claim 9, in which:
said algorithms (a) and (c) are replaced by the following algorithms:

$$T_{sg} = \frac{T_{n-1}}{4} [4C - 2 |K_p|], \quad (a)$$

$$T_{sg} = \frac{T_{n-1}}{2} [\frac{4C - 2 |K_p|}{2 + |K_p|}]. \quad (c)$$

40. A method as described in claim 39, further comprising steps of:

initiating an elapsed time measurement coincident with the initiation of said data sensing time measurement;

terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

41. A method as described in claim 16, in which: said algorithms (a), (b), (c), (d), (e), (f), (g), and (h) are replaced by the following algorithms:

$$T_{sg} = T_{n-1} [\frac{T_{n-1}}{T_{n-2}}][\frac{4C - 2|K_p|}{4}] \quad (a)$$

$$T_{sg} = T_{n-1} [\frac{T_{n-1}}{T_{n-2}}][\frac{4C + |K_p|}{4}] \quad (b)$$

$$T_{sg} = T_{n-1} [\frac{T_{n-1}}{T_{n-2}}][\frac{4C - 2|K_p|}{(2 + |K_p|)^2}] \quad (c)$$

$$T_{sg} = T_{n-1} [\frac{T_{n-1}}{T_{n-2}}][\frac{4C + |K_p|}{(2 - |K_p|)^2}] \quad (d)$$

$$T_{sg} = \frac{T_{n-1}}{2} [\frac{T_{n-1}}{T_{n-2}}][\frac{(4C - 2|K_p|)(2 - |K_p|)}{(2 + |K_p|)^2}] \quad (e)$$

$$T_{sg} = \frac{T_{n-1}}{2} [\frac{T_{n-1}}{T_{n-2}}][\frac{(2 + |K_p|)(4C + |K_p|)}{(2 - |K_p|)^2}] \quad (f)$$

$$T_{sg} = T_{n-1} [\frac{T_{n-1}}{T_{n-2}}][\frac{(4C - 2|K_p|)(2 + |K_p|)}{8}] \quad (g)$$

$$T_{sg} = T_{n-1} [\frac{T_{n-1}}{T_{n-2}}][\frac{(2 - |K_p|)(4C + |K_p|)}{8}]. \quad (h)$$

42. A method as described in claim 41, further comprising steps of:

initiating an elapsed time measurement coincident with the initiation of said data sensing time measurement;

terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

43. A method as described in claim 17, in which: said algorithms (a), (b), (c), (d), (e), (f), (g), and (h) are replaced by the following algorithms:

$$T_{sg} = T_{n-1} [\frac{T_{n-1}}{T_{n-2}}][\frac{4C - 2|K_p|}{4}] \quad (a)$$

$$T_{sg} = T_{n-1} [\frac{T_{n-1}}{T_{n-2}}][\frac{4C + |K_p|}{4}] \quad (b)$$

$$T_{sg} = T_{n-1} [\frac{T_{n-1}}{T_{n-2}}][\frac{4C - 2|K_p|}{(2 + |K_p|)^2}] \quad (c)$$

$$T_{sg} = T_{n-1} [\frac{T_{n-1}}{T_{n-2}}][\frac{4C + |K_p|}{(2 - |K_p|)^2}] \quad (d)$$

$$T_{sg} = \frac{T_{n-1}}{2} [\frac{T_{n-1}}{T_{n-2}}][\frac{(4C - 2|K_p|)(2 - |K_p|)}{(2 + |K_p|)^2}] \quad (e)$$

-continued $$T_{sg} = \frac{T_{n-1}}{2} [\frac{T_{n-1}}{T_{n-2}}][\frac{(2 + |K_p|)(4C + |K_p|)}{(2 - |K_p|)^2}] \quad (f)$$

$$T_{sg} = T_{n-1} [\frac{T_{n-1}}{T_{n-2}}][\frac{(4C - 2|K_p|)(2 + |K_p|)}{8}] \quad (g)$$

$$T_{sg} = T_{n-1} [\frac{T_{n-1}}{T_{n-2}}][\frac{(2 - |K_p|)(4C + |K_p|)}{8}]. \quad (h)$$

44. A method as described in claim 43, further comprising steps of:

initiating an elapsed time measurement coincident with the initiation of said data sensing time measurement;

terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

45. A method as described in claim 14, in which: said algorithms (b) and (c) are replaced by the following algorithms:

$$T_{sg} = \frac{T_{n-1}}{2} [\frac{4C - 2|K_p|}{2 + |K_p|}] \quad (b)$$

$$T_{sg} = \frac{T_{n-1}}{4} [4C - 2|K_p|]. \quad (c)$$

46. A method as described in claim 45, further comprising steps of:

initiating an elapsed time measurement coincident with the initiation of said data sensing time measurement;

terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

47. A method as described in claim 11, in which: said algorithms (b) and (c) are replaced by the following algorithms:

$$T_{sg} = \frac{T_{n-1}}{2} [\frac{4C - 2|K_p|}{2 + |K_p|}] \quad (b)$$

$$T_{sg} = \frac{T_{n-1}}{4} [4C - 2|K_p|]. \quad (c)$$

48. A method as described in claim 47, further comprising steps of:

initiating an elapsed time measurement coincident with the initiation of said data sensing time measurement;

terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

49. A method as described in claim 20, in which:
said algorithms (a), (b), (c), (d), (e), (f), (g), and (h) are replaced by the following algorithms:

$$T_{sg} = T_{n-1} [\frac{T_{n-1}}{T_{n-2}}][\frac{4C - 2|K_p|}{4}] \quad (a)$$

$$T_{sg} = T_{n-1} [\frac{T_{n-1}}{T_{n-2}}][\frac{4C + |K_p|}{4}] \quad (b)$$

$$T_{sg} = T_{n-1} [\frac{T_{n-1}}{T_{n-2}}][\frac{4C - 2|K_p|}{(2 + |K_p|)^2}] \quad (c)$$

$$T_{sg} = T_{n-1} [\frac{T_{n-1}}{T_{n-2}}][\frac{4C + |K_p|}{(2 - |K_p|)^2}] \quad (d)$$

$$T_{sg} = \frac{T_{n-1}}{2} [\frac{T_{n-1}}{T_{n-2}}][\frac{(4C - 2|K_p|)(2 - |K_p|)}{(2 + |K_p|)^2}] \quad (e)$$

$$T_{sg} = \frac{T_{n-1}}{2} [\frac{T_{n-1}}{T_{n-2}}][\frac{(2 + |K_p|)(4C + |K_p|)}{(2 - |K_p|)^2}] \quad (f)$$

$$T_{sg} = T_{n-1} [\frac{T_{n-1}}{T_{n-2}}][\frac{(4C - 2|K_p|)(2 + |K_p|)}{8}] \quad (g)$$

$$T_{sg} = T_{n-1} [\frac{T_{n-1}}{T_{n-2}}][\frac{(2 - |K_p|)(4C + |K_p|)}{8}]. \quad (h)$$

50. A method as described in claim 49, further comprising steps of:
initiating an elapsed time measurement coincident with the initiation of said data sensing time measurement;
terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

51. A method as described in claim 19, in which:
said algorithms (a), (b), (c), (d), (e), (f), (g), and (h) are replaced by the following algorithms:

$$T_{sg} = T_{n-1} [\frac{T_{n-1}}{T_{n-2}}][\frac{4C - 2|K_p|}{4}] \quad (a)$$

$$T_{sg} = T_{n-1} [\frac{T_{n-1}}{T_{n-2}}][\frac{4C + |K_p|}{4}] \quad (b)$$

$$T_{sg} = T_{n-1} [\frac{T_{n-1}}{T_{n-2}}][\frac{4C - 2|K_p|}{(2 + |K_p|)^2}] \quad (c)$$

$$T_{sg} = T_{n-1} [\frac{T_{n-1}}{T_{n-2}}][\frac{4C + |K_p|}{(2 - |K_p|)^2}] \quad (d)$$

$$T_{sg} = \frac{T_{n-1}}{2} [\frac{T_{n-1}}{T_{n-2}}][\frac{(4C - 2|K_p|)(2 - |K_p|)}{(2 + |K_p|)^2}] \quad (e)$$

$$T_{sg} = \frac{T_{n-1}}{2} [\frac{T_{n-1}}{T_{n-2}}][\frac{(2 + |K_p|)(4C + |K_p|)}{(2 - |K_p|)^2}] \quad (f)$$

$$T_{sg} = T_{n-1} [\frac{T_{n-1}}{T_{n-2}}][\frac{(4C - 2|K_p|)(2 + |K_p|)}{8}] \quad (g)$$

$$T_{sg} = T_{n-1} [\frac{T_{n-1}}{T_{n-2}}][\frac{(2 - |K_p|)(4C + |K_p|)}{8}]. \quad (h)$$

52. A method as described in claim 51, further comprising steps of:
initiating an elapsed time measurement coincident with the initiation of said data sensing time measurement;
terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

53. A method as described in clam 6, in which:
said algorithms (a) and (c) are replaced by the following algorithms:

$$T_{sg} = \frac{T_{n-1}}{4} [4C - 2|K_p|], \quad (a)$$

$$T_{sg} = \frac{T_{n-1}}{2} [\frac{4C - 2|K_p|}{2 + |K_p|}]. \quad (c)$$

54. A method as described in claim 53, further comprising steps of:
initiating an elapsed time measurement coincident with the initiation of said data sensing time measurement;
terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

55. A method as described in claim 5, in which:
said algorithms (a) and (c) are replaced by the following algorithms:

$$T_{sg} = \frac{T_{n-1}}{4} [4C - 2|K_p|], \quad (a)$$

$$T_{sg} = \frac{T_{n-1}}{2} [\frac{4C - 2|K_p|}{2 + |K_p|}]. \quad (c)$$

56. A method as described in claim 55, further comprising steps of:
initiating an elasped time measurement coincident with the initiation of said data sensing time measurement;
terminating said elapsed time measurement when said ideal length for said data sensing time mesurement has been predicted, and subtracting said elapsed time measurement from said predicted ideal length measurement and, if said difference is negative, generating an error signal, terminating all time measurements and returning to step a) but, if said difference is positive, continuing operation.

57. A method as described in claim 13, in which:
said algorithms (a), (b), (c), (d), (e), (f), (g), and (h) are replaced by the following algorithms:

$$T_{sg} = T_{n-1} [\frac{T_{n-1}}{T_{n-2}}][\frac{4C - 2|K_p|}{4}] \quad (a)$$

$$T_{sg} = T_{n-1} [\frac{T_{n-1}}{T_{n-2}}][\frac{4C + |K_p|}{4}] \quad (b)$$

$$T_{sg} = T_{n-1} [\frac{T_{n-1}}{T_{n-2}}][\frac{4C - 2|K_p|}{(2 + |K_p|)^2}] \quad (c)$$

-continued $$T_{sg} = T_{n-1}[\frac{T_{n-1}}{T_{n-2}}][\frac{4C + |K_p|}{(2 - |K_p|)^2}] \quad (d)$$

$$T_{sg} = \frac{T_{n-1}}{2}[\frac{T_{n-1}}{T_{n-2}}][\frac{(4C - 2|K_p|)(2 - |K_p|)}{(2 + |K_p|)^2}] \quad (e)$$

$$T_{sg} = \frac{T_{n-1}}{2}[\frac{T_{n-1}}{T_{n-2}}][\frac{(2 + |K_p|)(4C + |K_p|)}{(2 - |K_p|)^2}] \quad (f)$$

$$T_{sg} = T_{n-1}[\frac{T_{n-1}}{T_{n-2}}][\frac{(4C - 2|K_p|)(2 + |K_p|)}{8}] \quad (g)$$

$$T_{sg} = T_{n-1}[\frac{T_{n-1}}{T_{n-2}}][\frac{(2 - |K_p|)(4C + |K_p|)}{8}]. \quad (h)$$

58. A method as described in claim 57, further comprising steps of:
initiating an elapsed time measurement coincident with the initiation of said data sensing time measurement;
terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

59. A method as described in claim 10, in which: said algorithms (a), (b), (c), (d), (e), (f), (g) and (h) are replaced by the following algorithms:

$$T_{sg} = T_{n-1}[\frac{T_{n-1}}{T_{n-2}}][\frac{4C - 2|K_p|}{4}] \quad (a)$$

$$T_{sg} = T_{n-1}[\frac{T_{n-1}}{T_{n-2}}][\frac{4C + |K_p|}{4}] \quad (b)$$

$$T_{sg} = T_{n-1}[\frac{T_{n-1}}{T_{n-2}}][\frac{4C - 2|K_p|}{(2 + |K_p|)^2}] \quad (c)$$

$$T_{sg} = T_{n-1}[\frac{T_{n-1}}{T_{n-2}}][\frac{4C + |K_p|}{(2 - |K_p|)^2}] \quad (d)$$

$$T_{sg} = \frac{T_{n-1}}{2}[\frac{T_{n-1}}{T_{n-2}}][\frac{(4C - 2|K_p|)(2 - |K_p|)}{(2 + |K_p|)^2}] \quad (e)$$

$$T_{sg} = \frac{T_{n-1}}{2}[\frac{T_{n-1}}{T_{n-2}}][\frac{(2 + |K_p|)(4C + |K_p|)}{(2 - |K_p|)^2}] \quad (f)$$

$$T_{sg} = T_{n-1}[\frac{T_{n-1}}{T_{n-2}}][\frac{(4C - 2|K_p|)(2 + |K_p|)}{8}] \quad (g)$$

$$T_{sg} = T_{n-1}[\frac{T_{n-1}}{T_{n-2}}][\frac{(2 - |K_p|)(4C + |K_p|)}{8}]. \quad (h)$$

60. A method as described in claim 59, further comprising steps of:
initiating an elapsed time measurement coincident with the initiation of said data sensing time measurement;
terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

61. A method as described in claim 12, in which: said algorithms (b) and (c) are replaced by the following algorithms:

$$T_{sg} = \frac{T_{n-1}}{2}[\frac{4C - 2|K_p|}{2 + |K_p|}] \quad (b)$$

$$T_{sg} = \frac{T_{n-1}}{4}[4C - 2|K_p|]. \quad (c)$$

62. A method as described in claim 61, further comprising steps of:
initiating an elapsed time measurement coincident with the initiation of said data sensing time measurement;
terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

63. A method as described in claim 7, in which: said algorithms (b) and (c) are replaced by the following algorithms:

$$T_{sg} = \frac{T_{n-1}}{2}[\frac{4C - 2|K_p|}{2 + |K_p|}] \quad (b)$$

$$T_{sg} = \frac{T_{n-1}}{4}[4C - 2|K_p|]. \quad (c)$$

64. A method as described in claim 63, further comprising steps of:
initiating an elapsed time measurement coincident with the initiation of said data sensing time mesurement;
terminating said elapsed time measurement when said idea length for said data sensing time measurement has been predicted, and subtracting said elapsed time measurement from said predicted ideal length mesurement and, if said difference is negative, generating an error signal, terminating all time measurements and returning to step a) but, if said difference is positive, continuing operation.

65. A method as described in claim 18, in which: said algorithms (a), (b), (c), (d), (e), (f), (g), and (h) are replaced by the following algorithms:

$$T_{sg} = T_{n-1}[\frac{T_{n-1}}{T_{n-2}}][\frac{4C - 2|K_p|}{4}] \quad (a)$$

$$T_{sg} = T_{n-1}[\frac{T_{n-1}}{T_{n-2}}][\frac{4C + |K_p|}{4}] \quad (b)$$

$$T_{sg} = T_{n-1}[\frac{T_{n-1}}{T_{n-2}}][\frac{4C - 2|K_p|}{(2 + |K_p|)^2}] \quad (c)$$

$$T_{sg} = T_{n-1}[\frac{T_{n-1}}{T_{n-2}}][\frac{4C + |K_p|}{(2 - |K_p|)^2}] \quad (d)$$

$$T_{sg} = \frac{T_{n-1}}{2}[\frac{T_{n-1}}{T_{n-2}}][\frac{(4C - 2|K_p|)(2 - |K_p|)}{(2 + |K_p|)^2}] \quad (e)$$

$$T_{sg} = \frac{T_{n-1}}{2}[\frac{T_{n-1}}{T_{n-2}}][\frac{(2 + |K_p|)(4C + |K_p|)}{(2 - |K_p|)^2}] \quad (f)$$

$$T_{sg} = T_{n-1}[\frac{T_{n-1}}{T_{n-2}}][\frac{(4C - 2|K_p|)(2 + |K_p|)}{8}] \quad (g)$$

$$T_{sg} = T_{n-1}[\frac{T_{n-1}}{T_{n-2}}][\frac{(2 - |K_p|)(4C + |K_p|)}{8}]. \quad (h)$$

66. A method as described in claim 65, further conprising steps of:
    initiating an elasped time measurement coincident with the initiation of said data sensing time measurement;
    terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

67. A method as described in claim 15, in which:
    said algorithms (a), (b), (c), (d), (e), (f), (g), and (h) are replaced by the following algorithms:

$$T_{sg} = T_{n-1}[\frac{T_{n-1}}{T_{n-2}}][\frac{4C - 2|K_p|}{4}] \quad (a)$$

$$T_{sg} = T_{n-1}[\frac{T_{n-1}}{T_{n-2}}][\frac{4C + |K_p|}{4}] \quad (b)$$

$$T_{sg} = T_{n-1}[\frac{T_{n-1}}{T_{n-2}}][\frac{4C - 2|K_p|}{(2 + |K_p|)^2}] \quad (c)$$

$$T_{sg} = T_{n-1}[\frac{T_{n-1}}{T_{n-2}}][\frac{4C + |K_p|}{(2 - |K_p|)^2}] \quad (d)$$

$$T_{sg} = \frac{T_{n-1}}{2}[\frac{T_{n-1}}{T_{n-2}}][\frac{(4C - 2|K_p|)(2 - |K_p|)}{(2 + |K_p|)^2}] \quad (e)$$

$$T_{sg} = \frac{T_{n-1}}{2}[\frac{T_{n-1}}{T_{n-2}}][\frac{(2 + |K_p|)(4C + |K_p|)}{(2 - |K_p|)^2}] \quad (f)$$

$$T_{sg} = T_{n-1}[\frac{T_{n-1}}{T_{n-2}}][\frac{(4C - 2|K_p|)(2 + |K_p|)}{8}] \quad (g)$$

$$T_{sg} = T_{n-1}[\frac{T_{n-1}}{T_{n-2}}][\frac{(2 - |K_p|)(4C + |K_p|)}{8}]. \quad (h)$$

68. A method as described in claim 67, further comprising steps of:
    initiating an elapsed time measurement coincident with the initiation of said data sensing time measurement;
    terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

69. A method as described in claim 4, further comprising steps of:
    initiating an elasped time measurement coincident with the initiation of said data sensing time mesurement;
    terminating said elapsed time measurement when said ideal length for said data sensing time measurement has been predicted, and subtracting said elapsed time measurement from said predicted ideal length mesurement and, if said difference is negative, generating an error signal, terminating all time measurements and returning to step a) but, if said difference is positive, continuing operation.

70. A method as described in claim 20, further comprising steps of:
    initiating an elapsed time measurement coincident with the initiation of said data sensing time measurement;
    terminating said elapsed time measurement when said ideal length for said data sensing time measurement has been predicted, and subtracting said elapsed time measurement from said predicted ideal length measurement and, if said difference is negative, generating an error signal, terminating all time measurements and returning to step a) but, if said difference is positive, continuing operation.

71. The method as described in claim 1, further comprising the steps of:
    measuring the distortable characteristic with respect to spread of said preamble symbol by measuring the interval between either of said 1F signal transitions and said 2F signal transition, multiplying said measurement by two and subtracting it from said undistorted symbol measurement and dividing the result by said undistorted symbol measurement; and
    controlling the duration of searching for a 2F frequency signal in the succeeding data message bit cells in proportion to the results of both said undistorted symbol characteristic measuring step and said distorted symbol characteristic measuring step.

72. The method as described in claim 2, further comprising the steps of:
    measuring the distortable characteristic with respect to spread of said preamble symbol by measuring the interval between either of said 1F signal transitions and said 2F signal transition, multiplying said measurement by two and subtracting it from said undistorted symbol measurement and dividing the result by said undistorted symbol measurement; and
    controlling the duration of searching for a 2F frequency signal in the succeeding data message bit cells in proportion to the results of both said undistorted symbol characteristic measuring step and said distorted symbol characteristic measuring step.

* * * * *